US012241216B2

(12) United States Patent
Covington

(10) Patent No.: US 12,241,216 B2
(45) Date of Patent: Mar. 4, 2025

(54) SYSTEMS, APPARATUS AND METHODS CAPABLE OF COLLECTING AND PROCESSING FLOATING SOLID MATERIALS

(71) Applicant: Ocean Cleaner, LLC, Orange, TX (US)

(72) Inventor: Russell S. Covington, Orange, TX (US)

(73) Assignee: Ocean Cleaner, LLC, Orange, TX (US)

( * ) Notice: Subject to any disclaimer, the term of this patent is extended or adjusted under 35 U.S.C. 154(b) by 78 days.

(21) Appl. No.: 17/517,430

(22) Filed: Nov. 2, 2021

(65) Prior Publication Data

US 2022/0056655 A1 Feb. 24, 2022

Related U.S. Application Data

(63) Continuation-in-part of application No. 16/899,200, filed on Jun. 11, 2020, now Pat. No. 11,371,201, (Continued)

(51) Int. Cl.
*E02B 15/08* (2006.01)
*B63B 35/32* (2006.01)
(Continued)

(52) U.S. Cl.
CPC .......... *E02B 15/0864* (2013.01); *B63B 35/32* (2013.01); *C02F 1/40* (2013.01); (Continued)

(58) Field of Classification Search
CPC .... E02B 15/0864; E02B 15/048; E02B 15/10; E02B 15/106; E02B 15/046; (Continued)

(56) References Cited

U.S. PATENT DOCUMENTS 1,591,024 A 7/1926 Dodge
2,891,672 A 6/1959 Veld et al.
(Continued)

FOREIGN PATENT DOCUMENTS

CH 206327542 U 7/2017
CN 202931787 U * 5/2013
(Continued)

OTHER PUBLICATIONS

Machine-generated English translation of CN 202931787, generated on Feb. 17, 2024.*
(Continued)

*Primary Examiner* — Fred Prince
(74) *Attorney, Agent, or Firm* — E. Randall Smith; E. Randall Smith, PC

(57) ABSTRACT

Systems and methods capable of processing floating solid materials recovered from a body of water on a vessel are disclosed. In some embodiments, at least first and second debris processors are provided. The first debris processor may be disposed on the vessel between at least one intake opening and at least one discharge port, both of which are fluidly coupled to at least one chamber of the vessel. The second debris processor may be disposed between the first debris processor and the discharge port(s).

26 Claims, 59 Drawing Sheets

Related U.S. Application Data which is a continuation of application No. 16/052,045, filed on Aug. 1, 2018, now Pat. No. 10,683,627, which is a continuation-in-part of application No. 15/492,724, filed on Apr. 20, 2017, now Pat. No. 10,526,055, which is a continuation-in-part of application No. 14/881,394, filed on Oct. 13, 2015, now Pat. No. 9,643,692.

(60) Provisional application No. 63/110,014, filed on Nov. 5, 2020, provisional application No. 62/064,776, filed on Oct. 16, 2014.

(51) Int. Cl.

| | |
|---|---|
| ***C02F 1/40*** | (2023.01) |
| ***E02B 15/04*** | (2006.01) |
| ***E02B 15/10*** | (2006.01) |
| *C02F 101/32* | (2006.01) |
| *C02F 103/00* | (2006.01) |

(52) U.S. Cl.

CPC ............ *E02B 15/048* (2013.01); *E02B 15/10* (2013.01); *E02B 15/104* (2013.01); *E02B 15/106* (2013.01); *C02F 2101/32* (2013.01); *C02F 2103/007* (2013.01); *C02F 2201/002* (2013.01); *C02F 2201/008* (2013.01); *C02F 2209/42* (2013.01); *E02B 15/046* (2013.01); *Y02W 10/37* (2015.05)

(58) Field of Classification Search

CPC .......... E02B 15/104; B63B 35/32; C02F 1/40; C02F 2103/007; C02F 2201/008; C02F 2101/32; C02F 2201/002; C02F 2209/42; Y02W 10/37

USPC ............. 210/170.05, 143, 747.5, 747.6, 776, 210/242.1, 242.3, 170.09, 170.11, 923, 210/173

See application file for complete search history.

(56) References Cited

U.S. PATENT DOCUMENTS 3,667,235 A 6/1972 Preus et al.
3,688,506 A 9/1972 Marcocchio
3,701,430 A 10/1972 Tuttle
3,708,070 A 1/1973 Bell
3,762,256 A * 10/1973 Frantz .................... B29B 17/04 83/402
3,847,816 A 11/1974 DiPerna
3,923,661 A 12/1975 Crisafulli
3,926,812 A 12/1975 Neal
3,970,556 A 7/1976 Gore
3,983,034 A 9/1976 Wilson
4,033,876 A 7/1977 Cocjin et al.
4,054,525 A 10/1977 Propp
4,120,793 A 10/1978 Strain
4,211,659 A 7/1980 Nyfeld et al.
4,264,444 A 4/1981 Bronnec
4,308,140 A 12/1981 Pierson, Jr.
4,372,854 A 2/1983 Szereday
4,381,994 A 5/1983 Ayers
4,545,315 A 10/1985 Becherer
4,554,070 A 11/1985 Jordan
4,851,133 A 7/1989 Rymal
4,921,605 A 5/1990 Chastan-Bagnis et al.
4,959,143 A 9/1990 Koster
5,043,065 A 8/1991 Propp
5,047,156 A 9/1991 Sullivan
5,102,540 A 4/1992 Conradi et al.
5,108,591 A 4/1992 Hagan
5,194,151 A 3/1993 Broussard
5,215,654 A 6/1993 Karterman
5,292,430 A 3/1994 Sullivan
5,308,510 A 5/1994 Gore
5,378,376 A 1/1995 Zenner
5,688,075 A 11/1997 Gradek
5,893,978 A 4/1999 Yoda et al.
8,318,012 B2 11/2012 Dragna
9,643,692 B2 5/2017 Covington
10,293,895 B2 5/2019 Covington
10,526,055 B2 1/2020 Covington
2003/0132154 A1 7/2003 Morin
2003/0180604 A1* 9/2003 Zenger ................ H01M 6/5072 429/49
2006/0008865 A1* 1/2006 Cote ...................... B01D 65/08 210/295
2010/0314329 A1 12/2010 Prior
2013/0032524 A1 2/2013 Dragna
2014/0165894 A1 6/2014 Gastaldi et al.
2017/0197689 A1 7/2017 Covington
2019/0338481 A1 11/2019 Covington
2020/0208368 A1* 7/2020 Milanovich ............. E02B 15/10
2022/0056655 A1 2/2022 Covington

FOREIGN PATENT DOCUMENTS

CN 108179774 A 6/2018
CN 109267551 A 1/2019
CN 208897281 U 5/2019
CN 112389596 A 2/2021
EP 0005411 A1 11/1979
GB 2287000 A 9/1995
KR 100877213 B1 * 1/2009
KR 1020150101653 A 9/2015
KR 101556558 B1 10/2015
WO 95/21764 A1 8/1995
WO WO-9919204 A1 4/1999
WO 2014158391 A1 10/2014
WO WO-2020099713 A1 5/2020

OTHER PUBLICATIONS

Machine-generated English translation of KR-100877213, generated on Oct. 24, 2024.*
Ecooceane Products, http://ecooceane.com/products/, 7 pp. no date.
Oil Spill Recover Europe Ltd., YouTube video demonstration page and company information, 7 pp. no date.
Patzek, Tad W., "Energy and Environment Subcommittee of the Energy and Commerce Committee Jun. 9, 2010 Briefing", Jun. 8, 2010, 16 pp.
"Oil Skimmer 'The Big Gulp'", 2 pages, News Item Reported by Fox News 8, John Snell, Anchor, http://ladcompanies.com/index.php/home/news/101-oil-skimmer-qthe-big-gulpq.html, 2 pp.no date.
"Oil Whale How it Works", Copyright 2016 by Oilwhale Oy, http://www.oilwhale.fi/how-it-works/, 5 pp.
ELASTEC Weir Skimmers, https://www.elastec.com/products/oil-spill-skimmers/weir-oil-skimmers/, 11 pp. No date.
ABASCO Wier Skimmers, https://www.abasco.com/weir-skimmers.html, Copyright 2005-2022 Abasco, 3 pp.
Lamor, Weir Skimmer LWS 800/GTA . . . , https://cdn2.hubspot.net/hubfs/5964221/Weir%20skimmer%20LWS%20800%7B2%7DGTA%20115%7B2%7DGTA%20140%20-%20226633.pdf, 1 p. No date.
Lamor, Weir Skimmer LWS 500 . . . , https://cdn2.hubspot.net/hubfs/5964221/Weir%20skimmer%20LWS%20500%20Suction%20-%20213366%3B%20Weir%20skimmer%20LWS%20500.pdf, 2pp. No date.
Lamor User Friendly Weir Skimmer 500/800, https://www.lamor.com/equipment/weir-skimmer-500/800, Copyright 2020 Lamor Corp PLC., 5 pp.

* cited by examiner 424
420
58
440
430
440
430
30
32
34
40
428
480
100
100
480
38

SYSTEMS, APPARATUS AND METHODS CAPABLE OF COLLECTING AND PROCESSING FLOATING SOLID MATERIALS

CROSS REFERENCE TO RELATED APPLICATIONS

The present application claims priority to U.S. Provisional Patent Application Ser. No. 63/110,014 filed on Nov. 5, 2020 and entitled "Systems, Apparatus & Methods for Collecting Floating Debris", and is a continuation-in-part application of and claims priority to U.S. patent application Ser. No. 16/899,200 filed on Jun. 11, 2020 and entitled "Systems, Apparatus & Methods for Collecting Debris from a Body of Water", which is a continuation application of and claims priority to U.S. patent application Ser. No. 16/052,045 filed on Aug. 1, 2018, entitled "Systems, Apparatus & Methods for Collecting and Separating Floating Debris and Water From a Body of Water" and which issued as U.S. Pat. No. 10,683,627, which is a continuation-in-part application of and claims priority to U.S. patent application Ser. No. 15/492,724, filed on Apr. 20, 2017 and entitled "Apparatus and Methods for Recovering One or More Contaminants from a Body of Water", which issued as U.S. Pat. No. 10,526,055 and is a continuation-in-part application of and claims priority to U.S. patent application Ser. No. 14/881,394 filed on Oct. 13, 2015 and entitled "Apparatus and Methods for Recovering Oil from a Body of Water", which issued as U.S. Pat. No. 9,643,692 on May 9, 2017 and claims priority to U.S. Provisional Patent Application Ser. No. 62/064,776, filed on Oct. 16, 2014 and entitled "System, Apparats and Methods for Collecting Debris from a Body of Water", all of which are hereby incorporated by reference herein in their entireties.

FIELD OF THE DISCLOSURE

The present disclosure relates generally to recovering floating debris or contaminants. In some embodiments, the present disclosure relates to recovering floating oil, chemicals, trash, biological matter, other substances and materials, or a combination thereof, at offshore or onshore locations (e.g. ocean, pond, tank farm).

BACKGROUND

Historically, it has proven difficult to effectively and efficiently remove substantial amounts of floating debris, or contaminants, from offshore and onshore bodies of water and other locations. Some variables that may hinder such recovery efforts include the large amount of debris often needed to be recovered, the different types of debris, the rapid speed at which the debris spreads, the effect of wind, waves, rough seas and other environmental factors on the recovery operations and the limited size and/or capacity of existing recovery systems. Presently available debris recovery systems and techniques are thus believed to have one or more limitations or disadvantages.

For example, presently known vessels being used or promoted to collect waterborne debris are typically unable to efficiently and/or effectively collect different types of debris. For another example, in the offshore and inland waterway oil spill recovery arenas, various existing oil skimmers are believed to be unable to recover large volumes of oil. Many and perhaps all known systems cannot separate out significant amounts (or any) of the collected oil from sea water, resulting in limited on-board oil storage and, thus, oil recovery capacity. In fact, many existing systems cause further emulsification of the oil and water and thus cannot return separated water back to the sea or other body of water, limiting on-board oil storage capacity, increasing cost and time, etc. Other existing oil skimmers attempt to separate the recovered oil from sea water, but are slow and thus largely ineffective at recovering substantial volumes of oil.

It should be understood that the above-described examples, disadvantages, limitations, features and capabilities are provided for illustrative purposes only and are not intended to limit the scope or subject matter of this disclosure or the appended claims. Thus, none of the appended claims should be limited by the above discussion or construed to address, include or exclude each or any of the above-cited examples, disadvantages, features and capabilities merely because of the mention thereof above or herein.

Accordingly, there exists a need for improved systems, apparatus and methods useful in connection with debris recovery operations having one or more of the attributes or capabilities described or shown in, or as may be apparent from, this patent.

BRIEF SUMMARY OF SOME EMBODIMENTS OF THE DISCLOSURE

In various embodiments, the present disclosure involves systems for processing floating solid debris recovered from a body of water on a vessel. The vessel includes at least one chamber, at least one intake opening fluidly coupled to the chamber(s) and through which water enters the chamber(s) from the body of water and at least one discharge port fluidly coupled to the chamber(s) and through which at least some processed solid debris exits the chamber(s). Each item of floating solid debris has an original respective size. These systems include a first debris processor disposed on the vessel between the intake opening(s) and the discharge port(s) and configured to fragment floating solid debris from the body of water into fragments. Each such fragment generally has a fragmented size that is smaller than the original size of the solid debris from which it was fragmented. A second debris processor is disposed on the vessel between the first debris processor and the discharge port(s) and configured to receive solid debris fragments fragmented by the first debris processor and re-fragment at least some of the received fragments into a size that is smaller than the fragmented size thereof and allow at least some of the re-fragmented solid debris to enter the at least one discharge port(s).

The vessel includes at least first and second chambers, the first chamber being an inflow chamber positioned proximate to the intake opening(s) and the second chamber being a main cargo compartment fluidly coupled between the inflow chamber and at least one discharge port. The first debris processor is configured to fragment solid debris before it enters the main cargo compartment and the second debris processor is configured to re-fragment solid debris fragments received thereby from the main cargo compartment and before the solid debris fragments enter the at least one discharge port.

The following features are optional. The first debris processor may be configured to discharge solid debris fragments fragmented thereby into the inflow chamber and the second debris processor may be configured to receive debris fragments fragmented by the first debris processor. The first debris processor may be configured to be positioned within the inflow chamber. The first debris processor may be configured to be positioned above the inflow chamber. The first debris processor may be configured to receive and fragment floating solid debris constructed at least partially of any among plastic, metal, glass, fabric, other man-made materials, wood or a combination thereof, and the second debris processor may be configured to reduce the solid debris fragments received thereby into finely ground particles.

The first debris processor may include a shredder and the second debris processor includes a grinder. The first debris processor may include an industrial shredder capable of receiving and grinding wood and metal into smaller fragmented pieces and the second debris processor may include a grinder. The first and second debris processors may each include an in-line grinder, respectively. The second debris processor may include a shredder. At least one among the first and second debris processors may include a macerator. At least one among the first and second debris processors may include a clean-out configured to collect debris items that are too big to be processed or are otherwise rejected thereby. At least one feeder configured to help feed debris into the first debris processor may be included. The feeder(s) may include at least one funnel. At least one robotic handler configured to help feed debris into the first debris processor may be included.

A debris pump having at least one inlet fluidly coupled to at least one discharge port may be included and the second debris processor may be configured to allow solid debris fragments re-fragmented thereby to enter at least one inlet of the debris pump. The second debris processor may be arranged so that all solid debris fragments re-fragmented thereby enter at least one inlet of the debris pump. The second debris processor may be positioned closer to the upper end than the lower end of the main cargo compartment.

A conveyor configured to extend from the vessel to the body of water and receive floating solid debris from the body of water and deliver it to the first debris processor may be included. The conveyor may be elongated, include first and second ends and be positioned during floating solid debris collection operations so that the first end thereof extends at least partially over the inflow chamber and the second end thereof is positioned proximate to the surface of the body of water. The first debris processor may be positioned closer to the first end than the second end of the conveyor. The first debris processor may be positioned at least partially below the conveyor, wherein at least some of the collected floating solid debris drops from the conveyor into the first debris processor. The conveyor may be at least partially porous and configured to allow floating solid debris having an outer dimension of up to one and one-half inches to filter therethrough and into at least one chamber of the vessel. The conveyor may be positioned during floating solid debris collection operations so that the second end thereof is positioned below the surface of the body of water. The conveyor may be positioned during floating solid debris collection operations so that the second end thereof is positioned at the surface of the body of water. The conveyor may be at least partially porous and configured to allow floating solid debris having no dimension greater than one inch to filter therethrough.

At least one wall may extend at least partially between the upper and lower ends of the vessel and at least partially separate the main cargo compartment and inflow chamber. At least one passageway may fluidly couple the inflow chamber and main cargo compartment and the discharge port(s) may be fluidly coupled to the main cargo compartment at a height higher than the height of the passageway(s). An inflow regulator (IFR) configured to at least partially float in the inflow chamber at a height higher than the height of the at least one passageway may be included and the inflow chamber and main cargo compartment may be configured so that buoyant debris and water can move from the body of water onto the vessel through at least one intake opening thereof and into the inflow chamber, pass over the IFR and then move downwards to and through at least one passageway and into the main cargo compartment, then upwardly therein to at least one debris removal outlet.

In some embodiments, the present disclosure involves a system for collecting and processing floating solid debris from a body of water on a vessel. The vessel has at least one chamber and at least one debris pump in fluid communication with and positioned at or proximate to the upper end of the at least one chamber. The system includes a debris recovery conveyor belt having first and second ends and extending from the vessel to the body of water during operations so that the first end thereof is at or under the surface of the body of water. A first debris processor is positioned closer to the second end than the first end of the conveyor belt so that the conveyor belt receives floating solid debris from the body of water and delivers it to the first debris processor, which fragments the solid debris into small debris pieces and delivers the small debris pieces into at least one chamber of the vessel. A second debris processor is positioned in or proximate to the at least one chamber of the vessel and receives small debris pieces from the at least one chamber and fragments at least some of it into even smaller debris pieces and delivers that to the at least one debris pump.

In certain embodiments, the present disclosure involves a system for collecting floating debris from a body of water. At least one ingestion head is positionable at or proximate to the surface of the body of water. The ingestion head includes at least one intake opening and at least one exit port fluidly coupled together and a vacuum cavity surrounding the exit port(s) so that the exit port(s) can be maintained submerged in liquid throughout debris recovery operations. A fluid removal system is separate and distinct from the ingestion head and connected thereto only by one or more fluid transmission conduits extending therebetween and fluidly coupled to the exit port(s) of the ingestion head. The fluid removal system includes at least one suction pump fluidly coupled to the fluid transmission conduit(s) and is configured to draw debris and water into the ingestion head. The fluid removal system provides a sealed liquid system extending between the suction pump(s) and the port(s) of the ingestion head.

If desired, the ingestion head may include a plurality of intake openings positioned proximate to one another around the perimeter of the ingestion head and a plurality of IFRs, at least one IFR extending at least partially across each intake opening. At least IFR may be a variable buoyancy IFR. At least four IFRs may be included. The intake openings may be positioned around the perimeter of the ingestion head to ingest floating debris and water into the ingestion head from the body of water from any direction without moving the ingestion head. The ingestion head may be movable relative to the fluid removal system. The ingestion head may be moveable between at least one underground stowed position and at least one operating position at or proximate to the surface of the body of water.

The ingestion head may include an inflow chamber extending between and fluidly coupled to the at least one intake opening and the at least one exit port, the inflow chamber having a bottom surface and an inner vacuum cavity wall extending upwardly therefrom and surrounding the at least one exit port. At least one inflow chamber cover may extend over the inflow chamber and at least one exit port and have an outer vacuum cavity wall extending downwardly therefrom and around the inner vacuum cavity wall, the inflow chamber cover forming the vacuum cavity. The upper end of the inner vacuum cavity wall may be spaced downwardly from the inflow chamber cover and remain submerged in water during debris collection operations and the lower end of the outer vacuum cavity wall may be spaced downwardly from the upper end of the inner vacuum cavity and upwardly from the bottom of the inflow chamber. The space between the lower end of the outer vacuum cavity wall and the bottom of the inflow chamber may remain submerged in water during debris collection operations, whereby debris drawn into the ingestion head must pass below the outer vacuum cavity wall and over the inner vacuum cavity wall before entering the exit port(s) and remain submerged during such travel. The suction pump(s) may concurrently draw debris and water into the ingestion head and discharge such water from the fluid removal system.

If desired, a debris separation system fluidly coupled to the fluid removal system and remote from the ingestion head may be provided, whereby the water discharged from the fluid removal system has a hydrocarbon concentration of less than 5.0 PPM. A plurality of ingestion heads may be included, each ingestion head being connected to the fluid removal system only by one or more fluid transmission conduits and the fluid removal system may be at least partially disposed on a vessel or be land-based.

In many embodiments, a system for collecting floating debris from a body of water includes an ingestion head positionable at or proximate to the surface of the body of water. The ingestion head includes one or more intake openings extending around the perimeter thereof to allow floating debris and water to be drawn into the ingestion head from the surface of the body of water from any direction without moving the ingestion head. A fluid removal system may be separate and distinct from the ingestion head and connected thereto only by one or more fluid transmission conduits extending therebetween. The ingestion head may be movable relative to the fluid removal system and debris and water may be drawn into the ingestion head by suction provided by the fluid removal system through the at least one fluid transmission conduit. If desired, the ingestion head may include at least one exit port fluidly coupled to the at least one fluid transmission conduit. The fluid removal system may include at least one suction pump fluidly coupled to the at least one fluid transmission conduit and configured to draw debris and water into the ingestion head. The fluid removal system may provide a sealed liquid system extending between the at least one suction pump and the at least one port of the ingestion head.

In various embodiments, the present disclosure involves a method of collecting floating debris from a body of water. These exemplary methods include positioning an ingestion head at or proximate to the surface of the body of water, the ingestion head including at least one intake opening and at least one exit port fluidly coupled together; connecting a fluid removal system to the ingestion head only by one or more fluid transmission conduits; at least one suction pump of the fluid removal system fluidly coupled to the at least one fluid transmission conduit and drawing debris and water into the ingestion head, through the at least one fluid transmission conduit and into a vacuum-sealed collection chamber; the fluid removal system providing a sealed liquid system extending between the at least one suction pump and the port of the ingestion head; and the at least one suction pump discharging water from the collection chamber.

These exemplary methods may further include any combination of the following: the ingestion head moving across the body of water relative to the fluid removal system; the at least one suction pump concurrently drawing debris and water into the ingestion head and discharging water from the collection chamber; the ingestion head moving between at least one underground stowed position and at least one operating position at or proximate to the surface of the body of water; or any combination thereof. If desired, the ingestion head may include a plurality of intake openings positioned proximate to one at different locations around the perimeter thereof and floating debris and water may be drawn into the ingestion head from the body of water from any direction without moving the ingestion head.

In many embodiments, the present disclosure involves apparatus, systems and methods for collecting debris floating on an onshore or offshore body of water or other area (tank farm, earthen cavity, crater, etc.) and involve the use of at least one ingestion head configured to be positioned in the body of water to ingest debris from the body of water. Each ingestion head including at least one inflow regulatory ("IFR") and is remote from and fluidly coupled to at least one collection system configured to store and/or process debris recovered through the ingestion head. In some applications, any of the debris collection vessels summarized and described below may serve as the collection system. Furthermore, these embodiments can include any components and features of the debris collection vessels summarized and described below and vice versa.

In various embodiments, the present disclosure involves methods of collecting debris from a body of water on a vessel. The vessel includes at least one cargo compartment and at least one intake opening fluidly coupling the at least one cargo compartment and the body of water during debris collection operations. At least one discharge pump fluidly coupled to at least one cargo compartment concurrently draws water and debris from the body of water into the at least one cargo compartment and removes water from the cargo compartment(s). Concurrently therewith, at least one debris pump, distinct from the discharge pump(s), removes debris from the cargo compartment(s).

If desired, any one or more, or none, of the following features may be included. One or more discharge pumps may remove water from one or more cargo compartments at or proximate to the lower end thereof and/or one or more debris pumps may remove debris from one or more cargo compartments at or proximate to the upper end thereof. The discharge pump(s) may be selectively controlled to vary the volume of water removed from at least one cargo compartment and/or the debris pump(s) may be selectively controlled to vary the volume of debris removed from at least one cargo compartment.

At least one inflow chamber may be disposed on the vessel between the cargo compartment(s) and intake opening(s). The inflow chamber(s) may be at least partially separated from the compartment(s) by at least one wall and fluidly coupled thereto by at least one passageway. At least one IFR at least partially free-floating at or near the surface of liquid in at least one inflow chamber may limit the water and debris drawn from the body of water into the cargo compartment(s) to primarily debris and water that passes over the at least one IFR. At least one discharge pump may lower the liquid level in at least one inflow chamber between the IFR(s) and passageway(s) to a height lower than the liquid level therein between the IFR(s) and the intake opening(s) during debris collection operations.

A variable buoyancy system associated with at least one IFR may be selectively actuated to adjust the height thereof in the inflow chamber(s). First and second variable buoyancy IFRs may be disposed in the same inflow chamber, the second variable buoyancy IFR being positioned between the first variable buoyancy IFR and the cargo compartment(s). The first variable buoyancy IFR may primarily reduce wave action and/or turbulence in the water and debris moving through the inflow chamber(s) from the intake opening(s) to the cargo compartment(s), and/or the second variable buoyancy IFR may primarily cause mostly debris to enter the cargo compartment(s) during debris collection operations. The first variable buoyancy IFR may be selectively actuated to de-ballast it higher in the inflow chamber(s) than the second variable buoyancy IFR when there is an increase in water turbulence and/or wave action in the body of water proximate to the intake opening(s). The second variable buoyancy IFR may be selectively actuated to de-ballast it higher in the inflow chamber(s) than the first variable buoyancy IFR when debris in the body of water is a sheen and/or decreases in thickness proximate to the intake opening(s). The second variable buoyancy IFR may be selectively actuated to ballast it lower in the inflow chamber(s) than the first variable buoyancy IFR when debris in the body of water is thicker than a sheen and/or increases in thickness proximate to the intake opening(s).

A vacuum may be created above the surface of the contents of at least one cargo compartment and maintained during debris collection operations. The cargo compartment(s) may be maintained completely full of water and/or debris during collection operations. The vessel may include at least one vertical trunk fluidly coupled to at least one cargo compartment at or above the upper end thereof and the debris pump(s) fluidly coupled to at least one vertical trunk. Debris may be allowed to rise into at least one vertical trunk from at least one cargo compartment and at least one debris pump may remove debris from the cargo compartment(s) through the vertical trunk(s). The debris pump(s) may be selectively temporarily turned off when the level of debris in the vertical trunk(s) is at or below a particular height. At least one sensor may be disposed at least partially within at least one cargo compartment and/or at least one vertical trunk and indicate the height of water in the cargo compartment(s) and/or vertical trunk(s), respectively.

In some embodiments, the present disclosure involves systems useful for collecting debris from a body of water on a vessel. The vessel includes at least one cargo compartment and at least one intake opening fluidly coupling the cargo compartment(s) and body of water during debris collection operations. At least one discharge pump may be fluidly coupled to the cargo compartment(s) and have sufficient pumping capacity both when the vessel is moving and stationary to concurrently (i) draw water and debris from the body of water into the cargo compartment(s) and (ii) remove water from the cargo compartment(s). At least one debris pump that is distinct from the discharge pump(s) is fluidly coupled to the cargo compartment(s) and selectively controllable to remove debris from the cargo compartment(s) concurrently with (i) and (ii) above.

If desired, any one or more, or none, of the following features may be included. each cargo compartment has upper and lower ends, further wherein the at least one discharge pump is fluidly coupled to at least one cargo compartment closer to the lower end than the upper end thereof and the at least one debris pump is fluidly coupled to at least one cargo compartment closer to the upper end than the lower end thereof. The discharge pump(s) may be selectively controllable to vary the volume of water removed from the cargo compartment(s) and the debris pump(s) may be selectively controllable to vary the volume of debris removed from the cargo compartment(s).

At least one inflow chamber may be disposed on the vessel between the cargo compartment(s) and intake opening(s) and at least partially separated from the at least one cargo compartment by at least one wall and fluidly coupled thereto by at least one passageway. At least one IFR may be at least partially free-floating at or near the surface of liquid in at least one inflow chamber. At least one discharge pump may be configured to lower the liquid level in at least one inflow chamber between the IFR(s) and passageway(s) to a height below the liquid level in the inflow chamber(s) between the IFR(s) and intake opening(s) during debris collection operations. First and second variable buoyancy IFRs disposed in the same inflow chamber, the second variable buoyancy IFR being positioned between the first variable buoyancy IFR and the cargo compartment(s).

A variable buoyancy system may be associated with at least one IFR, the variable buoyancy system being configured to (i) allow air to escape from the at least one IFR and be replaced with liquid to decrease the buoyancy thereof and (ii) provide air into the at least one IFR and force liquid out of the at least one IFR to increase the buoyancy thereof.

At least one vertical trunk may be fluidly coupled to at least one cargo compartment at or above the upper end thereof. The debris pump(s) may be fluidly coupled to at least one vertical trunk and configured to remove debris from at least one cargo compartment through at least one vertical trunk. At least one sensor disposed at least partially within at least one cargo compartment and/or at least one vertical trunk and configured to indicate the height of water therein, respectively.

In some embodiments, the present disclosure involves methods of collecting and separating floating debris and water from a body of water on a vessel moveable in the body of water. The vessel has at least one inflow chamber distinct from a main collection compartment and fluidly coupled thereto by at least one passageway. The main collection compartment has a length, width, height and upper and lower ends. The vessel also includes at least one intake opening fluidly coupling the inflow chamber(s) and the body of water and through which water and floating debris can enter the at least one inflow chamber and vessel from the body of water. At least one water removal outlet and at least one debris removal outlet (distinct from the water removal outlet(s)) are fluidly coupled to the main collection compartment. The passageway(s) and water removal outlet(s) are fluidly coupled to the main collection compartment closer to the lower end than the upper end of the main collection compartment and the debris removal outlet(s) are fluidly coupled to the main collection compartment closer to the upper end than the lower end of the main collection compartment. These methods include filling the main collection compartment with liquid to a fill height above the passageway(s) and water removal outlet(s) and thereafter, concurrently drawing floating debris and water from the inflow chamber(s) through the submersed passageway(s) and into the main collection compartment during collection operations. At least one IFR at least partially floats in the inflow chamber(s) and reduces wave action and/or turbulence in the floating debris and water passing through the inflow chamber(s) to the main collection compartment during collection operations. Floating debris in the main collection compartment is allowed to rise above the at least one debris removal outlet and the water in the main collection compartment, removing water from the main collection compartment through the water removal outlet(s) and discharged to the body of water. Floating debris is allowed to be removed from the main collection compartment through the debris removal outlet(s) and directed to one or more debris delivery destinations.

If desired, any of the following may be included. These methods may include minimizing emulsification of water and debris in the main collection compartment during collection and separation operations. At least initially, the main collection compartment may be filled with primarily water from the body of water to a fill height above the at least one debris removal outlet and all or substantially all air may be evacuated from the main collection compartment above the surface of the contents therein. If desired, initially, the main collection compartment may be completely filled with primarily water from the body of water and, thereafter, maintained completely full of water and/or debris during collection operations. Floating debris and little, or no, water may be caused to enter the main collection compartment during collection operations. A vacuum may be created above the surface of the contents of the main collection compartment. The vessel may include at least one vertically-oriented trunk having at least one elongated, upwardly extending void fluidly coupled to the main collection compartment at or above the upper end thereof, the void(s) having a width that is smaller than the length and width of the main collection compartment. Water and/or floating debris may be allowed to completely fill the main collection compartment and extend up into at least one void of the vertical trunk(s) during collection operations. The debris removal outlet(s) may be fluidly coupled to the void(s) and floating debris may be allowed to float to the upper end of the main collection compartment and into the vertical trunk(s) and be removed therefrom through the debris removal outlet(s) and directed to one or more debris delivery destinations.

These methods may include at least substantially preventing the entry of air into the main collection compartment during collection and separation operations. The drawing floating debris and water from the inflow chamber(s) into the main collection compartment may be ceased and at least one IFR allowed to extend at least partially above the surface of the contents of the at least one inflow chamber to prevent floating debris from backing out of the inflow chamber(s) through the intake opening to the body of water. One or more IFR(s) may be disposed on the vessel at a height above the location of the passageway(s) and limit the floating debris and water that enters the main collection compartment during collection operations to primarily floating debris and water that passes over the at least one IFR. The passageway(s) may have a width or diameter that is less than 10 percent the height of the main collection compartment and be disposed at or proximate to the bottom of the main collection compartment and primarily floating debris and some water may be drawn over the at least one IFR, down in the inflow chamber(s), through the passageway(s) and into the main collection compartment during collection operations.

A second IFR may be disposed in the inflow chamber(s) between a first IFR and the main collection compartment. The first IFR may primarily reduce wave action and turbulence in water and floating debris moving through the inflow chamber(s) and the second IFR may primarily cause mostly floating debris to enter the main collection compartment during collection operations. At least one IFR may be a variable buoyancy IFR and at least one variable buoyancy IFR may be actuated during collection operations to vary the buoyancy thereof and its reducing water turbulence in the floating debris and water moving through the inflow chamber(s) and into the main collection compartment. If desired, at least one variable buoyancy IFR may be selectively actuated during collection operations to vary the buoyancy thereof and its causing mostly floating debris to enter the main collection compartment during collection operations. A second IFR may be is disposed in the inflow chamber(s) between a first IFR and the main collection compartment, both IFRs being variable buoyancy IFRs. The second IFR may be actuated during collection operations to ballast it lower in the inflow chamber(s) than the first IFR when the floating debris on the surface of the body of water is a sheen and/or decreases in thickness proximate to the intake opening(s) to assist in increasing the volume and cascading movement of floating debris passing by the second IFR into the main collection compartment. The first IFR may be selectively actuated to ballast it higher in the inflow chamber(s) than the second IFR during collection operations when at least one among the speed of the vessel in the body of water or the water turbulence and/or wave action in the body of water proximate to the intake opening(s) increases.

If desired, at least one fluid discharge pump may draw water and floating debris from the inflow chamber(s), through the passageway and into main collection compartment. The fluid discharge pump(s) may concurrently (i) draw water and floating debris from the body of water into the inflow chamber(s) and main collection compartment and (ii) remove water and little or no debris from the main collection compartment through the water removal outlet(s) and discharge it to the body of water during collection and separation operations. The fluid discharge pump(s) may lower the liquid level in the inflow chamber(s) between the passageway(s) and the IFR(s) to assist in increasing at least one among the cascading movement, volume and rate of floating debris drawn over the IFR(s) and into the main collection compartment. At least one debris discharge pump, distinct from the fluid discharge pump(s) may remove floating debris and little or no water from the main collection compartment through the debris removal outlet(s) and directing it to one or more debris delivery destinations during collection and separation operations. The debris discharge pump(s) may remove floating debris and little or no water from the main collection compartment through the debris removal outlet(s) and direct it to one or more debris delivery destinations concurrently with the fluid discharge pump(s) concurrently (i) drawing water and floating debris from the body of water into the inflow chamber(s) and main collection compartment and (ii) removing water and little or no floating debris from the main collection compartment through the water removal outlet(s) and discharging it to the body of water during collection and separation operations regardless of whether the vessel is moving.

At least one IFR may be a variable buoyancy IFR and the speed of the vessel in the body of water may be selectively varied, and/or the fluid discharge pump(s) may be selectively actuated and/or at least one variable buoyancy IFR may be selectively actuated to assist in (a) varying the buoyancy thereof in real-time on an ongoing basis as needed during collection operations in response to one or more changes in wind, rain, wave action, turbulence or other sea conditions in or above the body of water, the type, density and/or viscosity of liquid in the body of water or main collection compartment, the thickness, size, composition and/or depth of floating debris in the body of water or main collection compartment, or a combination thereof, and/or (b) changing at least one among the volume, rate and ratio of floating debris and water entering the main collection compartment, (c) optimizing the intake resistance of at least one IFR, (d) optimizing the efficiency and effectiveness of debris collection, (e) enhancing the separation of floating debris and water on the vessel, or a combination thereof.

If desired, at least one debris discharge pump, distinct from the fluid discharge pump(s) may be used to remove floating debris and little or no water from the main collection compartment through the debris removal outlet(s) and direct it to one or more debris delivery destinations during collection and separation operations. The debris pump(s) may be selectively actuated to vary the volume of floating debris removed from the main collection compartment. The suction of the fluid discharge pumps and/or speed of the vessel in the body of water may be increased during collection operations when the floating debris on the surface of the body of water is thicker than a sheen and/or increases in thickness proximate to the intake opening(s) in order to assist in increasing the volume and/or rate of floating debris entering the main collection compartment. At least one IFR may be de-ballasted during collection operations when at least one among the (i) speed of the vessel in the body of water, (ii) suction of the fluid discharge pump(s) and (iii) wave action and/or turbulence in the body of water proximate to the intake opening(s) increases.

At least one IFR may include at least one buoyant portion that free-floats at or near the surface of liquid in the inflow chamber(s). The buoyant portion(s) of IFR(s) may be lowered relative to the surface of liquid in the inflow chamber(s) during collection operations when (i) the vessel is not moving or slowed, (ii) there is a reduction in, or little or no, wave action and/or water turbulence in the body of water, (iii) the floating debris on the surface of the body of water is thicker than a sheen and/or increases in thickness proximate to the intake opening(s), or a combination thereof. The suction of the fluid discharge pump(s) and/or the height of the buoyant portion(s) of at least one IFR in the inflow chamber(s) may be varied during collection operations to assist in (i) increasing the ratio of floating debris to water entering the main collection compartment, (ii) increasing the volume and cascading movement of floating debris passing by the IFR(s) into the main collection compartment, (iii) optimizing the intake resistance of at least one IFR, (iv) optimizing the efficiency and effectiveness of debris collection, (v) enhancing the separation of floating debris and water on the vessel, or a combination thereof. The height of the buoyant portion(s) of at least one IFR may be increased in the inflow chamber(s) during collection operations when at least one among (i) the speed of the vessel in the body of water and/or the water turbulence and/or wave action in the body of water proximate to the intake opening(s) increases and/or (ii) the floating debris on the surface of in the body of water is a sheen or decreases in thickness proximate to the intake opening(s).

If desired, a second IFR may be disposed in the inflow chamber(s) between a first IFR and the main collection compartment, both IFRs being variable buoyancy IFRs. The second IFR may be ballasted higher in the inflow chamber(s) than the first IFR during collection operations when the floating debris on the surface of the body of water is thicker than a sheen or increases in thickness proximate to the intake opening(s). When the vessel is moving in the body of water during collection operations, the suction of at least one fluid discharge pump may be increased to a volume that is at least slightly greater than the volume of water and/or floating debris entering the intake opening(s) to reduce or eliminate the existence or effect of head waves at the intake opening(s). One or more fluid discharge pumps may be disposed in at least one suction chamber that is distinct from the inflow chamber(s) and the main collection compartment and fluidly coupled to the main collection compartment by the at least one water removal outlet. At least one suction chamber vent may be fluidly coupled to the suction chamber(s) proximate to the upper end thereof and opened during initial filling of the main collection compartment with liquid to at least partially vent the suction chamber(s) of gases and allow liquid to enter the suction chamber sufficient to submerse the water removal outlet(s) in liquid and provide a liquid-only interface between the suction chamber(s) and main collection compartment, to allow minimal or no gases to enter the main collection compartment from the at least one suction chamber.

In many embodiments, the present disclosure involves systems for collecting and separating floating debris and water from a body of water on a vessel moveable in the body of water and which include a main collection compartment disposed on the vessel and having a length, width, height and upper and lower ends. At least one water removal outlet is fluidly coupled to the main collection compartment closer to the lower end than the upper end of the main collection compartment. At least one debris removal outlet, distinct from the at least one water removal outlet(s), is fluidly coupled to the main collection compartment closer to the upper end than the lower end of the main collection compartment. At least one inflow chamber is disposed on the vessel and at least partially separated from the main collection compartment and fluidly coupled thereto by at least one passageway. The at least one passageway is disposed closer to the lower end than the upper end of the main collection compartment. At least one intake opening is fluidly coupling the at least one inflow chamber and the body of water, whereby water and floating debris can enter the vessel from the body of water through the at least one intake opening and into the at least one inflow chamber. At least one fluid discharge pump is fluidly coupled to the main collection compartment by the at least one water removal outlet. The fluid discharge pump(s) are selectively controllable during collection operations to draw water and floating debris from the at least one inflow chamber, through the at least one passageway and into the main collection compartment and vary at least one among the volume, rate and ratio of water and floating debris drawn into the main collection compartment. At least first and second IFRs are at least partially floating in the same inflow chamber. The second IFR is disposed between the first IFR and the main collection compartment.

If desired, at least one IFR may be a variable buoyancy IFR that is selectively controllable during collection operations to vary the buoyancy thereof in at least one inflow chamber. A variable buoyancy system may be associated with one or more variable buoyancy IFRs and is selectively controllable during debris collection operations to allow air to escape from the variable buoyancy IFR(s) and be replaced with liquid to decrease the buoyancy of the variable buoyancy IFR(s), and provide air into the variable buoyancy IFR(s) and force liquid out of the variable buoyancy IFR(s) to increase the buoyancy of the variable buoyancy IFR(s). The first and second IFRs may be pivoting-type, variable buoyancy IFRs, each disposed on the vessel at a height above the location of the at least one passageway. At least one IFR may be configured to principally limit the floating debris and water that enters the main collection compartment from the at least one inflow chamber to primarily floating debris and water that passes over the at least one IFR and thereafter moves down in the at least one inflow chamber and into the at least one passageway. The passageway(s) may have a width or diameter that is less than 10 percent the height of the main collection compartment and be disposed at or proximate to the bottom of the main collection compartment. During collection operations, the at least one passageway and the at least one water removal outlet may be configured to be submersed in liquid to provide a liquid seal of the main collection compartment below the surface of the contents thereof and allow minimal or no gases to enter the main collection compartment from below the surface of the contents thereof (e.g. to support a sealed liquid system, such as defined below).

A vertically-oriented trunk having at least one elongated, upwardly extending void may be fluidly coupled to the main collection compartment at or above the upper end of the main collection compartment. The void(s) may have a width that is smaller than the length and width of the main collection compartment. The debris removal outlet(s) may be fluidly coupled to the void(s) and the main collection compartment may be completely filled with water and/or floating debris. During debris collection operations, floating debris at the upper end of the main collection compartment may be able to pass into the vertical trunk(s) and thereafter removed through the debris removal outlet(s). A debris discharge pump that is distinct from the fluid discharge pump(s) and fluidly coupled between the debris removal outlet(s) and one or more debris delivery destinations may be included. The debris discharge pump(s) may be selectively controllable during collection and separation operations to vary the volume of floating debris removed from the main collection compartment through the debris removal outlet(s).

The fluid discharge pump(s) may be disposed on the vessel in at least one suction chamber that is distinct from the inflow chamber(s) and the main collection compartment and fluidly coupled to the main collection compartment by at least one water removal outlet. The water removal outlet(s) may be disposed proximate to the lower end of the main collection compartment and submersed in water during collection operations. At least one gate may be associated with the passageway(s) and/or water removal outlet(s). The gate(s) may be selectively controlled to block the passageway(s) and/or water removal outlet(s) and fluidly isolate the main collection compartment from the inflow chamber(s) and/or water removal outlet(s).

At least one inflow chamber cover may extend at least partially over at least one inflow chamber on the vessel and be at least partially transparent, see-through or perforated and/or strong enough to support large-sized debris placed thereupon. At least one front door may be disposed on the vessel and selectively controllable to close off or block the intake opening(s). At least one large-sized debris guard may be provided on the vessel proximate to the intake opening(s) to assist in preventing large-sized debris from entering into the inflow chamber(s).

In the present disclosure, there are also embodiments of systems for collecting and separating floating debris and water from a body of water on a vessel moveable in the body of water. These systems include a main collection compartment disposed on the vessel and having a length, width, height and upper and lower ends. At least one inflow chamber is disposed on the vessel and is distinct from the main collection compartment and fluidly coupled thereto by at least one passageway. At least one intake opening fluidly couples the inflow chamber(s) and the body of water, whereby water and floating debris can enter the vessel from the body of water through the intake opening(s) and into the inflow chamber(s). At least one fluid discharge pump is disposed on the vessel and fluidly coupled to the main collection compartment. The fluid discharge pump(s) are selectively controllable during collection operations to draw floating debris and water from the inflow chamber(s) through the passageway(s) and into the main collection compartment. At least one vertical trunk has at least one elongated, upwardly extending void fluidly coupled to the main collection compartment at or above the upper end thereof. During debris collection operations, floating debris at the upper end of the main collection compartment can pass into the vertical trunk to allow the main collection compartment to be completely filled with water and/or floating debris. At least one debris removal outlet through which floating debris can be removed from the main collection compartment is also included. The debris removal outlet(s) are fluidly coupled to the vertical trunk(s), whereby floating debris at the upper end of the main collection compartment will pass at least partially through the vertical trunk(s) as it is removed through the debris removal outlet(s). At least one IFR at least partially floats in the inflow chamber(s).

If desired, at least one wave diminishing surface may be disposed on the vessel between the IFR(s) and the body of water, slant downwardly away from the vessel and towards the body of water and be configured to assist in dampening or reducing the impact, size and/or action of waves and turbulence of water and debris entering the intake opening(s). The fluid discharge pump may be disposed on the vessel in at least one suction chamber having upper and lower ends and being distinct from the main collection compartment and inflow chamber(s). The suction chamber(s) may be fluidly coupled to the main collection compartment by at least one water removal outlet, the water removal outlet(s) being submersed in water during collection operations. A suction chamber vent may be disposed proximate to the upper end of the suction chamber(s) and configured to allow the suction chamber(s) to be selectively at least partially vented of gases. At least one flooding port may be fluidly coupled between the main collection compartment and body of water and configured to allow the main collection compartment to be at least partially filled with liquid from the body of water. At least one submersible fluid pump may be fluidly coupled to at least one flooding port and selectively actuated to completely fill the main collection compartment with liquid from the body of water. At least one air discharge vent may be disposed at or proximate to the upper end of, and fluidly coupled to, the main collection compartment and be configured to selectively allow gases to be evacuated from the main collection compartment. At least one vacuum pump may be fluidly coupled to at least one air discharge vent(s) and selectively controllable to remove gases from the main collection compartment.

If desired, at least one sensor may be disposed at least partially within the main collection compartment and configured to indicate whether debris is at a particular height in the main collection compartment. At least a first sensor may be disposed inside the main collection compartment above the passageway(s) and water removal outlet(s) to indicate when debris should be removed from the main collection compartment through the debris removal outlet(s) and assist in avoiding more than minimal debris being sucked into the fluid discharge pump(s). At least a second sensor may be disposed on the vessel below the debris removal outlet(s) to indicate when debris should not be removed from the main collection compartment through the debris removal outlet(s) and assist in avoiding more than minimal water being removed from the main collection compartment through the debris removal outlet(s).

In various embodiments, the present disclosure involves a system useful for collecting debris and water from a body of water at or near the surface of the body of water onto a waterborne vessel, separating the collected debris from water on the vessel and separately off-loading the collected debris and water from the vessel. At least one intake opening is provided in the vessel at or near the front of the vessel and in fluid communication with at least a first area inside the vessel. At least one variable buoyancy IFR is disposed in the first area on the vessel aft of the intake opening and configured to at least partially float in liquid inside the first area. The IFR includes at least one variable buoyancy chamber and may be selectively actuated to vary its buoyancy by introducing air into or allowing air to escape from the buoyancy chamber. At least one fluid discharge pump is disposed on the vessel and fluidly coupled to the first area. The discharge pump may be selectively actuated to draw debris and water from the body of water, through the intake opening into the first area and over the IFR and discharge recovered water to the body of water. At least one debris pump is fluidly coupled to the first area and configured to remove recovered debris from the vessel and offload it to at least one destination off the vessel.

In some embodiments, the present disclosure involves apparatus, methods and systems useful for collecting debris (and some water) from a body of water at or near the surface of the body of water onto a waterborne vessel. The vessel has front and rear ends and is positionable at or near the surface of the body of water. The vessel includes at least a first cargo compartment in fluid communication with the body of water and configured to contain water and debris. At least one bulkhead is disposed on the vessel between the first cargo compartment and the front end of the vessel. At least one intake opening is disposed adjacent to or formed in the bulkhead(s) and fluidly couples the first cargo compartment and the body of water. At least a first, at least partially buoyant, IFR is disposed at least partially in the first cargo compartment proximate to the intake opening(s). The IFR has a front end and a rear end and extends at least partially across the width of the first cargo compartment. The IFR is sufficiently buoyant so that when the first cargo compartment at least partially contains water, the front end thereof floats at or near the surface of the water in the first cargo compartment and limits the inflow of debris (and some) water from the body of water into the first cargo compartment to debris and water disposed at or near the surface of the body of water and which flows over the IFR during use of the system. At least one suction conduit is disposed on the vessel and fluidly coupled to the first cargo compartment. At least one discharge pump is disposed on the vessel and fluidly coupled to at least one suction conduit. When one or more discharge pumps are actuated during use of the system, it/they will create suction in at least one suction conduit to concurrently (i) draw debris and water from the body of water through the intake opening(s) over at least one IFR into the first cargo compartment and (ii) draw water from the first cargo compartment into at least one suction conduit.

In various embodiments, the present disclosure includes a system useful for collecting debris from a body of water on a vessel moveable in the body of water. The vessel includes at least one cargo compartment and at least one intake opening fluidly coupling the at least one cargo compartment with the body of water during debris collection operations. The system includes at least one discharge pump having sufficient pumping capacity both when the vessel is moving and stationary to concurrently (i) draw water and debris from the body of water, through the at least one intake opening and into the at least one cargo compartment and (ii) remove water and little or no debris from the at least one cargo compartment. At least one IFR can at least partially free-float at or near the surface of liquid in the vessel and limit the water and debris drawn from the body of water into the at least one cargo compartment to primarily debris and water that passes over the at least one buoyant portion during debris collection operations. The at least one IFR can also be selectively actuated to adjust the height of at least a portion thereof relative to the surface of liquid in the vessel during debris collection operations.

In many embodiments, the present disclosure involves methods of collecting debris from a body of water onto a vessel moveable in the body of water and having at least one intake opening fluidly coupling at least one cargo compartment of the vessel with the body of water. At least one discharge pump on the vessel is selectively actuatable, both when the vessel is moving and stationary, to concurrently (i) draw water and debris from the body of water, through the at least one intake opening and into the at least one cargo compartment and (ii) remove water and little or no debris from the at least one cargo compartment. At least one buoyant portion of at least one IFR on the vessel free-floats at or near the surface of liquid in the vessel. The at least one IFR limits the water and debris drawn from the body of water into the cargo compartment to primarily debris and water that passes over the at least one buoyant portion of the at least one IFR during debris collection operations. The at least one IFR is selectively actuatable to adjust the height of the at least one buoyant portion thereof relative to the surface of liquid in the vessel during debris collection operations.

In some embodiments, the present disclosure involves an oil recovery vessel useful for collecting oil floating in a body of water in an oil spill area at or near the surface of the body of water. The vessel includes a plurality of distinct cargo compartments positioned adjacent to one another along at least part of the length of the vessel and arranged and adapted to contain sea water and oil. A front the cargo compartment is disposed closest to the front of the vessel and a rear the cargo compartment is disposed closest to the rear of the vessel. The front cargo compartment is separated from the front end of the vessel by at least one front vertical wall. Each adjacent pair of cargo compartments is separated by at least one other vertical wall. Each vertical wall includes at least one opening formed therein proximate to the upper end thereof. Each opening is arranged and adapted to allow the flow of liquid through the associated vertical wall and into the adjacent cargo compartment aft of the vertical wall.

These embodiments include a plurality of gates. Each gate allows and disallows liquid flow through at least one of the openings. Each gate is selectively movable between at least one open and at least one closed position. At least one suction conduit is fluidly coupled to each cargo compartment to concurrently allow water to be removed from, and oil to enter, any of them. The vessel also includes at least one at least partially floating, elongated, boom disposed proximate to the front of the vessel. Each boom is arranged and adapted to encourage oil to flow into the front cargo compartment from the body of water.

In various embodiments, the present disclosure involves a system for collecting oil on a waterborne vessel from an oil spill area at or near the surface of a body of water. The system includes at least three successively fluidly coupled cargo compartments configured to initially hold sea water and thereafter hold oil. A front cargo compartment is disposed closest to the front of the vessel and a rear cargo compartment is disposed closest to the rear of the vessel. At least one intermediate cargo compartment is disposed between the front and rear cargo compartments.

The system of these embodiments also includes a plurality of fluid passageways. At least a first fluid passageway fluidly couples the front cargo compartment to the body of water and is configured to allow the flow of liquid into the front cargo compartment from the body of water. At least a second fluid passageway fluidly couples the front and the forward-most intermediate cargo compartment and is configured to allow the flow of liquid from the front cargo compartment into the forward-most intermediate cargo compartment. If there is more than one intermediate cargo compartment, at least a third fluid passageway fluidly couples each pair of successively fluidly coupled intermediate cargo compartments in the direction of the rear end of the vessel and is configured to allow liquid flow from the forward-most of each such pair of intermediate cargo compartments to the aft-most of each such pair of intermediate cargo compartments. At least one other fluid passageway fluidly couples the aft-most intermediate cargo compartment and the rear cargo compartment to allow liquid flow into the rear cargo compartment from the aft-most intermediate cargo compartment.

The system of these embodiments also includes at least one suction conduit fluidly coupled to each cargo compartment and configured to allow each cargo compartment to be concurrently at least substantially emptied of sea water and at least substantially filled with oil, starting with the rear cargo compartment. At least one fluid discharge pump is fluidly coupled to the suction conduit(s) and arranged and adapted to concurrently draw sea water out of each cargo compartment through the suction conduit(s) and draw oil into that cargo compartment through at least one associated passageway until that cargo compartment is substantially full of oil, starting with the rear cargo compartment and ending with the front cargo compartment.

There are embodiments of the present disclosure that involve a method of collecting oil on a waterborne vessel from an oil spill area at or near the surface of a body of water. At least three fluidly interconnected cargo compartments on the vessel are at least substantially filled with sea water. A front cargo compartment is disposed closest to the front end of the vessel, a rear cargo compartment is disposed closest to the rear end of the vessel and at least one intermediate cargo compartment is disposed between the front and rear cargo compartments. The front end of the vessel is positioned in or adjacent to the oil spill area. At least a first fluid passageway allows oil and some sea water to enter the front cargo compartment proximate to the upper end thereof from the body of water. Additional fluid passageways allow oil and some sea water to pass from the front cargo compartment into each successively fluidly coupled cargo compartment proximate to the upper end thereof (in the direction of the rear end of the vessel), respectively. At least one fluid discharge pump concurrently pumps sea water out of the rear cargo compartment through at least one suction conduit and allows oil and some sea water to enter the rear cargo compartment from the aft-most intermediate cargo compartment.

After the rear cargo compartment is substantially filled with oil, the rear cargo compartment is fluidly isolated from the other cargo compartments. At least one fluid discharge pump concurrently pumps sea water out of the aft-most intermediate cargo compartment through at least one suction conduit and allows oil and some sea water to enter the aft-most intermediate cargo compartment from the cargo compartment fluidly coupled thereto on its forward side. After the aft-most intermediate cargo compartment is substantially filled with oil, the aft-most intermediate cargo compartment is fluidly isolated from the other substantially water filled cargo compartments. These acts are repeated for any additional intermediate cargo compartments and then the front cargo compartment. After the front cargo compartment is substantially filled with oil, it is fluidly isolated from the body of water.

Accordingly, the present disclosure includes features and advantages which are believed to enable it to advance debris recovery technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF PRESENTLY PREFERRED EMBODIMENTS

Figure 1:
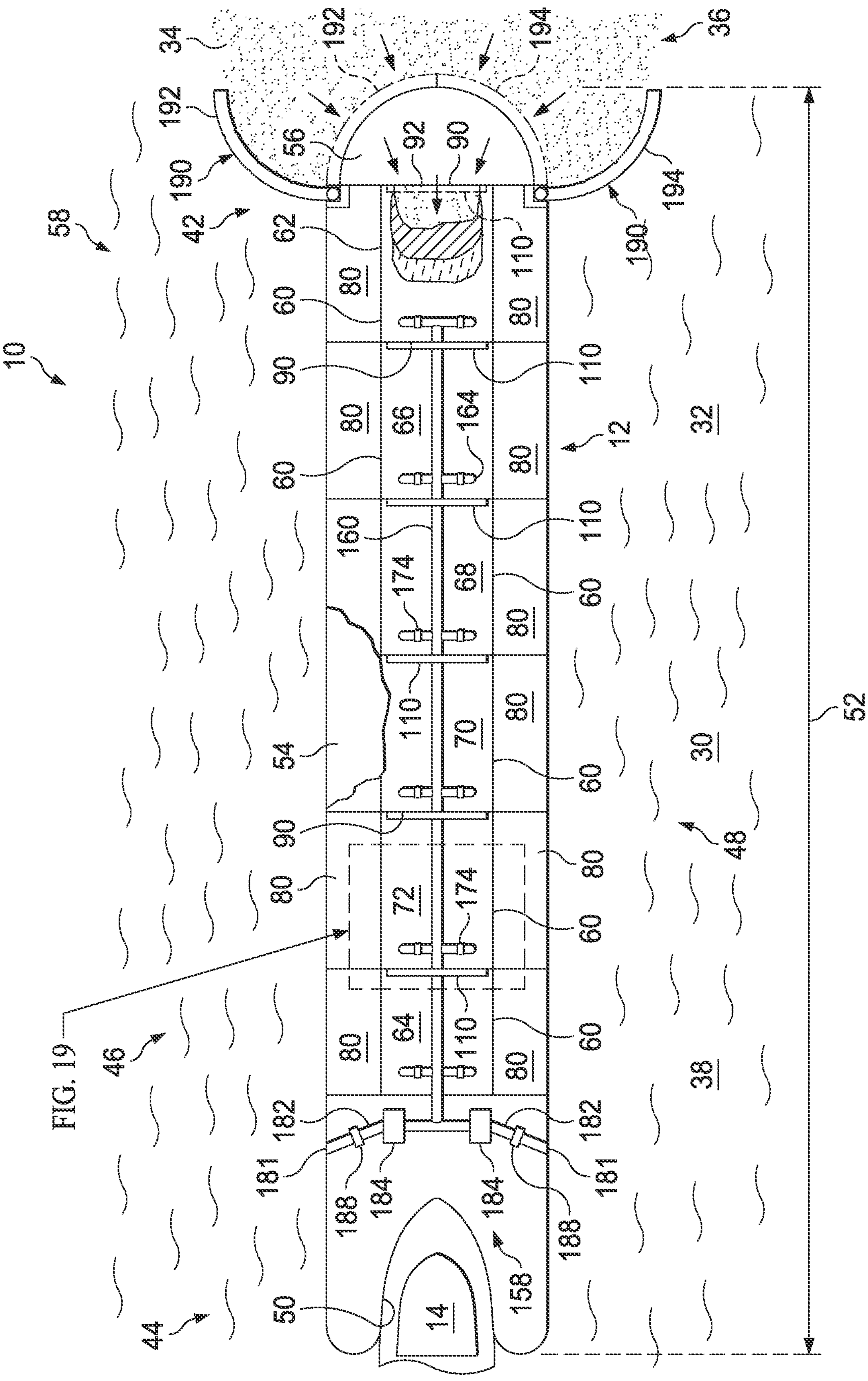
FIG. 1 is a top view of an exemplary waterborne debris recovery vessel in accordance with an embodiment of the present disclosure.

Characteristics and advantages of the present disclosure and additional features and benefits will be readily apparent to those skilled in the art upon consideration of the following detailed description of exemplary embodiments and/or referring to the accompanying Figures. It should be understood that the description herein and appended drawings, being of example embodiments, are not intended to limit the claims of this patent (or any patent or patent application claiming priority hereto). On the contrary, the intention is to cover all modifications, equivalents and alternatives falling within the spirit and scope of this disclosure and the relevant claims. Many changes may be made to the particular embodiments and details disclosed herein without departing from such spirit and scope.

In showing and describing preferred embodiments in the appended Figures, common or similar elements are referenced with like or identical reference numerals or are apparent from the Figures and/or the description herein. The Figures are not necessarily to scale and certain features and certain views of the Figures may be shown exaggerated in scale or in schematic in the interest of clarity and conciseness.

As used herein and throughout various portions (and headings) of this patent (including the claims), the terms "invention", "present invention" and variations thereof are not intended to mean every possible embodiment encompassed by this disclosure or any particular claim(s). Thus, the subject matter of each such reference should not be considered as necessary for, or part of, every embodiment hereof, or of any particular claim(s), merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ". The use of "(s)" in reference to an item, component or action (e.g. "surface(s)") throughout this patent should be construed to mean "at least one" of the referenced item, component or act. Further, reference herein and in the appended claims to components, feature, actions, aspects, etc. in a singular tense does not limit the present disclosure or appended claims to only one such component feature, action, aspect, etc., but should be interpreted to mean one or more and does not exclude a plurality, except and only to the extent as may be expressly specified otherwise herein or in a particular claim hereof and only for such claim(s) and potentially those claim(s) depending therefrom. The use of expressions like preferably, in particular, especially, typically, etc. is not intended to and should not be construed to limit the present disclosure.

As used throughout this patent, the following terms have the following meanings, except and only to the extent as may be expressly specified otherwise:

The term "and/or" as used herein provides for three distinct possibilities: one, the other or both. All three possibilities do not need to be available—only any one of the three. For example, if a component is described as "having a collar and/or a coupling", some embodiments may include a collar, some embodiments may include a coupling and some embodiments may include both. Since the use of "and/or" herein does not require all three possibilities, a claim limitation herein that recites "having a collar and/or a coupling" would be literally infringed by a device including only one or more collars, one or more couplings or both one or more couplings and one or more collars.

The terms "coupled", "connected", "engaged" and the like, and variations thereof mean and include either an indirect or direct connection or engagement. Thus, if a first component couples to a second component, that connection may be through a direct connection, or through an indirect connection via other components or connections.

The terms "elongated" and variations thereof as used herein mean and refer to an item having an overall length (during the intended use of the item) that is greater than its average width.

The terms "operator", "assembler", "manpower", "labor" and variations thereof as used herein refer to and include one or more humans, robots or robotic components, artificial intelligence-driven components/circuitry, other components and the like or the effort thereof.

The terms "rigidly coupled" and variations thereof mean connected together in a manner that is intended not to allow any, or more than an insubstantial or minimal amount of, relative movement therebetween as is expected during typical or expected operations. In other words, if components A and B are rigidly coupled together, they are not movable relative to one another (more than a minimal or insubstantial amount) during typical or expected operations.

It should be noted that any of the above terms may be further explained, defined, expanded or limited below or in other parts of this patent. Further, the above list of terms is not all inclusive, and other terms may be defined or explained below or in other sections of this patent.

Referring initially to FIG. 1, an exemplary debris recovery vessel 10 in accordance with an embodiment of the present disclosure is shown in a body of water 30. In this example, the debris 34 to be recovered is a contaminant, such as floating oil. However, the vessel 10 may be used to recover any other form of floating contaminants or debris. It should be noted, the terms "debris" and "contaminant" are used interchangeably herein. In other words, the "debris" being recovered may sometimes be referred to herein as a "contaminant", whether or not it actually formally contaminates the body of water 30. For example, the debris 34 may include one or more substances, materials or a combination thereof, such as floating chemicals (e.g. alcohol, petroleum products, oil) and particulate pollutants and other solids (e.g. plastic debris and micro plastics, such as presently found in the Great Pacific Garbage Patch, wood, floating metallic materials, etc.). Moreover, the present disclosure and appended claims are not limited to or by type of debris or contaminants, unless and only to the extent as may be expressly provided in a particular claim and only for that claim and claims depending therefrom.

The exemplary vessel 10 may be arranged and adapted to be used in any type of body of water 30. For example, the body of water 30 may be any inland or offshore waterway, such as a sea or ocean, bay, sound, inlet, river, lake, canal, wetlands, swamp, as well as an on-shore or off-shore man-made areas or structures that contains water (e.g. pond, tank, tank farm, etc.) or the like. The nature and type of the body of water 30 is not limiting upon the present disclosure. For convenience, the water in the body of water 30 and/or in or on the vessel 10 is sometimes referred to herein as "sea water" 38, even though it may not actually be sea water, depending upon the type of body of water 30. For example, in some cases, the "sea water 38" as referenced herein may be fresh water, contaminated water, one or more other liquids or a combination thereof in an offshore (e.g. ocean) or inland body of water (e.g. lake) or a man-made area or structure (e.g. pond, tank, tank farm, etc.). In some instances, the body of water 30 may contain only, or primarily, liquids other than water. For example, when the body of water 30 is a tank farm 424 (e.g. FIG. 61) with oil or other chemical product storage tanks 426 and there is a tank failure, the liquid in the body of water 30 may be only product, or product and water and/or other substances/materials (e.g. fire suppressants). Thus, in some situations, the body of water 30 refers to an area that does not, in fact, contain water and what is referred to herein as the sea water 38 may not include any water.

The illustrated vessel 10 is useful for recovering and/or collecting debris 34 floating in the body of water 30 in a debris field, or oil spill area, 36 or elsewhere at or near the surface 32 of body of water 30. For the purposes of the description below and the appended claims, the surface 32 of the body of water 32 may often be generally at sea level 33 (e.g. FIG. 41) of the body of water 30 and may extend to a depth below the actual surface plane. The "debris field", or "oil spill area", 36 can, in some instances, be characterized as generally having a top layer of floating debris (e.g. oil), followed by a lower layer of partially submerged debris or contaminated sea water (e.g. "oily water") followed by lower layers of sea water 38 that debris may extend into or enter, particularly when there is turbulence in the water from wind, waves, vessels moving through the oil spill area 36 or other causes. It should be noted, however, that such "layering" is a general description and the actual disposition of oil and other debris in the body of water 30 is dynamic and thus may be constantly changing. Accordingly, for the purposes of this patent and its claims, debris floating at the surface of a body of water includes debris that is at least partially buoyant, which may be located at the top layer (in the plane of the surface 32) as well as debris floating or positioned in a middle or even lower layer (below the plane of the surface 32). As used herein, the terms "wave" and variations thereof mean and includes waves, swells, chops and any other formations of water 38 in a body of water 30 that cause the surface 32 of the body of water 30 to not be flat.

In this embodiment, the vessel 10 includes a front or forward end 42, a rear or aft end 44, a left or port side 46, a right or starboard side 48 and is moveable across the surface 32 of the body of water 30 to, from and through the debris (e.g. oil) spill area 36. The front end 42 of the illustrated vessel 10 is shown having a curved shape, but could instead have a straight, rectangular or any other desired shape. The vessel 10 may be self-propelled, be propelled in a different manner or be stationary (e.g. moored platform, anchored barge, etc.). In this example, the vessel 10 is a ship-shape tanker barge 12 moved by a primary mover, such as a tug boat 14, in an integrated tug/barge arrangement. The illustrated tug 14 inserts into the barge 12 at a slot 50 at the rear end 44 of the barge 12. Other embodiments of the vessel 10 may be a self-propelled tanker or other ship, a barge moved by a tanker ship or any other type of waterborne vessel or structure. Furthermore, the vessel 10 may be a retrofit or a new vessel. Thus, the present disclosure is not limited by the nature and type of vessel 10 or whether or how it is propelled in the body of water 30.

Still referring to FIG. 1, in accordance with an embodiment of the present disclosure, the vessel 10 includes a debris recovery system 58 having at least one cargo chamber, or compartment, 60. The cargo compartment 60 may also be referred to herein as a processing, collection and/or separation, chamber or tank, as well as other variations of the terms processing, collection, separation, compartment, chamber and tank. As used herein and in the appended claims, the terms "successive" and variations thereof means one after the other. In the above instance, for example, multiple distinct cargo compartments 60 are fluidly coupled together in succession, or one after the other. So, a first compartment is fluidly coupled to a second compartment, which is fluidly coupled to a third compartment and so on. In the present embodiment, the exemplary cargo compartments 60 are positioned proximate or adjacent to one another along at least part of the length 52 of the vessel 10 and below the top deck 54. Each exemplary cargo compartment 60 is arranged and adapted to contain fluid and debris 34 (e.g. water and oil).

Any desired number of one or more cargo compartments 60 may be included. In this example, a front, or first, cargo compartment 62 is closest to the front end 42 of the vessel 10, a rearmost, or sixth, cargo compartment 64 is closest to the rear end 44 of the vessel 10 and four intermediate cargo compartments 60 (e.g. the second 66, third 68, fourth 70 and fifth 72 cargo compartments) are positioned therebetween. However, there may be fewer (e.g. one) or more (e.g. 6, 7, 8, etc.) cargo compartments 60. Some embodiments may include cargo compartments 60 that are side-by-side, one above the other, and/or multiple rows of cargo compartments 60 or any combination thereof. The present disclosure is not limited by the number, size, location and configuration of cargo compartments 60.

The cargo compartments 60 may have any suitable size, shape and dimensions. For example, in some embodiments, the exemplary cargo compartments 60 each have a height of 45 feet, a width of 50 feet and a length of 75 feet.

If desired, the vessel 10 may have additional compartments. For example, the illustrated barge 12 is a double-hull tanker that includes outer compartments surrounding the cargo compartments 60, such as one or more side ballast tanks 80, a forward void 84 (e.g. FIG. 2), a rear void 86 (e.g. FIG. 2) and one or more inner bottom tanks 88 (e.g. FIG. 2). These additional compartments may be used for any suitable purpose. For example, one or more of the ballast tanks 80 may be loaded and/or unloaded during debris recovery operations with sea water to obtain and maintain the desired height of the vessel 10 in the body of water 30. However, the inclusion, quantity, type, configuration, location and use of additional compartments is not limiting upon the present disclosure.

Figure 3:
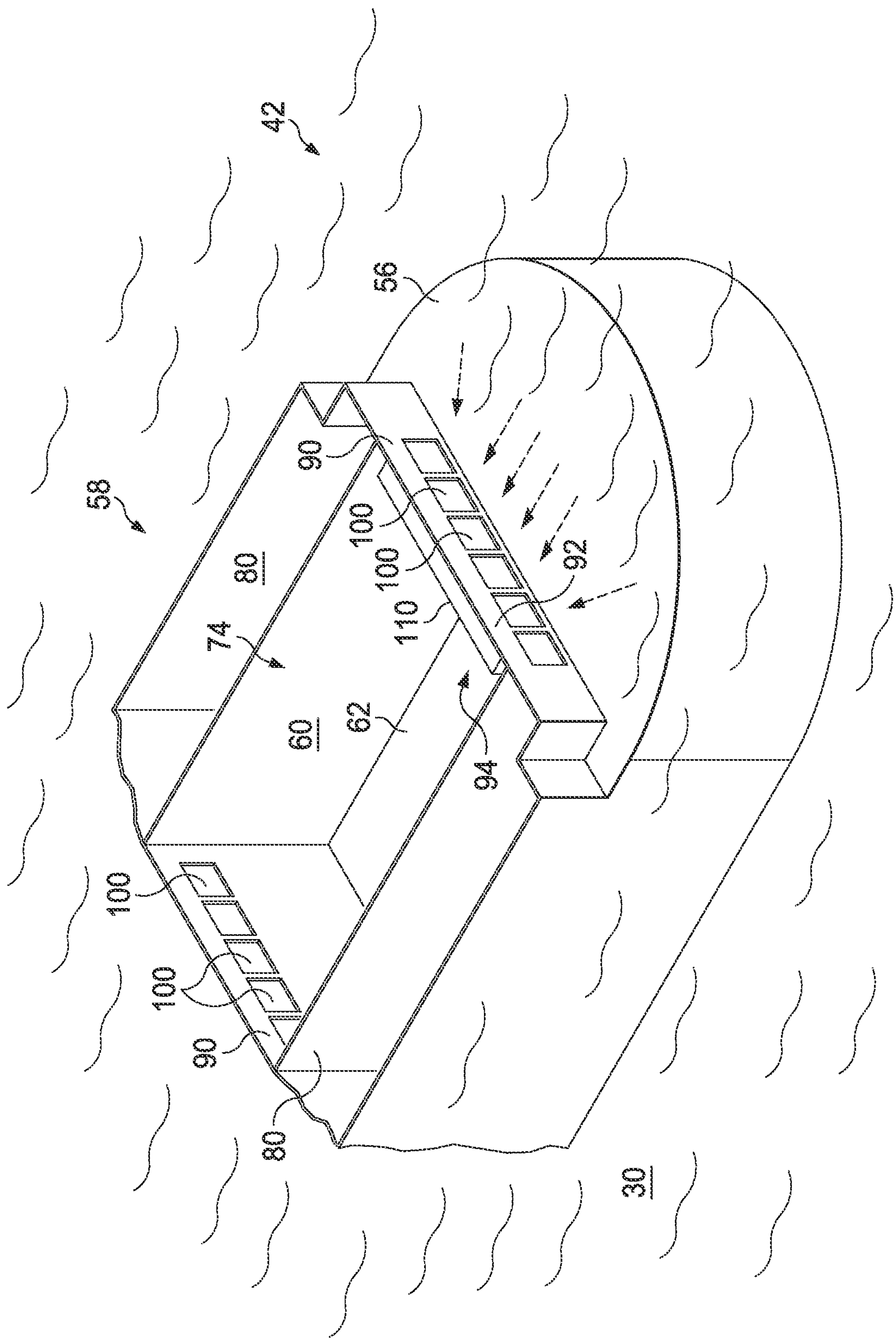
FIG. 3 is a perspective view of part of the front end of the exemplary vessel of FIG. 1.
Figure 4:
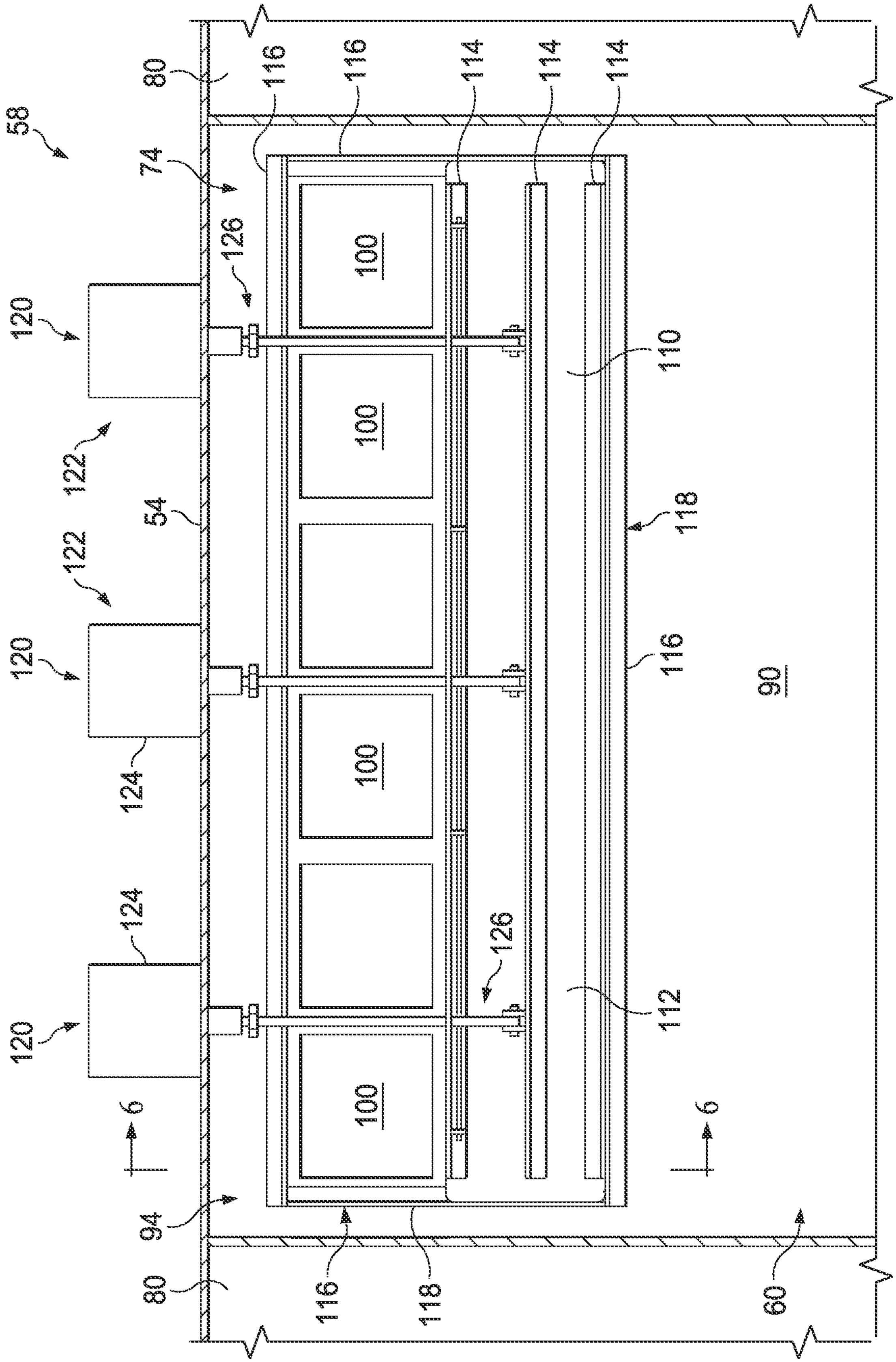
FIG. 4 is a view facing an exemplary vertical wall disposed between cargo compartments of the embodiment of FIG. 1 from inside one of the cargo compartments (facing rearwards) and showing an exemplary associated gate in a fully open position.
Figure 5:
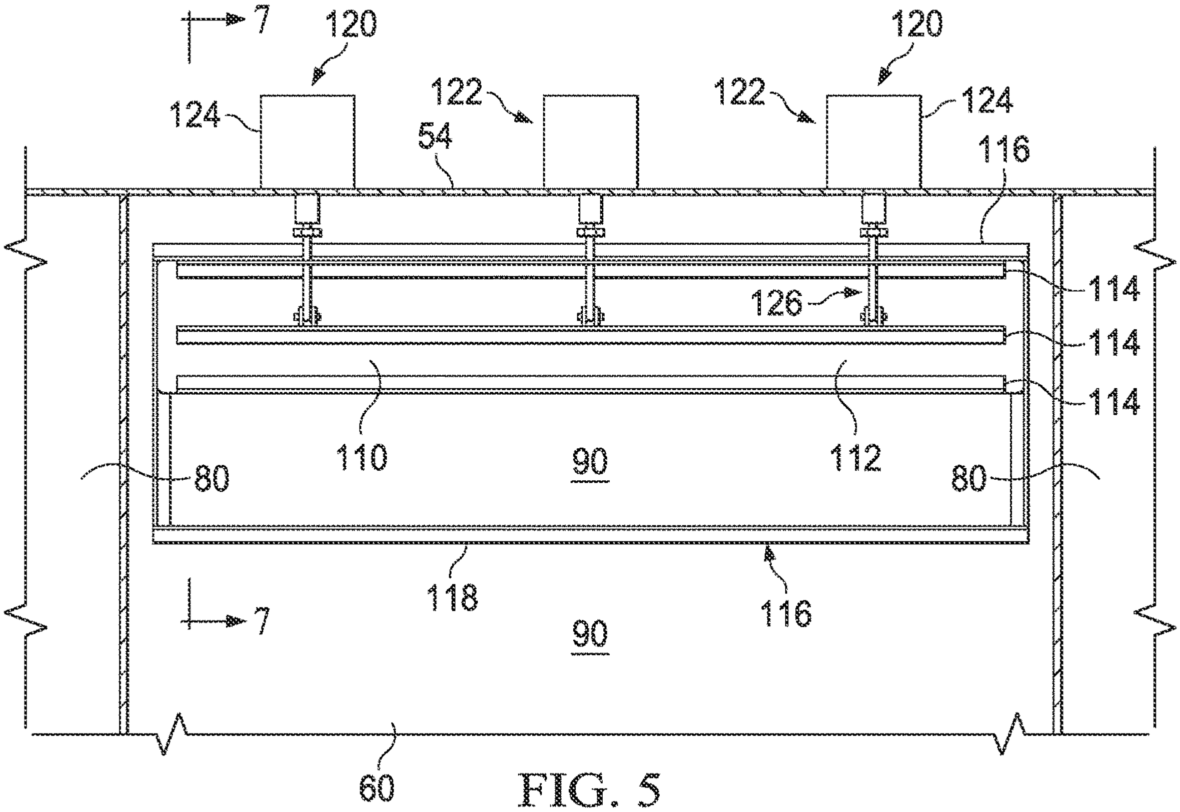
FIG. 5 shows the exemplary vertical wall of FIG. 4 with the exemplary gate in a closed position.
Figure 6:
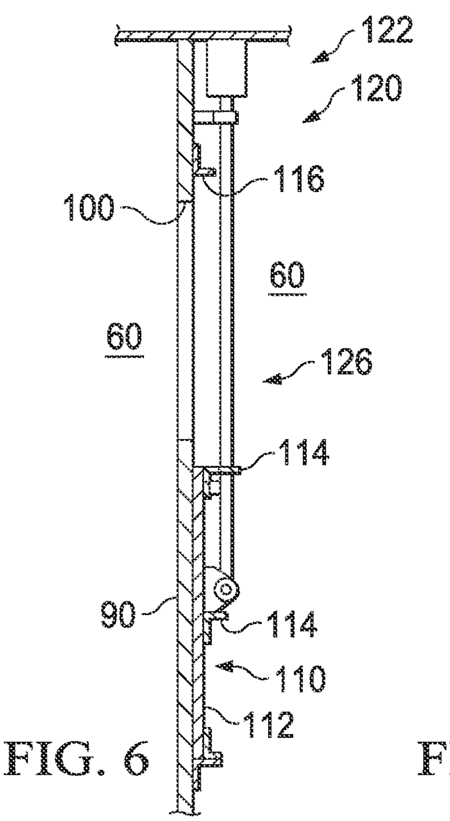
FIG. 6 is a cross-sectional view of part of the exemplary vertical wall and gate of FIG. 4 taken along lines 6-6.
Figure 7:
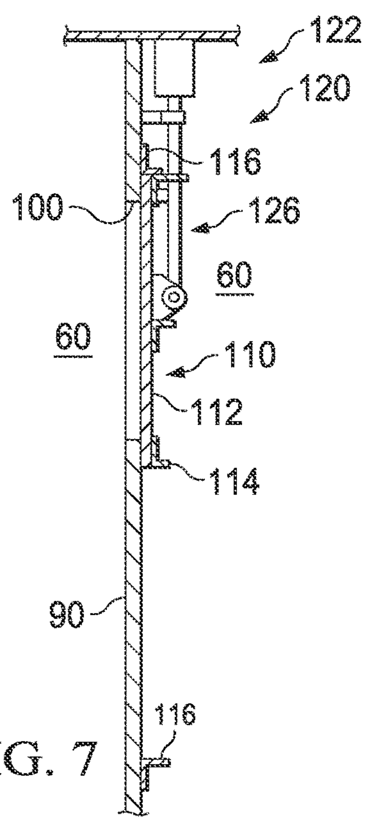
FIG. 7 is a cross-sectional view of part of the exemplary vertical wall and gate of FIG. 5 taken along lines 7-7.

Still referring to the embodiment of FIG. 1, each adjacent pair of illustrated cargo compartments 60 is separated by at least one vertical wall, or bulkhead, 90. At least one vertical wall, or bulkhead, 90 also separates the exemplary front cargo compartment 62 from the front end 42 of the vessel 10 and the body of water 30, and may sometimes be referred to herein as the front vertical wall 92. As used throughout this patent (including the appended claims), the term "vertical" and variations thereof means, includes and refers to perfectly vertical, angled (not perfectly vertical) or otherwise extending in a non-horizontal manner or orientation. For example, the "vertical wall" 90 is not limited to having only a perfectly vertical orientation, but instead means and includes any orientation that is not horizontal. Referring now to FIGS. 3 & 4, each illustrated vertical wall 90 includes at least one fluid passageway, or opening, 100 that allows fluid flow past the associated vertical wall 90. For example, the opening(s) 100 in the front vertical wall 92 (referred to sometimes herein as the intake opening(s) 102 (e.g. FIG. 24)) allows fluid flow between the body of water 30 and the front cargo compartment 62 (see also FIG. 11), while the openings 100 in each successive vertical wall 90 allow fluid flow between the successive adjacent cargo compartments 60 (see also FIG. 12). In other embodiments, the front vertical wall 92 may instead be coupled to one or more forward-facing trunk (not shown) or other component having at least one fluid passageway 100 (e.g. intake opening 102) that allows fluid flow from the body of water 30, through the associated opening(s) 100 and into the front cargo compartment 62. If desired, two forward-facing trunks (not shown) fluidly coupled to the compartment 62 may be outwardly angled relative to the longitudinal centerline of the vessel 10. Likewise, the fluid passageways 100 in the other vertical walls 90 may communicate fluid through one or more forward-facing trunks or other components. In some embodiments, one or more of the openings 100 may be at least partially formed in or by the body, hull, top deck or other component of the vessel 10 (e.g. not necessarily in a vertical wall 90).

In this particular example, each opening 100 is formed in the corresponding vertical wall 90 proximate to its upper end 94 and the upper end 74 of the adjacent cargo compartment(s) 60. As will be described further below, the location of the openings 100 near the upper end 74 of the cargo compartments 60 may be provided, for example, to encourage primarily debris (e.g. oil and some oily water), and at time, only oil and/or other debris, to flow into the front cargo compartment 62 from the body of water 30 and then into each successive cargo compartment 66, 68, 70 72 and 64 during debris recovery operations. It should be noted that to the extent that oil and/or other debris and sea water enter any cargo compartment 60, the lower density and/or buoyancy of the debris 34 (e.g. oil) and heavier density of the sea water 38 are expected, to a large extent, to cause the debris to ultimately float atop the sea water 38 therein.

The openings 100 may have any suitable size, configuration and orientation. For example, each vertical wall 90 of the illustrated debris recovery system 58 includes six square openings 100, each having dimensions of 6 feet high by 15 feet wide and spaced 6 feet from the top of the associated cargo compartment 60. However, there may be more or less openings 100 formed in each vertical wall 90, which may have any other desired dimensions and location. If desired, a removable hatch 93 (e.g. FIG. 54) may be provided over the top of one or more vertical walls 90 (e.g. to provide easy access).

Figure 2:
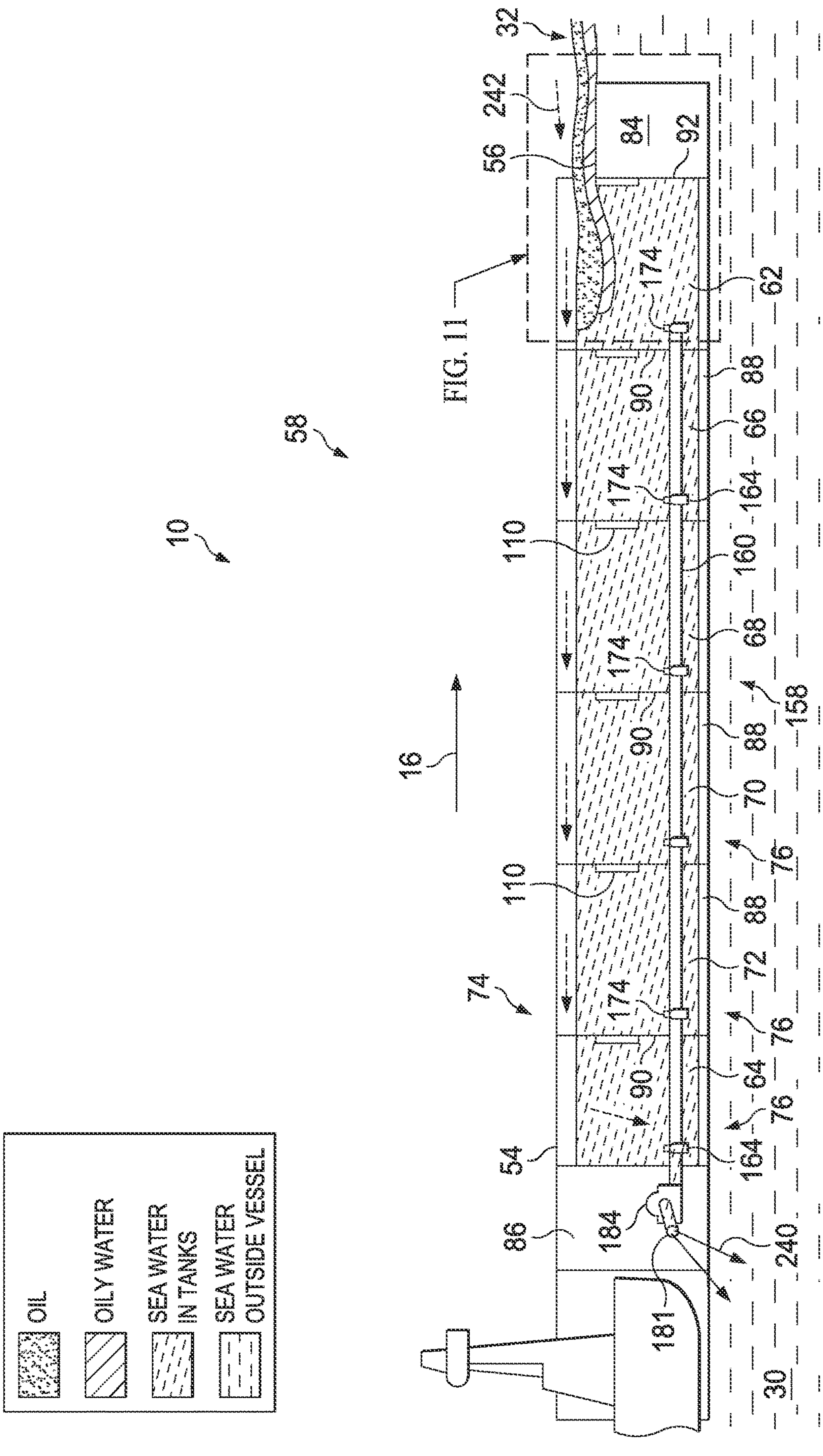
FIG. 2 is a side view of the exemplary vessel of FIG. 1 with the side shell removed to show exemplary interior cargo compartments and other components during exemplary debris recovery operations in accordance with an embodiment of the present disclosure.
Figure 11:
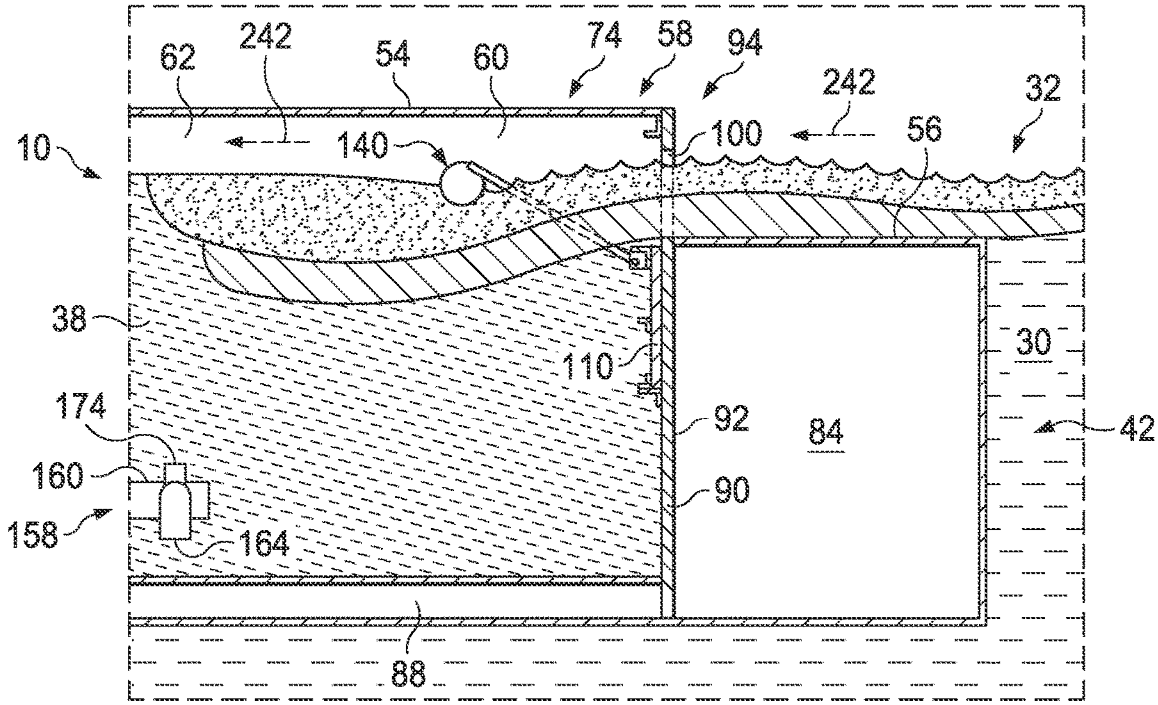
FIG. 11 is an exploded view of part of the exemplary vessel shown in FIG. 2.

Referring to FIGS. 1-3, in the illustrated embodiment, the opening(s) 100 in the front vertical wall 92 allow the flow of liquid into the front cargo compartment 62 from the body of water 30 (see also FIG. 11). The exemplary opening(s) 100 in each successive vertical wall 90 allow liquid to flow at least from the adjacent foremost cargo compartment 60 into the adjacent aft-most cargo compartment 60; or, in other words, into each successive cargo compartment 60 in the aft direction. Thus, in this embodiment, liquid can flow from the body of water 30 into the front cargo compartment 62, then into the second cargo compartment 66, then into the third cargo compartment 68 and so on and finally into the rear-most cargo compartment 64 through the respective openings 100.

Still referring to FIGS. 1-3, if desired, the vessel 10 may have an intake, or recessed front, deck 56 forward of the front vertical wall 92. As used herein, the term "recessed front deck", "intake deck" and variations thereof refers to the uppermost deck of the vessel 10 that is forward of the front vertical wall 92 and is recessed relative to, or lower in height than, the top deck 54 of at least some of the portion(s) of the vessel 10 that extend over the cargo compartments 60. In this embodiment, as shown in FIG. 3, the recessed front deck 56 is a flat plate that aligns below the height of the openings 100 in the front vertical wall 92, such as to assist in encouraging the flow of the top layer(s) of liquid from the body of water 30 into the front cargo compartment 62. However, the recessed front deck 56 may have any other form, configuration and shape or may not be included.

Still referring to FIGS. 1 & 3, the exemplary debris recovery system 58 may include at least one distinct door, or gate, 110 arranged and adapted to allow and disallow the flow of fluid through at least one of the openings 100. Each exemplary gate 110 is selectively movable between at least one open and at least one closed position. In the open position(s), each exemplary gate 110 allows liquid flow through its associated opening(s) 100, and in the closed position(s), each illustrated gate 110 disallows liquid flow through its associated opening(s) 100. If desired, the debris recovery system 58 may be configured so that the gates 110 may be used, at least in part, to further refine the flow of liquid thereby. For example, the position of the respective gates 110 may be remotely adjusted to serve as a skimmer, or debris separator, to encourage mostly debris (e.g. oil) to waterfall, cascade or pass, by the gate 110 through the associated opening(s) 100. In that context, the gate 110 thus serves as an embodiment of a "sliding"-type wave dampener, or inflow regulator, 140 (e.g. as discussed below). In the present embodiment, the fully open position(s) of each gate 110 is below the associated opening(s) 100. Consequently, if desired, each exemplary gate 110 may be movable up therefrom, or down from a closed position, into one or more partially open position. Thus, in some embodiments, the height of the gate 110 can be adjusted relative to the lower end of the associated opening(s) 100 to cause a waterfall, or cascading, effect of the top layer(s) of liquid and debris (e.g. oil and oily water) and block the lower, heavier, layer of sea water 38 from passing thereby.

It should be noted that, in some embodiments, the gates 110 in the closed position may not provide a complete fluid-tight seal. Thus, when all gates 110 associated with all the openings 100 in one of the vertical walls 90 are in a closed position, the aft-most adjacent cargo compartment 60 is at least substantially sealed from the inflow of liquid from the other adjacent cargo compartment 60, or, in the case of the front cargo compartment 62, from the body of water 30. For example, when the gate(s) 110 associated with opening(s) 100 in the front vertical wall 92 are closed, the front cargo compartment 62 is at least substantially sealed from the entry of liquid from the body of water 30 through those opening(s) 100. As used herein and throughout this patent and the appended claims, the terms "substantial", "substantially", "primarily" and variations thereof mean generally more than 50% and depending upon the particular components involved and/or circumstances, may be more than 60%, 70%, 80%, 90% and even may be more than 95%. However, in some instances of the use of the terms "generally", "substantially" and variations thereof herein, the above definition may not apply, as should be apparent from the context of such use. For example, in some embodiments, such as upon completion of debris recovery operation and prior to transit of the vessel 10 to an off-loading location, all gates 110 may be 100% sealed.

The gates 110 may have any suitable form, construction, configuration and operation. Referring to FIGS. 4-7, in the illustrated embodiment, a single gate 110 is movable over all the openings 100 formed in the associated vertical wall 90. The exemplary gate 110 includes an elongated plate 112 that is selectively moveable up and down over the adjacent openings 100 between at least one open (e.g. FIGS. 4 & 6) and at least one closed position (e.g. FIGS. 5 & 7) by at least one gate actuator 120. In this embodiment, the gate 110 includes numerous (e.g. three) stiffeners 114 extending at least substantially across the length of the plate 112. The stiffeners 114 may have any suitable form, configuration and construction. For example, the stiffeners 114 may be angle iron coupled to the outside surface of the plate 112, such as to assist in supporting the plate 112 and maintaining the shape of the plate 112, other desired purpose(s) or a combination thereof. However, the present disclosure is not limited to this arrangement. In other embodiments, for example, a distinct gate 110 may be provide for each opening 10, may have a configuration that does not include an elongated plate 112 and/or may not have stiffeners 114.

The gate actuator(s) 120 may have any suitable form, configuration, construction and operation. For example, the gate actuator 120 may be electronically and/or manually and/or remotely controlled. For another example, one or more gate actuators 120 may be used to control movement of one or more gates 110. For yet another example, the gate actuator 120 may be used to selectively move the associated gate(s) 110 between positions, such as between any among multiple different open positions and a closed position, based upon any suitable criteria. For example, any one or more of the gates 110 may be moved to an optimal partially-open position for encouraging mostly debris, such as oil, to flow thereby based upon the particular buoyancy, density, thickness and/or weight of the debris. Thus, the gate actuator(s) 120 may, if desired, be configured so that the position of one or more of the gates 110 may be varied throughout debris recovery operations.

Figure 8:
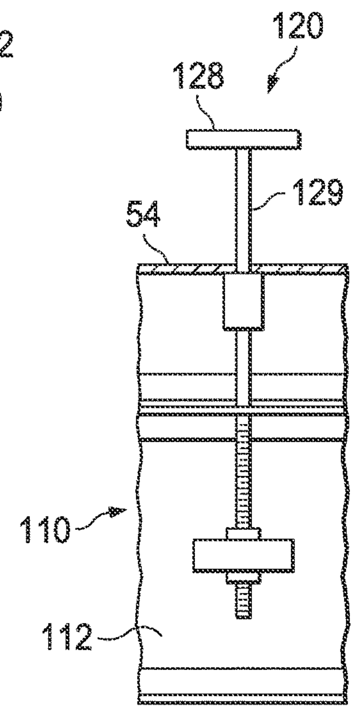
FIG. 8 is a front view of part of an exemplary gate of the present disclosure showing an alternate embodiment of a gate actuator.

Still referring to FIGS. 4-7, in this embodiment, three gate actuators 120 are used to drive each exemplary gate 110. Each illustrated gate actuator 120 is a hydraulic actuator 122, as is and become further known. For example, the hydraulic actuator 122 may include a hydraulic power unit 124 (shown positioned above the top deck 54) which drives a telescoping unit 126 coupled to the gate 110. In other embodiments, the gate actuator 120 may be a pneumatic actuator, as is and become further known. In the embodiment of FIG. 8, the gate actuator 120 includes a manually rotatable crank-wheel 128 and crank rod 129 coupled to the gate 110 and configured to move the gate 110 up into at least one closed position and down into one or more open positions. If desired, the crank-wheel 128 may extend above the top deck 54, such as for convenience.

Referring specifically to FIG. 4, if desired, one or more gate guide/sealing mechanisms 116 may be provided, such as to assist in defining one or more position of the gate 110, guiding the up and down movement of the gate 110, enhancing the desired sealing engagement between the gate 110 and vertical wall 90, other purpose(s) or a combination thereof. The gate guide/sealing mechanism 116 may have any suitable form, configuration, construction and operation. In the illustrated embodiment, the gate guide/sealing mechanism 116 includes a frame 118 extending around the periphery of all of the openings 100 to define the upper and lower limits of movement of the gate 110 and also assist in providing some sealing engagement between the gate 110 in a fully closed position and the vertical wall 90. For example, the frame 118 may be constructed of angle iron coupled to the vertical wall 90.

Figure 10:
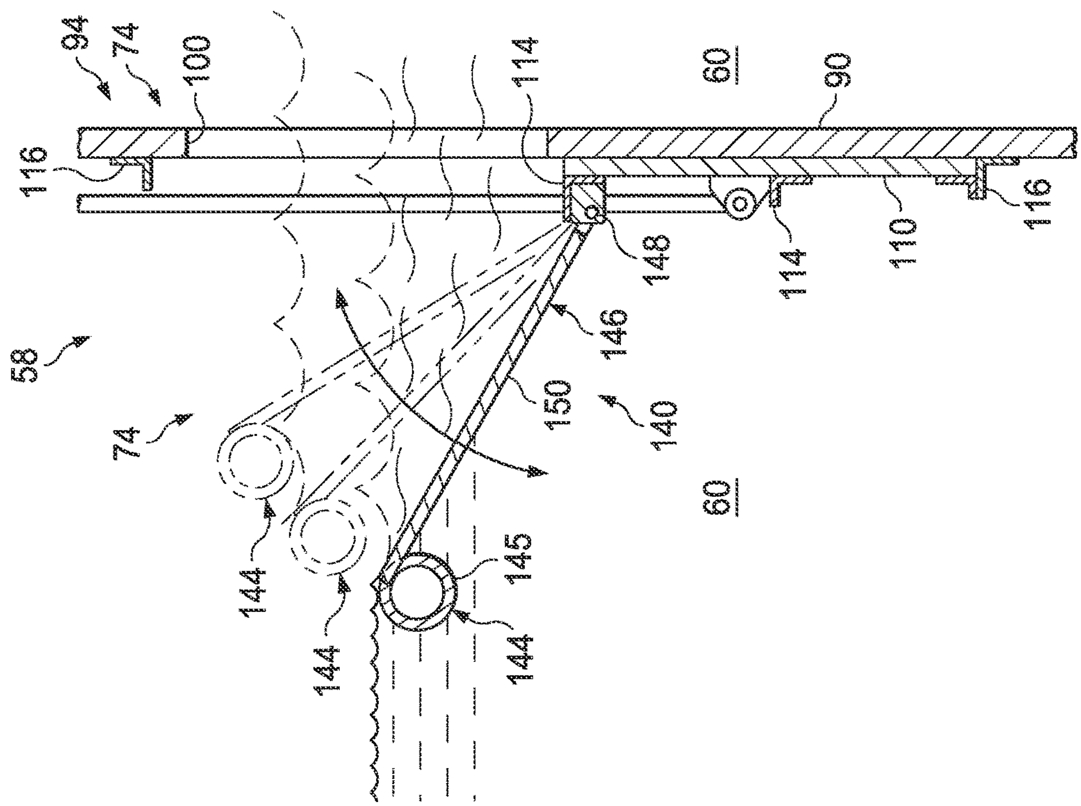
FIG. 10 is a side, cross-sectional view of the exemplary wave dampener of FIG. 9 taken along lines 10-10.
Figure 9:
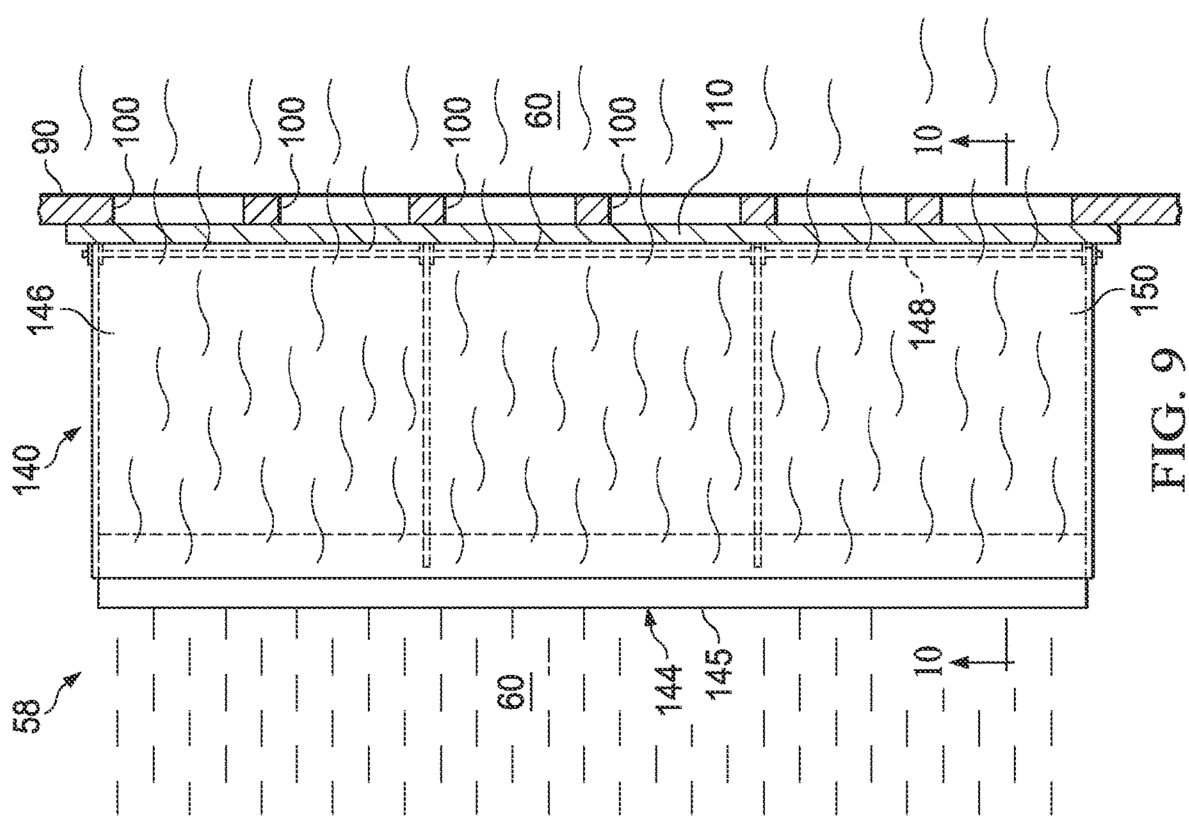
FIG. 9 is a top view of an exemplary wave dampener within an exemplary cargo compartment of the vessel of FIG. 1 in accordance with an embodiment of the present disclosure.

Now referring to FIGS. 9 & 10, if desired, the debris recovery system 58 may include one or more wave dampeners, or inflow regulators (IFR), 140 within one or more of the cargo compartments 60 or any other desired location on the vessel 10 (as well as in any other components of a remote debris recovery arrangement 420, e.g. FIGS. 58-81). As used herein and in the appended claims, the terms "wave dampener", "inflow regulator", "IFR" and variations thereof are used interchangeably. The wave dampener(s) 140 may have any suitable purpose. For example, the wave dampener(s) 140 may be provided to reduce the size of, or turbulence caused by, waves in the liquid passing through one or more of the openings 100, help encourage only the top layers of liquid and debris (e.g. oil, oily water) to pass through the openings 100, help maintain a steady flow of liquid through the openings 100, for any other purpose(s) or a combination thereof.

The wave dampeners 140 may have any suitable form, configuration, construction and operation. Some embodiments of IFRs 140 are sometimes referred to herein as "sliding"-type IFRs 140 (e.g. gates 110, FIGS. 2, 4-6, 14-18; see also, FIGS. 35-39) because they are designed to move in a generally sliding movement (typically up and down) relative to the vessel 10 or other structure or components, while others are sometimes referred to herein as "pivoting"-type IFRs 140 because they are configured to pivot relative to the vessel 10 (see e.g. FIGS. 10-13, 23-29) or other structure or components (e.g. ingestion head 440, FIGS. 52-77).

Figure 13:
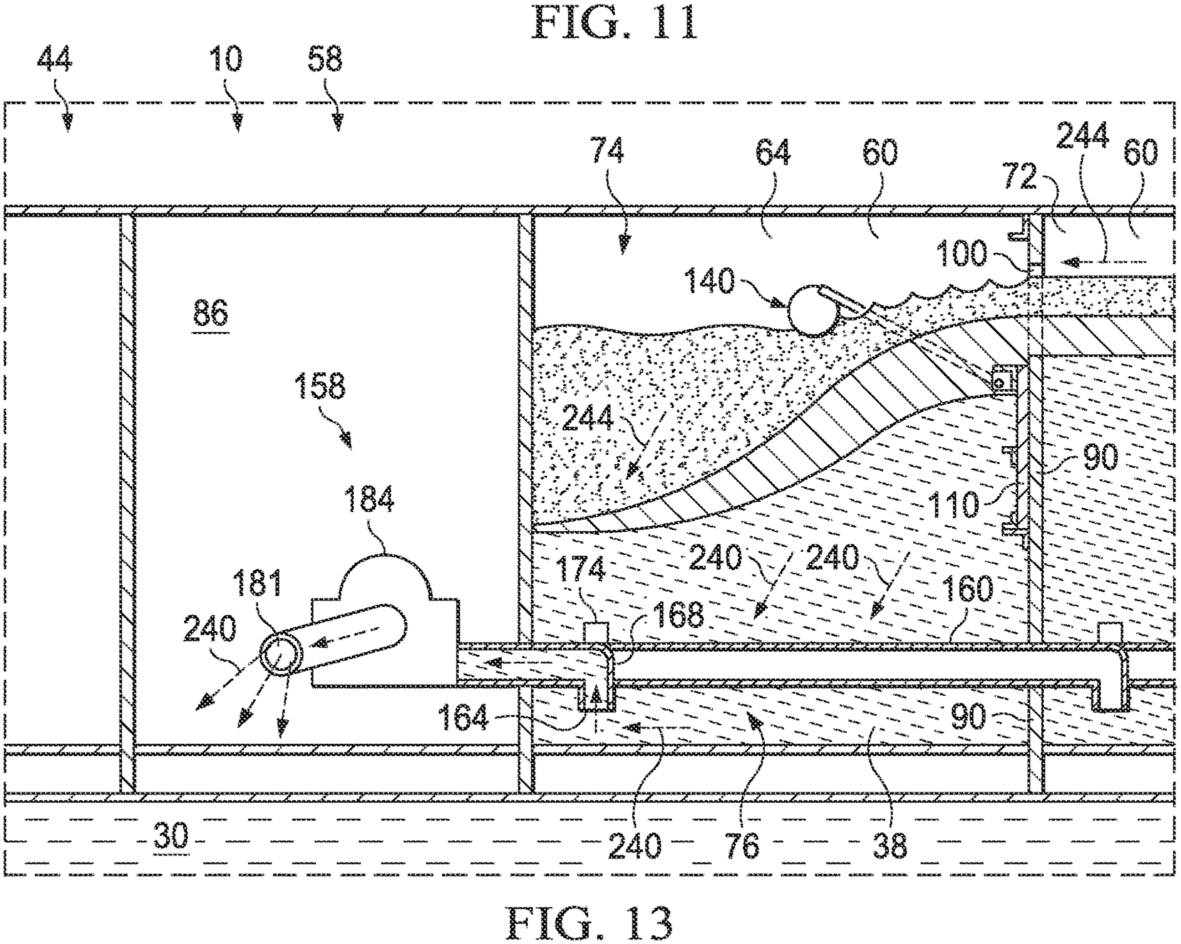
FIG. 13 is an exploded view of part of the exemplary vessel shown in FIG. 12.

Referring again to FIGS. 9 & 10, in this embodiment, a pivoting-type IFR 140 extends into each cargo compartment 60 proximate to the opening(s) 100 formed in the forward-most vertical wall 90 for that cargo compartment 60 (See also FIGS. 11 & 13). The illustrated wave dampener 140 includes at least one elongated float 144 spaced-away from the vertical wall 90 and arranged to float in the liquid entering the cargo compartment 60 though the openings 100. The exemplary elongated float 144 is configured to freely move up and down with the surface of the liquid. In FIG. 10, for example, the elongated float 144 is shown in three positions as it moves up and down with the incoming liquid.

In this particular embodiment, the elongated float 144 is a single tube 145 (e.g. hollow-pipe) coupled (e.g. by weld, mechanical connectors, etc.) to the end of one or more carrier 146. The illustrated carrier 146 is pivotably connected to the gate 110 associated with the openings 100, such as with one or more hinge pin 148. The exemplary carrier 146 and elongated float 144 extend across all of the openings 100 in the vertical wall 90. Depending upon the particular circumstances and arrangement, the carrier 146 may also assist in reducing the size of, or turbulence caused by, waves in the liquid passing through one or more of the openings 100, encouraging only the top layer(s) of liquid and debris (e.g. oil, oily water) to pass through the openings 100, and/or maintaining a steady flow of liquid through the openings 100. In this embodiment, the exemplary carrier 146 is a flat plate 150. When included, the carrier 146 and float 144 may be constructed of metal, plastic or any other suitable material or combination thereof. In other embodiments, the wave dampener 140 may include multiple elongated floats 144 and/or carriers 146. For example, multiple independent sets of carriers 146 with floats 144 may be side-by-side across the width of the cargo compartment 60 (e.g. to move at least partially independently relative to one another). Further, the wave dampener 140 may instead be coupled to the vertical wall 90 or other component(s).

Figure 12:
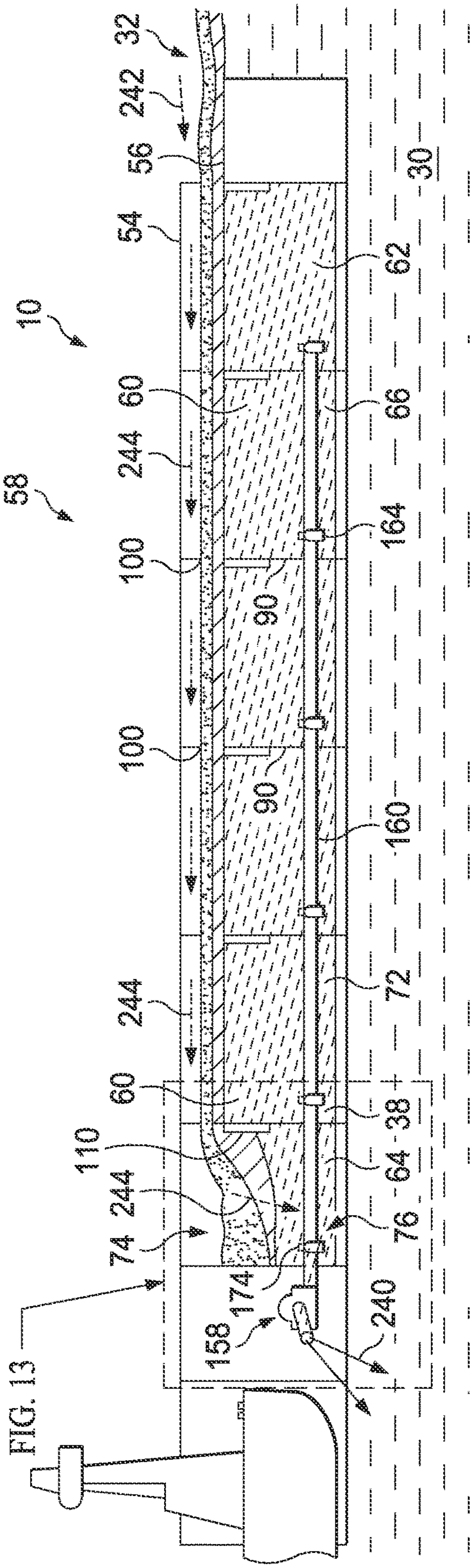
FIG. 12 is a side view of the exemplary vessel of FIG. 1 with the side shell removed to show exemplary interior cargo compartments and other components during exemplary debris recovery operations in accordance with an embodiment of the present disclosure.

Referring back to FIGS. 1 & 2, the debris recovery system 58 of any embodiments may include a fluid removal system 158. In this embodiment, fluid can be removed through the fluid removal system 158 from any one or more cargo compartment 60 at the same time, or in isolation relative to the other cargo compartments. Referring specifically to FIGS. 12 & 13, in the present embodiment, the fluid removal system 158 is particularly configured to allow the drainage of sea water 38 from the lower end 76 of any cargo compartment 60 and, at the same time, ultimately allow oil (and/or other debris) to at least partially fill that cargo compartment 60 from its upper end 74 through the opening(s) 100 in the forward-adjacent vertical wall 90. In fact, the illustrated debris recovery system 58 allows each successive cargo compartment 60, starting at the rear end 44 of the vessel 10, to be at least substantially drained of sea water 38 and, concurrently, at least partially or substantially filled with debris 34.

The fluid removal system 158 may include any suitable components and operation. In the illustrated embodiment, as shown in FIG. 1, the system 158 includes a main suction conduit 160 extending at least partially through, and fluidly coupled to, each cargo compartment 60 and configured to remove liquid from each cargo compartment 60 as described above. The suction conduit 160 may have any suitable form, configuration, construction, location and operation. The exemplary suction conduit 160 extends lengthwise from the front cargo compartment 62 to aft of the rear cargo compartment 64, and delivers the drained liquid into the body of water 30 proximate to its aft end.

Figure 19:
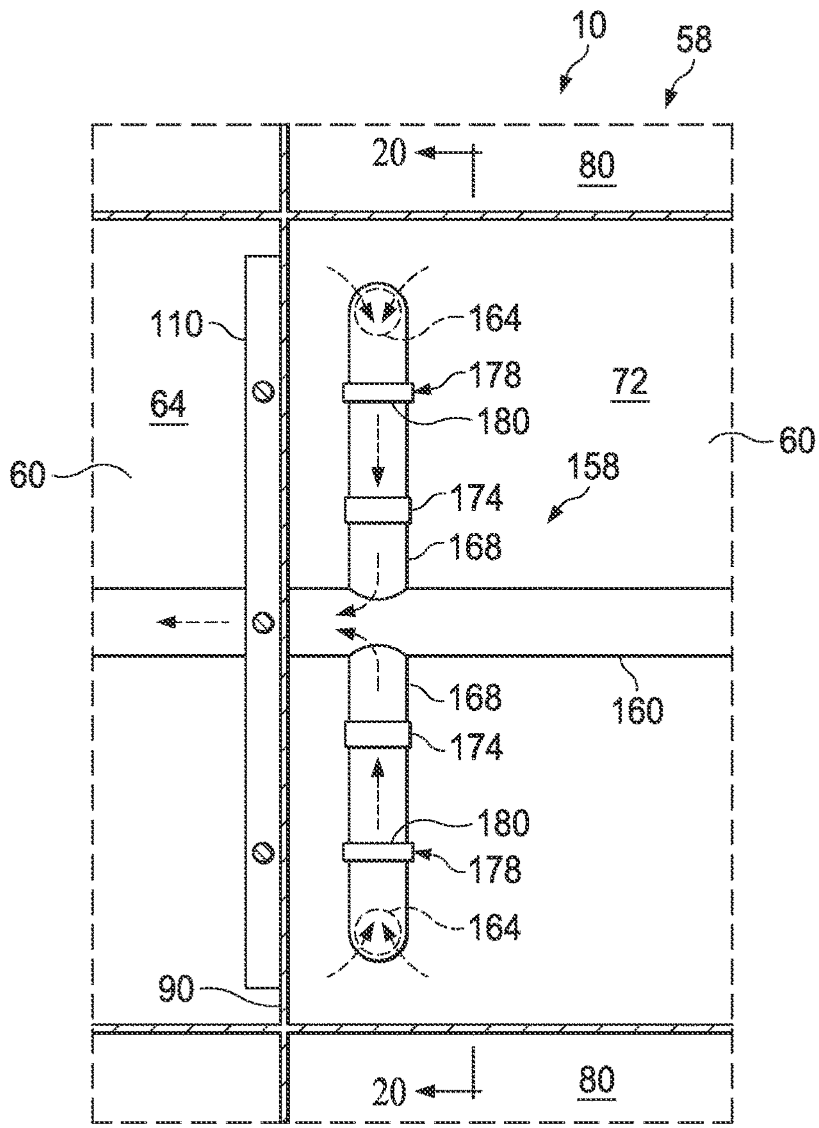
FIG. 19 is an exploded top view of part of the exemplary fluid removal system shown in FIG. 1.
Figure 20:
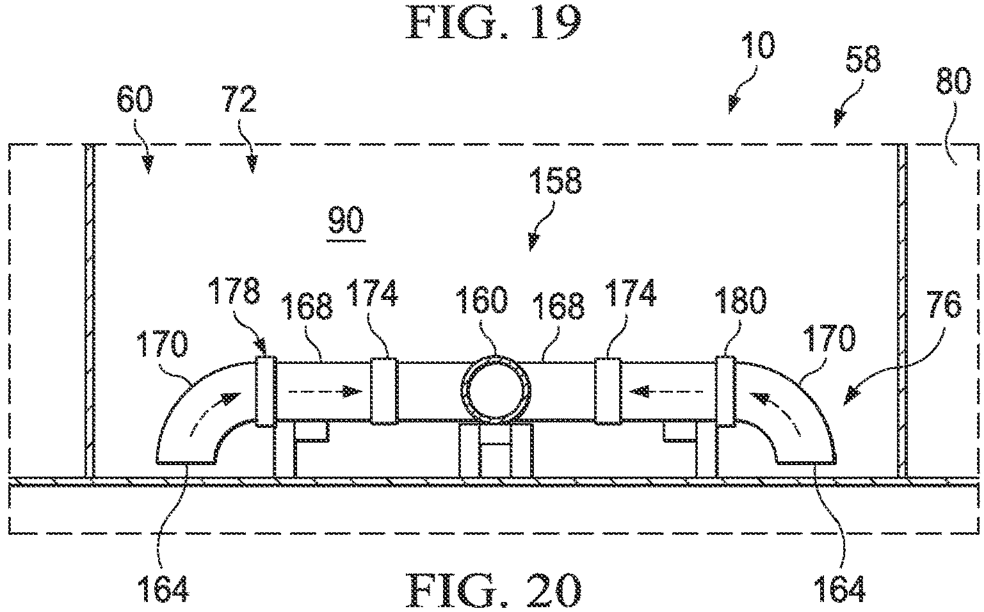
FIG. 20 is a front view of some of the exemplary fluid removal system components in FIG. 19 taken along lines 20-20.

Referring now to FIGS. 19 & 20, the exemplary suction conduit 160 is configured to draw liquid from each cargo compartment 60 at the lower end 76 thereof. For example, the illustrated suction conduit 160 can draw liquid through at least one distinct suction inlet 164 positioned within each respective cargo compartment 60 proximate to the lower end 76 thereof (See also e.g. FIG. 13). In this embodiment, the fluid removal system 158 includes two suction inlets 164 disposed within each cargo compartment 60. The exemplary suction inlets 164 are each provided in a respective inlet pipe section 168 fluidly coupled to and extending laterally from the suction conduit 160. The illustrated suction inlets 164 are positioned to optimally draw in liquid (e.g. sea water) from the bottom of the cargo compartment 60. For example, the inlets 164 may be positioned as close to the bottom (lower end 76) of the associated cargo compartment 60 as is possible or practical. In this embodiment, each suction inlet 164 is the open end of a downwardly facing elbow pipe 170 provided at the ends of the respective inlet pipe sections 168. However, this exemplary configuration is not limiting upon the present disclosure. Any other suitable arrangement may be used to remove fluid (e.g. sea water) from one or more cargo compartments 60. In fact, some embodiments will not include any suction conduits 160 and/or related components.

The size, number and location of the suction inlets 164 may be determined based on any suitable criteria, such as to provide the desired liquid flow rate in the associated cargo compartment 60. For example, the velocity of the liquid (e.g. sea water) being removed from the cargo compartments 60 may be determined or limited to control or limit the turbulence and mixing of the liquid (e.g. oil, oily water) entering the successive compartments 60 through the associated openings 100 and promote the separation of debris and sea water in the cargo compartments 60.

Still referring to FIGS. 19 & 20, the fluid removal system 158 may be configured to fluidly isolate each cargo compartment 60 in any suitable manner. For example, at least one fluid valve 174 may be associated with each cargo compartment 60. In the present embodiment, in an open position, each such valve 174 will allow the flow of liquid from the associated cargo compartment 60 into the suction conduit(s) 160 at the location of that valve 174. In a closed position, each exemplary valve 174 will disallow liquid flow between the associated cargo compartment 60 and the suction conduit 160 at the location of that valve 174. Any suitable arrangement of valves 174 may be used for selectively allowing and disallowing liquid flow from each cargo compartment 60 into the fluid removal system 158. In this embodiment, a distinct selectively controllable valve 174 is provided between the suction conduit 160 and each suction inlet 164, such as in each inlet pipe section 168. Thus, to remove liquid from a particular cargo compartment 60, the exemplary valves 174 in that cargo compartment 60 are opened and the valves 174 in all other cargo compartments 60 are closed. In some embodiments, it may be possible to open one or more valves 174 in multiple cargo compartments 60 at the same time.

The valve(s) 174 may have any suitable form, configuration and operation. For example, the valves 174 may be the presently commercially available Class 123, iron body, gate-type valves having an outside screw and yoke with a rising stem by Crane Co. If desired, the valves 174 may be remotely actuated, such as via an electronic controller or computer-based control system, as is and becomes further known.

Still referring to FIGS. 19 & 20, if desired, the fluid removal system 158 may include one or more sensors 178 to determine when the debris being recovered from the body of water 30 is approaching or entering the fluid removal system 158, the height or location of debris in the compartment 60, for any other purpose(s) or a combination thereof. For example, the sensor(s) 178 may be mounted in the cargo compartment 60 or coupled to the fluid removal system 158.

The sensor 178 may have any suitable form, configuration and operation. In this embodiment, the sensor 178 is an oily water sensor 180 disposed within each cargo compartment 60 proximate to each suction inlet 164 and configured to detect oil in the liquid entering the associated section inlet 164. For example, a distinct oily water sensor 180 may be fluidly coupled to each inlet pipe section 168 or the suction conduit 160. The illustrated oily water sensor 180 may, for example, be the presently commercially available Model EX-100P2/1000P2, in-line analyzer by Advanced Sensors. For another example, at least one oily water sensor 180 may be mounted elsewhere in the cargo compartment 60. An example of a presently commercially available oily water sensor 180 that may be mounted elsewhere in the cargo compartment 60 is the Model EX-100M/1000M side stream analyzer by Advanced Sensors. If desired, the debris recovery system 58 may be configured so that each sensor 178 may communicate with an electronic controller or computer-based control system, such as to provide control signals to the sensor 178 and/or for the sensor 178 to provide signals when the debris (e.g. oil) is detected in the sea water entering the associated suction inlet 164.

Referring back to FIG. 1, the fluid removal system 158 may deliver the fluid removed from the cargo compartments 60 to one or more desired destination in any suitable manner. In this embodiment, the suction conduit 160 discharges liquid from the cargo compartments 60 into the body of water 30 via at least one discharge opening 181 disposed aft of the rear cargo compartment 64. For example, the discharge opening 181 may be disposed on one or the other side 46, 48 of the vessel 10 and fluidly communicate with the suction conduit 160 via one or more discharge pipe sections 182. In the illustrated embodiment, at least one discharge pipe section 182 extends laterally from each side of the suction conduit 160 toward a distinct discharge opening 181 on the left or right side 46, 48 of the vessel 10, respectively.

If desired, the fluid removal system 158 may include one or more fluid suction, or discharge, pumps 184 configured to assist in drawing fluid (e.g. sea water) from one or more cargo compartments 60 into the suction conduit 160 and discharge it from the debris recovery system 58, draw debris (e.g. and water) into the intake opening(s) 102 of the vessel 10 from the body of water 30, for any other purposes or a combination thereof. For example, the discharge pump(s) 184 may provide "active" removal of fluid from the cargo compartments 60, such as to expedite the debris recovery operation, eliminate the need to continuously move the vessel 10 through the debris field 36 during debris recovery operations, for any other desired purpose(s) or a combination thereof.

The discharge pump 184 may have any suitable form, configuration, location, operation and purpose. In this embodiment, a distinct discharge pump 184 (e.g. suction pump) is fluidly coupled to the discharge pipe section(s) 182 on each side of the suction conduit 160 and configured to create suction in the fluid removal system 158 to draw liquid and debris into the vessel 10 from the body of water 30 (e.g. at the intake opening(s) 102) and from one or more cargo compartments 60 through the suction conduit 160 and out the associated discharge opening 181. In other embodiments, one or more banks of multiple discharge pumps 184 (e.g. two banks of five or six pumps each, or more or less) may be provided, such as to enhance the ability to control fluid removal during debris recovery operations, provide greater flexibility in fluid removal, reduce the potential for negative consequences caused by pump failure during operations, one or more other purposes, or a combination thereof. The illustrated discharge pump 184 may be any suitable pump capable of providing sufficient suction on one of its sides to draw debris into the vessel 10, and draw water from one or more cargo compartments 60 into the suction conduit 160 and discharge it through the associated discharge opening(s) 181. For example, the discharge pump 184 may be a presently commercially available Model 3498 double suction pump by Goulds Pumps. However, some embodiments may not include any discharge pumps 184.

Still referring to FIG. 1, if desired, the fluid removal system 158 may include one or more fluid valves 188 to seal off the suction conduit 160 and/or or other components of the fluid removal system 158. The valve(s) 188 may have any suitable form, configuration, location and operation and purpose. In the present embodiment, one or more valves 188 are provided proximate to each discharge opening 181 to seal off the aft end of the suction conduit 160 and related components from the body of water 30 when the fluid removal system 158 is not in operation, during transit and/or after the cargo compartments 60 have been at least partially filled with debris. For example, a valve 188 is shown fluidly coupled to the discharge pipe section 182 between each discharge opening 181 and adjacent discharge pump 184. Any suitable type of fluid valve 188 may be used, such as the presently commercially available Class 123, iron body, gate-type valves having an outside screw and yoke with a rising stem by Crane Co. If desired, the valves 188 may be remotely actuated, such as via an electronic controller or computer-based control system, as is and becomes further known.

However, the fluid removal system 158 may have any other desired components, configuration and operation. For example, the fluid removal system 158 may include multiple main suctions conduits 160. For another example, the suction conduit(s) 160 may not extend lengthwise through all the cargo compartments 60 and/or may discharge liquid at one or more intermediate location on the vessel 10. For still a further example, the suction conduit(s) 160 may deliver the drained liquid to any other desired destination (e.g. into another one or more compartments and/or other container(s) on the vessel 10, or to another vessel, such as via one or more hose, etc.). For yet another example, the fluid removal system 158 may not include any suction conduits 160 (or other components described above) and may remove liquid from only one or any combination of compartment, chambers or other locations. In some embodiments, the fluid removal system 158 may only include one or more discharge pumps 184. Thus the location, components and operation of the fluid removal systems 158 are not limiting upon the present patent and its claims or claims of any patents related hereto, unless and only to the extent as may be expressly provided in a particular claim and only for that claim and claims depending therefrom.

Still referring to the embodiment of FIG. 1, the debris recovery system 58 may include at least one at least partially floating, elongated, boom 190 disposed proximate to the front end 42 of the vessel 10. In some embodiments, the boom(s) 190 may be useful, for example, to encourage liquid to flow into the front cargo compartment 62 from the body of water 30 and, in particular, to ultimately effectively funnel, or corral, the top layer(s) of liquid (e.g. oil and oily water) and/or other floating debris, for entry into the cargo compartment 62. Any desired number, type, configuration and construction of booms 190 may be included, and the boom(s) 190 may have any suitable location and operation. In the illustrated embodiment, the debris recovery system 58 includes first and second elongated booms 192, 194 configured to be movable between at least one stowed position and at least one deployed position. In the stowed position, the exemplary booms 192, 194 are positioned adjacent to the front end 42 of the vessel 10, such as shown in shadow in FIG. 1. In other embodiments, the boom(s) 190 in the stowed position may be positioned at least partially on the front end 42 of the vessel 10, such as atop the recessed front deck 56.

In at least one deployed position, the exemplary booms 190 extend angularly outwardly from the vessel 10 away from the front end 42, the first elongated boom 192 being closer to the left side 46 of the vessel 10 and the second elongated boom 194 being closer to the right side 48 of the vessel 10. In some embodiments, for example, the booms 192, 194 may extend out into the body of water at an approximate 45-degree angle relative to the longitudinal centerline of the vessel 10. In this embodiment, the deployed positions of the booms 190 are useful to form an overall funnel shape forward of the vessel 10 to allow or encourage floating liquid and debris, to flow or funnel into the front cargo compartment 62 during debris recovery operations. If desired, one or more cables or other connectors may be coupled between each boom 190 and the vessel 10, such as to provide support for the boom 190 in the deployed position(s), maintain the position of the boom 190 in the deployed position, prevent the boom 190 from moving back towards the vessel 10 from the deployed position, other purpose(s) or a combination thereof. For example, multiple cables or other connectors may extend between the vessel 10 and each boom 190 at different locations along the length of the boom 190.

Figure 21:
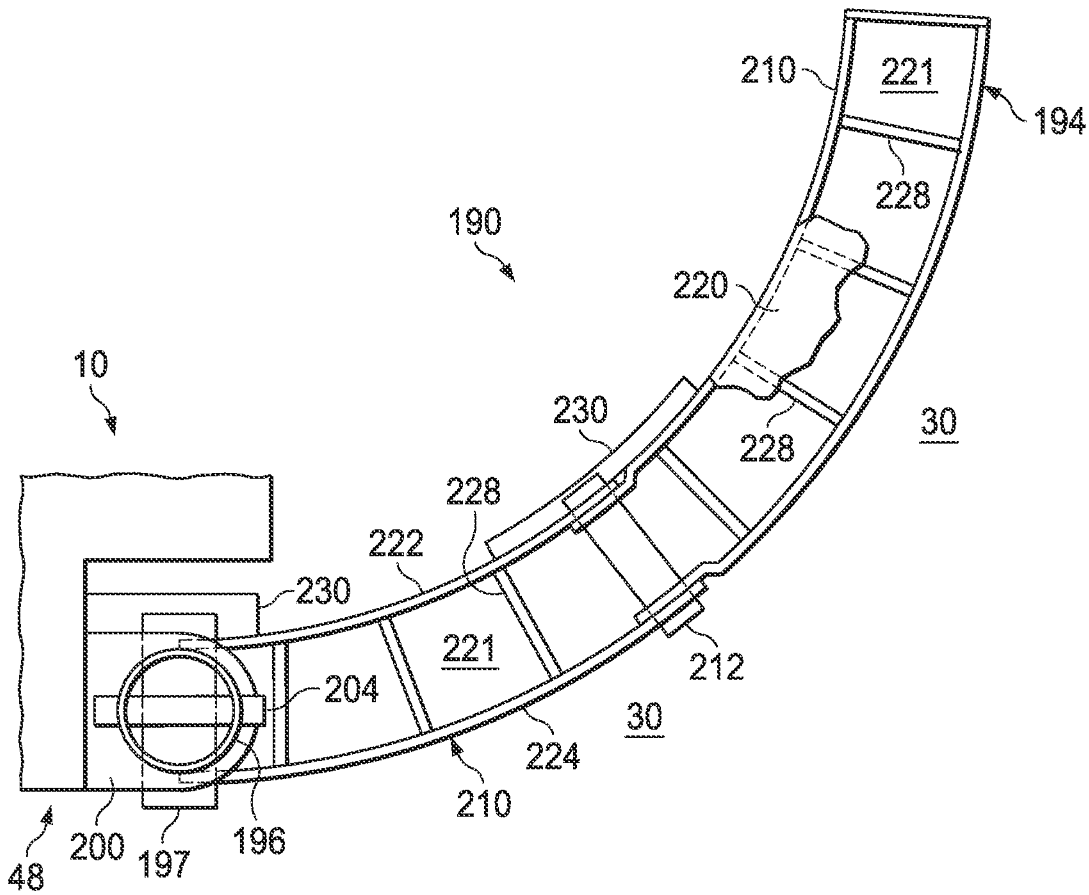
FIG. 21 is a top view of an exemplary elongated boom of FIG. 1 shown in a stowed position.
Figure 22:
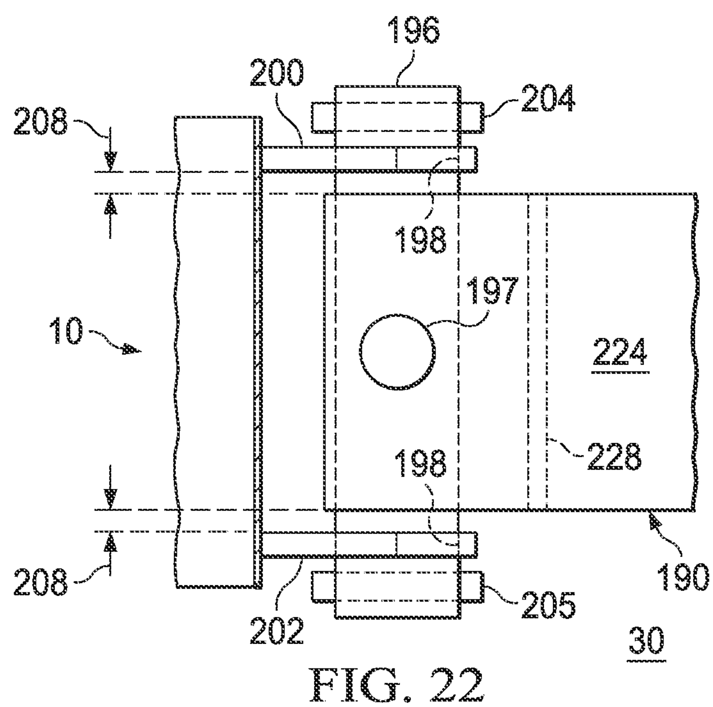
FIG. 22 is an exploded view of part of the exemplary elongated boom of FIG. 21.

The elongated boom(s) 190 may be movable between at least one stowed and at least one deployed position in any suitable manner. Referring to FIGS. 21 & 22, in this embodiment, each boom 190 is pivotably engaged with the vessel 10. For example, the boom 190 may be secured to a vertical pipe, or pin, 196, such as with one or more cross pin 197 extending transversely through the boom 190 and vertical pipe 196. The illustrated cross pin 197 allows the concurrent movement of the boom 190 and vertical pin 196. The exemplary vertical pin 196 is rotatable within holes 198 formed in at least one upper bracket 200 and at least one lower bracket 202 extending from, or coupled to, the vessel 10. The vertical pin 196 may be prevented from sliding out of the holes 198 in any suitable manner, such as with upper and lower locking pins 204, 206 extending transversely through the vertical pin 196 above and below the upper and lower brackets 200, 202, respectively. However, the present disclosure is not limited to this arrangement for moving the elongated boom(s) 190 between at least one stowed and at least one deployed position. For example, in some embodiments, one or more hydraulic or pneumatic actuators, cables, winches or other known components may be used to move booms 190 between stowed and deployed positions.

If desired, the boom 190 may be configured to be moveable into and secured in more than one distinct deployed position. This may be desirable, for example, to form a wider or narrow outer reach of multiple booms 190, or any other purpose. Any suitable mechanism(s) may be used to provide multiple distinct deployed positions of the boom(s) 190. For example, the vertical pin 196 may be engaged with a ratchet-like mechanism to secure the boom 190 in multiple deployed positions. If desired, the movement of the boom(s) 190 between at least one stowed and at least one deployed position may be automated and/or automatically controlled, such as with an electronic controller or computer-based control system, as is and becomes further known.

Still referring to FIGS. 21 & 22, each exemplary elongated boom 190 may be movable vertically relative to the vessel 10 during operations and/or include multiple articulating boom sections 210 to allow the boom 190 to follow or respond to the action of waves in body of water 30, reduce the potentially damaging forces places upon the boom 190 and/or connecting components (e.g. vertical pin 196, locking pins 204, 206, brackets 200, 202) during extreme or near extreme sea conditions, maintain a desired position of the boom 190 in the body of water 30, other purpose(s) or a combination thereof. These features may be useful, for example, to enhance the flexibility and capabilities of the vessel 10 and debris recovery system 58 to operate in typical deep sea conditions and not have to wait for the debris field to move close to shore.

Each boom 190 may be vertically moveable relative to the vessel 10 in any suitable manner. For example, the vertical pin 196 may be movable up and down relative to the upper and lower brackets 200, 202 within a desired range of motion. In this embodiment, the vertical pin 196 is movable up and down relative to the upper and lower brackets 200, 202 a desired distance 208. For example, if the distance 208 is 3 feet, the boom 190 and connected vertical pin 196 may move up to three 3 feet up and down relative to the brackets 200, 202 and vessel 10.

Still referring to FIGS. 21 & 22, each exemplary boom 190 includes multiple, interconnected, articulating boom sections 210 that are moveable relative to one another during debris recovery operations. While the illustrated embodiment includes two articulating boom sections 210, other embodiments may include three, four, five, size or more boom sections 210. The boom sections 210 being moveable relative to one another in any suitable manner. For example, the illustrated boom sections 210 are pivotably coupled together to allow each of them to move up and down relative to one other when the boom 190 is in one or more deployed positions. In this embodiment, adjacent boom sections 110 are connected with at least one hinge pin 212 extending transversely between them and allowing their relative up and down movement. In other embodiments, the boom sections 210 may be also or instead moveable side to side relative to one another.

Still referring to the embodiment of FIGS. 21 & 22, each elongated boom 190 may have an overall curved, straight or varied-shaped outer profile. The exemplary boom 190 is formed in a hollow box-beam configuration with one or more top plate 220, bottom plate 221, inner side plate 222, outer side plate 224 and end cap plate 226. If desired, one or more stiffener plates 228 may be provided within the boom 190, such as to add stiffness and structural support to the boom 190. The exemplary stiffener plates 228 are shown extending between the side plates 222, 224, but could also or instead be provided between the top and bottom plates 221 or oriented in a different configuration. The exemplary plates 220, 221, 222 and 224 and stiffener plates 228 are constructed of any suitable material, such as steel. However, the boom 190 may have any other suitable construction.

If desired, one or more flexible, fluidly impermeable cover 230 may be coupled to the boom 190 over the cross pin 197 and/or hinge pin(s) 212. This may be useful in some embodiments, for example, to prevent floating liquid (e.g. oil) and debris, from escaping from inside the funnel area caused by the boom(s) 190 through the boom 190 at the location of the cross pin 197 and hinge pin(s) 212. The flexible cover 230 may have any suitable form, configuration, construction and operation. For example, the flexible covers 230 may be flaps, sheets or other arrangements of heavy, flexible neoprene rubber. In this embodiment, each flexible cover 230 is coupled to the boom 190 only on one side of the respective cross pin 197 or hinge pin 212 to allow the remainder of the cover 230 to slide relative to the boom 190 during shifting or movement of the boom 190 or articulating section(s) 210 during operations. For example, the cover 230 disposed over the cross pin 197 may be coupled to the boom 190 forward of the cross pin 197, and the cover 230 disposed over each hinge pin 212 may be coupled to the adjacent boom section 210 forward of the hinge pin 212. In other embodiments, the cover 230 may instead be coupled to the boom 190 or other component on both respective sides of the cross pin 197 and/or hinge pins 212. For example, the cover 230 may have a pleated, or accordion-like, configuration and be coupled to both sides of the boom 190 or boom sections 210 so that it gives, or bends along with the boom 190 and/or boom sections 210.

Referring back to FIGS. 1 & 3, in some embodiments, the vessel 10 may be arranged and ballasted so that its front end 42 and the boom(s) 190 are at least partially submerged in sea water during debris recovery operations. In some circumstances, this may be beneficial to provide the desired rate and/or flow of liquid into the cargo compartments 60, encourage the top layer of liquid (e.g. oil) and other floating debris to enter the cargo compartments 60 from the body of water 30 other purpose(s) or a combination thereof. In the present embodiment, the vessel 10 may be configured so that when the vessel 10 is submerged to its load line, the recessed front deck 56 is at least partially submerged and the booms 192, 194 and openings 100 in the front vertical wall 92 are partially submerged so that the top layer(s) on the surface 32 of the body of water 30 can wash across the recessed front deck 56 and flow directly into those openings 100. For example, the vessel 10 may be arranged and ballasted so that the booms 190 and the openings 100 in the front vertical wall 92 are submerged up to approximately ½ their respective heights. Thus, if the booms 190 and the openings 100 in the front vertical wall 92 each have a height of 6 feet, for example, the vessel 10 may be positioned in the body of water so the boom 190 and openings 100 are each submerged 3 feet. However, any other desired arrangement may be used.

An exemplary method of removing debris from a body of water 30 in accordance with an embodiment of the present disclosure will now be described. Referring initially to the embodiment of FIGS. 1 & 2, the cargo compartments 60 of the debris recovery vessel 10 are initially at least substantially filled with water in any suitable manner. If desired, the cargo compartments 60 may be flooded with sea water 38 before the vessel reaches the debris field 36. For example, all the gates 110 could be moved into a fully open position to allow the cargo compartments 60 to free-flood with sea water 38. Also, if desired, the free-flooding of the cargo compartments 60 could be performed during the forward movement of the vessel 10 in the direction of arrow 16 (FIG. 2), such as to flood, or assist in expediting flooding of, the compartments 60. Preferably, the illustrated valves 174 are closed during free-flooding of the cargo compartments 60. However, it may be possible to temporarily open the valves 174 and even turn on one or more discharge pumps 184 to fill the compartments 60 with sea water. The vessel 10 may be arranged and ballasted so that flooding the cargo compartments 60 will submerge the vessel 10 to the desired load line, such as described above.

After the exemplary cargo compartments 60 are at least substantially filled with water, the vessel 10 is moved to the debris field 36. Preferably at that time, each illustrated boom 190 is moved to a deployed position, such as described above. However, the boom(s) 190 may be moved into a deployed position at an earlier or later time. Once at the debris field 36, while all of the exemplary gates 110 are in an open position, sea water is removed from the rear cargo compartment 64. For example, one or more of the valves 188 are opened and all of the valves 174, except those in the rear cargo compartment 64, are closed. The exemplary valves 174 in the rear cargo compartment 64 are opened to remove sea water from the lower end 76 of the rear cargo compartment 64 into the suction conduit 160 and out one or more discharge opening 181 in the path of arrows 240 (FIG. 2). If desired, one or more discharge pump 184 may be turned on, such as to provide active suction and pumping of the sea water.

Still referring to the embodiment of FIG. 2, as sea water is removed from the lower end 76 of the rear cargo compartment 64, liquid is simultaneously drawn into (e.g. by suction of the discharge pump(s) 184) or enters the front cargo compartment 62 through the openings 100 in the front vertical wall 92. Although it is impossible to forecast the actual makeup of the liquid entering those openings 100 at any specific point in time, the exemplary debris recovery system 58 is configured so that primarily the liquid on and near the surface 32 of the body of water 30 (e.g. oil and some oily water) and other floating debris enter the front cargo compartment 62, as shown by flow arrow 242 in FIGS. 2 & 11.

In accordance with this embodiment, since the intermediate cargo compartments 66, 68, 70 and 72 are substantially full of sea water, as the lower end 76 of the rear cargo compartment 64 is being emptied of sea water, the upper layers of liquid (e.g. oil and some oily water) and other floating debris entering the front cargo compartment 62 are preferably drawn across the surface of the sea water in the intermediate cargo compartments 66, 68, 70 and 72 through the openings 100 in each successive vertical wall 90 and ultimately into the rear cargo compartment 64, such as shown with flow arrows 244 in FIG. 12.

If one or more exemplary wave dampeners 140 (e.g. FIGS. 11 & 13) are included in one or more of the cargo compartments 60, the wave dampener(s) 140 may assist in encouraging primarily floating debris to enter the front and subsequent cargo compartments 62, 66, 68, 72 and 64 through the successive openings 100, reduce wave action and turbulence of liquid entering each compartment 60, help maintain a steady flow of liquid through the openings 100 other desired purpose(s) or a combination thereof. In this embodiment, as sea water continues to be drawn down through the rear cargo compartment 64, it is expected that at least some of the oil (and/or other submerged debris) in the water therein will separate and float on top of the sea water, further separating the debris from the sea water therein.

Figure 14:
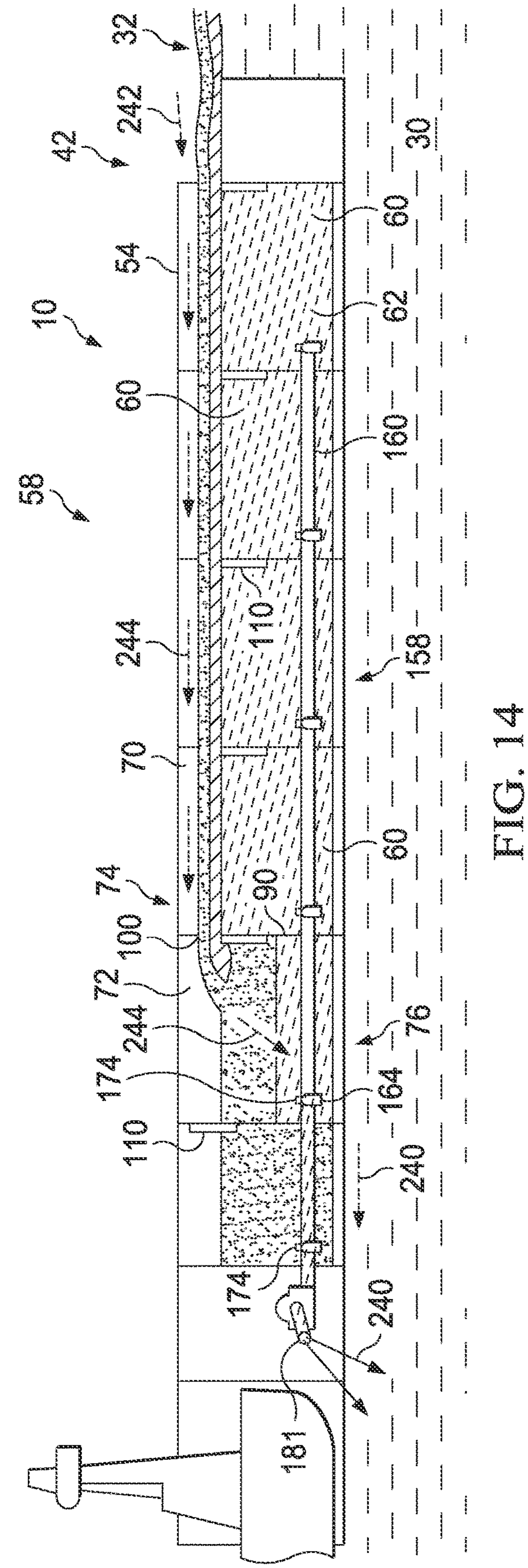
FIG. 14 is a side view of the exemplary vessel of FIG. 1 with the side shell removed to show exemplary interior cargo compartments and other components during exemplary debris recovery operations in accordance with an embodiment of the present disclosure.

Referring now to the embodiment of FIGS. 12 & 14, when substantially all of the sea water in the exemplary rear cargo compartment 64 is removed, that compartment 64 is fluidly isolated as desired. For example, the compartment 64 may be fluidly isolated from the fluid removal system 158 and the other compartments 60, such as by closing the valves 174 in the cargo compartment 64 and the gate(s) 110 associated with the openings 100 that lead into that compartment 64. In some embodiments, the cargo compartment 64 may be fluidly isolated when it is substantially full of debris. For example, this may occur when one or more sensors 178, such as the oily water sensors 180 (e.g. FIG. 20), indicate the presence of some or a particular amount of debris in the exiting sea water.

In this embodiment, to continue the debris recovery operations, the above process as performed with respect to the rear cargo compartment 64 is repeated for each successive aft-most cargo compartment 60. For example, referring to FIG. 14, the valve(s) 174 in the next cargo compartment 72 are opened to allow sea water to be removed from the lower end 76 of that compartment 72 in the path of arrows 240. Substantially simultaneously, principally floating debris some water preferably enters into the upper end 74 of, and fills, that cargo compartment 72, such as shown with flow arrows 244. In this embodiment, when substantially all sea water in that cargo compartment 72 is removed (e.g. FIG. 15), that compartment 72 is fluidly isolated. For example, the compartment 72 may be fluidly isolated at least from the remaining forward cargo compartments 60 which still contain sea water, or fluidly isolated similarly as described above with respect to cargo compartment 64. For example, the valves 174 in that cargo compartment 72 and the gate(s) 110 associated with the openings 100 that lead into that compartment 72 may be closed.

Figure 15:
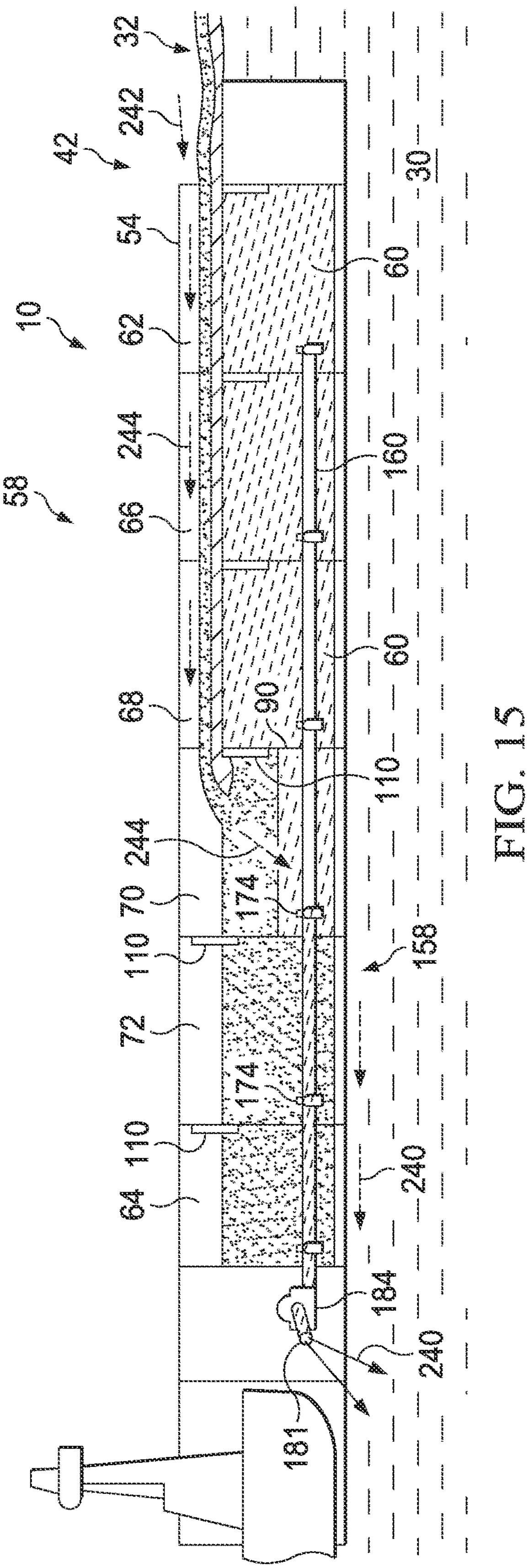
FIG. 15 is a side view of the exemplary vessel of FIG. 1 with the side shell removed to show exemplary interior cargo compartments and other components during exemplary debris recovery operations in accordance with an embodiment of the present disclosure.
Figure 16:
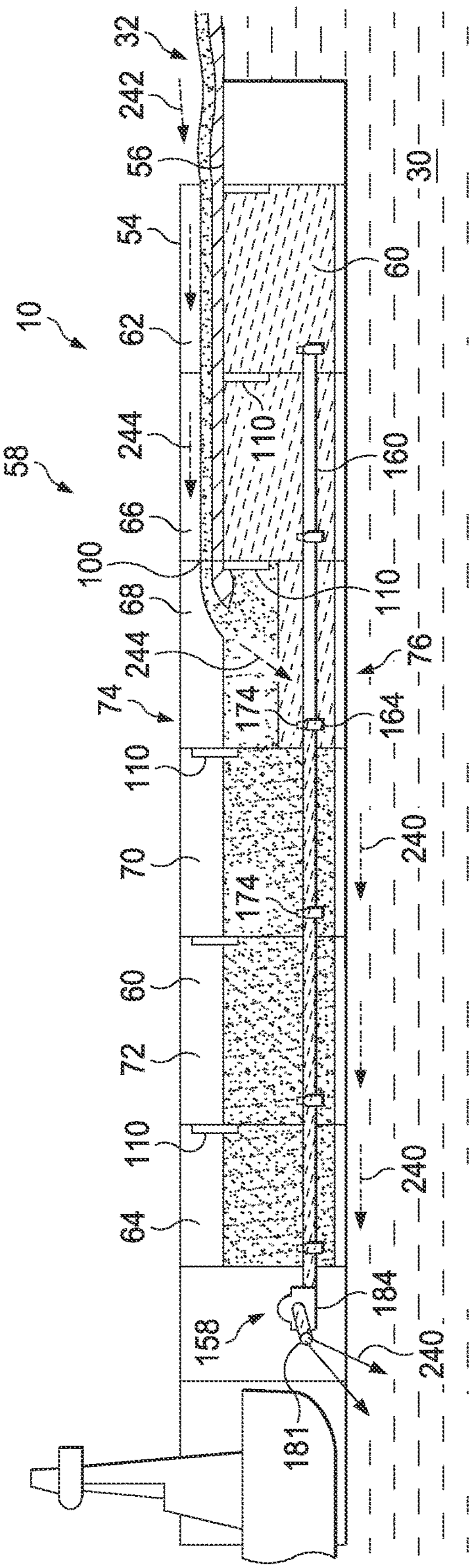
FIG. 16 is a side view of the exemplary vessel of FIG. 1 with the side shell removed to show exemplary interior cargo compartments and other components during exemplary debris recovery operations in accordance with an embodiment of the present disclosure.
Figure 17:
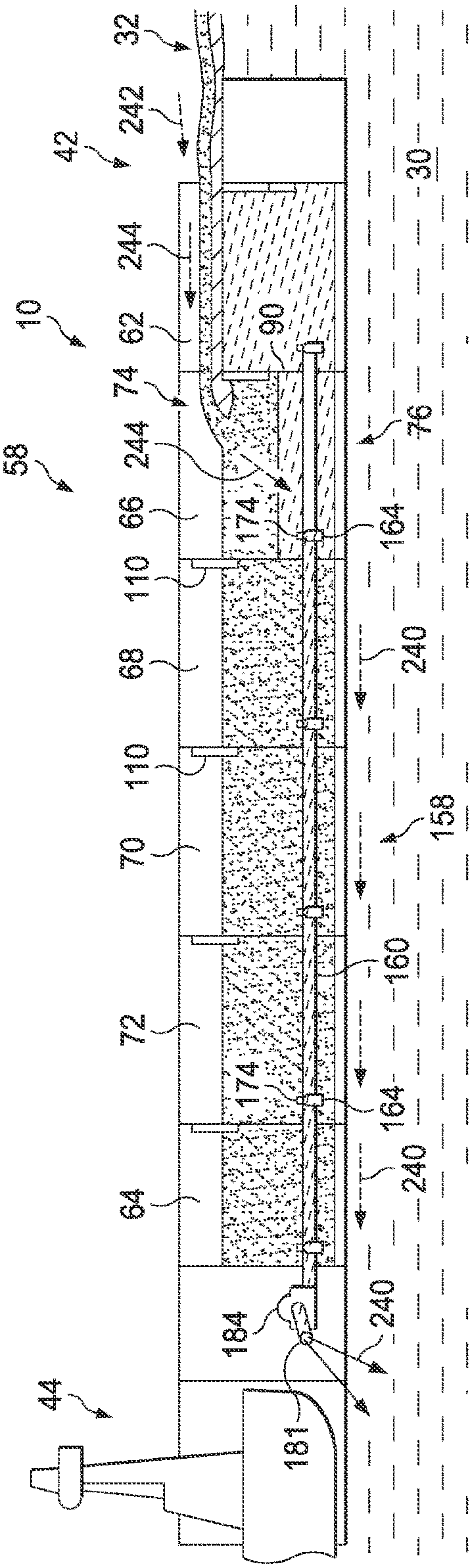
FIG. 17 is a side view of the exemplary vessel of FIG. 1 with the side shell removed to show exemplary interior cargo compartments and other components during exemplary debris recovery operations in accordance with an embodiment of the present disclosure.

If desired, the above exemplary process may then be repeated for cargo compartment 70 (e.g. FIGS. 15 & 16) by opening the valves 174 therein to allow sea water to be removed from the lower end 76 of that compartment 70 in the path of arrows 240. In this embodiment, substantially simultaneously, principally debris and some water preferably enters into the upper end 74 of, and fills, that cargo compartment 70, such as shown with flow arrows 244 (FIG. 15). When substantially all sea water in that cargo compartment 70 is removed (FIG. 16), it may be fluidly isolated, such as described above.

Figure 18:
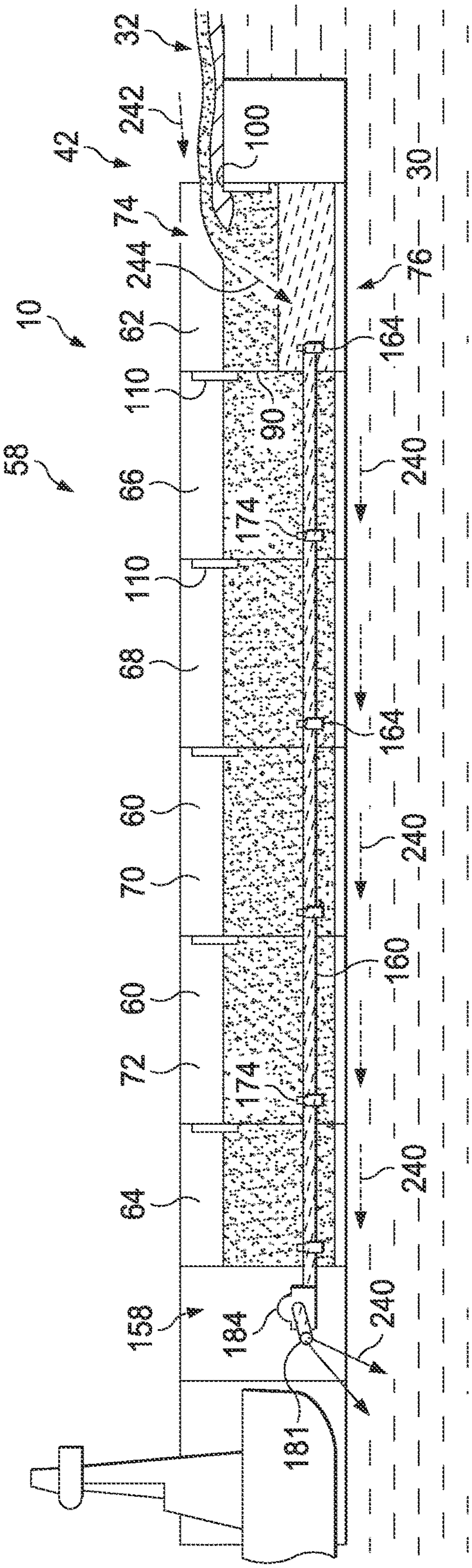
FIG. 18 is a side view of the exemplary vessel of FIG. 1 with the side shell removed to show exemplary interior cargo compartments and other components during exemplary debris recovery operations in accordance with an embodiment of the present disclosure.

In this embodiment, the above process may then be repeated for cargo compartment 68 (e.g. FIGS. 16 & 17), then cargo compartment 66 (e.g. FIGS. 17 & 18) and finally cargo compartment 62 (e.g. FIG. 18). If desired, one or more cargo compartment 60 may be skipped in the process by fluidly isolating that compartment 60 (and the other more rearward cargo compartments 60), such as described above. When substantially all sea water in the illustrated front cargo compartment 62 is removed, it is fluidly isolated, such as described above. It should be noted that the above process can be used with embodiments having any number (e.g. 2, 3, 4 etc.), form and configuration of cargo compartments 60. Thus, the methods of debris recovery of present disclosure are not limited by the number, form and configuration of compartments 60.

In accordance with many embodiments, debris 34 is separated from sea water 38 and collected as it moves across the vessel 10 and as sea water 38 is discharged from the vessel 10. For example, large amounts of floating debris (e.g. oil) may be relatively quickly collected and removed from practically any body of water 30.

Referring back to the embodiment of FIG. 1, as the cargo compartments 60 are being emptied of sea water and at least partially filled with debris, liquid may be added to or removed from one or more of the other compartments 80, 84, 86, 88 in the vessel 10, such as to maintain the desired height of the vessel 10 in the body of water 30 (e.g. at the desired load line or other position). For example, sea water may be added to and removed from one or more of the side ballast tanks 80 on either, or both sides, of the vessel 10 as needed throughout the above debris recovery operations to maintain or refine the height of the vessel 10 in the body of water 30.

If desired, the vessel 10 may be moved in a forward direction (e.g. arrow 16, FIG. 2) through the debris field 36 at any desired speed, or at varying speeds, throughout, or at certain times, during the debris recovery operations. This may be desirable, for example, for strategic positioning of the front end 42 of the vessel 10 relative to the debris field or oil spill area 36 (e.g. like moving a vacuum cleaner over a dirty rug) as the discharge pump(s) 184 actively move liquid through the fluid removal system 158 as described above, to urge or assist in directing preferably floating debris and some water into the front cargo compartment 62 and through the other compartments 60, thus enhancing the active flow action caused by the discharge pump(s) 184, to cause the passive flow of liquid through the fluid removal system 158 when the discharge pumps 184 are not used, other purpose(s) or a combination thereof. In the present embodiment, for example, the vessel 10 may be eased through the debris field 36 in the forward direction at a steady, slow speed during debris recovery operations. However, forward movement of the vessel 10 is not necessary in all embodiments.

Also, during the debris recovery operations, if desired, the position of one or more of the exemplary open gates 110 may be varied as needed to affect or control the flow of liquid into the cargo compartments 60. For example, one or more of the gates 110 may be moved into one or another partially open position, such as to provide the optimal flow rate and/or liquid content (e.g. primarily oil or other floating debris) of the flowing liquid. If desired, the height of any of the open gates 110 relative to their associated openings 100 may be dynamically adjusted during debris recovery operations, such as via an electronic controller or computer-based control system. One or more variables, such as the weight, density and viscosity of the oil and/or other debris, substances or material in the sea water, may affect and be considered in varying the position of one or more gates 110 to achieve a desired flow rate and/or content of the liquid passing through the openings 100.

When debris recovery operations are completed, the exemplary fluid removal system 158 and all the cargo compartments 60 may be fluidly isolated from the body of water 30. For example, all the gates 110 and all valves 174, 188 may be closed and the discharge pumps 184 turned off. If desired, all the gates 110 and/or cargo compartments 60 may be substantially sealed. In some embodiments, all the gates 110 and/or cargo compartments 60 may be completely (100%) sealed. The exemplary elongated boom(s) 190 may be moved to a stowed position and the vessel 10 transported to a desired location for offloading the contents (preferably primarily debris) in the cargo compartments 60. If desired, one or more other compartments on the vessel, such as the ballast tanks 80, may be emptied, such as to raise the height of the vessel 10 in the body of water 30 as it leaves the debris field 36. This may be desirable, for example, to minimize further debris (e.g. oil) contamination of the exterior surface of the side shell of the vessel 10 and/or allow cleaning/removal of any debris (e.g. oil) adhered thereto.

The contents of the cargo compartments 60 may be offloaded in any suitable manner. For example, the contents of the cargo compartments 60 may be offloaded to containers on one or more other vessel or onshore. In some embodiments, the debris (and some water) may be offloaded through the openings 100 or other openings (not shown) in the cargo compartments 60, such as via one or more hose or other component. In other embodiments, the debris (and some water) may be offloaded through the debris recovery system 58 (e.g. the fluid removal system 158). If desired, the tug 14 used with a first vessel 10 as described above may be used to take a second similar vessel 10 to the debris field 36 to recover debris while the first vessel 10 is being offloaded.

It should be noted that variations of the embodiments of FIGS. 1-22 may include more, fewer or different components, features and capabilities as those described or shown herein. Further, any of the details, features, components, variations and capabilities of other embodiments discussed or shown in this patent or as may be apparent from the description and drawings thereof, are applicable to the embodiments of FIGS. 1-22, except and only to the extent they may be incompatible with any features, details, components, variations or capabilities of the embodiments of FIGS. 1-22. Accordingly, other than with respect to any such exceptions, all of the details and description provided in this patent with respect to the other embodiments or as may be shown in the appended drawings relating thereto or which may be apparent therefrom, are hereby incorporated by reference herein in their entireties with respect to the embodiments of FIGS. 1-22.

Referring now to the embodiments of FIGS. 23-40, the debris recovery system 58 of the illustrated vessel 10 (e.g. barge 12) includes a single cargo compartment 60 (e.g. front cargo compartment 62). As shown in FIG. 24, one opening 100 (e.g. intake opening 102) is provided in or proximate to the illustrated front bulkhead 92 to allow water and debris to enter the exemplary cargo compartment 60 from the body of water 30. The illustrated intake opening 102 is shown extending upwardly from the recessed front deck 56 with no upper boundary and generally across the width of the cargo compartment 60. Thus, the upper end 74 of the exemplary cargo compartment 60 at the front end 42 of the vessel 10 is essentially open to allow debris 34 and probably some water 38 to wash, or flow, from the body of water 30 across or over the recessed front deck 56 and into the cargo compartment 60. However, the debris recovery system 58 may instead include more than one cargo compartment 60 and/or intake opening 102, and the intake opening(s) 102 may have any other desired configuration and location(s).

To illustrate that the exemplary debris recovery system 58 may be configured to recover a wide (potentially unlimited) variety and size of debris, the debris shown being recovered includes both generally small-sized debris 40 (e.g. oil, other chemicals, particulate pollutants, small biological materials (e.g. algae bloom), small plastic material (e.g. micro plastics), other small trash particles, small floating metallic and/or wood objects, etc.) and generally large-sized debris 41 (e.g. large trash, cups, bottles, cans and other garbage, driftwood, large biological materials (e.g. deceased marine life, algae bloom), floating wood and metallic objects). Thus, the debris recovery system 58 is not limited by type of debris or contaminants being collected, except as may be explicitly provided or recited herein or in any particular claims and only for such claim and claims depending therefrom.

Figure 23:
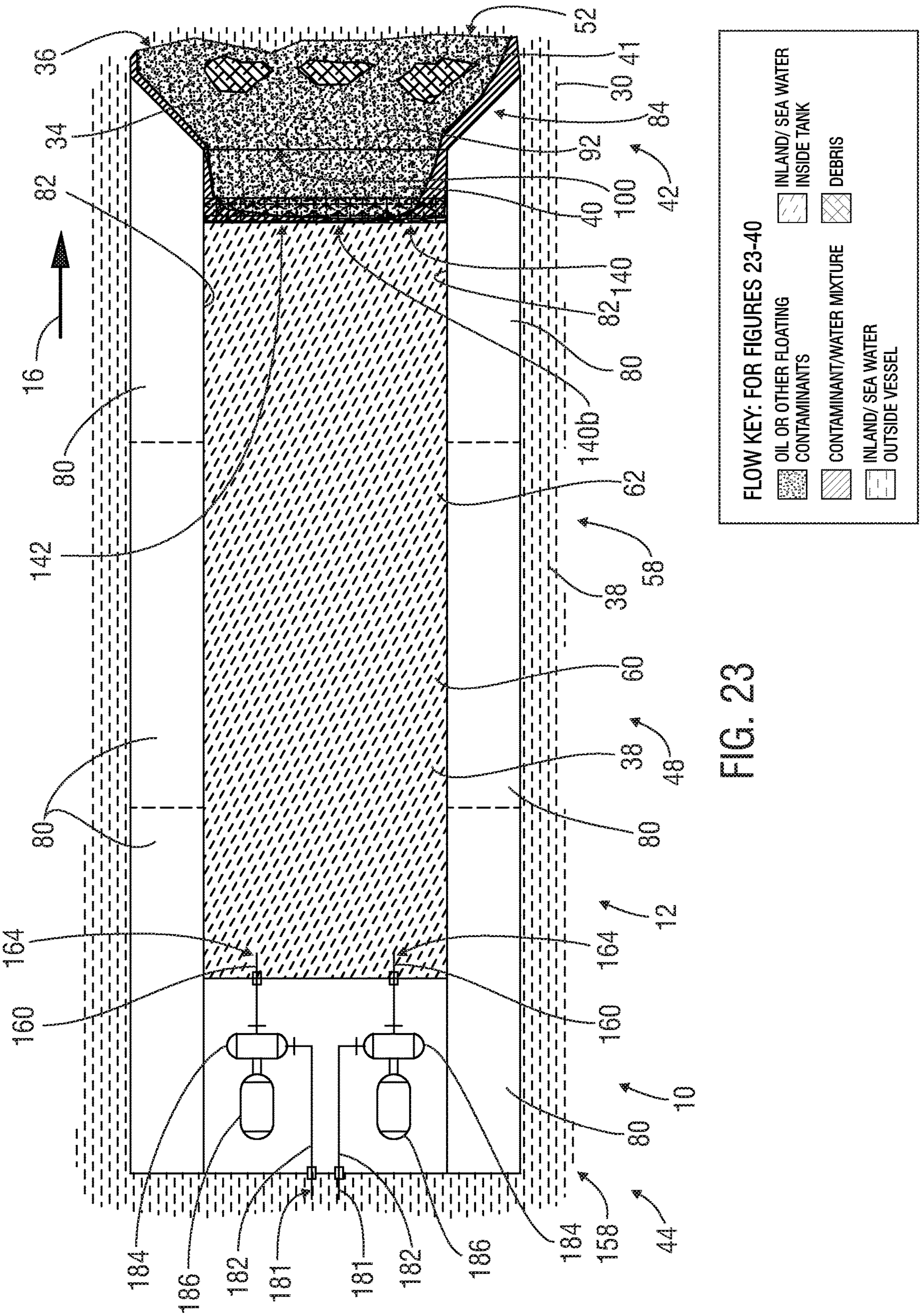
FIG. 23 is a plan view of an exemplary waterborne vessel with the decks removed to show parts of an exemplary debris recovery system having an exemplary pivoting-type inflow regulator in accordance with at least one embodiment of the present disclosure.
Figure 24:
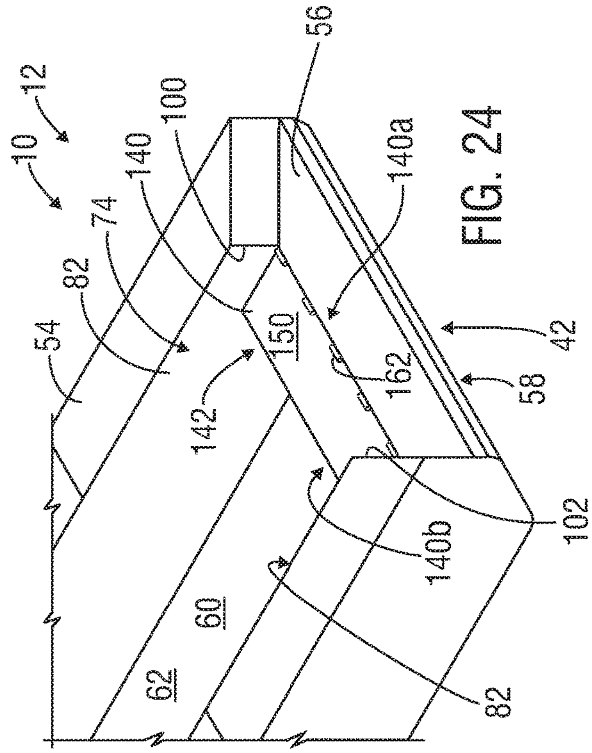
FIG. 24 is an isolated perspective view of part of the front end of the exemplary vessel and debris recovery system of FIG. 23.
Figure 25:
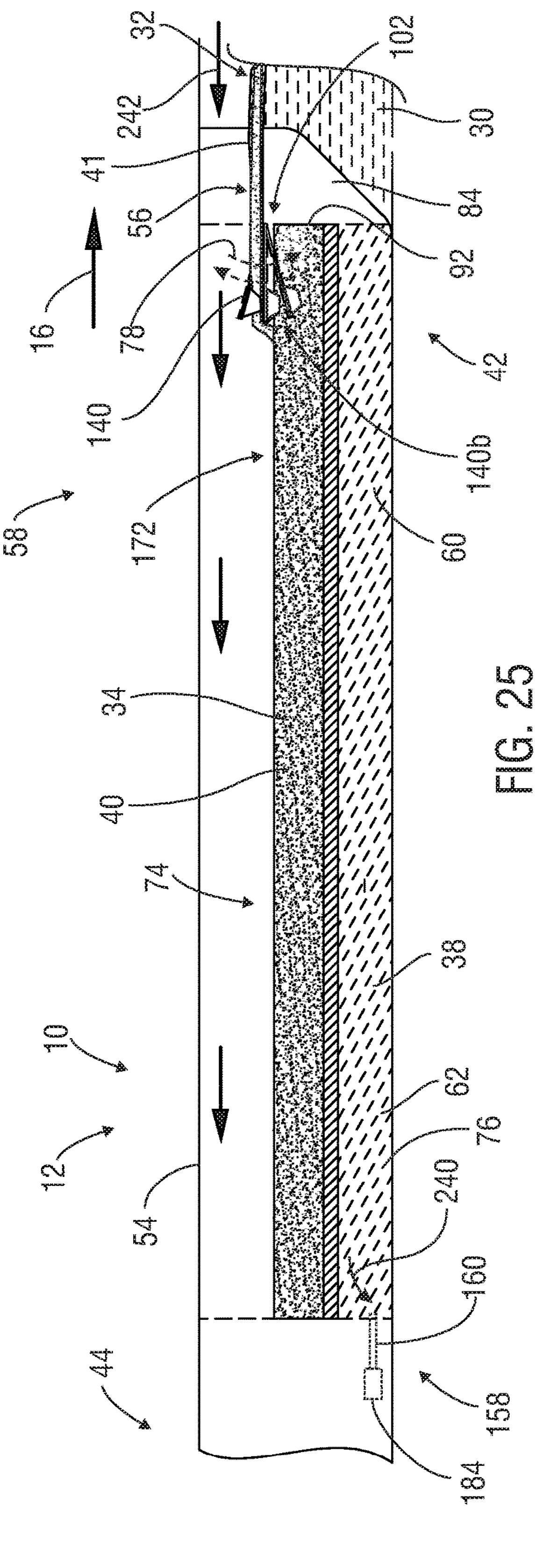
FIG. 25 is a side, partial cross-sectional view of the exemplary vessel of FIG. 23 with the side shell removed and showing the exemplary interior cargo compartment and inflow regulator in accordance with at least one embodiment of the present disclosure.

As shown in FIGS. 23 & 25, the exemplary debris recovery system 58 includes a fluid removal system 158 configured to allow the drainage of sea water 38 from the cargo compartment 60 (e.g. at its lower end 76) and, at the same time, to draw in debris (and often some water) from the body of water 30 to at least partially fill the cargo compartment 60, such as described elsewhere herein. In this embodiment, the fluid removal system 158 is shown including two sets of suction conduits 160 drawing water from the same (e.g. single) cargo compartment 60, along with associated discharge pumps 184 (having one or more associated motors 186, such as hydraulic motors driven by a diesel engine), discharge pipe sections 182, discharge openings 181, valves and other components such described elsewhere herein. However, any other arrangement of parts could be used (e.g. with no suction conduits 160).

Referring to FIGS. 23-25, during use of the exemplary debris recovery system 58, at least one discharge pump 184 will create suction to concurrently (i) draw debris (and probably some water) from the body of water 30, through the intake opening 102, over the IFR(s) 140 (when included) and into the cargo compartment 60 and (ii) draw water 38 from the cargo compartment 60 into the associated suction conduit(s) 160 (e.g. and eject it from the vessel 10). When IFRs 140 are included, the suction created by the exemplary discharge pump(s) 184 may at least slightly lower the liquid level rearward of the IFR 140 relative to the liquid level forward of the IFR 140 causing the liquid forward of the IFR 140 to move rearward, typically increasing the volume and cascading movement (rushing) of various types of small-sized debris over the front edge 142 of the IFR 140 and utilizing any cohesive properties (intermolecular attractive forces) of the debris (e.g. oil) to rapidly draw the debris in (e.g. capturing all or virtually all of the debris 34 in the debris field 36).

Generally, in many embodiments, the less water 38 that is drawn into the debris recovery system 58 from the body of water 30 during debris collection operations in a debris field 36, the quicker and greater the volume of the debris 34 that can be ingested, along with other potential benefits, such as less emulsification, more space onboard for debris, more efficient, effective, extensive and quicker debris collection. Likewise, the more debris 34 that is ingested can provide any or all the same benefits. These objective can often be achieved, for example, with efforts to limit ingestion to the uppermost layer(s) of the body of water 30 (where the floating debris resides) as much as possible, sometimes referred to herein as "inflow optimization".

In accordance with an independent aspect of the present disclosure, one way to help regulate or limit ingestion to the uppermost layer(s) of the body of water 30 is by spreading-out the intake surface area via a long front edge(s) 142 of the IFR(s) 140 (or long of the intake opening(s) 102 when IFR's 140 are not included), in some cases, for example, extending at least substantially across the entire width of the cargo compartment 60, inflow chamber 310 or other chamber or area in which it is located (or to some desired lesser extent). In these embodiments, expanding, or spreading out, the intake surface area during debris recovery effectively spreads out, and thus generally decreasing, the pulling forces of the suction pressure of the system 58 at each point along the intake. Reducing the pulling forces at any point should reduce the amount (and thus depth) of water/debris being sucked in at each point. In most applications, the shallower the water/debris of the body of water 30 in a debris field 36 that is drawn in, the less water will be drawn in. At the same time, spreading such shallow intake across a wider or longer area expands the reach for ingesting more of the top layers (debris), helping optimize debris recovery.

Another feature to potentially help regulate or limit ingestion to the uppermost layer(s) of the body of water 30 is by providing a continuous and/or consistent front edge 142 of the IFR(s) 140 across an intake opening 102 (or continuous and/or consistent front edge of the intake opening 102 when no IFR's 140 are included). Continuity and consistency in such front edge(s) should remove at least some variability in the rate and volume (and thus depth and makeup) of water/debris that flows thereover. For example, a single IFR 140 extending across an entire intake opening 102 (e.g. from wall to wall) can provide one continuous and consistent front edge 142, whereas the inclusion of (i) one or more gaps between the IFR(s) 140 and any side wall(s) or (ii) two adjacent, side-by-side IFRs 140, each extending across part of the width of the intake opening 102, may provide undesirable variability in the rate and volume (and thus depth and makeup) of the intake. Accordingly, in various embodiments, the use of a single IFR 140 (e.g. extending wall to wall) across an intake opening 102 can help optimize debris recovery. These features (independently and collectively) are referred to herein as "inflow optimization" and can be applied to any embodiments of this patent.

Referring now to FIGS. 23-25, the illustrated debris recovery system 58 includes a single at least partially buoyant IFR 140 configured to be positionable to at least substantially (i) regulate, or limit, the inflow of debris (and typically some water) into the cargo compartment 60 from the body of water 30 to that debris (and maybe some water) which is disposed at or near the surface 32 of the body of water 30 and which passes through the intake opening 102 over the IFR 140 during use of the debris recovery system 58, (ii) dampen or reduce the size of, or turbulence caused by, waves in the liquid passing through the opening(s) 100, (iii) maintain a steady flow of debris/water through the opening(s) 100, (iv) take advantage of the cohesive properties (intermolecular attractive forces) of the debris (e.g. oil) to rapidly draw in all or virtually all of the debris in the debris field, (v) other desired purpose(s) or (vi) a combination thereof.

It should be noted that, in other embodiments, more than one IFR 140 may be used (e.g. side-by-side and/or one forward of another or any other configuration). The exemplary IFR 140 will typically at least substantially regulate, or limit, inflow into the cargo compartment 60 to debris (and water) that passes over the IFR 140 and disposed at or near (or comes from) the surface 32 of the body of water 30 by providing resistance to the water/debris passing through the opening 100, constraining the amount of water/debris able to pass into the compartment 60 to the top layer(s) (e.g. the least dense or most buoyant liquid/debris) moving through the intake opening 102. This is sometimes referred to herein and in the appended claims as the "intake resistance", "ability to constrain the inflow of fluid/debris into the cargo compartment(s) 60" and variations thereof.

In many embodiments, the (e.g. ideal) intake resistance and/or suction of the discharge pump(s) 184 will cause debris (e.g. oil) to rush or cascade over the front edge 142 of the exemplary IFR 140 and into the cargo compartment 60. In the case of oil and any other debris with similar relevant properties, the IFR 140 may use the cohesive property (intermolecular attractive forces) of the debris and/or overcome the adhesion of water and debris to facilitate or encourage the inflow (and even increased velocity) of mostly, or all, debris and little water. For example, the exemplary IFR 140 may be configured and used to act similarly as holding a ladle or spoon on the surface of soup having a layer of oil or grease on top and applying downward pressure sufficient to cause or allow (up to the entire volume of) oil or grease to rush or cascade into the ladle or spoon (referred to sometimes herein as the "ladle effect"). As the small-sized debris is drawn into the exemplary vessel 10, due to the cohesive property of the debris (e.g. oil), the debris passing over the IFR 140 will effectively pull the surrounding debris across the surface 32 of the body of water 30 into the vessel 10 (potentially pulling the entire body of debris into the vessel 10).

When the debris is thin, even as thin as just a sheen, the exemplary IFR 140 may be positioned to cause a very thin layer to pass over the front edge 142 thereof, increasing the volume and cascading movement (rushing, ladle effect) of the debris as it falls over the front edge 142 of the IFR 140 (e.g. due to the cohesive nature of the small-sized debris and the condition caused by the suction of the discharge pump(s) 184 of at least slightly lowering the water level rearward of the IFR(s) 140 below the water level forward of the IFR(s) 140), which may accelerate the recovery of the small-sized debris and the amount of debris recovered. In fact, the use of the exemplary debris recovery system 58 may result in recovery of substantially all the small-sized debris on or near the surface of the body of water in the subject debris field(s) 36.

With regard to various embodiments of the present disclosure and appended claims, there may be configurations, applications or periods of use of the debris recovery system 58 during which only debris (and no water) is collected or drawn into the cargo compartment 60. Thus, any mention herein of both debris and water being collected or drawn into the cargo compartment(s) 60 is meant to include and includes use of the exemplary debris recovery system 58 to draw in only debris, only water or any combination thereof, unless expressly provided otherwise.

In many embodiments, the debris recovery system 58 will not at least substantially mix or emulsify the incoming debris and water (e.g. due to the intake resistance and/or wave dampening effect caused by the IFR 140, utilizing one or more controllable variables, provide and/or maintain a sealed liquid system, such as defined below, or other factors), allowing the debris to rise above the water in the cargo compartment 60. Often, the exemplary cargo compartment 60 will contain a defined layer of debris on top of the water and may include an intermediate layer of mixed debris and water (e.g. FIG. 25).

With various embodiments of the present disclosure, on-board separation of debris and water may be easy, achievable and not overly onerous or time-consuming, allow substantial volumes of (acceptably clean) water to be discharged from vessel 10 (to the environment) and thus free up more on-board space for debris, allow the ultimate waste collected to have a high ratio of debris to water (e.g. 95 or more parts debris to 1 part water), other benefits or a combination thereof. For example, the less water that is ultimately included with the collected debris (collectively, the "waste"), (i) the more space will be available for collecting and storing the waste, and (ii) the less waste that needs to be stored, transported and dealt with, freeing up more space, effort and expense in storing, handling and treating debris.

Depending on the particular type and conditions of use of the exemplary debris recovery system 58, the position (and movement) of each IFR 140 and its intake resistance, the rate of inflow and volume of incoming debris (and some water) and the debris-water ratio entering the vessel 10 may be regulated and varied as desired by selectively controlling one or more "controllable" variable. Some potential examples of controllable variables are the (i) height, width and length of the cargo compartment 60 and/or vertical trunk 372 (described below) (e.g. which can be predesigned or selectively adjustable, such as with one or more removable partitions), (ii) direction and speed of movement of the vessel 10, (iii) buoyancy of the exemplary IFR 140, (iv) use of one or more IFR variable buoyancy mechanisms (such as described below), (v) activity such as the amount of suction within the cargo compartment 60 or other part of the vessel (e.g. varying suction with the use of one or more variable speed discharge pumps 184 and/or multiple discharge pumps 184, manipulating one or more of valves (e.g. valves 174, 188) in the fluid removal system 158), (vi) off-loading of debris from the vessel 10 (e.g. through one or more debris pumps 380, FIGS. 41-47), or a combination thereof. Depending upon the particular embodiment of the debris recovery system 58 and conditions of use, any one or more of the controllable variables may be evaluated and/or varied as desired (e.g. in real-time, on an ongoing basis).

One or more "non-controllable" variables may also influence the position (and movement) of each IFR 140 and its intake resistance, the rate of inflow or volume of incoming debris (and some water) and the debris-water ratio entering the cargo compartment 60 or other part of the vessel 10 and can be factored in (e.g. in real-time, on an ongoing basis) when deciding on the manipulation or use of one or more controllable variable. Some potential examples of non-controllable variables include environmental factors (e.g. wind, rain, wave action, sea conditions, etc.), the type or nature (e.g. density, viscosity) of liquid in the cargo compartment 60 and body of water 30 (e.g. fresh verses salt water) and the type, thickness, composition and depth of the debris 34 in the body of water 30, as well as the size or varying sizes of debris 34 at the debris field, all of which may be changing on an ongoing basis during operations.

Figure 26:
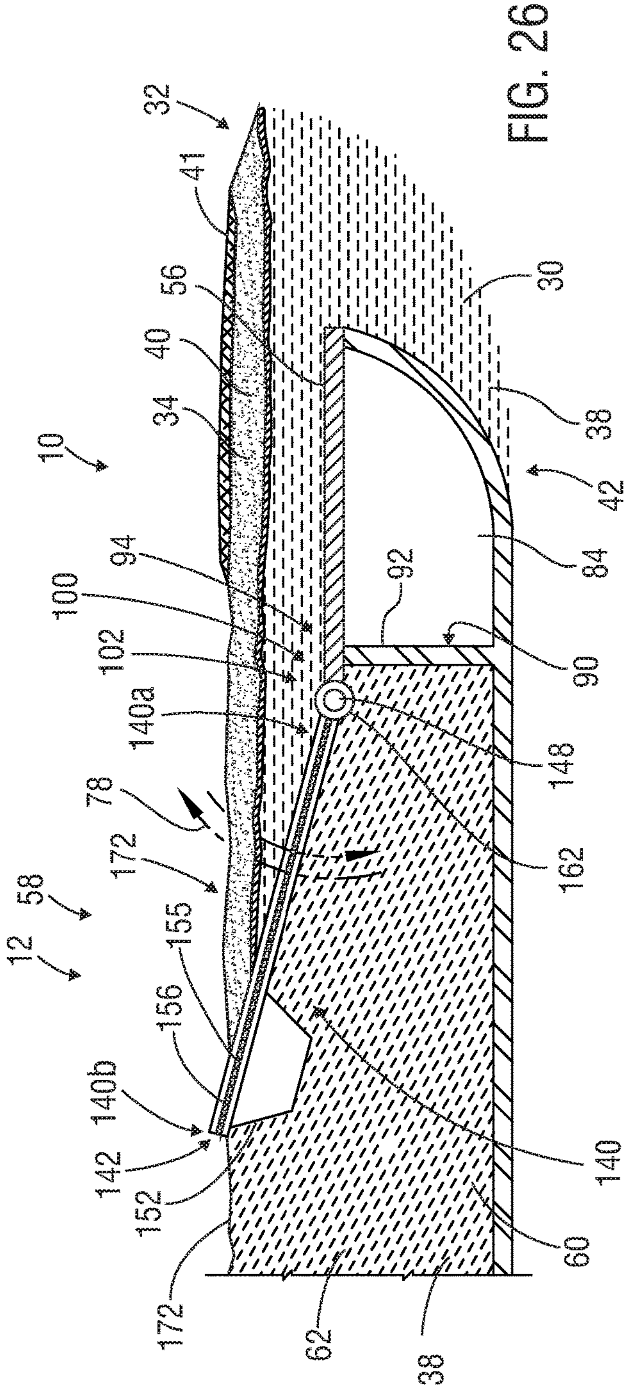
FIG. 26 is side, partial cross-sectional view of part of the exemplary vessel of FIG. 23 with the side shell removed and showing the exemplary inflow regulator in an exemplary rest position.
Figure 29:
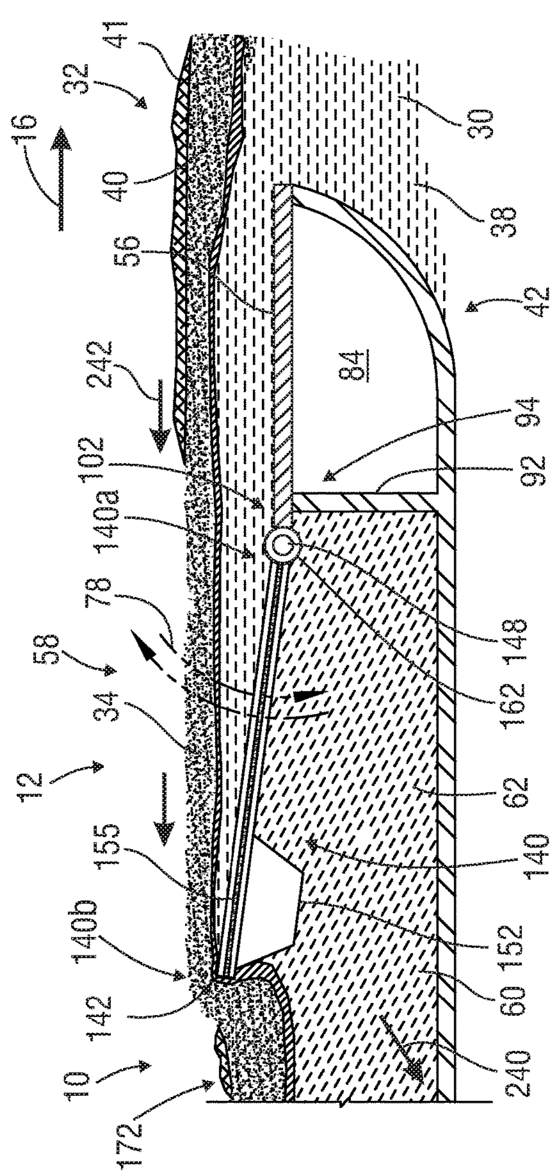
FIG. 29 is side, partial cross-sectional view of part of the exemplary vessel of FIG. 23 with the side shell removed and showing the exemplary inflow regulator in an exemplary operating position.

As mentioned above, the IFR 140 may have any suitable form, configuration, components and operation and some examples of IFRs 140 are a "pivoting"-type IFR (e.g. FIGS. 23-34, 40-46) and a "sliding"-type IFR (e.g. FIGS. 35-39). Still referring to FIGS. 23-25, in this embodiment (as well as other embodiments), the IFR 140 is an at least partially buoyant, pivoting-type IFR 140, extends into the cargo compartment 60 across the width of the cargo compartment 60 and is pivotable relative to the vessel 10. For example, the pivoting-type IFR 140 may be pivotably coupled to the vessel 10 proximate to the front end 42 thereof. Referring specifically to FIG. 26, the illustrated pivoting-type IFR 140, at or near its rear end 140*a*, is pivotably coupled to the bulkhead 92, front recessed deck 56 or other portion(s) or component(s) of the vessel 10. The exemplary pivoting-type IFR 140 is thus pivotable relative to the surface 172 of liquid in the cargo compartment 60 as indicated with arrows 78.

In this embodiment (as well as other embodiments (e.g. FIGS. 27-34, 40-46)), the debris recovery system 58 is designed so that the rear end 140*a* of the pivoting-type IFR 140 will be below the surface 32 of the body of water 30 and the surface of debris/water entering the cargo compartment 60 during debris recovery. It should be noted, however, that the pivoting-type IFR 140 may be positioned so that its rear end 140*a* is not below the surface 32 of the body of water 30 and/or the surface of debris/water entering the cargo compartment 60, and may be coupled to the vessel 10 in any other desired manner (e.g. not across the entire width of the cargo compartment 60 or other part of the vessel 10) and location.

Still referring to FIG. 26, the front end 140*b* of the illustrated pivoting-type IFR 140 is free-moving up and down (e.g. in the cargo compartment 60, arrows 78). (See also FIGS. 35-39). (In various figures (e.g. FIGS. 25, 30, 35, 38) the illustrated pivoting-type IFR 140 is shown in multiple potential positions.) Further, the exemplary pivoting-type IFR 140 is sufficiently buoyant so that its front end 140*b* will float at or near the surface 172 of water/debris contained in the cargo compartment 60 during use of the debris recovery system 58. (See also FIGS. 35-39, 41-46).

Figure 27:
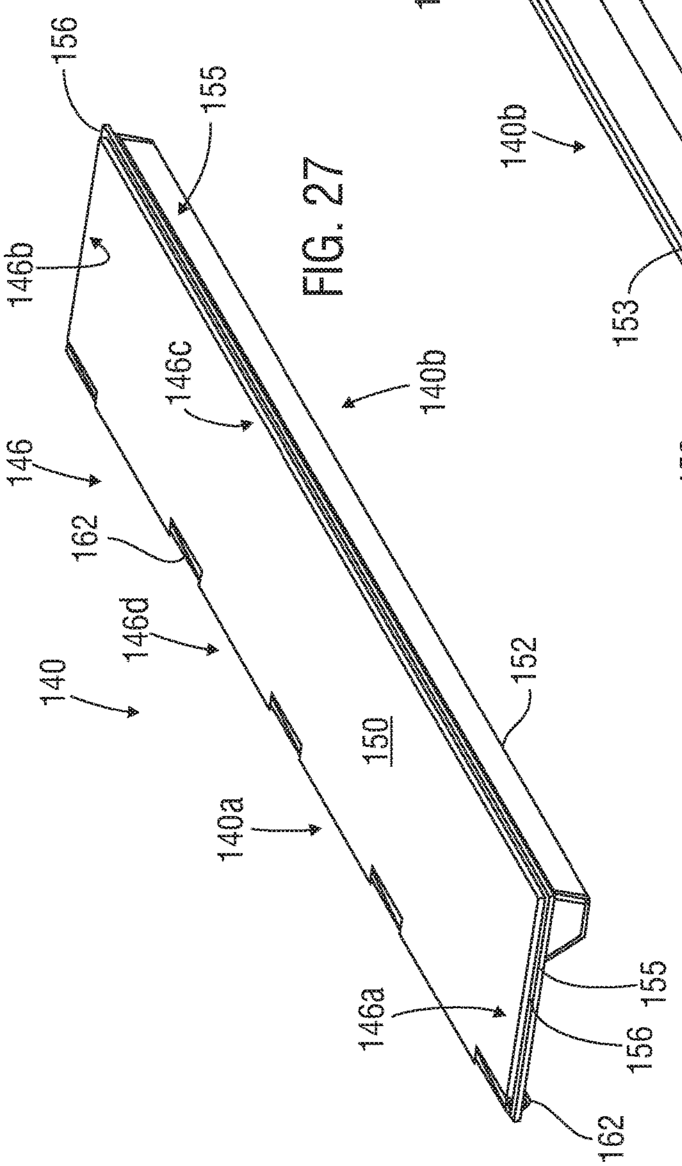
FIG. 27 is a perspective view of the exemplary inflow regulator of FIG. 26.
Figure 28:
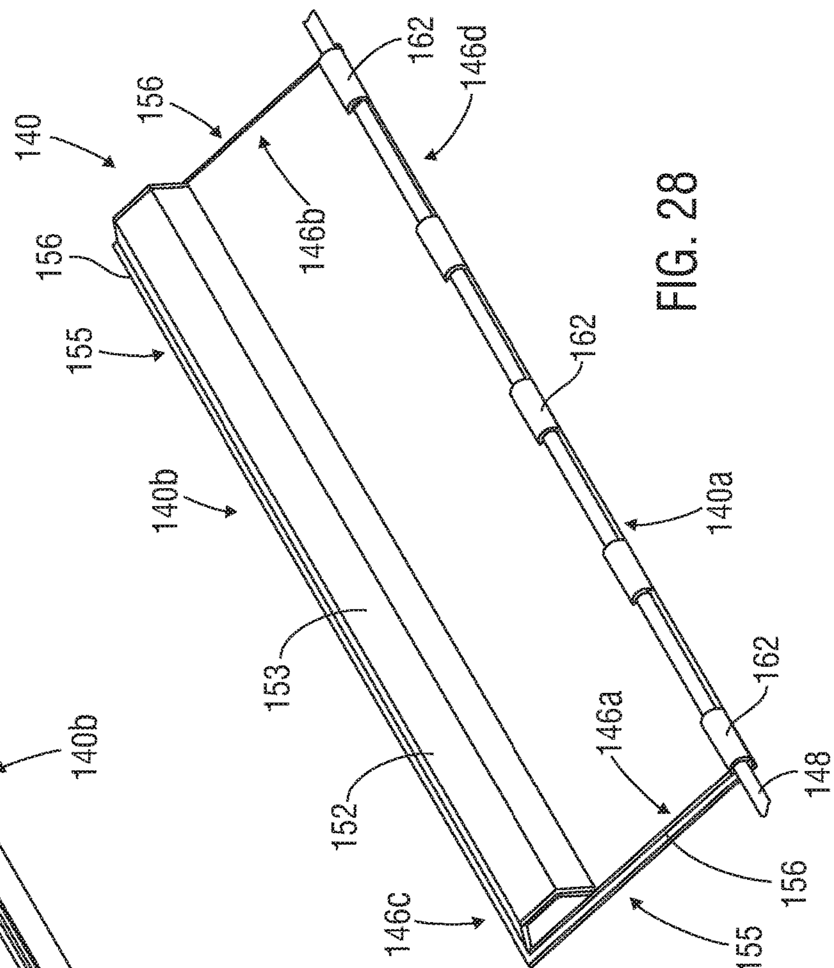
FIG. 28 is another perspective view of the exemplary inflow regulator of FIG. 26 showing its underside.

Referring now to FIGS. 27 & 28, the pivoting-type IFR 140 may have any suitable form, configuration, components, construction and operation. In this embodiment, the carrier 146 of the IFR 140 is a flat, rigid plate 150 and the float 144 is a buoyancy chamber 152 coupled to the plate 150, such as by welding, connectors (e.g. bolts), etc., proximate to the front end 140*b* of the IFR 140 to provide the desired buoyancy of the IFR 140. The plate 150 and buoyancy chamber 152 may be constructed of metal (e.g. aluminum, steel), wood, plastic, any other suitable material or combination thereof. If desired, the carrier 146 may include multiple plates 150, one or more support or frame members (e.g. to provide desired rigidity, sturdiness, durability, etc.), or may be semi-rigid, flexible or pliable, perforated, non-flat, convex or concave or have any other form, configuration and components. If desired, the IFR 140 may include multiple side-by-side adjacent sections (e.g. two or more sets of carriers 146 and corresponding floats 144), such as to accommodate or provide flexibility in response to side-by-side rocking or rolling of the vessel 10.

In some embodiments, the pivoting-type IFR 140 may not include any separate floats 144 or buoyancy chambers 152. Any other suitable component(s) may be included to provide the desired buoyancy of the IFR 140. For example, the carrier 146 may include one or more buoyancy sections, cavities or chambers, and may be at least partially inflatable. For another example, the IFR 140 (e.g. carrier 146) may include foam or other material with floatation properties to provide the desired buoyancy or uplift of the front end 140*b* or other portion thereof. For yet another example, the IFR 140 may be, or include, one or more bladder bags coupled to the vessel 10 proximate to the front end 42 thereof and configured to provide the desired intake resistance. If desired, the bladder bag(s) may be fixed buoyancy or variable buoyancy (e.g. similarly as described below).

Still referring to FIGS. 27 & 28, the exemplary carrier 146 includes one or more seal members 155 or other components to provide or encourage at least substantial sealing engagement of the pivoting-type IFR 140 with the cargo compartment 60 during use of the debris recovery system 58. The seal members 155 may have any suitable form, configuration, components and operation. For example, the seal members 155 may include one or more elongated gaskets 156 coupled to the carrier 146 (e.g. with connectors (e.g. bolts), epoxy or other glue, opposing mating portions, by friction fit, or a combination thereof) extending along the side edges 146*a*, 146*b* of the carrier 146 to sealingly engage the interior opposing side walls 82 (e.g. FIGS. 24, 31) of the cargo compartment 60 or one or more other components adjacent thereto during use of the debris recovery system 58.

Figure 31:
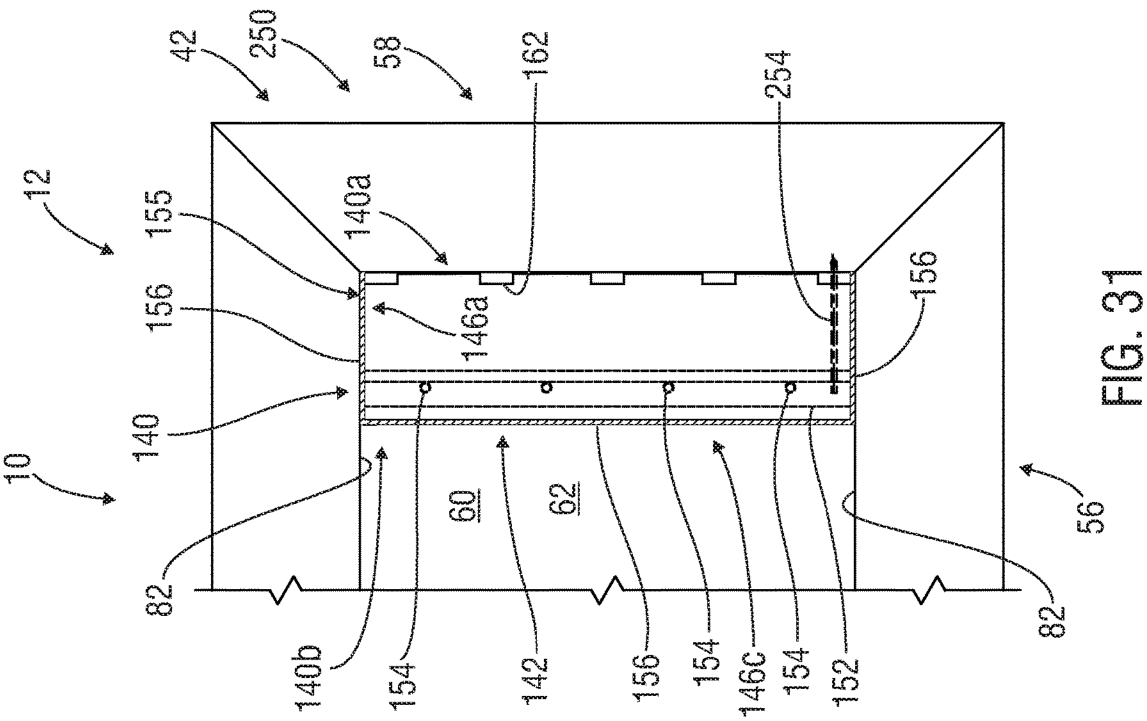
FIG. 31 is a plan view of part of the exemplary debris recovery system shown in FIG. 30.
Figure 38:
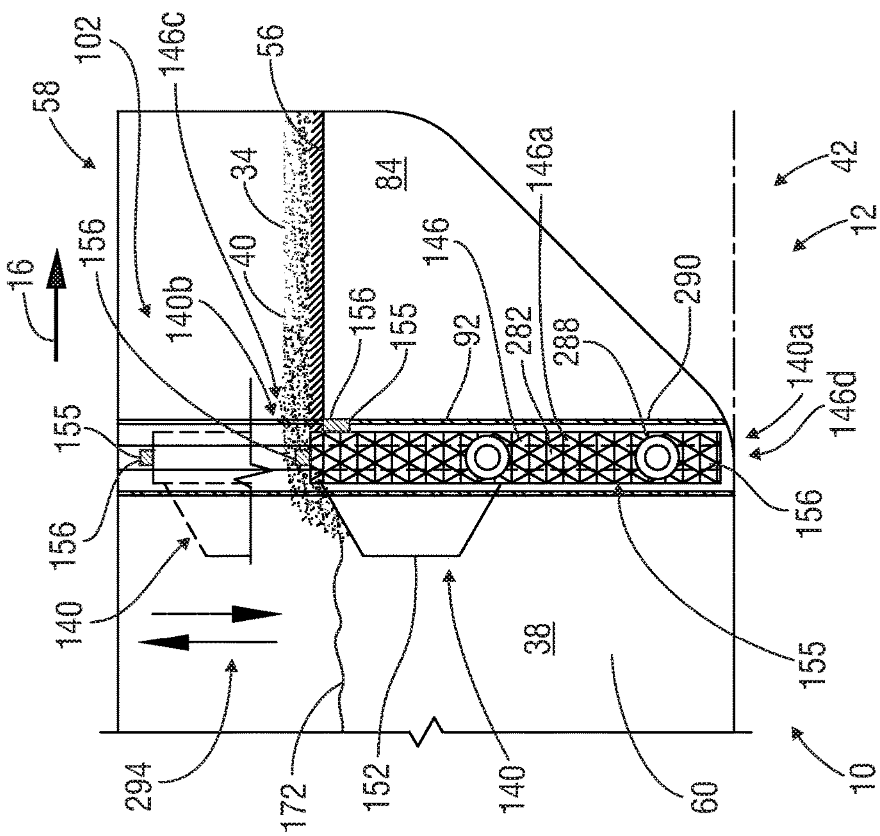
FIG. 38 is a side, cut-away view of part of the exemplary waterborne vessel of FIG. 35 with the side shell removed and including exemplary seal members in accordance with one or more embodiments of the present disclosure.

In this embodiment, one or more seal members 155 (e.g. elongated gaskets 156) are also shown extending along the front edge 146*c* of the carrier 146 (see also FIGS. 31, 38). This may be useful, for example, to at least substantially sealingly engage the IFR 140 with the underside of the top deck 54 or other component(s) on the vessel 10 to at least substantially prevent the loss of liquid/debris from the cargo compartment 60 through the opening(s) 100 before or after debris recovery operations, other purpose(s) or a combination thereof.

If desired, one or more seal members 155 (e.g. elongated gaskets 156) may be provided along the rear edge 146*d* of the exemplary carrier 146, such as to at least substantially seal any gap between the IFR 140 and the bulkhead 92 or other component, other purpose(s) or a combination thereof. One or more seal members 155 may instead or additionally be provided on the bulkhead 92, side wall(s) 82 of the cargo compartment 60 or other components of the vessel 10 to at least substantially sealing engage the IFR 140, any other purpose(s) or a combination thereof. However, other embodiments may include fewer or no seal members 155 or different variations of sealing components.

Referring again to FIGS. 27 & 28, the exemplary pivoting-type IFR 140 may be pivotably coupled to the vessel 10 in any suitable manner. In this example, the carrier 146 includes multiple receivers 162 (e.g. pipe sections) at or proximate to the rear end 140*a* of the IFR 140 that fit and freely rotate over one or more hinge pin 148 anchored to the vessel 10 (e.g. the front recessed deck 56 (e.g. FIG. 26) or adjacent component(s)). However, any other suitable components may be used to provide the desired pivotable movement of the pivoting-type IFR 140 relative to the vessel 10. For example, the pivoting-type IFR 140 may instead include one or more pivot pin that is pivotably engaged with the vessel 10, or a different variation of corresponding pivotably mating portions or structures may be provided on the IFR 140 and vessel 10.

Still referring to FIGS. 27 & 28, the buoyancy chamber 152, when included, may have any desired form, configuration, construction and operation. The exemplary buoyancy chamber 152 includes at least one cavity provided therein for containing air (and/or other gases) so that it floats on liquid. As used herein and in the appended claims, the terms "air" and variations thereof are is-meant to include any type and combination of gas(es) and air. The illustrated buoyancy chamber 152 is shown coupled to the plate 150 proximate to the front end 140*b* of the IFR 140 and extends across almost the entire width of the carrier 146 to provide the desired buoyancy of the IFR 140, intake resistance, other suitable purpose(s) or a combination thereof. For example, the location of the illustrated buoyancy chamber 152 proximate to the front end 140*b* of the IFR 140 may be farthest from the pivot mechanism(s) at the rear end 140*a*, such as to provide the greatest leverage advantage for the IFR 140 (see e.g. FIG. 26) other purpose(s) or a combination thereof. It should be noted that the buoyancy chamber 152 may be coupled to the carrier 146 or IFR 140 in any other suitable manner, at a different location on the carrier 146 and have any other desirable configuration, components and operation, or multiple buoyancy chambers 152 may be included, to provide the desired buoyancy, movement, positioning and/or intake resistance of the IFR 140, other purpose(s) or a combination thereof.

Referring again to FIGS. 23-29, the illustrated pivoting-type IFR 140 is an example of a "fixed-buoyancy" IFR 140 because does not possess any internal mechanisms for varying the buoyancy thereof. Thus, the internal cavity(ies) of the exemplary buoyancy chamber 152 is/are sized to hold sufficient air to provide the desired buoyancy of the exemplary pivoting-type IFR 140. For example, referring to FIG. 26, the illustrated buoyancy chamber 152 may be sized and situated to position the pivoting-type IFR 140 so that the front edge 142 thereof will be above the surface 172 of the water and/or debris within the cargo compartment 60 in a "rest" or "non-operating" position (e.g. when no suction is provided in the cargo compartment 60) after the cargo compartment 60 has been filled with water and before the start of debris recovery operations. FIG. 26 thus reflects an exemplary "rest" position (see also FIGS. 32, 35). For another example referring to FIG. 29, the exemplary buoyancy chamber 152 may be sized and situated to position the illustrated pivoting-type IFR 140 so that the front edge 142 thereof will be below the surface 172 of the water and/or debris in the cargo compartment 60 during debris recovery operations as the vessel 10 moves forward and/or suction (e.g. via discharge pump(s) 184) has commenced in the cargo compartment 60. The position of the exemplary pivoting-type IFR 140 in FIG. 29 reflects an exemplary "operating" position that provides the desired intake resistance (see also FIGS. 33-34). In this exemplary operating position of the illustrated IFR 140, the debris (e.g. oil 34) tends to cascade, or rush, over the front edge 142 of the illustrated IFR 140 and fill the cargo compartment 60 as water 38 is being removed therefrom. (See also FIGS. 33-34, 46). In various embodiments, the position of the IFR 140 often may tend to remain relatively static during debris recovery operations (e.g. in the position of FIGS. 29, 33) when the controllable and non-controllable variables remain constant. However, in various instances, the exemplary IFR 140 may reciprocate, flutter, float or constantly adjust position in real-time throughout or intermittingly during operations.

Figure 32:
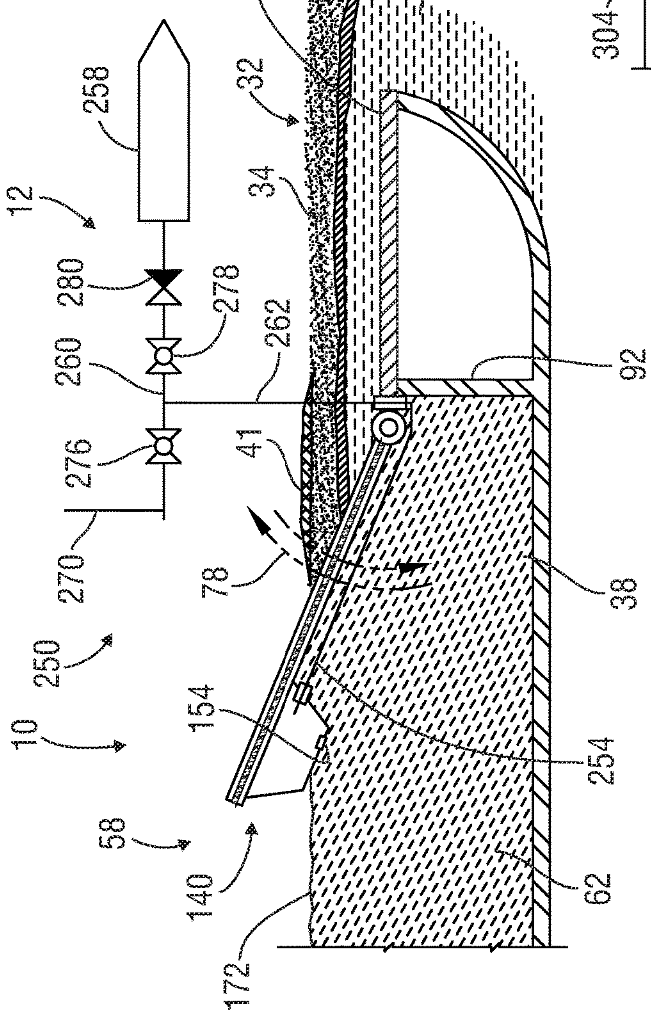
FIG. 32 is a side, partial cross-sectional view of the exemplary waterborne vessel of FIG. 23 with the side shell removed and the exemplary debris recovery system including the exemplary variable buoyancy system of FIG. 30 and showing the exemplary inflow regulator in an exemplary rest position in accordance with one or more embodiments of the present disclosure.

Referring to FIGS. 26 & 32, if desired, the IFR 140 may have an "extended" or "closed" position, such as to close off the front end of the cargo compartment 60 or the intake opening 102, situate the front end 142 thereof high enough to contact, engage to at least substantially sealingly engage the underside of the top deck 54 of the vessel 10 (or other component(s) on the vessel 10) to at least substantially prevent the loss of liquid/debris from the cargo compartment 60 through the intake opening(s) 102 before or after debris recovery operations, other purpose(s) or a combination thereof. For example, the "rest position" as described above with respect to FIGS. 26, 32 may also serve as the "extended" position. For another example, the IFR 140 may float or be movable (e.g. manually or with a positive movement device, such as one or more mechanical or pneumatic drivers (e.g. as described above with respect to the exemplary gates 110), etc.)) to a higher position (e.g. FIGS. 35 & 40).

Figure 40:
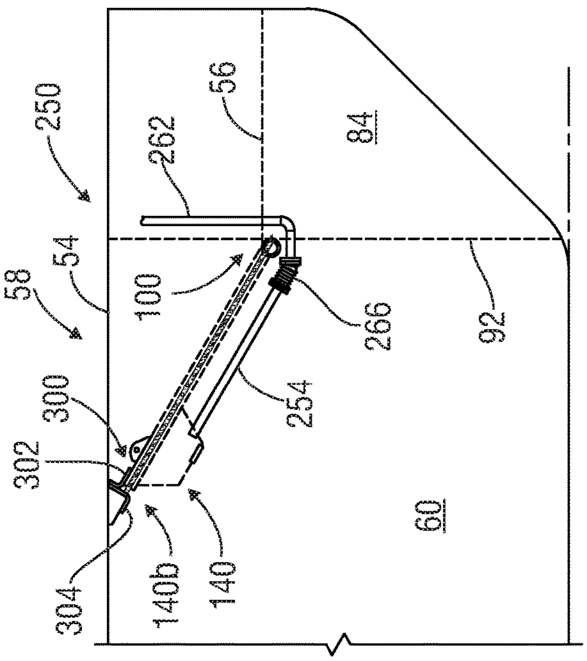
FIG. 40 is a side, cut-away view of part of the exemplary waterborne vessel of FIG. 30 with the side shell removed and including an exemplary IFR catcher in accordance with one or more embodiments of the present disclosure.

In FIG. 40, the illustrated IFR 140 biasingly engages an IFR catcher 300 provided on the vessel 10 to establish or secure it in a closed position. The IFR catcher 300 may have any suitable form, configuration and operation. In this example, the IFR catcher 300 includes a first stop 302 configured to at least substantially sealingly engage the front edge 142 of the IFR 140 and a second stop 304 configured to engage the upper front surface of the IFR 140. The illustrated first and second stops 302, 304 are elongated sections of angle iron coupled to the underside of the top deck 54 and/or the side walls 82 of the cargo compartment 60. However, the stops 302, 304 may have any other suitable form, configuration and operation. In other embodiments, the IFR 140 may be releasably securable to the IFR catcher 300 (e.g. with one or more hooks, latches, magnets, mechanical connectors) to secure the IFR 140 in the extended position (e.g. to prevent debris from sloshing out of the cargo compartment 60 during transport after debris recovery operations). For another example, the "closed" position of the IFR 140 and techniques for moving it into and out of a "closed" position may be similar to that described above for the gates 110 and shown in FIGS. 1-22.

Now referring to FIGS. 35-39, an exemplary sliding-type (fixed-buoyancy) IFR 140 is shown. The illustrated sliding-type IFR 140 (a.k.a. gate 110) is at least partially buoyant and situated in an upright position so that the entire IFR 140 is movable up and down (as indicated with arrows 294) relative to the cargo compartment 60, bulkhead 92 and intake opening 102 to provide the desired intake resistance. In this example, when installed, the sliding-type IFR 140 is perfectly vertical (e.g. relative to a centerline of the vessel 10) or nearly perfectly vertical. However, in other embodiments, the sliding-type IFR 140 may be angled or substantially vertical. Thus, the precise orientation of the sliding-type IFR 140 is not limiting upon the present disclosure and appended claims (unless explicitly noted otherwise), so long as the IFR 140 is movable up and down and has one or more of the capabilities provided herein or which is evident from this disclosure and the appended drawings and claims.

Figure 36:
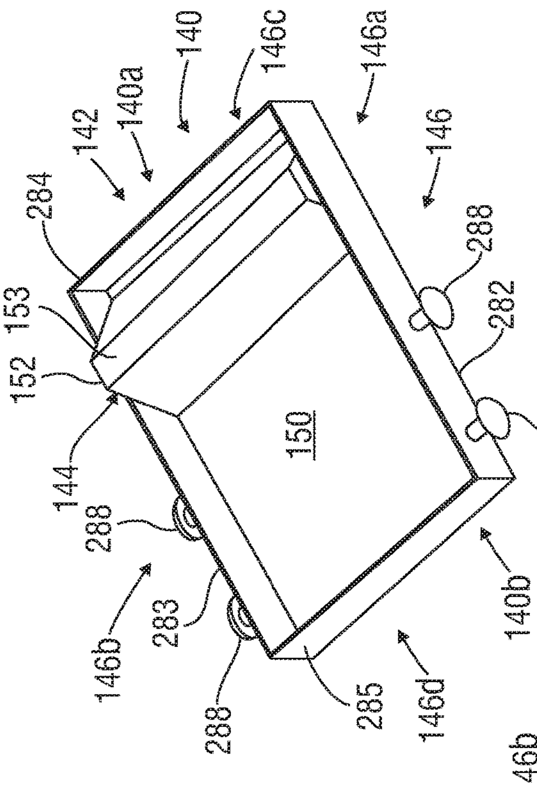
FIG. 36 is a perspective view of the exemplary sliding-type inflow regulator of FIG. 35.

The sliding-type IFR 140 may have any suitable form, configuration and operation. In this embodiment, as shown in FIG. 36, the IFR 140 includes a carrier 146 (e.g. plate 150) and a float 144 (e.g. buoyancy chamber 152) of the same type and having the same features as described above and shown in the appended drawings with respect to the exemplary pivoting-type IFR 140 (except those details relating to the pivotability thereof). Accordingly, all of the disclosure herein with respect to the carrier 146 and float 144 (e.g. the buoyancy chamber 152) of the exemplary pivoting-type IFR 140 (except that relating to the pivotability thereof) and otherwise provided herein with respect to the IFR 140 is incorporated herein by reference in its entirety. For example, the sliding-type IFR 140 may include multiple side-by-side adjacent sections (e.g. multiple sets of carriers 146 and corresponding floats 144) such as to accommodate or provide flexibility in response to side-by-side rocking or rolling of the vessel 10.

Similarly as described above, the sliding-type IFR 140 may not include any separate floats 144 or buoyancy chambers 152, but possess other suitable component(s) to provide the desired buoyancy. For example, the carrier 146 may include one or more buoyancy sections, cavities or chambers, and may be at least partially inflatable. For another example, the sliding-type IFR 140 (e.g. carrier 146) may include foam or other material with floatation properties to provide the desired buoyancy or uplift of the front end 140*b* or other portion thereof. For yet another example, the sliding-type IFR 140 may be, or include, one or more bladder bags coupled to the vessel 10 proximate to the front end 42 thereof and configured to provide the desired intake resistance. If desired, the bladder bag(s) may be fixed buoyancy or variable buoyancy.

Still referring to FIG. 36, if desired, the carrier 146 of the exemplary the sliding-type IFR 140 may include multiple plates 150, one or more support or frame members, such as to provide rigidity, sturdiness, durability, etc. to the plate(s) 150, or may be semi-rigid, flexible or pliable, perforated, non-flat, convex or concave or have any other form, configuration and components. In this embodiment, the IFR 140 includes left and right side frames 282, 283 and top and bottom edge frames 284, 285. The illustrated frame members 282-285 extend inwardly from the plate 150 around the perimeter thereof, such as to provide stiffness to the IFR 140, assist in guiding the movement of the IFR 140, other suitable purpose(s) or a combination thereof.

Figure 35:
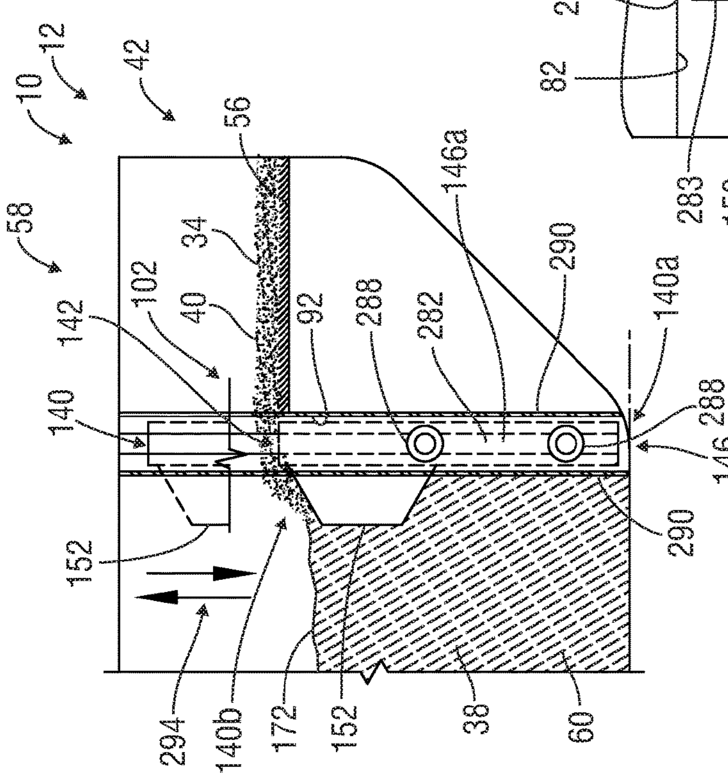
FIG. 35 is a side, cut-away view of part of an exemplary waterborne vessel with the side shell removed and including a debris recovery system having an exemplary sliding-type inflow regulator in accordance with one or more embodiments of the present disclosure.
Figure 37:
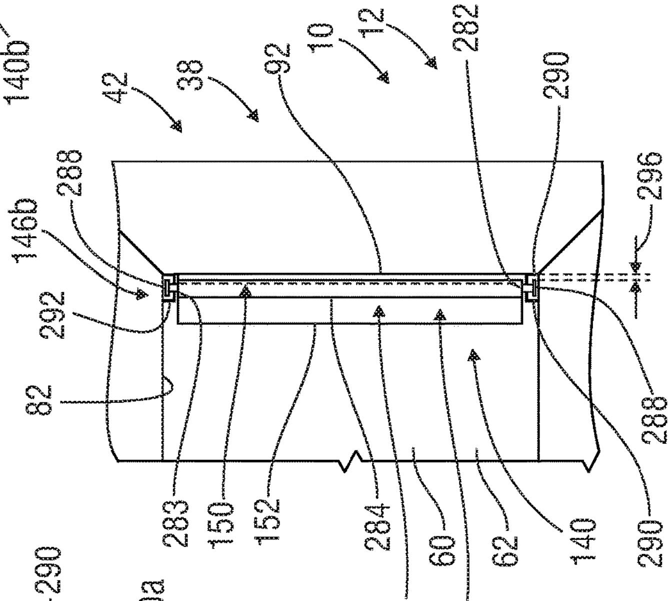
FIG. 37 is a top view of part of the exemplary waterborne vessel and debris recovery system shown in FIG. 35.

Referring to FIGS. 35-37, in this embodiment, one or more guide pins 288 are shown protruding outwardly from each of the side frames 282, 283 and configured to move freely up and down (arrows 294) within respective left and right guide rails 290, 292. The guide pins 288 and guide rails 282, 292 may have any suitable form, configuration and operation. In this example, as shown in FIG. 36, two guide pins 288 are provided on each side of the sliding-type IFR 140, but only one or more than two (e.g. 3, 4, 5, etc.) may be included. The illustrated guide pins 288 include a circular plate rigidly coupled (e.g. by weld and/or mechanical connectors) to a pipe section, which is rigidly coupled (e.g. by weld and/or mechanical connectors) to the side frames 282, 283 of the IFR 140. In other embodiments, the guide pins 288 may include a rotatable or non-rotatable wheel or other guide mechanism(s). As shown in FIG. 37, the exemplary guide rails 290, 292 each include a pair of elongated sections of angle-iron rigidly coupled (e.g. by weld and/or mechanical connectors) to the side walls 82 of the cargo compartment 60 or other part(s) or component(s) of the vessel 10. The exemplary sliding-type IFR 140 slides freely up and down within the guide rails 290, 292, which define and limit the path of the IFR 140 (e.g. FIG. 35). The guide rails 290, 292 may be oriented perfectly or near-perfectly vertically, substantially vertically or have another desired orientation. Thus, the precise orientation of the guide rails 290, 292 is not limiting upon the present disclosure and appended claims (unless explicitly noted otherwise).

Referring specifically to FIG. 35, in this embodiment, the debris recovery system 58 is designed so that the sliding-type IFR 140 is free-moving up and down (e.g. in the cargo compartment 60, e.g. arrows 294). The front end 140*b* thereof will float at or near the surface 172 of liquid contained in the first cargo compartment 60 (or moving into it) during use of the debris recovery system 58 to provide the desired intake resistance. Specifically, the front end 140*b* of the exemplary sliding-type IFR 140 is shown extending across the intake opening 102 so the debris will flow, or cascade, over the front edge 142 of the IFR 140 as desired and similarly as described and shown herein with respect to the pivoting-type IFR 140. FIG. 35 thus shows an exemplary optimal operating position of the IFR 140 during debris recovery operations. The IFR 140 shown in shadow in FIG. 35 illustrates an exemplary extended, or closed, position of the IFR 140, similarly as described above.

Figure 39:
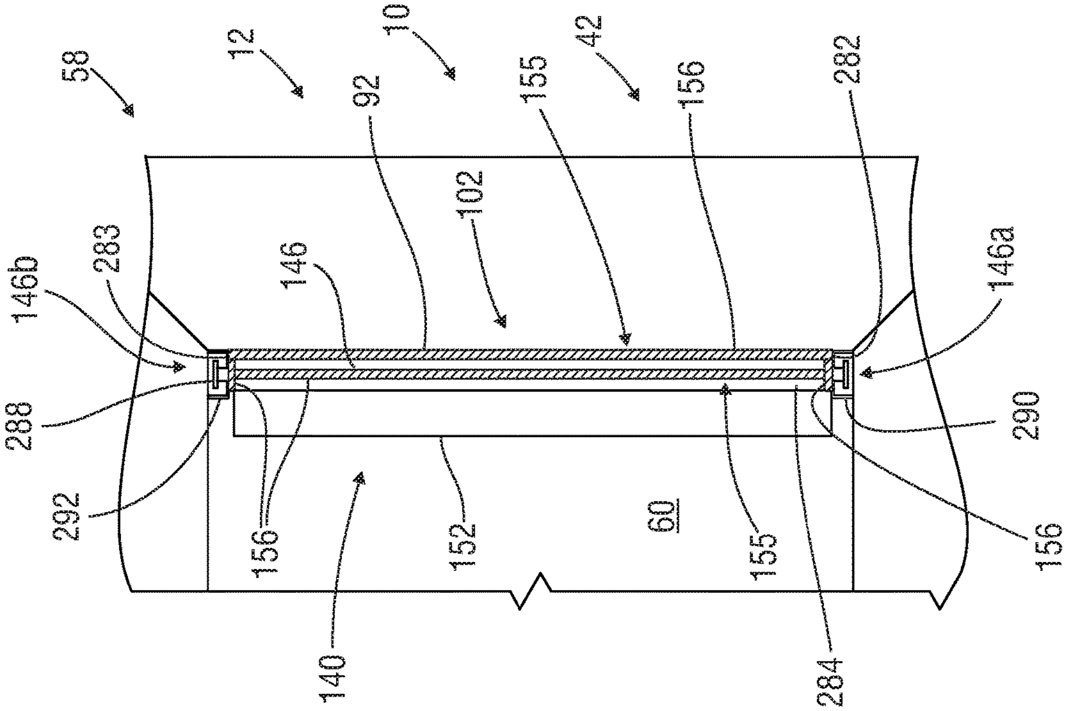
FIG. 39 is a top view of part of the waterborne vessel and exemplary debris recovery system shown in FIG. 38.

Referring now to FIGS. 38 & 39, if desired, the exemplary sliding-type IFR 140 may include one or more seal members 155 or other components to provide or encourage at least substantial sealing engagement of the IFR 140 with the cargo compartment 60, bulkhead 92 and/or other components. The seal members 155 may have any suitable form, configuration, components and operation. For example, the seal members 155 may include one or more elongated gaskets 156 are shown coupled to the carrier 146 (e.g. with connectors (e.g. bolts), epoxy or other glue, opposing mating portions, by friction fit, or a combination thereof) and extending along the side edges 146*a*, 146*b* of the carrier 146 (e.g. along the outside surfaces of the left and right frames 282, 283) to at least substantially sealingly engage the left and right guide rails 290, 202, respectively, or one or more other components adjacent thereto. In this embodiment, one or more elongated gaskets 156 are also shown extending along the front edge 146*c* of the carrier 146. If desired, one or more seal members 155 (e.g. elongated gaskets 156) may also be provided along the rear edge 146*d* of the carrier 146. One or more seal members 155 may instead or additionally be provided on the bulkhead 92, side wall(s) 82 of the cargo compartment 60 or other components of the vessel 10 for the same purpose. For example, one or more elongated gaskets 156 are shown coupled to the inner wall of the bulkhead 92 across substantially the entire width of the intake opening 102 and/or cargo compartment 60, such as to at least substantially seal the gap 296 (e.g. FIG. 37) between the bulkhead 92 and the sliding-type IFR 140, other purpose(s) or a combination thereof.

If desired, the illustrated sliding-type IFR 140 may be positioned within the cargo compartment 60 with the guide pins 288 inserted into the respective rails 290, 292 before the top deck 54 (or at least the foremost section of the top deck 54) is secured to the vessel 10. If the exemplary debris recovery system 58 includes a variable buoyancy system 250 (such as described below), the system 250 may be used to selectively position the front end 140*b* of the sliding-type IFR 140 as desired. Otherwise, the debris recovery system 58 can be used to provide the desired intake resistance, similarly as described above with respect to the pivoting-type IFR 140.

Referring now to FIGS. 30-34 & 40, the debris recovery system 58 may include one or more internal mechanisms for varying the buoyancy of the exemplary IFR 140. An IFR 140 used in a variable buoyancy arrangement is sometimes referred to herein as a "variable-buoyancy" IFR 140. Thus, the IFR 140 may be a variable-buoyancy, pivoting-type IFR (e.g. FIGS. 30-34, 40-46), fixed-buoyancy, pivoting-type IFR (e.g. FIGS. 9-11, 13, 26-29), variable-buoyancy, sliding-type IFR, fixed-buoyancy, sliding-type IFR (e.g. gate 110, FIGS. 4-8; FIGS. 35-39) or have any other configuration. The illustrated debris recovery system 58 includes a variable buoyancy system 250 associated with the IFR 140 and configured to allow the selective insertion and removal of air, gas or a combination thereof into/from the IFR 140 to influence its buoyancy. For example, when it is desirable to decrease the buoyancy of the exemplary IFR 140, air may be allowed to escape from the exemplary buoyancy chamber 152 and be replaced by liquid in the cargo compartment 60 (e.g. FIG. 33). Conversely, when it is desirable to increase the buoyancy of the illustrated IFR 140, additional air may be injected into the buoyancy chamber 152 to displace liquid out of the buoyancy chamber 152 (e.g. FIG. 34). In embodiments of the debris recovery system 58 not including any buoyancy chambers 152 (e.g. an IFR 140 with one or more bladder bags), the variable buoyancy system 250 could similarly be used with other components (e.g. inflatable) of the IFR 140.

The variable buoyancy system 250 may have any suitable form, configuration, components and operation. In this embodiment, referring to FIGS. 30 & 31, the buoyancy chamber 152 includes four water exchange openings 154 (e.g. formed in the bottom 153 of the buoyancy chamber 152 and always open) to allow liquid from the cargo compartment 60 to be able to enter the buoyancy chamber 152. However, any other suitable form, configuration, quantity (e.g. 1-3, 5 or more) and location of the water exchange openings 154 may be used.

The exemplary variable buoyancy system 250 includes at least one air exchange conduit 254 (e.g. flexible hose, steel pipe, etc.) fluidly coupled to the buoyancy chamber 152 and configured to allow the selective insertion and removal of air (and/or gas(es)) into the chamber 152. For example, one or more air compressors 258 may be provided on the vessel 10 for selectively suppling compressed air into the buoyancy chamber 152 via the air exchange conduit 254, such as through one or more risers 262 (e.g. steel pipe, flexible tubing, etc.). However, any other arrangement of components may be used to selectively provide air in the buoyancy chamber 152.

Figure 30:
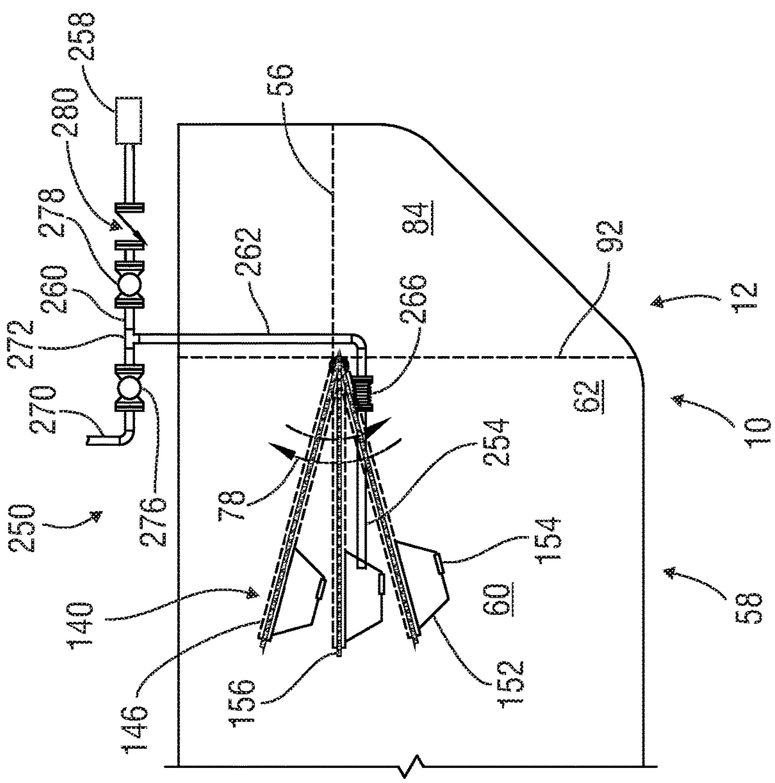
FIG. 30 is a side, cut-away view of part of the exemplary waterborne vessel of FIG. 23 with the side shell removed and the exemplary debris recovery system including an exemplary variable buoyancy system in accordance with one or more embodiments of the present disclosure.

Still referring to FIGS. 30-31, if desired, since the illustrated IFR 140 will move relative the vessel 10 (e.g. arrows 78), one or more flex connector 266 may be strategically placed between the air exchange conduit 254 and riser 262 to allow movement of the air exchange conduit 254 (with the IFR 140) relative to the riser 262 (and/or other components) without disconnecting or damaging the air exchange conduit 254, buoyancy chamber 152 and/or other components. The flex connector 266 may have any suitable form, configuration and operation. For example, the flex connector 266 may be a flexible hose or expansion joint.

In this embodiment, the variable buoyancy system 250 also includes one or more discharge conduits 270 (e.g. to the atmosphere) fluidly coupled to the buoyancy chamber 152 to allow air to be selectively discharged therefrom. For example, the illustrated riser 262 is shown fluidly coupled to both the air compressor 258 (e.g. via air supply branch 260) and at least one air discharge conduit 270, such as at a T-connector 272. The illustrated variable buoyancy system 250 also includes at least one relief valve 276 and at least one fill valve 278 that may be actuated to allow/disallow air to be selectively supplied into the buoyancy chamber 152 from the air compressor 258 (or other source) and discharged out of the buoyancy chamber 152 via the discharge conduit 270. One or more check valves 280 may be included in the variable buoyancy system 250 (e.g. in the supply branch 260 and/or one or more discharge conduit 270), such as to allow only one-way air flow in desired sections of the variable buoyancy system 250.

Figure 33:
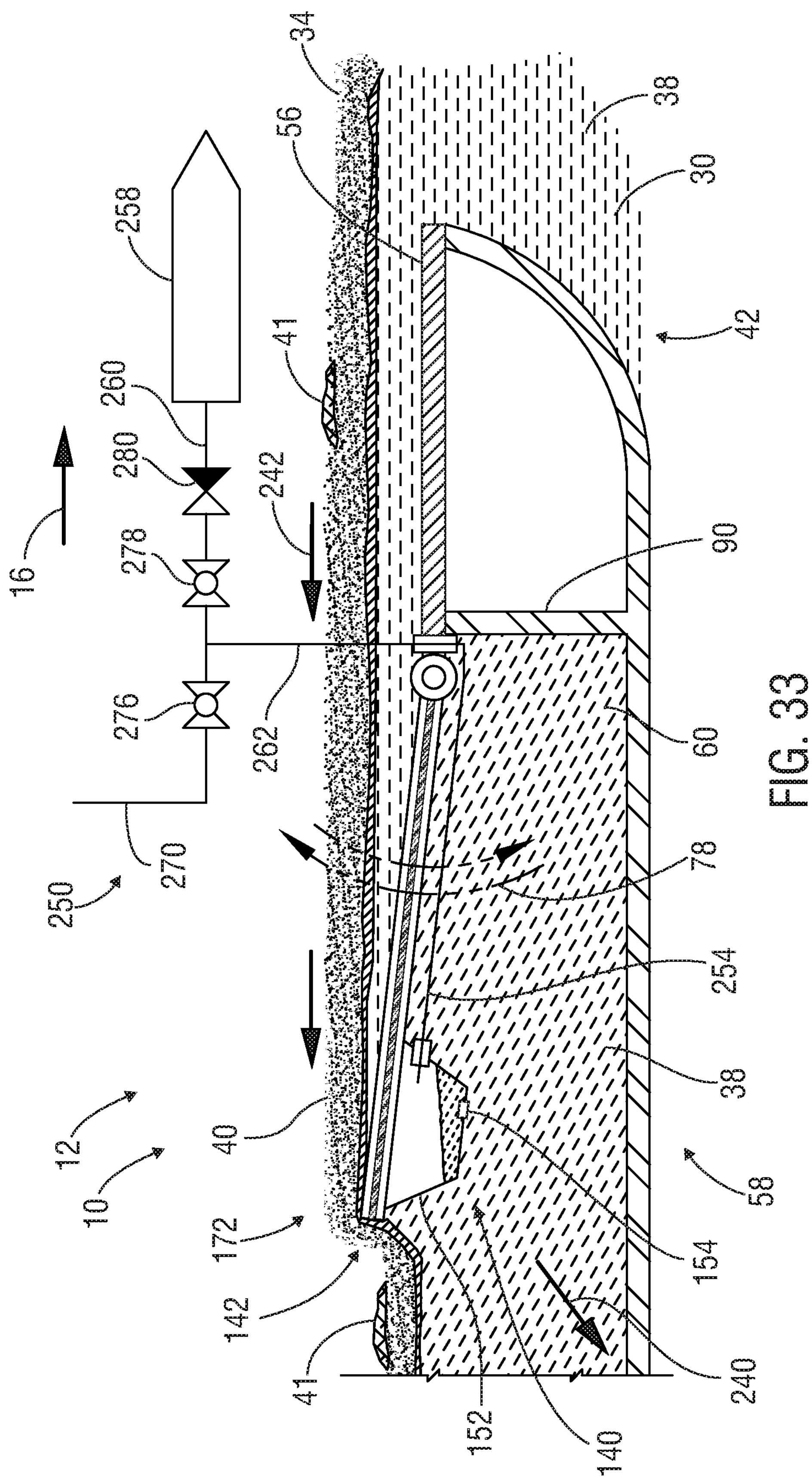
FIG. 33 is a side, partial cross-sectional view of the exemplary waterborne vessel of FIG. 32 with the side shell removed and showing the exemplary inflow regulator in a first exemplary operating position in accordance with one or more embodiments of the present disclosure.
Figure 34:
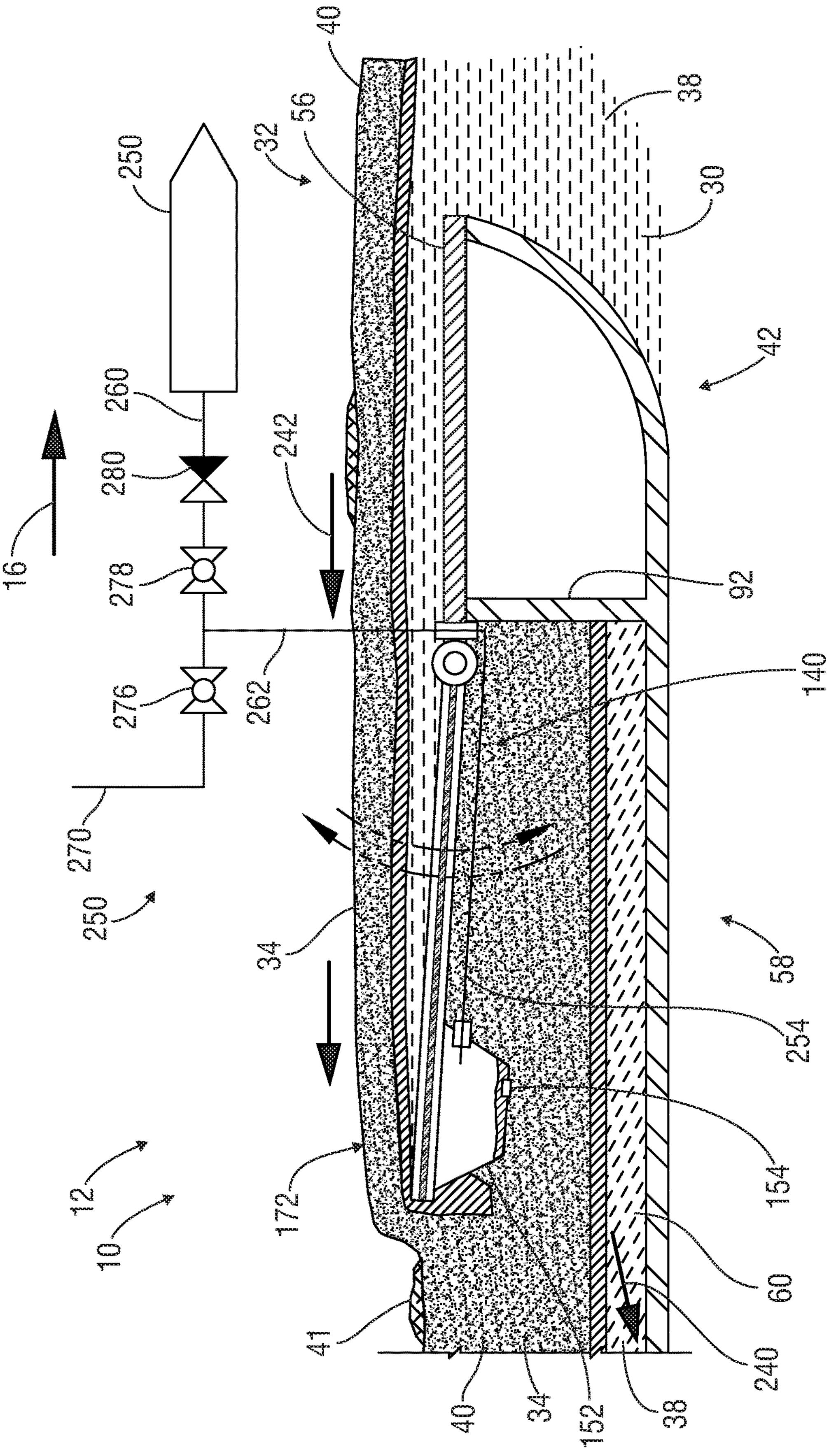
FIG. 34 is a side, partial cross-sectional view of the exemplary waterborne vessel of FIG. 32 with the side shell removed and showing the exemplary inflow regulator in a second exemplary operating position in accordance with one or more embodiments of the present disclosure.

Referring now to FIGS. 32-34, an example use of the illustrated variable buoyancy IFR 140 will now be described. FIG. 32 represents a potential start, or rest, position of the exemplary variable buoyancy IFR 140 after the cargo compartment 60 has been filled with water and before the start of debris recovery operations. In this example, the buoyancy chamber 152 is filled with air (e.g. naturally, by injecting air therein such as described above or otherwise) so that the front edge 142 of the IFR 140 is positioned above the surface 172 of the water within the cargo compartment 60, representing an exemplary rest or non-operating position of the IFR 140.

Referring to FIG. 33, if it is desired to decrease the buoyancy of the IFR 140 (e.g. move the exemplary IFR 140 down into a lower position relative to the surface 172 of the water/debris in the cargo compartment 60) with the use of the variable buoyancy system 250, the exemplary fill valve 278 is closed and the relief valve 276 opened, allowing a desired volume of air to escape from buoyancy chamber 152 and be replaced by liquid flowing up into the buoyancy chamber 152 through the water exchange opening(s) 154. When the desired position of the exemplary IFR 140 is achieved, the illustrated valve 276 is closed. This may be desirable in various scenarios, such as to establish or maintain the optimal operating position of the IFR 140 and/or optimal intake resistance when the forward movement of the vessel 10 and/or suction pressure (e.g. via the discharge pumps 184 and/or in the relevant suction conduit(s) 160) in the cargo compartment(s) 60 is reduced or stopped, when the thickness of the debris (e.g. oil) in the body of water 30 increases and it is desired to allow more debris to enter the cargo compartment 60, upon the occurrence of one or more other events, variables or situations or a combination thereof. In FIG. 33, some liquid has thus entered the illustrated buoyancy chamber 152, positioning the IFR 140 lower in the cargo compartment 60 as comparted to its rest position in FIG. 32. FIG. 33 thus illustrates the exemplary buoyancy chamber 152 partially flooded and the IFR 140 in an exemplary operating position. In this illustration, suction in the cargo compartment 60 has also commenced and/or the vessel 10 is moving in the forward direction, and debris (e.g. small-sized debris 40, large-sized debris 41, some mixed debris/water) is shown flowing or cascading over the front edge 142 of the IFR 140 into the cargo compartment 60 as water 38 is being removed therefrom.

There may be various situations in which it is desirable to increase the buoyancy of the IFR 140 with the use of the exemplary variable buoyancy system 250. For example, as the cargo compartment 60 becomes more filled with oil (and/or other low density debris), the IFR 140 will tend to float lower in the cargo compartment 60 and it may be desirable to raise up the IFR 140 (e.g. to establish or maintain the optimal operating position of the IFR 140 and/or optimal intake resistance). For other examples, it may be desirable to increase the buoyancy of the IFR 140 (e.g. to establish or maintain the optimal operating position of the IFR 140 and/or optimal intake resistance) upon moving the vessel 10 forward from a stationary position, increasing the forward speed of the vessel 10, initiating or increasing suction pressure (e.g. via the discharge pumps 184 and/or in the relevant suction conduit(s) 160) in the cargo compartment(s) 60, increased wind or wave action (e.g. where fluid pressure provides increased push on the IFR 140), the occurrence of one or more other events, or a combination thereof.

To increase buoyancy of the exemplary IFR 140 using the illustrated variable buoyancy system 250, the relief valve

276 is closed, the fill valve 278 is opened and the desired volume of air is injected into the buoyancy chamber 152 from the air compressor 258 (or other source) to push out the desired volume of liquid from inside the buoyancy chamber 152 through the water exchange opening(s) 154. When the desired position of the IFR 140 is achieved, the exemplary valve 274 is closed. FIG. 34 thus shows a less partially flooded buoyancy chamber 152 than in FIG. 33. However, any other technique and components may be used to vary the buoyancy of the IFR 140.

In some embodiments, the variable buoyancy system 250 may be useful on an ongoing basis to continually, or as necessary, selectively adjust the position of the IFR(s) 140 in the cargo compartment(s) 60 to influence (e.g. improve) the efficiency and effectiveness of debris collection operations (e.g. collect as much debris as quickly as possible), establish or maintain the optimal operating position of the IFR 140 and/or optimal intake resistance, other purpose(s) or a combination thereof. Further, the variable buoyancy system 250 may be used in conjunction with one or more other controllable or uncontrollable variables, as mentioned above. Any of the embodiments of the IFR 140 described or shown herein (or of any other embodiments of the debris recovery system 58) may be equipped to function as a variable-buoyancy IFR 140 in the manner described/shown herein or otherwise. Thus, the description herein of the variable-buoyancy IFR 140 and corresponding figures, for example, may be applied to the embodiments of FIGS. 26-29 and 35-39.

It should be noted that variations of the embodiments of FIGS. 23-40 may include more, fewer or different components, features and capabilities as those described or shown herein. Further, any of the details, features, components, variations and capabilities of other embodiments discussed or shown in this patent or as may be apparent from the description and drawings thereof, are applicable to the embodiments of FIGS. 23-40, except and only to the extent they may be incompatible with any features, details, components, variations or capabilities of the embodiments of FIGS. 23-40. Accordingly, other than with respect to any such exceptions, all of the details and description provided in this patent with respect to the other embodiments or as may be shown in the appended drawings relating thereto or which may be apparent therefrom, are hereby incorporated by reference herein in their entireties with respect to the embodiments of FIGS. 23-40.

Figure 41:
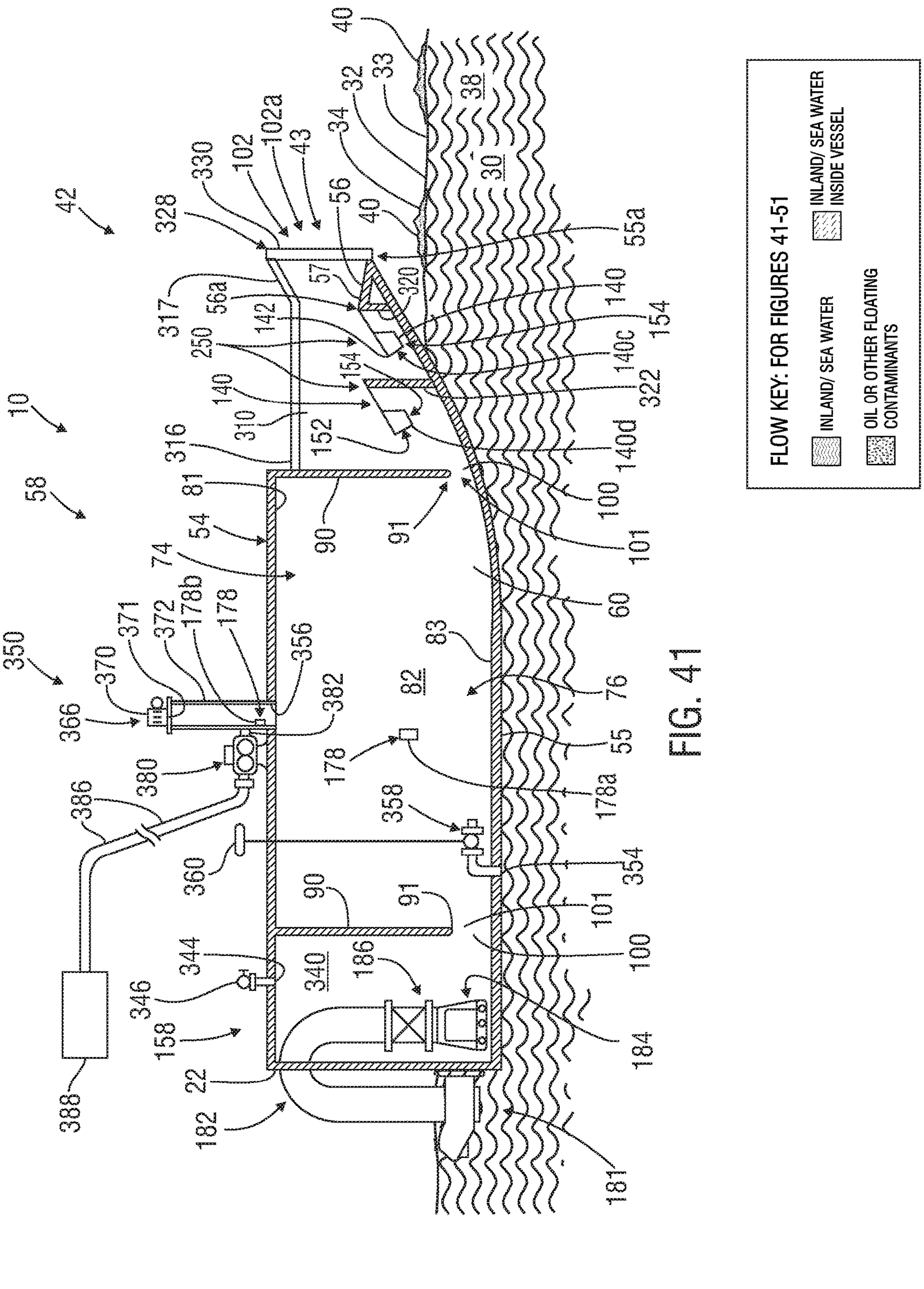
FIG. 41 is partial cross-sectional side view of a waterborne vessel and at least part of another embodiment of a debris recovery system provided thereon in an exemplary transit mode in accordance with the present disclosure.
Figure 42:
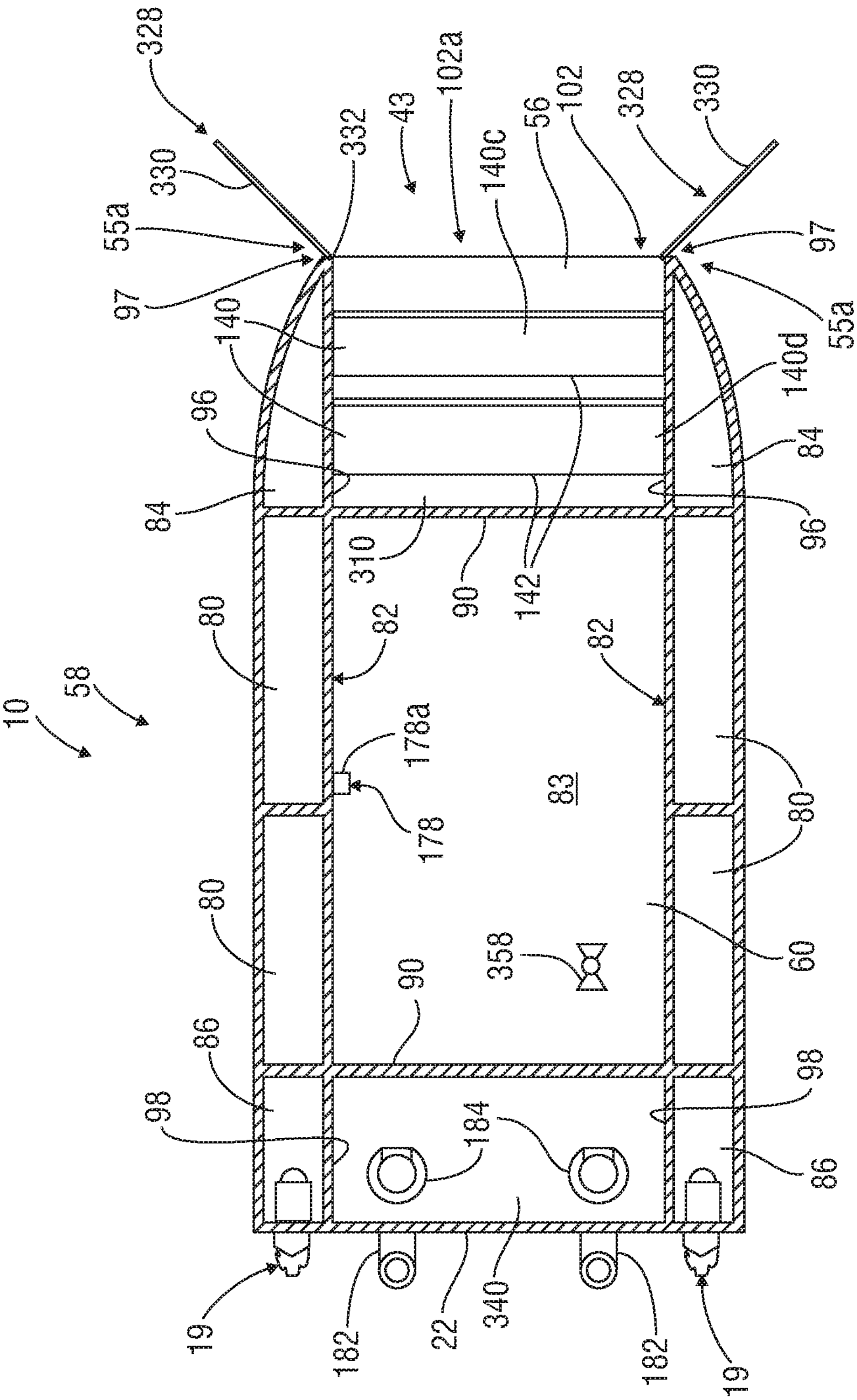
FIG. 42 is a top view of the exemplary vessel of FIG. 41 with the top deck removed and exemplary front doors open to show exemplary interior areas and components.

Now referring to FIGS. 41-51, an embodiment of a debris recovery system 58 is shown having at least one IFR 140 situated within at least one inflow chamber 310 forward of and fluidly coupled to at least one cargo compartment 60 on the debris recovery vessel 10. Referring specifically to FIGS. 41 & 42, in this example, the debris recovery system 58 includes a single cargo compartment 60 and a single inflow chamber 310 containing a front IFR 140*c* and a rear IFR 140*d*. Other embodiments may include more or fewer IFRs 140 in any configuration (e.g. front-to-rear and/or side-by-side), more than one inflow chambers 310 and/or cargo compartments 60 or a combination thereof.

An example (small-sized) vessel 10 of various embodiments may have an approximate length of 32', an approximate width of 10' and an approximate depth of 4.75' and be configured to effectively recover debris in waterways that may have up to approximately 12" waves (e.g. inland waterways and shallow off-shore locations). As discussed above, the vessel 10 may be self-propelled or propelled by one or more other vessel or in any other manner. In some embodiments, the vessel 10 may be self-propelled with two propel units 19 powered by one or more power units. In some embodiments, two MJP Ultrajet 251 units sold by Marine Jet Power, Inc., each having a 250 mm diameter impeller and joy stick control may be used as the propel units 19 and be powered, for example, by a General Motors Marine Diesel VGT500 as the power unit.

In an independent aspect of the present disclosure, in various embodiments, a substantially, or completely, submerged flow path (e.g. liquid-only, entirely or substantially void of gas) can be provided at least from the intake opening(s) 102, one or more IFRs 140, and/or inflow chamber(s) 310, through the passageway(s) 100 and to the suction pumps 184 during debris collection operations, which is sometimes referred to herein as a "sealed liquid system". In various embodiment, a substantially, or completely, submerged (liquid-only) flow path may also extend to the discharge port(s) 356 and/or debris pump(s) 380, when included. A sealed liquid system may be desirable, for example, to optimize the effort of the suction pumps 184, provide optimal or maximum suction at the intake openings 102 and/or IFRs 140 (when included), help provide and/or control a desired rate and velocity of incoming debris, optimize system performance and efficiency, for any other purposes or a combination thereof. In some embodiments, with an exemplary sealed liquid system, the ratio of suction pressure (or liquid velocity) at the suction pumps 184 to suction pressure (or liquid velocity) at the intake openings 102 or IFRs 140 can be optimized, such as 1:1 minus the friction loss of fluid/debris travelling therebetween. This may be achievable, for example, by creating and maintaining a vacuum and/or one or more vacuum, or fluid, sealed spaces at, around or between the suction pumps 184 and passageways 100 (and possibly other components), so debris 34 flows substantially entirely through liquid and/or any gas entering the flow path during operations can be removed.

Referring still FIGS. 41 & 42, the exemplary inflow chamber 310 is shown separated from the cargo compartment 60 by at least one vertical wall 90 and fluidly coupled to the cargo compartment 60 by at least one fluid passageway, or opening, 100 that allows fluid (and debris) flow past the vertical wall 90. In this embodiment, the fluid passageway(s) 100 between the inflow chamber(s) 310 and cargo compartment(s) 60 is typically fully submersed in liquid (e.g. FIG. 46) during operations (e.g. to allow a vacuum to be created/maintained in the cargo compartment 60 and/or help provide a sealed liquid system, for one or more other purposes or a combination thereof). For example, the lower end 91 of the vertical wall 90 may not extend down to the hull, or lower plate, 55 of the vessel 10 or other part(s) of the vessel 10 that forms or serves as the bottom 83 of the cargo compartment 60 and/or inflow chamber 310. In such instance, the exemplary fluid passageway 100 may be the entire space 101 extending below the lower end 91 of the vertical wall 90.

In other examples, one or more fluid passageways 100 may comprise only a part of the space 101 formed or provided in or proximate to the lower end 91 of the exemplary vertical wall 90 (which may extend to the bottom 83 of the compartment 60, hull 55 or other component) or provided elsewhere. In yet other embodiments, the exemplary passageway(s) 100 between the cargo compartment 60 and inflow chamber 310 may be in one or more suction conduit(s) 160 (e.g. similarly as described above and shown in various appended figures (e.g. FIGS. 1-2, 13-20)) extending therebetween or therethrough. Accordingly, the compatible features of the suction conduit 160 as described and shown elsewhere in this patent are hereby incorporated herein by reference for these embodiments. Thus, the form, quantity, size, configuration, construction, precise location, orientation and operation of the passageway(s) 100 fluidly coupling the inflow chamber(s) 310 and cargo compartment(s) 60 is not limited or limiting upon the present disclosure, unless and only to the extent as may be expressly provided in a particular claim and only for that claim and claims depending therefrom. If desired, a selectively moveable gate (e.g. gate 110, FIG. 47; see also FIGS. 3-18) may be associated with the passageway(s) 100 to selectively seal off or fluidly isolate the inflow chamber(s) 310 from the cargo compartment(s) 60 as desired, serve as a "sliding"-type IFR 140 (e.g. FIGS. 35-39), for any other purposes or a combination thereof.

Still referring to FIGS. 41 & 42, in this embodiment, for debris recovery operations, the debris recovery system 58 is designed so that liquid and debris enters the vessel 10 from the body of water 30 via the inflow chamber(s) 310 at one or more intake opening 102 forward of the IFR(s) 140 (e.g. at or proximate to the front end 42 or the mouth 43 of the vessel 10). Any desired number, form and configuration of intake openings 102 may be included. For example, the intake opening 102 may be the entire space 102*a* extending between front edges of at least one inflow chamber cover 316 (and/or other vessel component(s), such as the top deck 54) and the hull 55 (and/or other vessel component(s), such as one or more recessed front decks 56) and the opposing side walls 96 that define the inflow chamber 310.

In other embodiments, one or more intake openings 102 may, for example, comprise only part of the space 102*a*, or may be formed in a front bulkhead or vertical wall of the vessel 10 (e.g. similar to other embodiments described above, e.g. FIG. 3). In yet other embodiments, the intake opening 102 may have no upper boundary, such as similar to the embodiment of FIGS. 23-26. Thus, the form, quantity, size, configuration, construction, precise location, orientation and operation of the intake opening(s) 102 is not limited or limiting upon the present disclosure and claims, unless and only to the extent as may be expressly provided in a particular claim and only for that claim and claims depending therefrom.

The recessed front deck(s) 56, when included, may have any suitable form, quantity, size, configuration, construction, precise location, orientation and operation. In this embodiment, the recessed front deck 56 is provided at or near the front 42 of the vessel 10 forward of the front IFR 140*c*. For example, the recessed front deck 56 may extend between (or near) the front edge 55*a* of the hull 55 and a front IFR support wall 320. If desired, the recessed front deck 56 may include a wave diminishing surface 57 that slants downwardly toward the front end 42 of the vessel 10 to assist in dampening or reducing the impact, size, action of waves/turbulence in the body of water 30 (e.g. like a beach) or otherwise caused by fluid/debris entering the inflow chamber 310, encourage only the top layer(s) of liquid/debris (e.g. oil 34, debris, algae, oily water) to pass through the intake opening(s) 102, limit the flow of sea water through the intake opening(s) 102, other desired purpose(s) or a combination thereof. However, the recessed front deck 56 may have different features or not be included in various embodiments.

Still referring to FIGS. 41 & 42, when included, the inflow chamber cover(s) 316 may have any suitable form, quantity, size, configuration, construction, precise location, orientation and operation. In this embodiment, the inflow chamber cover 316 is at least partially transparent, or see-through, to allow one or more operators on the vessel 10 to observe one or more conditions in the inflow chamber 310 (e.g. the effect of one or more controllable variables and/or the existence and effect of one or more non-controllable variables (e.g. the nature, action, turbulence and/or content of water (e.g. amount and/or type of debris) entering, within and/or flowing through the inflow chamber 310)), one or more components in the inflow chamber 310, such as the position, intake resistance and/or effectiveness of each IFR 140, in order to determine if, when and what adjustments should be made (e.g. to the IFRs 140, suction pressure from the discharge pump(s) 184, vessel speed, state and speed of the debris pump(s) 380) during operations, for other purpose(s) or a combination thereof. The inflow chamber cover 316 may, for example, be at least partially perforated, constructed at least partially of grating, mesh, clear fiberglass or other at least partially transparent material(s), other suitable material or a combination thereof. In this embodiment, the inflow chamber cover 316 includes a metallic grate.

Figure 48:
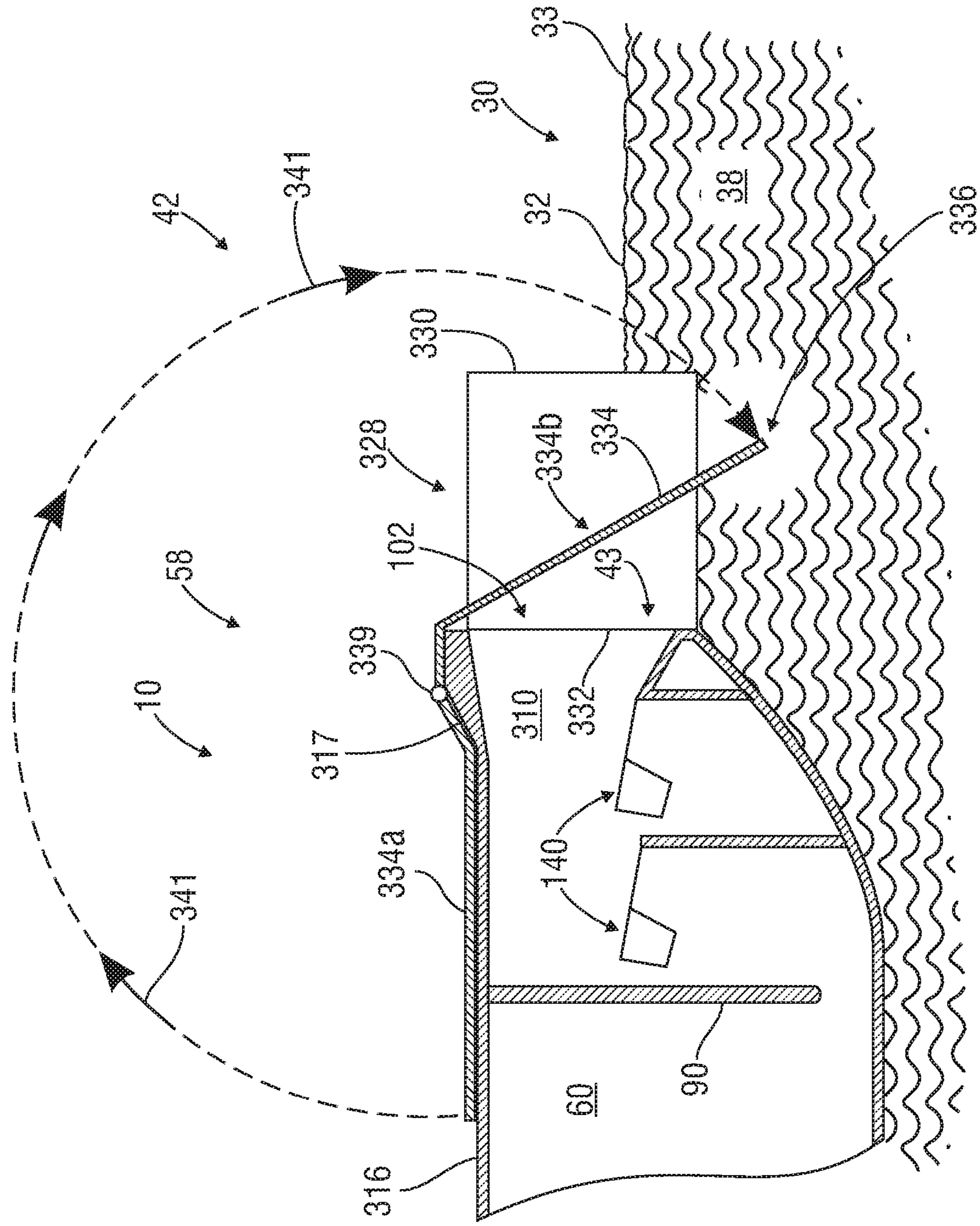
FIG. 48 is partial cross-sectional, side view of part of the exemplary vessel of FIG. 41 and equipped with an exemplary large-sized debris guard in accordance with an embodiment of the present disclosure.
Figure 49:
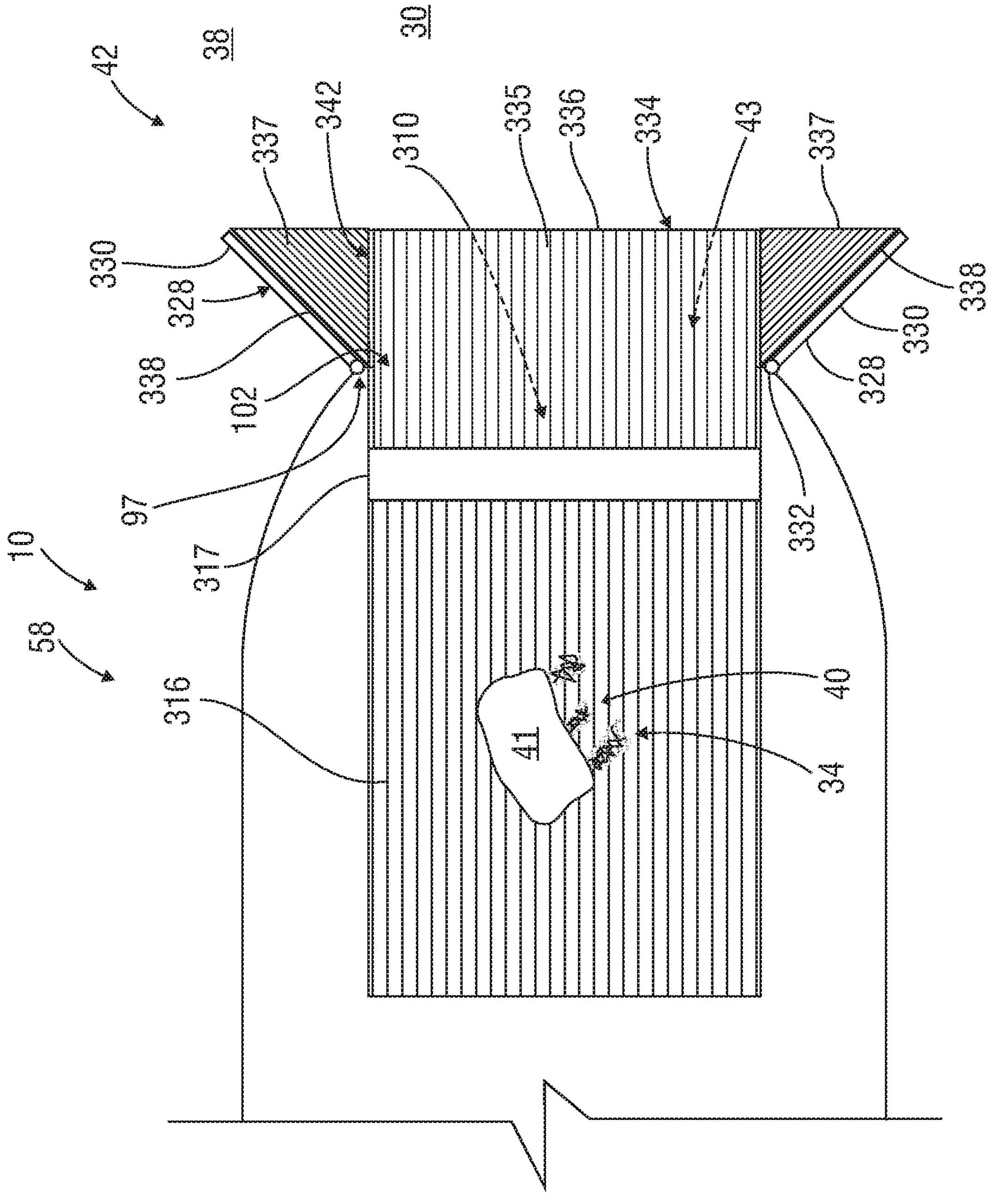
FIG. 49 is a top view of the exemplary vessel of FIG. 48 showing exemplary large-sized debris atop the exemplary inflow chamber cover.

Referring now to FIGS. 48 & 49, the inflow chamber cover 316 may also or instead be used to at least temporarily store debris that cannot be processed via the debris recovery system 58 or for which an operator does not want to so process (e.g. animals, large-sized debris 41, etc.), sometimes referred to herein as the "undesirable debris". For example, when undesirable debris is encountered during operations (e.g. as or before it enters the inflow chamber 310), it may be grabbed (e.g. with a manually-operated or automated gaff or grabber) and placed atop the inflow chamber cover 316 for later disposal, preventing the undesirable debris from clogging the intake opening(s) 102, for other purpose(s) or a combination thereof. If the inflow chamber cover 316 is perforated, placement of the undesirable debris upon the cover 316 may allow any small-sized debris 40 (e.g. oil 34, algae bloom) carried by or on it and which is small enough to fit through the perforations in the inflow chamber cover 316 to pass or drip into the inflow chamber 310 for recovery and processing. If desired, one or more front portions 317 and/or side portions of the inflow chamber cover 316 may be angled upwardly, such as to prevent undesirable debris placed thereupon from rolling off the vessel 10. However, the inflow chamber cover(s) 316 may have any other configuration, components and operation and is not required in various embodiments.

It should be noted that, in any desired embodiments, one or more debris processors (e.g. processors 550*a*, 550*b*, FIGS. 55-56) or other components of a debris processing system 530, such as described below or shown in FIGS. 55-56, may be provided on the vessel 10 for processing some or all of the undesirable or other debris.

Still referring FIGS. 48 & 49, one or more front doors 328 may be provided on the vessel 10 (e.g. to selectively close off or block the intake opening(s) 102 during transit or storage of the vessel or any other desired time). The front door(s) 328 may have any suitable form, quantity, size, configuration, construction, precise location, orientation and operation. In the present embodiment, the front doors 328 include a pair of sideways pivoting gates 330 situated at the front 42 of the vessel 10 and selectively moveable between at least one closed position (e.g. FIG. 41) and at least one open position (e.g. FIGS. 42-46, 48-51). The illustrated gates 330 are pivotably coupled (e.g. via one or more hinges 332) at or proximate to the respective front edges 97 (e.g. FIG. 42) of the side walls 96 that form the inflow chamber 310 (or to one or more other components at or near the front end 42 of the vessel 10) and are selectively pivotable (e.g. by electric or solar powered motor, hydraulic or pneumatic power source, manually or otherwise) inwardly and outwardly relative to the vessel 10 between open and closed positions. However, the door(s) 328 (e.g. gates 330), when included, may be configured, coupled to the vessel 10 and moveable between positions in any other suitable manner and technique.

In at least one closed position, the exemplary doors 328 may be configured to substantially or fully, fluidly seal the intake opening(s) 102 and the mouth 43 of the vessel 10 (e.g. to prevent wave splash from entering the vessel 10 and/or debris from escaping from the vessel 10 therethrough during transit to a debris field, for one or more other purposes or a combination thereof). In at least one open position, the exemplary gates 330 allow sea water/debris flow into the inflow chamber 310 for debris recovery operations. If desired, the door(s) 328 may be configured to funnel or encourage debris to move towards the inflow chamber 310 during debris recovery operations. In fact, the door(s) 328 may have any of the compatible features, details or capabilities of the elongated boom(s) 190 as described above and/or shown in other figures appended hereto (e.g. FIG. 1). However, front doors 328 may not be included in some embodiments or may have different or additional features.

Still referring FIGS. 48 & 49, if desired, one or more large-sized debris guards 334 may be provided at the front 42 of the vessel 10 to assist in preventing large-sized debris 41 from entering into and/or blocking the inflow chamber 310 and/or for any other purpose(s). When included, the large-sized debris guard(s) 334 may have any suitable form, quantity, size, configuration, components, construction, precise location, orientation and operation. In this embodiment, a single large-sized debris guard 334 is configured to extend at least partially across the intake opening(s) 102 and/or mouth 43 of the vessel 10 and is at least partially perforated to allow the flow of sea water and small-sized debris 40 to pass therethrough. For example, the large-sized debris guard 334 may include grating or mesh having holes which are sized as desired.

The illustrated large-sized debris guard 334 is configured to be stowed atop the inflow chamber cover 316 (e.g. during transit and/or non-use of the debris recovery system 58) and deployable therefrom to one or more positions forward of the front 42 of the vessel 10. For example, the guard 334 may be pivotably coupled to the inflow chamber cover 316 (e.g. via one or more hinge pins 339) or other component of the vessel 10 and selectively pivotable (e.g. up, over and down, e.g. along arrows 341) relative to the vessel 10 (e.g. by electric or solar powered motor, hydraulic or pneumatic power source, manually or otherwise) between at least one stowed position (334*a*) and at least one deployed position (334*b*). However, any other components and technique may be used to deploy the large-sized debris guard 334, when included. For example, it may be coupled to one or more front doors 328, manually placed in at least one deployed position, etc.

In a deployed position, the exemplary large-sized debris guard 334 extends angularly outwardly in front of the vessel 10 and between the open front door(s) 328 (when included) so that its bottom edge 336 is preferably typically submersed in sea water 38 during debris recovery operations. For example, the large-sized debris guard 334 may include a main (e.g. rectangular) panel 335 and side (e.g. triangular) wing panels 337 in order to extend fully between the open doors 328 and across the vessel mouth 43. In this embodiment, the side wing panels 337 are pivotably coupled to the main panel 335 between at least one folded (e.g. stowed) position and at least one open (e.g. deployed) position of the side wing panels 337, such as with hinge pins 342 or one or more other coupling devices.

If desired, the large-sized debris guard 334 may be selectively releasably coupled to the front door(s) 328 (e.g. gates 330), such as to increase the structural tolerance and/or strength of the doors 328 and/or guard 334, maintain the desired operating position(s) of the doors 328 and/or guard 334, other purpose(s) or a combination thereof. In this embodiment, the side wing panels 337 are configured to be selectively releasably coupled at or near their respective side edges 338 to the open gates 330 with retractable or releasable pins, clamps or the like. However, the large-sized debris guard 334, when included, may have any other suitable arrangement of components and operation.

Referring back to FIGS. 41 & 42, the IFRs 140 in the inflow chamber 310 may have any suitable form, quantity, size, configuration, construction, precise location, orientation and operation. In this embodiment, the front and rear IFRs 140*c*, 140*d* are both variable-buoyancy, pivoting-type IFRs 140. For example, the IFRs 140*c*, 140*d* may each include a variable buoyancy system 250 (such as described and shown elsewhere herein). However, either or both of the IFRs 140*c*, 140*d* may be fixed-buoyancy and/or sliding-type IFRs 140 (such as described above and shown in the corresponding figures). The illustrated front IFR 140*c* is shown pivotably coupled to the front IFR support wall 320 (e.g. at the uppermost edge 56*a* of, and rearward of, the recessed front deck 56), while the illustrated rear IFR 140*d* is pivotably coupled to a rear IFR support wall 322 rearward of the front IFR 140*c*.

Multiple IFRs 140 (e.g. the front and rear IFRs 140*c*, 140*d*) may be used in the inflow chamber 310 to improve debris collection operations by directing or allowing mostly debris (more debris and less sea water) into the cargo compartment 60, dampening or reducing wave action and/or turbulence in water entering the vessel 10, providing for more consistent debris recovery operations during a project (e.g. by efficiently and effectively managing the impact of controllable and non-controllable variables to provide steady inflow of primarily debris (e.g. small-sized debris) into the cargo compartment(s) 60), for any other purposes or a combination thereof.

For example, in many use scenarios, the front IFR 140*c* may typically float primarily in sea water 38 in the inflow chamber 310 (e.g. FIG. 46) and be configured to assist in dampening or reducing the impact, size, action and/or turbulence of waves that may enter the intake opening(s) 102, encourage only the top layer(s) in the sea water (e.g. small-sized debris, oily water) to pass thereby, other desired purpose(s) or a combination thereof. In such instances, the variable buoyancy system 250 (when included) of the exemplary front IFR 140*c* may be selectively actuated/adjusted during operations based upon the fact that the front IFR 140*c* floats primarily in water (high density liquid) and in response to or anticipation of direct contact with waves and water turbulence. Thus, in some embodiments, the front IFR 140*c* may be used to act similarly as the angled wave diminishing surface 57 of the exemplary recessed front desk 56 (when included) as described above and may move drastically between positions. For example, when the body of water is calm (e.g. having a flat surface) during debris recovery operations, it may be desirable to maintain the front IFR 140*c* in a less buoyant (more horizontal) position. When there is turbulence on/near the surface of the body of water (e.g. due to waves), increased forward motion of the vessel, increased suction caused by the discharge pump(s) 184 (and or the debris pump(s) 380) or a combination thereof, it may be desirable to maintain the front IFR 140*c* in a more buoyant (angled) position.

Still referring to FIGS. 41 & 42, the exemplary rear IFR 140*d* may, in many use scenarios, typically float in primarily small-sized debris 40 (e.g. oil 34, oily water, algae bloom) in the inflow chamber 310 (e.g. FIG. 46) with little water turbulence (or less water turbulence than experienced by the front IFR 140*c*, particularly when the recessed front deck 56 and/or front IFR 140*c* successfully or significantly reduce the effect of wave action/turbulence in the liquid entering the inflow chamber 310 and/or allow primarily debris (e.g. small-sized debris 40) to pass to the rear IFR 140*d*). In at least those instances, the variable buoyancy system 250 of the rear IFR 140*d* may be selectively actuated/adjusted during operations based upon the facts that the rear IFR 140*d* floats primarily in debris (e.g. often having a lower density than sea water) and/or is subject to little or no wave action or water turbulence. The position of the exemplary rear IFR 140*d* may thus be fine-tuned (e.g. based upon the thickness and make-up of the debris floating through the inflow chamber 310, vessel speed, discharge pump 184 suction pressure) to optimize intake resistance, the cohesive properties of some small-sized debris 40, the ladle effect or a combination thereof.

In at least some scenarios, the front IFR 140*c* of various embodiments may be characterized as being more likely to adjust position (e.g. pivot and/or be selectively pivoted in response to controllable and/or non-controllable variables) drastically in its unique environment and to achieve the desired objectives of the front IFR 140*c*, while the rear IFR 140*d* may be characterized as more being more likely to adjust position (e.g. pivot and/or be selectively pivoted in response to controllable and/or non-controllable variables) by slight adjustments due to its unique environment and in order to optimize debris recovery operations. For example, the front IFR 140*c* of a debris recovery system 58 designed to effectively recover debris in a body of water that may have up to approximately twelve inch (12") waves (e.g. on inland bodies of water and shallow off-shore locations) may move (e.g. pivot) within an arc of up to approximately twelve-fourteen inches (12-14") in response to the controllable and non-controllable variables acting upon it during operations. In that scenario, the exemplary rear IFR 140*d*, though capable of moving within the same range of motion, may be expected to and/or selectively manipulated to move within a smaller range of motion in response to the controllable and non-controllable variables acting upon it and the desired objectives.

As discussed above, in various embodiments, during use of the debris recovery system 58, the buoyancy of the variable-buoyancy IFRs 140 may be adjusted by increasing or decreasing the amount of air in the buoyancy chamber(s) 152 of the IFR 140. In some embodiments, such as shown and discussed elsewhere herein, the buoyancy may be increased, for example, by blowing air from a low-pressure air compressor through piping and/or flexible hoses (e.g. flexible hoses may accommodate the movement of the IFR 140) into the buoyancy chamber(s) 152. As air is introduced into the exemplary buoyancy chamber(s) 152, liquid is pushed out of the buoyancy chamber(s) 152 through one or more openings 154 in (e.g. the bottom of) the buoyancy chamber 152. The buoyancy of the exemplary variable-buoyancy IFR 140 may be decreased by releasing air from the buoyancy chamber(s) 152 through the same flexible hoses and/or piping (e.g. through one or more vent valves). In such instances, the hydrostatic pressure around the buoyancy chamber 152 (and/or a motor, gravity or other cause) may force water back into the chamber 152, resulting in increased weight of the IFR 140 and a tendency for the IFR 140 to be positioned lower, relative to the surface of the liquid it floats in. Letting water into a buoyancy chamber 152, such as described above, may be referred to herein as "ballasting" the IFR 140, while forcing water out of a buoyancy chamber 152 may be referred to as "de-ballasting" the IFR 140.

Referring again to FIGS. 41 & 42, some exemplary operational scenarios that may warrant adjustment to the buoyancy of one or more exemplary variable-buoyancy IFRs 140 (and/or other variables) include when the body of water is dead-calm verses having waves and/or water turbulence. In a dead calm situation, one or more of the exemplary IFRs 140 would typically not have to counter the dynamic force of waves/turbulence and can, if necessary, be ballasted to a less buoyant position. As waves or water turbulence increases, one or more of the exemplary IFRs 140 may be de-ballasted to a more buoyant position. For example, it may be desirable or necessary to (potentially significantly) de-ballast the front IFR 140*c* to press against and dampen or diminish the effect of the waves, and (typically) less necessary to de-ballast the rear IFR 140*d* or de-ballast it to a lesser degree.

For another example, when conditions allow, the exemplary vessel 10 may be configured to collect debris while in transit (typically moving forward) through the debris field or fields. The transit motion of the exemplary vessel 10 may create head waves at the front 42 of the vessel 10 and intake opening 102. The head waves may, in many instances, be avoided, reduced or mitigated by increasing the suction of the exemplary discharge pumps 184 (e.g. one or more operators visually observing the water in front of the vessel 10 to see or anticipate head waves and ramping up the pumps 184 as needed). For example, the exemplary discharge pumps 184 may be configured to suck in sea water from the cargo compartment 60 at a rate or volume that is at least slightly greater than the rate or volume of water/debris entering the intake opening 102, reducing or eliminating the existence or effect of head waves. If the maximum suction capacity of the exemplary discharge pump(s) 184 is achieved and head waves are forming, it may be desirable to slow the forward velocity of the vessel 10 to avoid, reduce or mitigate the existence or effect of the head waves. In any case, an increase in the transit motion of the exemplary vessel 10 or suction of the discharge pump(s) 184 (and/or suction of the debris pumps 380 (described below), typically to a less extent than the discharge pump(s) 184), or the existence of head waves or other water turbulence forward of the vessel 10, or any combinations thereof, will typically apply increased forces and/or friction upon the IFRs 140, which may be offset by de-ballasting one or more of the exemplary IFR(s) 140 to a more buoyant position. For example, it may be desirable or necessary to (potentially significantly) de-ballast the front IFR 140*c*, and (typically) less necessary to de-ballast the rear IFR 140*d* (or de-ballast it to a lesser degree than the front IFR 140*c*) to counter increased friction and/or forces thereupon.

For still a further example, the thicker the small-sized debris 40 (e.g. oil 34) on the surface 32 of the body of water 30, the less buoyant the exemplary IFRs 140 (particularly the rear IFR 140*d*) may typically need to be in order to allow more debris to pass or cascade over it/them. Thus, it may be desirable to (potentially significantly) ballast the exemplary rear IFR 140*d* and potentially also ballast the front IFR 140*c* (or ballast it to a lesser degree than the rear IFR 140*d*)

depending upon the thickness of the debris 40. In scenarios with thicker debris, it may also or instead be beneficial to increase the suction of the exemplary discharge pump(s) 184 and/or transit velocity of the vessel 10 to increase debris inflow. Thus, adjustments to the buoyancy of the IFRs 140 may benefit from consideration of the other controllable and non-controllable variables.

In use scenarios when the small-sized debris 40 (e.g. oil 34) on the surface 32 of the body of water 30 is thin (e.g. a mere sheen), it may be desirable to de-ballast the exemplary IFRs 140 (particularly the rear IFR **140*d*) to make them more buoyant and cause a very thin layer of debris to pass over the front edge 142 thereof. As used herein, the terms "sheen" and variations thereof mean a very thin layer of small-sized debris (e.g. oil), such as less than 0.0002-0.005 mm floating on the water surface. Finessing the position of the exemplary IFRs 140, particularly the rear IFR 140*d*, to cause a very thin layer (e.g. razor or paper thin, sheen) of the small-sized debris 40 to pass over it may increase the volume and cascading movement (rushing, ladle effect) of the debris being collected as it falls over the front edge 142 of the IFR 140 (e.g. due to the cohesive nature of the small-sized debris (particles pulling other particles across the surface of the body of water 30 into the vessel 10) and/or suction of the discharge pump(s) 184 to at least slightly lower the liquid level rearward of the IFR(s) 140 relative to the liquid level forward of the IFR(s) 140) and cause the liquid forward of the IFRs 140 to move rearward and accelerate the recovery of small-sized debris and amount of debris recovered). In fact, the use of the exemplary debris recovery system 58 may result in recovery of substantially all the small-sized debris on or near the surface of the body of water in the subject debris field(s) 36**.

Referring still to FIGS. 41 & 42, the illustrated fluid removal system 158 may include one or more discharge pumps 184 situated in any desired location, such as one or more suction chambers 340 fluidly coupled to the cargo compartment(s) 60. In this example, two submersible, variable speed discharge pumps 184 are disposed in a single suction chamber 340 rearward of the cargo compartment 60. An example of a commercially available process pump that may be used as each discharge pump 184 in some embodiments of the present disclosure is the model SBM, 8" hydraulic, submersible, axial or mixed-flow, 2,000 gallons-per-minute (GPM) high-volume pump sold by Hydra-Tech Pumps (e.g. 2 each, resulting in 4,000 GPM maximum intake of water/debris into the vessel 10 and water discharge from the cargo compartment 60). Other embodiments may include only one or more than two (e.g. 3, 4, 5, etc.) discharge pumps 184, one or more banks of discharge pumps 184, one or more non-variable speed and/or non-submersible discharge pumps 184, more than one suction chamber 340, other features or a combination thereof.

Figure 46:
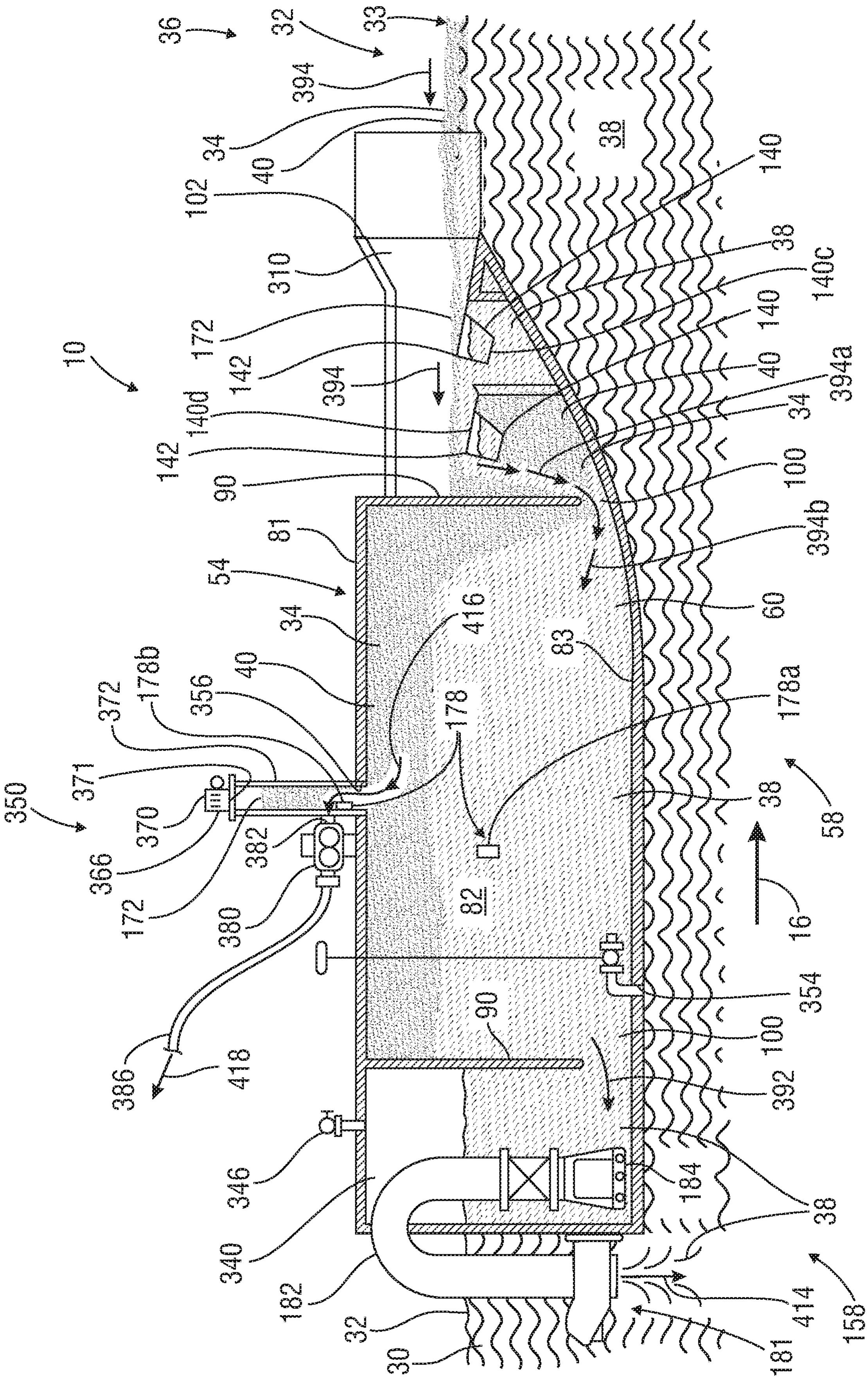
FIG. 46 is partial cross-sectional, side view of the exemplary vessel of FIG. 41 and the exemplary debris recovery system during exemplary debris recovery operations.

The exemplary suction chamber 340 is shown separated from the cargo compartment 60 by at least one vertical wall 90 and fluidly coupled to the cargo compartment 60 by at least one fluid passageway 100 that allows fluid flow past the vertical wall 90. As shown in FIG. 46, during debris recovery operations, the exemplary discharge pump(s) 184 is configured to create suction (e.g. in the suction chamber 340 and/or cargo compartment 60) to concurrently (i) draw at least substantially or entirely sea water from the cargo compartment 60, through the passageway(s) 100 and into the discharge pump(s) 184 (e.g. arrow 392) and (ii) draw debris (and typically some water) from the body of water 30, through the intake opening 102, into the inflow chamber 310 then over the IFRs 140 and into the cargo compartment 60 (e.g. arrows 394). Thus, while the exemplary passageway(s) 100 between the cargo compartment 60 and suction chamber 340 of this embodiment effectively serve at least one common or similar purpose as the "suction conduit(s) 160" described above and shown in various appended figures (e.g. FIGS. 1-2, 13-20), one or more actual suction conduits 160 could, in this embodiment, be coupled to one or more of the exemplary discharge pumps 184, if desired. Accordingly, the compatible features of the suction conduit 160 as described and shown elsewhere in this patent are hereby incorporated herein by reference for these embodiments.

Referring back to FIGS. 41 & 42, in this embodiment, a single passageway 100 is shown extending between the exemplary suction chamber 340 and cargo compartment(s) 60, situated proximate to the lower end 76 of the illustrated cargo compartment 60 and configured to typically be fully submersed in liquid (e.g. sea water) during operations (e.g. FIG. 46) to allow a vacuum to be created/maintained in the cargo compartment 60 and/or a sealed liquid system provided, draw at least substantially only sea water out of the cargo compartment 60, for one or more other purposes or a combination thereof. For example, the lower end 91 of the vertical wall 90 may not extend down to the hull, or lower plate, 55 of the vessel 10 (or other part of the vessel 10) that forms or serves as the bottom 83 of the cargo compartment 60 and/or suction chamber 340. In such instance, the exemplary passageway 100 may be the entire space 101 extending below the lower end 91 of the vertical wall 90 and between the walls 82, 98 that define or form the cargo compartment 60 and suction chamber 340, respectively.

In other examples, the passageway(s) 100 may comprise only part of the space 101, or one or more passageways 100 may be formed or provided in or proximate to the lower end 91 of the exemplary vertical wall 90 (which may extend to the bottom 83 of the cargo compartment and/or suction chamber 340, hull 55 or other component) or elsewhere. In other embodiments, one or more suction conduits 160 (such as described above and shown in the corresponding drawings) may also or instead extend between the cargo compartment(s) 60 and the suction chamber(s) 340 (and/or discharge pump(s) 184) and/or fluidly couple the cargo compartment(s) 60 with the suction chamber(s) 340 (and/or discharge pump(s) 184). Thus, the form, quantity, size, configuration, construction, precise location, orientation and operation of the passageway(s) 100 fluidly coupling the suction chamber 340 and cargo compartment(s) 60 are not limited or limiting upon the present disclosure, unless and only to the extent as may be expressly provided in a particular claim and only for that claim and claims depending therefrom. If desired, a selectively moveable gate (e.g. gate 110, FIG. 47) may be associated with the passageway(s) 100 to selectively seal off or fluidly isolate the suction chamber(s) 340 from the cargo compartment(s) 60 and/or for any other purposes.

Referring still to FIGS. 41 & 42, since the suction created by the exemplary discharge pump(s) 184 is configured to simultaneously remove sea water from the cargo compartment 60 and draw liquid/debris into the inflow chamber 310 and cargo compartment 60 (e.g. provide "active" removal of sea water from the cargo compartment 60), substantial pumping capacity may be necessary in various debris recovery scenarios (such as mentioned above). In one exemplary application, an exemplary vessel 10 moving at approximately 2 knots across a debris field and having two concurrently operating suction pumps 184 without any IFR's 140 may have a rate of ingestion of water and debris up to approximately 4,000 gallons/minute.

The liquid captured by the exemplary discharge pump(s) 184 may be delivered to any desired destination, such as discussed above. For example, the discharge pumps 184 may discharge liquid (e.g. entirely or substantially pure sea water) from the cargo compartment 60 into the body of water 30 via at least one discharge opening 181. If desired, the fluid removal system 158 may include one or more discharge pipe (or hose) sections 182 extending from the discharge pump(s) 184 to the body of water 30 (or another vessel, storage tank, bladder bag etc.) for discharging the liquid. However, any other components and techniques may be used for moving or transporting the liquid removed from the cargo compartment(s) 60 by the discharge pump(s) 184 off the vessel 10.

Still referring to FIGS. 41 & 42, in any embodiments, the debris recovery system 58 may include a debris separation system 350 configured to assist in removing recovered debris therefrom (e.g. from one or more cargo compartments 60, vessels 10, other location). The debris separation system 350 may have any suitable form, configuration, components and operation. In this embodiment, the debris separation system 350 includes at least one suction chamber vent 344 to allow the suction chamber 340 to be selectively at least partially vented of air/gases. For example, during flooding of the exemplary cargo compartment 60 (and/or at any other desired times), the suction chamber vent 344 may be opened to allow air in the suction chamber 340 to escape and sea water to enter the suction chamber 340 sufficient to submerge the passageway(s) 100 between the suction chamber 340 and the cargo compartment 60 and allow a vacuum to be created in the cargo compartment 60 and/or a sealed liquid system to be provided, for any other purposes or a combination thereof. In some embodiments, the exemplary suction chamber 340 will fill with sea water 38 to sea level 33 during flooding (e.g. FIG. 44) and the suction chamber vent 344 closed thereafter.

In the illustrated embodiment, the escape of air from the suction chamber 340 through the suction chamber vent 344 may, if desired, be selectively controlled with at least one suction chamber vent valve 346, cap or other component. When included, the suction chamber vent valve 346 may have any suitable form, quantity, size, configuration, construction, precise location, orientation and operation. For example, the suction chamber vent valve 346 (and suction chamber vent 344) may be selectively opened and closed manually (e.g. accessible by operators on the top deck 54) or electronically (e.g. via computer-based controller) as is and becomes further known. In some embodiments, the suction chamber vent valve 346 may, for example, be a suitable 3", 300#, ball valve.

Still referring to FIGS. 41 & 42, the illustrated debris separation system 350 may include at least one flooding port 354 and at least one discharge port 356, both fluidly coupled to the cargo compartment 60. The exemplary flooding port(s) 354 is/are configured to allow the cargo compartment 60 to be selectively filled (e.g. to sea level 33, FIG. 44) with sea water from the body of water (e.g. by free-flooding or active filling of the cargo compartment(s) 60 prior to debris recovery operations). For example, a single flooding port 354 is shown formed in the bottom 83 of the cargo compartment 60 (e.g. the vessel hull 55) to provide direct fluid communication between the body of water and the cargo compartment 60. In other embodiments, the flooding port(s) 354 may be provided at any other location(s) in the cargo compartment 60 or elsewhere in the vessel 10 (e.g. and fluidly coupled to the cargo compartment(s) 60, such as with hoses or pipes).

In the illustrated embodiment, the flow of sea water into the cargo compartment 60 through the flooding port 354 may be selectively controlled with at least one flood valve 358. The flood valve(s) 358 may have any suitable form, quantity, size, configuration, construction, precise location, orientation and operation. For example, the flood valve 358 (and flooding port 354) may be selectively opened and closed via a manual flood valve handle 360 (e.g. accessible by operators on the top deck 54) or electronically (e.g. via computer-based controller) as is and becomes further known. In some embodiments, the flood valve 358 may be a suitable 3", 150#, flanged ball valve. In other embodiments, a flood valve 358 may not be included (e.g. one or more remotely controllable cap, conduit, submersible fluid pump 376 (e.g. FIG. 47) or other component be provided).

Still referring to FIGS. 41 & 42, the exemplary discharge port(s) 356 is/are configured to allow air (and any other gases) in the cargo compartment(s) 60 to be selectively evacuated therefrom (e.g. during flooding of the cargo compartment(s) 60 and/or during debris recovery operations). The evacuation of air from the cargo compartment(s) 60 may be desirable, for example, to allow debris floating in the cargo compartment 60 to reach up to the upper end 74 of the cargo compartment 60 for subsequent removal therefrom, completely fill the cargo compartment 60 with liquid, help form a sealed liquid system, help ensure only (or primarily) sea water is drawn by the discharge pump(s) 184 out of the cargo compartment(s) 60, allow a vacuum to be created/maintained in the cargo compartment 60, for any other purposes or a combination thereof. In this embodiment, a single discharge port 356 is provided in the cargo compartment 60 at the upper end 74 thereof (e.g. in the top deck 54 of the vessel 10 or wall 81 forming the top of the compartment 60). If desired, the exhaust of air (and/or other gases) from the cargo compartment 60 through the discharge port 356 may be selectively controlled and/or sealed, such as with at least one valve 362 (e.g. FIG. 47), door or other component. However, the suction chamber vent(s) 344, suction chamber vent valve(s) 346, flooding port(s) 354, flood valve(s) 358 and the discharge port(s) 356 may have any other suitable form, quantity, size, configuration, construction, precise location, orientation and operation or may not be included in various embodiments.

Still referring to FIGS. 41 & 42, the exemplary debris separation system 350 may include one or more air evacuators 366 configured to encourage the flooding and air (gas) evacuation of the cargo compartment 60. In various embodiments, for example when the exemplary discharge port(s) 356 (e.g. disposed at or near the upper end 74 of the compartment 60) and the exemplary flooding port(s) 354 are open and each of the passageways 100 to the compartment 60 is submersed in liquid and/or closed off, a vacuum may be formed in the compartment 60 (creating a vacuum-sealed compartment 60), all or a desired lesser amount of air and other gases therein may be removed therefrom by actuation of one or more air evacuator(s) 366 and the entire cargo compartment 60 (or a desired lesser amount) may be filled with sea water (e.g. FIG. 45). Thereafter, during debris recovery operations in some applications the cargo compartment 60 could be effectively sealed (and, if desired, intermittently evacuated of any gas that may enter with inflow from the inflow chamber 310) to help form a sealed liquid system. In other embodiments, a sealed liquid system may be achievable with merely a sealed cargo compartment 60 (e.g. without the use of any air evacuators 366).

Figure 47:
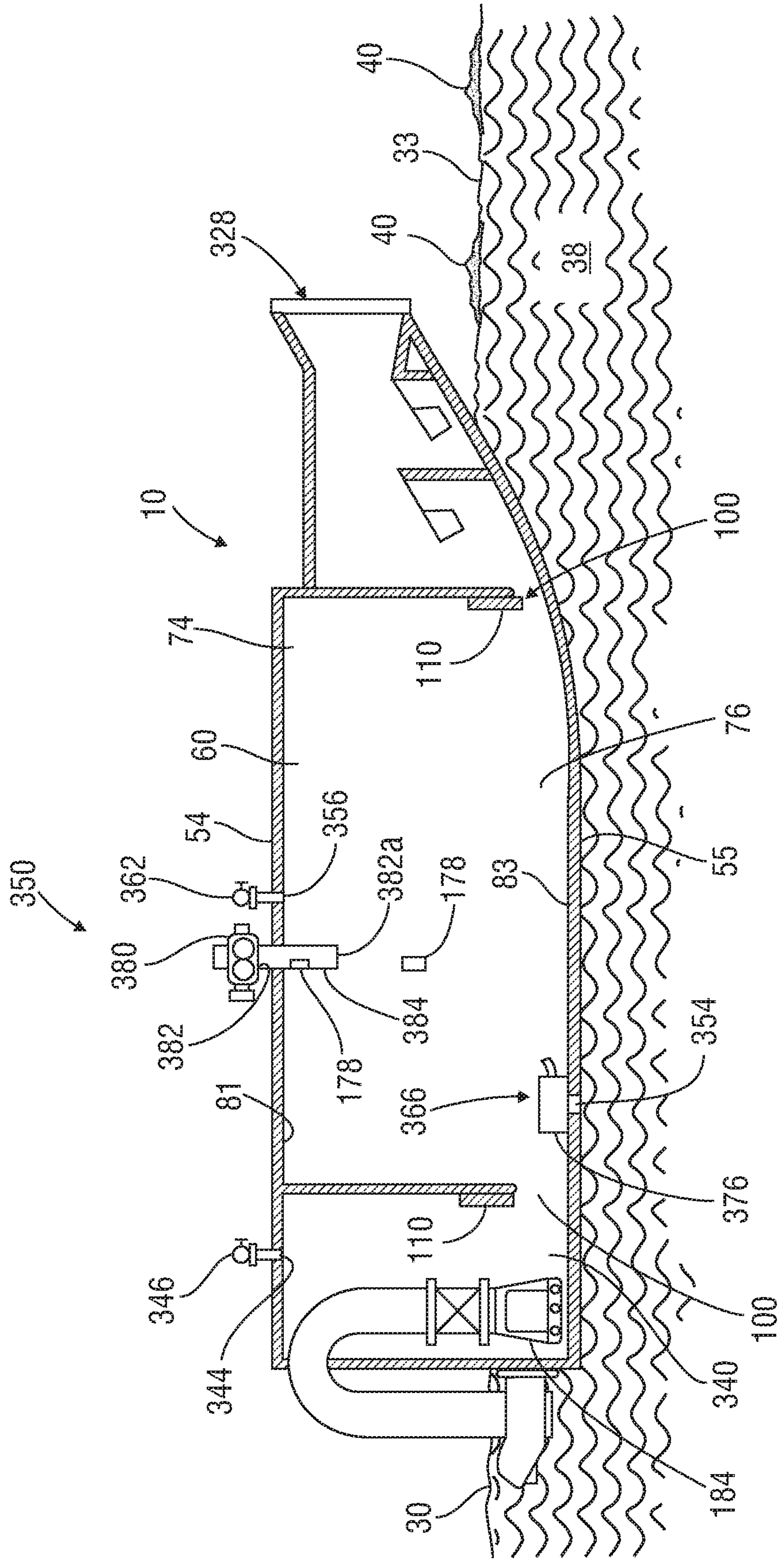
FIG. 47 is partial cross-sectional, side view of the exemplary vessel of FIG. 41 but having an alternate embodiment of components for flooding and air evacuating the illustrated cargo compartment in accordance with an embodiment of the present disclosure.

When included, the air evacuator(s) 366 may have any suitable form, quantity, size, configuration, construction, precise location, orientation and operation. In this embodiment, the air evacuator 366 includes a vacuum pump 370 (e.g. 24-volt standard vacuum pump, hydraulic drive diaphragm pump (e.g. SELWOOD PD 75 positive displacement pump)) fluidly coupled to the discharge port 356 at at least one inlet 371 so that the vacuum pump 370 can be selectively actuated to draw air (and other gases) out of the cargo compartment 60 and exhaust it to atmosphere (or other desired destination). In other embodiments, the air evacuator(s) 366 may also or instead include at least one submersible fluid pump 376 (e.g. FIG. 47) configured to actively pump sea water 38 into the cargo compartment 60 and push out the air and/or other gas therein. For example, as shown in FIG. 47, a submersible fluid pump 376 may be fluidly coupled to one or more of the flooding ports 354 (e.g. at the lower end 76 of the cargo compartment 60). In such instance, a selectively actuated door (e.g. gate 110) may be needed to block the passageway(s) 100 between the inflow chamber 310 and/or suction chamber 340 and the cargo compartment 60 to enable flooding of the cargo compartment 60 as desired. However, the air evacuator 366 may have any other suitable form, components, configuration and operation. For example, one or more debris pumps 380 can serve as an air evacuator(s) 366 or be used in conjunction with one or more other air evacuators 366 (e.g. vacuum pumps 370), such as in FIGS. 52, 55 & 87.

Referring again to FIGS. 41 & 42, the debris separation system 350 may include one or more debris pumps 380 configured to remove small-sized debris 40 from the cargo compartment 60 (e.g. during or after debris recovery operations). The debris pump(s) 380 may have any suitable form, quantity, size, configuration, construction, precise location, orientation and operation. For example, the debris pump 380 may be a pump capable of pumping liquid and small-sized solid debris 40 (e.g. up to 1.00" or 1.50" sized particles or more or less). An example of a commercially available pump that may be used as the debris pump 380 in some embodiments of the present disclosure is the Vogelsang model VX136-210Q positive displacement, self-priming, rotary lobe, 610 GPM volume pump.

In some embodiments, the debris pump 380 may be variable speed, or multiple independently controllable debris pumps 380 may be included, such as to serve as a controllable variable during debris recovery operations, provide greater flexibility in the speed of off-loading the debris, other purpose or a combination thereof.

In this embodiment, the inlet 382 to the illustrated debris pump 380 is fluidly coupled to the cargo compartment 60 (e.g. via the discharge port 356) at or near the upper end 74 thereof (e.g. to assist in ensuring that only (or primarily) debris that floats to the upper end 74 of the cargo compartment 60 is removed thereby and/or for any other purpose). In other embodiments, the inlet 382 to the debris pump(s) 380 may be fluidly coupled to the cargo compartment 60 at a location **382*a* (e.g. FIG. 47) in the compartment 60 spaced down from the upper wall 81 of the compartment 60 (e.g. via extension 384). For example, in some embodiments, the inlet 382 may be positioned in the cargo compartment 60 to be submersed in debris therein substantially throughout operations (e.g. to ensure that air/gas that may enter the cargo compartment 60 is not sucked into the debris pump 380**, help provide a sealed liquid system and/or for any other purpose).

Referring still to FIGS. 41 & 42, the exemplary debris pump 380 may, if desired, be configured to off-load or deliver the recovered debris to any desired location during debris recovery operations (e.g. without at least significant, or any, interruption in debris recovery) so that there is effectively no limit in the volume of debris that can be (e.g. rapidly) recovered. For example, one or more debris disposal hoses, or pipes, 386 may be coupled between the debris pump 380 and one or more other vessels (e.g. barges, ships), floating or submersed storage tanks, bags or other debris storage containers 388, any other destination (on or off shore, on or off the vessel 10) or a combination thereof. Thus, the exemplary debris recovery system 58 is configured to effectively remove a virtually unlimited volume of collected debris 40 during operations and does not need to store the recovered debris on-board. The debris recovery system 58 may therefore be used continuously to recover debris, separate debris from sea water and separately off-load collected debris and sea water without interruption and unlimited by volume.

Referring to FIGS. 41 & 46, in some embodiments, one or more vertical trunks 372 may be associated with (e.g. provided over) the discharge port 356. The vertical trunk(s) 372 may have any suitable form, quantity, size, configuration, construction, precise location, orientation and operation. In some embodiments, the vertical trunk 372 is configured to extend upwardly from (e.g. and above the upper wall 81 of) the cargo compartment 60. In various instances, the vertical trunk 372 can also or instead be oriented at least partially sideways (e.g. with a horizontal, "L", "S" or "T" shape).

If desired, the inlet(s) 382 to the exemplary debris pump(s) 380 may be fluidly coupled to the vertical trunk 372 at or upwardly of the top (e.g. upper wall 81) of the cargo compartment 60, and the inlet(s) 371 to the vacuum pump(s) 370 may be spaced upwardly of the inlet 382 to the debris pump 380. With this exemplary arrangement, the vacuum pump 370, when included, may be configured to evacuate air, and other gases, 28 (e.g. FIG. 44, arrows 396) from the cargo compartment 60 (e.g. after free-flooding) sufficient to allow sea water/debris in the cargo compartment 60 to then fill the compartment 60 (e.g. FIG. 45) and extend up into the vertical trunk 372 to a level 172 (e.g. FIG. 46) ideally above the inlet 382 to the debris pump 380 (e.g. FIG. 46). For another example, floating debris (e.g. small-sized debris 40) may be allowed to rise all the way to the top of the exemplary cargo compartment 60 and into the vertical trunk 372 (e.g. providing for a maximum volume of debris and minimal amount of water collected in the compartment 60 and removed therefrom) and can be maintained at a level 172 in the vertical trunk 372 above the inlet 382 to the exemplary debris pump 380 (e.g. ensuring that (at least substantial) air is not sucked into the debris pump 380 when it is actuated and/or for any other purposes). However, the vertical trunk(s) 372, when included, may have any other configuration and operation.

Still referring to FIGS. 41 & 46, if desired, the debris separation system 350 may include one or more sensors 178, such as to indicate that water or debris in the cargo compartment 60 is at a desired height, depth and/or volume to turn on or off the debris pump(s) 380, any other desired purpose or a combination thereof. The sensor(s) 178 may be provided at any desired location(s). For example, one or more sensors 178 may be provided on one or more of the walls 81, 82, 90 inside the cargo compartment 60 and/or inside the vertical trunk 372 or extension 384 (e.g. FIG. 47).

In the present embodiment, at least a first sensor **178*a* (e.g. FIGS. 41 & 42) is provided inside the cargo compartment (e.g. on one or more of the walls 82 approximately midway between the walls 90 and approximately 12" (or more or less) above the top of the highest passageway 100**)

to indicate when the debris pump(s) 380 need to be "on" to remove debris from the compartment 60 (e.g. to assist in avoiding (more than minimal) debris being sucked into the discharge pump(s) 184). At least a second exemplary sensor 178*b* may be provided inside the vertical trunk 372 (or extension 384, FIG. 47) below the inlet(s) 382 to the debris pump(s) 380 to indicate when the debris pumps 380 should preferably be "off" (e.g. to assist in avoiding (more than minimal) sea water being sucked into the debris pump 380).

Some exemplary alternative or additional arrangements for detecting debris/water levels in the vessel 10, cargo compartment 60 or other location may include one or more water sensors 497 (e.g. FIG. 52), visual inspection (via camera, naked eye, etc.) by operators on the vessel 10 (e.g. through windows, periscopes, etc.), the use of cameras at the desired location(s), the use of one or more mechanical debris level indicators (e.g. configured to float on the surface of water in the cargo compartment 60 and/or vertical trunk 372 but not in debris (e.g. oil)) visible to operators via an extension through and above the top deck 54 or otherwise.

An exemplary embodiment of a method of debris recovery with the debris recovery system 58 of FIGS. 41-47 will now be described. FIG. 41 illustrates an exemplary state of the debris recovery system 58 and vessel 10 during transport to the debris field. When included, the exemplary port(s) 354, 356, vent(s) 344, valves 346, 358, 362 and front doors 328 may be closed and the various pumps 184, 370, 380 preferable off during transport.

Figure 43:
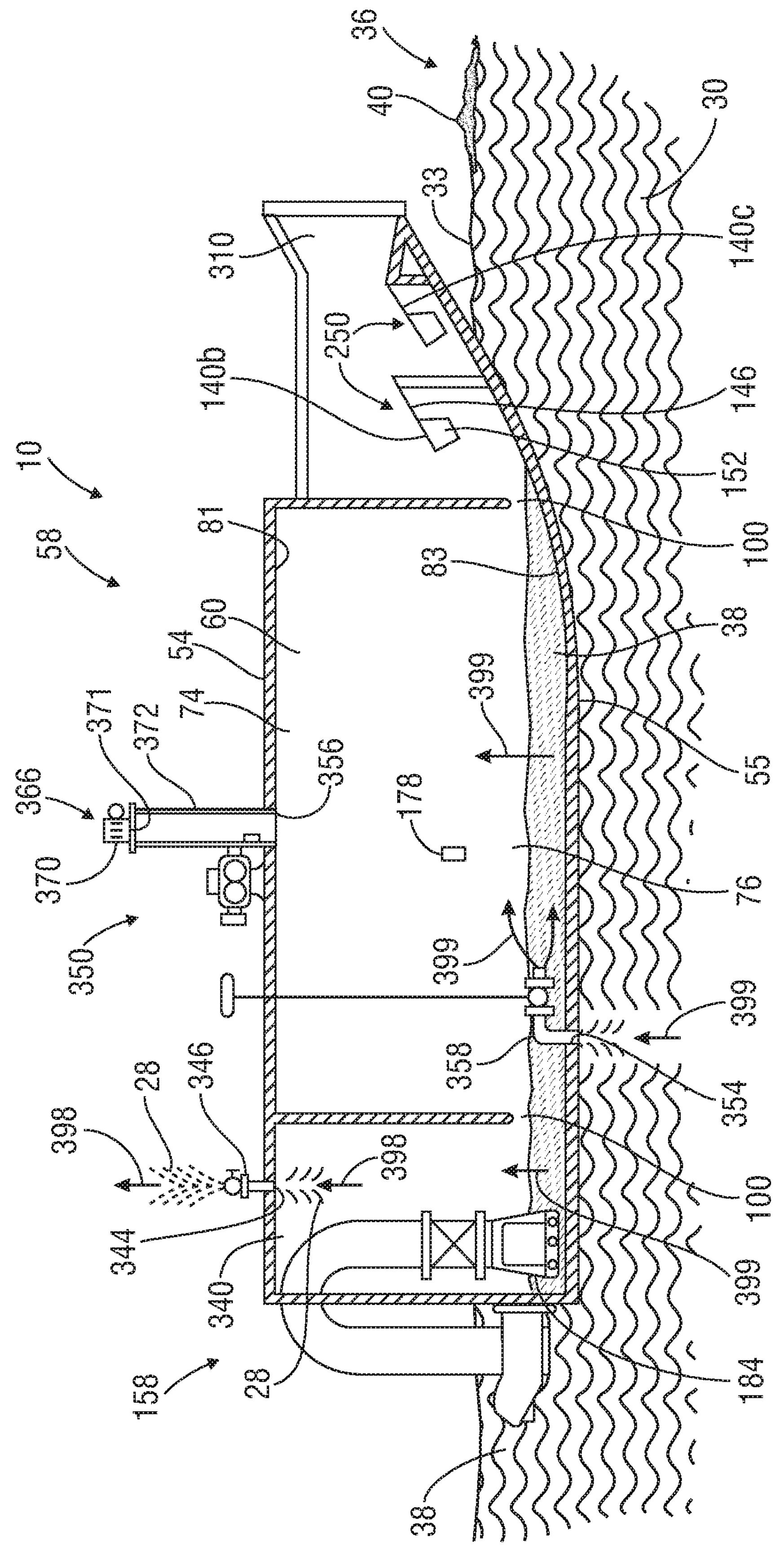
FIG. 43 is partial cross-sectional, side view of the exemplary vessel of FIG. 41 and the exemplary debris recovery system at the beginning of free-flooding of the exemplary cargo compartment in accordance with an embodiment of the present disclosure.

Referring now to FIG. 43, upon arriving at the debris field 36 (or earlier if desired), the exemplary cargo compartment 60 is flooded with sea water 38, such as described above. For example, the illustrated suction chamber vent 344 and the flooding port 354 may be opened, such as by actuating the valves 346, 358, to allow air escape (e.g. arrows 398) from the suction chamber 340, as desired, and free-flooding (e.g. arrows 399) of the cargo compartment 60 (e.g. and the inflow chamber 310 and suction chamber 340) to the desired level, such as until the height of sea water 38 in the compartment is (at least approximately) at sea level 33 (e.g. FIG. 44). (The discharge port 356 may or may not be open depending upon operator preference or any other variable(s)).

Figure 44:
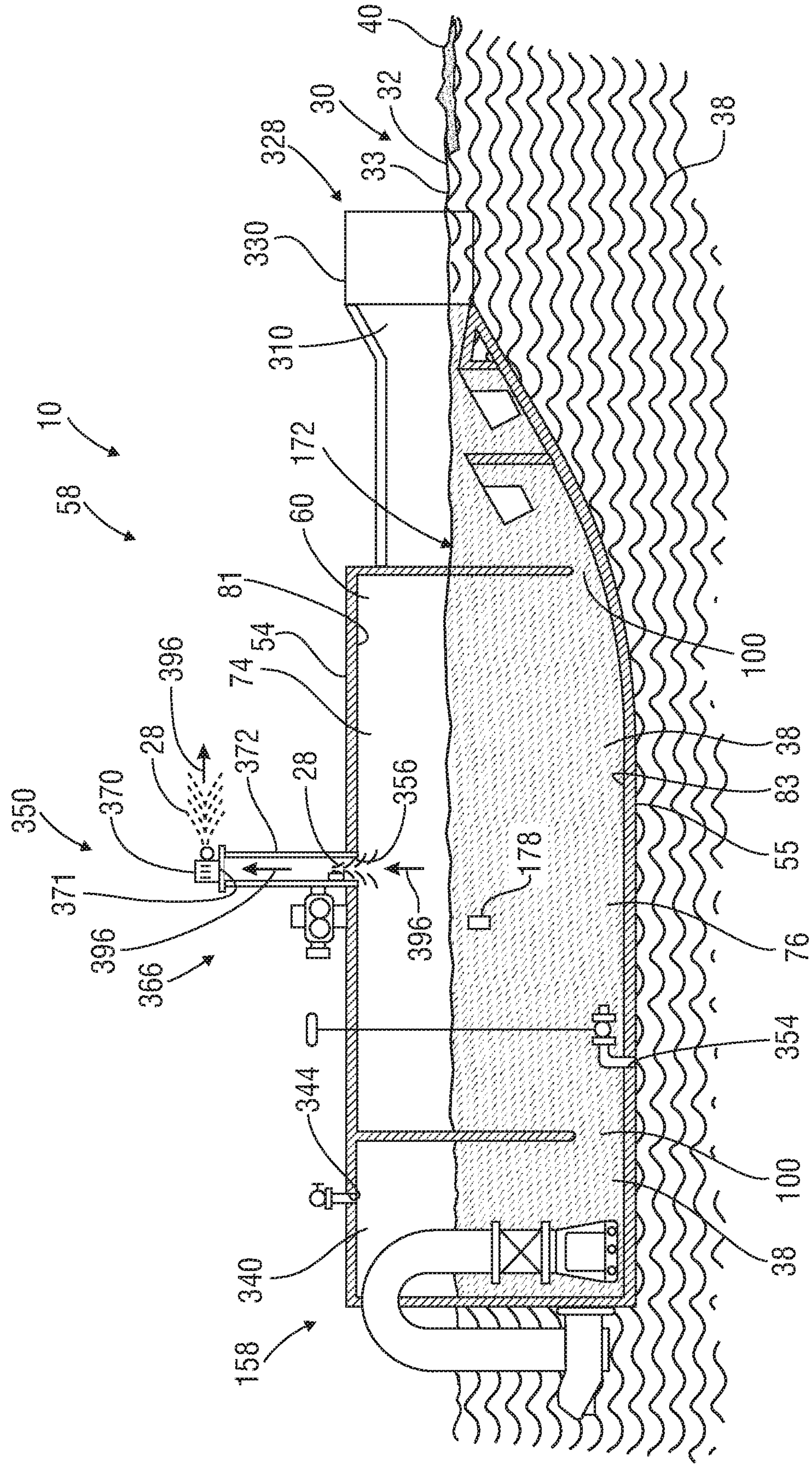
FIG. 44 is partial cross-sectional, side view of the exemplary vessel of FIG. 41 and the exemplary debris recovery system at the end of free-flooding and the beginning of air evacuation of the exemplary cargo compartment in accordance with an embodiment of the present disclosure.

Referring now to FIG. 44, in this embodiment, the exemplary cargo compartment 60 is shown passively free-flooded with sea water 38 to the desired level (e.g. sea level 33) and above the passageways 100 to the compartment 60. The exemplary suction chamber vent 344 is typically closed and, if the vessel includes one or more front door(s) 328 (e.g. gates 330), one or all doors 328 are typically opened. Gas may then be evacuated from the exemplary cargo compartment 60 (e.g. at or near its upper end 74), such as described above, to help provide a sealed liquid system and form ideal conditions for the removal of debris from the compartment 60 during debris recovery operations, for any other purpose or a combination thereof. In this embodiment, the vacuum pump 370 is turned on to remove gases from the compartment 60 (e.g. arrows 396) until sea water 38 in the cargo compartment 60 rises to the desired level (e.g. above the inlet 382 to the debris pump 380, FIG. 45). (The exemplary flooding port(s) 354 may be open or closed during air evacuation of the cargo compartment 60 depending upon operator preference or any other variable(s)).

However, any other method of and components for evacuating air/gas from the cargo compartment 60 or otherwise at least substantially flooding or filling the compartment 60 with liquid may be used. For example, in the embodiment of FIG. 47, one or more fluid pumps 376 may be used to actively flood the cargo compartment 60 (e.g. with sea water 38) to the desired level (e.g. completely). In such instance, it may be necessary or desirable to open the discharge port(s) 356 (e.g. with valve 362) during flooding to allow the air and any other gases in the compartment 60 to be vented or pushed out and temporarily block the passageway(s) 100 to the cargo compartment 60 (such as with one or more moveable doors (e.g. gates 110)) and/or the intake opening(s) 102 (e.g. with doors 328) and/or close the suction chamber vent 344, such as to fill the compartment 60 with sea water 38 to the desired height. In this embodiment, the cargo compartment 60 is flooded until sea water 38 in the cargo compartment 60 rises to the desired level (e.g. above the inlet 382 to the debris pump 380 (or an alternate location 382*a* thereof), to the upper wall 81 or any other height).

Figure 45:
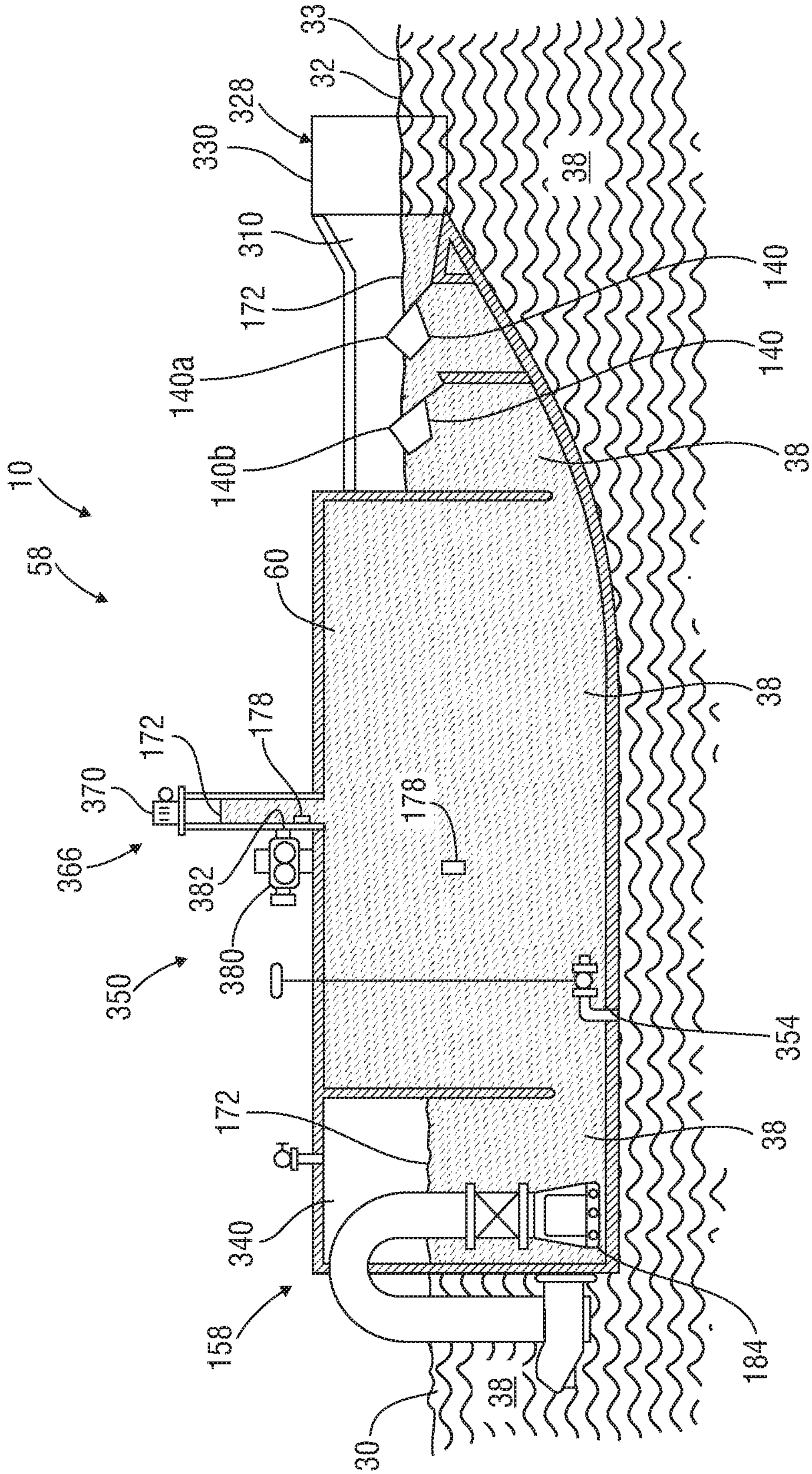
FIG. 45 is partial cross-sectional, side view of the exemplary vessel of FIG. 41 and the exemplary debris recovery system at the end of air evacuation of the exemplary cargo compartment in accordance with an embodiment of the present disclosure.

Referring now to FIG. 45, after the exemplary cargo compartment 60 has been flooded and evacuated of air/gases as desired, the flooding port 354 (if left open) may be closed, the vacuum pump 370, fluid pump 376 (e.g. FIG. 47), or other air evacuator 366 may be turned off and all doors (e.g. front door 328 to the vessel 10 and gates 110 (FIG. 47)) to the cargo compartment 60 are opened. In this embodiment, the exemplary discharge pumps 184 and the inlet 382 to the illustrated debris pump 380 are sufficiently submersed in sea water 38 (e.g. to help provide a sealed liquid system and/or for any other purposes). The exemplary vessel 10 is situated in the body of water 30 at a height so that the IFRs 140 are floating in sea water 38 in the inflow chamber 310 as desired and the exemplary debris recovery system 58 is ready for (e.g. continuous) debris recovery, separation and off-loading operations, such as described above.

Referring now to FIG. 46, during debris recovery operations, any among the position, location and transit velocity of the exemplary vessel 10, suction pressure of the discharge pumps 184, off-loading of debris through the debris pump(s) 380 and position/buoyancy of the IFRs 140 may be adjusted (e.g. dynamically and in real-time), such as described above (e.g. based upon one or more controllable and/or non-controllable variables), such as to optimize the intake resistance of the IFRs 140, optimize the efficiency and effectiveness of debris recovery, other purpose of a combination thereof. In this embodiment, the exemplary discharge pump(s) 184 may be actuated as desired to concurrently (i) draw in (at least primarily) sea water 38 from the cargo compartment 60 (e.g. arrow 392) and discharge it to the body of water 30 (e.g. arrow 414), (ii) draw debris (and typically some water) from the body of water 30, through the intake opening 102, into the inflow chamber 310 and over the IFRs 140 (e.g. arrows 394) and (iii) draw primarily debris over the front edge 142 of the rear IFR 140*d* and (e.g. steeply) down into and through the passageway 100 (e.g. arrows 394*a*, 394*b*) from the inflow chamber 310 to the compartment 60. In many situations, this suction of the exemplary discharge pump(s) 184 and other variables will effectively, and possibly only slightly but importantly, lower the front edge 142 of the rear IFR 140*d* and level 172 of debris/sea water in the inflow chamber 310 rearward of the rear IFR 140*d* and cause or allow debris to rush or rapidly cascade over the rear IFR 140*d* and down into the cargo compartment 60, essentially separating the debris from the sea water and not mixing or emulsifying them together. Depending upon the level of debris 40 in the exemplary cargo compartment 60 (e.g. as indicated by one or more sensors 178 or otherwise), the exemplary debris pump(s) 380 may be actuated to remove debris from the cargo compartment 60 (e.g. arrows 416) and offload it (e.g. arrow 418) to another vessel or any other desired destination, such as described above. Thus, in this embodiment, as long as debris in the cargo compartment 60 is at or above a desired level and the exemplary debris pump 380 is coupled to a debris delivery destination (e.g. barge, storage bladder, etc.) with available storage capacity, debris can be continuously recovered, separated and off-loaded from the vessel 10. The movement and velocity of the exemplary vessel 10, buoyancy of one or more IFRs 140 and suction pressure of the exemplary discharge pump(s) 184 may be varied as desired (e.g. for one or more reasons such as described above, on an on-going real-time basis) throughout debris recovery operations.

Figure 50:
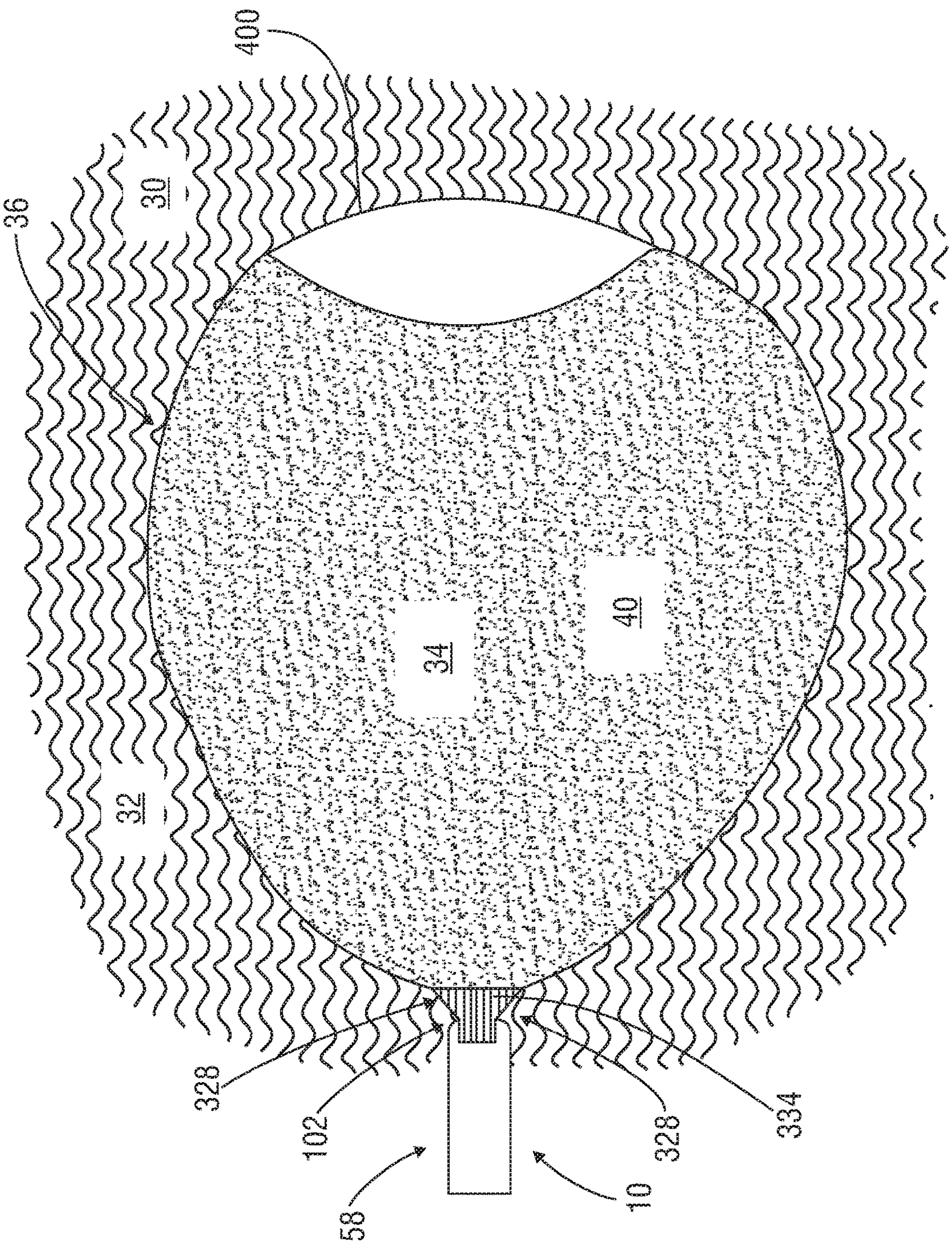
FIG. 50 is a top view of the exemplary vessel of FIG. 48 and equipped with an exemplary debris containment boom coupled to the exemplary front doors of the vessel and surrounding an exemplary debris field in accordance with an embodiment of the present disclosure.

Referring again to FIGS. 41-51 the exemplary vessel 10 may collect debris in a variety of modes. For example, in some situations, the vessel 10 can be positioned stationary during debris recovery operations (e.g. in still, or relatively still, water). Referring to FIG. 50, if desired, one or more debris (e.g. oil) containment booms 400 may be used to increase the efficiency, speed and/or effectiveness of debris recovery operations. The containment boom 400 may have any suitable form, quantity, size, configuration, construction, precise location, orientation and operation. Typical commercially available oil containment booms, for example, are constructed at least partially of flexible (e.g. vinyl) material and configured to extend partially above and partially below the surface 32 of the body of water 30 (e.g. with flotation foam and weighted chain or cable). For example, the containment boom 400 may be coupled at one end to one of the exemplary doors 328 (e.g. at the forward-most point of the door) of the debris recovery system 58, around one or more patches of debris (e.g. oil) and coupled, at its other end, to the other door 328 (e.g. at the forward-most point of the door). As debris is collected on the exemplary vessel 10 and/or the debris on or near the surface of the body of water 30 begins to thin, the containment boom(s) 400 can be drawn in a tighter area, drawing the debris patch as it decreases in volume closer to the intake opening 102.

Figure 51:
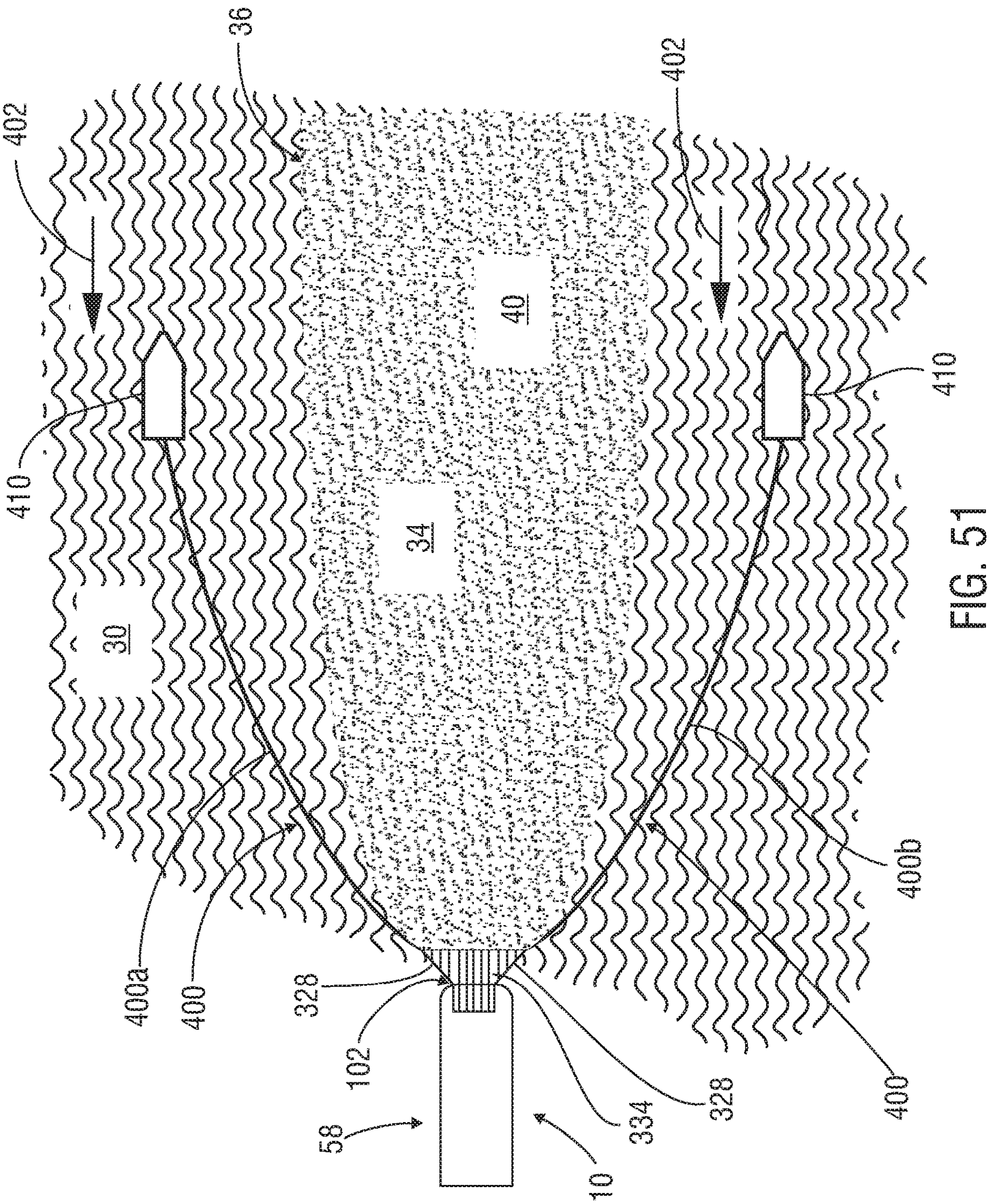
FIG. 51 is a top view of the exemplary vessel of FIG. 48 and equipped with two debris containment booms coupled to the exemplary front doors of the vessel and a pair of exemplary assist vessels in accordance with an embodiment of the present disclosure.

Now referring to FIG. 51, in a river, or other flowing body of water 30, the exemplary vessel 10 may, in some instances, be positioned downstream of one or more debris field 36 and the vessel 10 facing upstream. Arrows 402 indicate the flow of the current. If desired, one end of first and second containment booms 400*a*, 400*b* may be coupled to one of the doors 328 (e.g. at the forward-most point thereof) respectively, and the containment booms 400*a*, 400*b* extended outwardly therefrom (e.g. to near the shore line) around the debris field(s) 36. For example, the other ends of the respective containment booms 400*a*, 400*b* may be coupled to a respective assist vessel 410 (e.g. adjacent to or upstream of the vessel 10). In this exemplary mode of operation, the vessel 10 may be moving, stationary or alternate therebetween to stay with the floating debris, optimize debris recovery operations, etc. Depending on one or more variables, such as the velocity of the current and the size of the debris field 36, for example, the exemplary vessel 10 may drift almost freely with the current, be propelled downstream at a higher rate than the current, or moved in a forward direction so that it moves upstream against the current, as desired, in order to stay with the debris field 36 (e.g. at or near its forward edge) and, at the same time, strive to continuously recover debris. With the exemplary debris recovery system 58 (having the ability to offload debris to one or more accompanying transport vessel, barge or other destination and other capabilities such as described herein), the vessel 10 may be capable of staying with the moving debris field and recover, separate and dispose of debris without interruption, collecting greater quantities (or virtually all) of the debris on the moving water as compared to other known techniques and regardless of the size of the debris field and volume of debris.

Referring back to FIGS. 41-47, whenever sea water is drawn into the exemplary vessel 10 (without debris) by the suction of the discharge pump(s) 184, the pumps 184 will pump out the ingested sea water 38 without inhibiting other operations. Because debris (e.g. oil) and sea water recovered during typical operations with the exemplary debris recovery system 58 is not (further) emulsified on the vessel 10 and the debris recovery system 58 can typically discharge (at least substantially) all of the sea water 38 it takes in, the operation of the vessel 10 and debris recovery system 58 of various embodiments is not affected by travelling though areas where no debris exists between disconnected patches of debris, allowing for the collection of debris immediately upon reaching the debris field(s) 36 and without the need for taking the time to deploy or use any containment booms 400. Accordingly, in modes of use of the exemplary debris recovery system 58 in one or more debris fields 36 that include multiple discontinuous or disconnected debris patches (or the debris field is broken up due to weather or other causes), the exemplary vessel 10 of various embodiments can transit, or be moved, throughout the greater area and provide continuous debris recovery without delay or interruption and without the need to deploy debris containment booms 400.

It should be noted that variations of the embodiments of FIGS. 41-51 may include more, fewer or different components, features and capabilities as those described or shown herein. Further, any of the details, features, components, variations and capabilities of other embodiments discussed or shown in this patent or as may be apparent from the description and drawings thereof, are applicable to the embodiments of FIGS. 41-51, except and only to the extent they may be incompatible with any features, details, components, variations or capabilities of the embodiments of FIGS. 41-51. Accordingly, other than with respect to any such exceptions, all of the details and description provided in this patent with respect to the other embodiments or as may be shown in the appended drawings relating thereto or which may be apparent therefrom, are hereby incorporated by reference herein in their entireties with respect to the embodiments of FIGS. 41-51.

Figure 52:
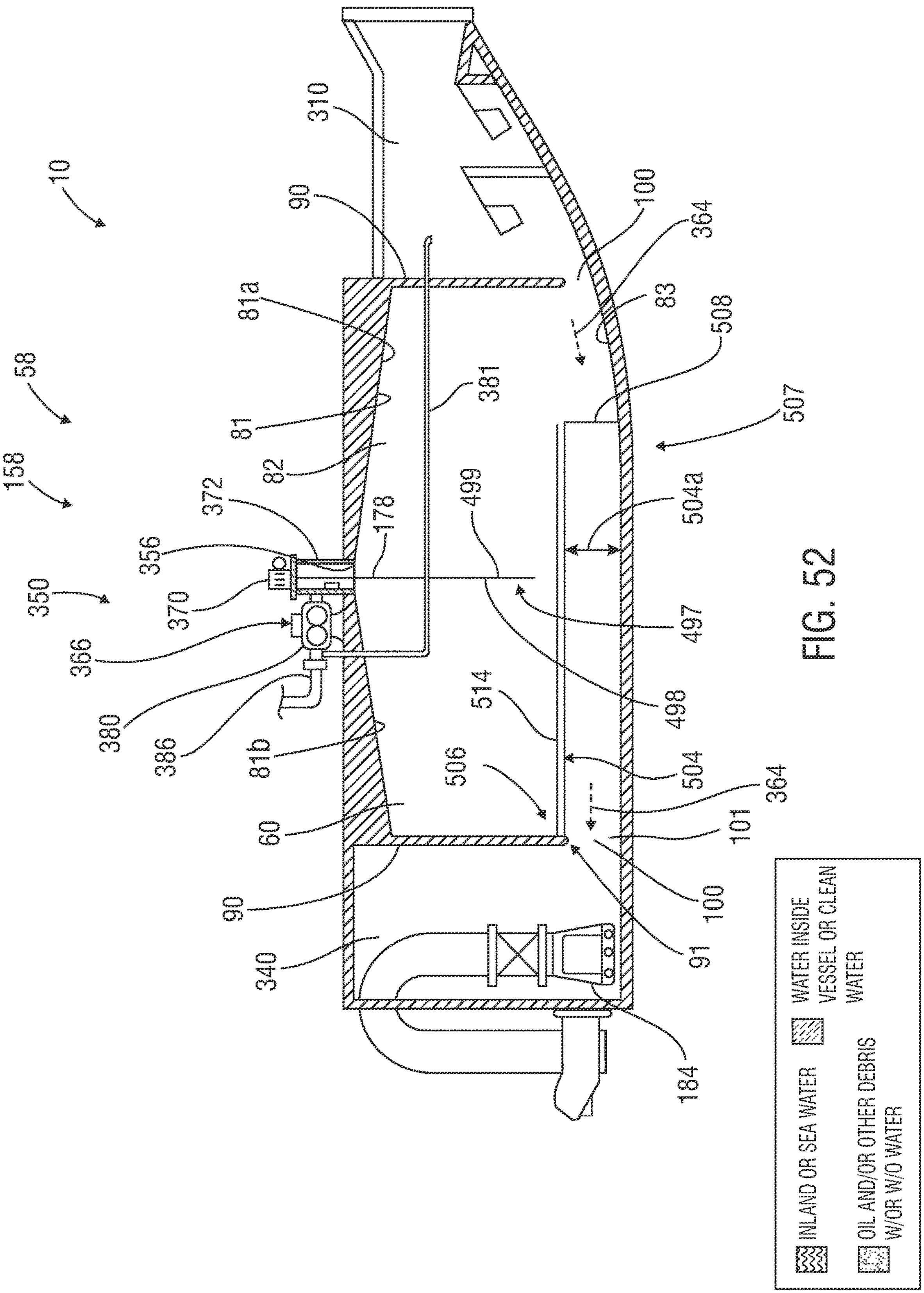
FIG. 52 is partial cross-sectional, side view of an exemplary waterborne vessel having an exemplary suction diffuser plate and associated exemplary filter in accordance with at least one embodiment of the present disclosure.

Referring now to FIG. 52, the exemplary cargo compartment 60 (and/or other components) may be designed and/or sized to help guide or encourage the flow of debris (e.g. oil) 34 (e.g. FIG. 55) into the discharge port(s) 356 and/or vertical trunk 372, prevent debris 34 from becoming trapped in an upper corner (or at other locations) of the chamber 60, encourage the separation of debris 34 from water 38, the rising of debris 34 away from the discharge pump(s) 184 or the removal of virtually all debris 34 in the chamber 60 (e.g. via the debris pump(s) 380), discourage mixing or emulsification of water 38 and debris 34, for any other purposes or a combination thereof. For example, the upper wall 81 of the cargo compartment 60 may slope upwardly to contribute to one or more such purpose. When this feature is included, the exemplary upper wall 81 may slope upwardly in any desired manner and with any suitable components. In this embodiment, the upper wall 81 has an inverted-funnel shape, sloping similarly upwardly from each side wall 82 (e.g. FIG. 53) and vertical wall 90 bordering the upper wall 81. If desired, the discharge port 356 may be at, or near, dead-center of the cargo compartment 60 with the upper wall 81 sloping downwardly therefrom around it's perimeter and/or the discharge port 356 may sit at the crest of the upper wall

81. In some cases, one or more portions (e.g. sides 81*a*, 81*b*) of the upper wall 81 may have differing pitches, lengths or other attributes. In various embodiments, one or more side walls 82 (e.g. FIG. 53) and/or vertical walls 90 may also, or instead be sloped inwardly toward the discharge port(s) 356. However, any other arrangement may be used (e.g. one or more discharge ports 356 are not dead center.)

For another example, one or more intermediate walls, or other partial barriers, such as an enclosure or compartment containing the vessel engine or other equipment, (not shown) may extend into or occupy part of the cargo compartment 60 and contribute to one or more of the above purposes (e.g. discourage mixing or emulsification of water 38 and debris 34), such as by slowing the flow of water 38 and debris 34 in the compartment 60. For yet another example, the height, length or width of the cargo compartment 60 and/or vertical trunk 372 (when included) can be designed or varied to help achieve one or more of the stated objectives, such as by allowing more space for debris 34 to rise and/or separate from water 38. If desired, the vertical trunk 372 may be particularly shaped and/or configured (e.g. L-shaped, formed with a tall height or a wide, sloped or inverted-funnel shaped mouth) to achieve one or more such purposes, such as by providing increased space therein to allow a maximum volume of debris and minimal volume of water to be removed (e.g. via the debris pump(s) 380) and/or allow water 38 to drain off and leave primarily or only (e.g. highly concentrated) debris 34 therein. However, any additional or different features may be provided to contribute to the desired objectives.

Referring still to FIG. 52, in a different independent aspect of the present disclosure, in some embodiments, when included, the sensor(s) 178 may include one or more water sensors 497 that detect water in the compartment 60. The water sensor(s) 497 may be used, for example, to determine the height of the top of water in the collection chamber 60 (e.g. whether air, oil and other types of debris is present). If desired, the water sensor 497 can help verify whether the chamber 60 is effectively exhausted of air (e.g. that the vacuum is working during initial filling of the chamber 60), determine the height and amount of oil (and/or other debris) 34 accumulating in the chamber 60 during collection operations, for any other purposes or a combination thereof. In some embodiments, the water sensor 497 may be useful to take readings on an on-going or on-demand basis, such as to help determine with some precision when to vary one or more controllable variable and/or begin and cease debris removal from the chamber 60 (e.g. so that minimal water enters the discharge port 356), reducing the volume of overall waste output of the debris recovery system 58 and the energy, effort and time necessary to transport, store and process it, thus improving efficiency of the debris collection operations.

The water sensor(s) 497 may have any suitable form, components, construction, location and operation. The illustrated water sensor 497 is a guided wave radar level sensor 498. In this embodiment, the guided wave radar level sensor 498 reads the elevation of the "top of water" relative to the height of the collection chamber 60. For example, the guided wave radar level sensor 498 may be installed at the top of the vertical trunk 372 (or other location) with its elongated probe 499 extending down into the cargo compartment 60 to a desired depth (e.g. proximate to the bottom 83, at a desired height above the rear passageway 100 or elsewhere). One presently available exemplary guided wave radar level sensor 498 is the VEGAFLEX 81, 4 . . . 20 mA/HART, two-wire, rod and cable probe and TDR sensor for continuous level and interface liquid measurement by VEGA Grieshaber KG (www.vega.com). If desired, VEGA's VEGADIS 81 external, digital display and adjustment unit may be used with it. However, any number of these and/or other types of sensors 178 (e.g. oily water sensors 180, gas or air sensors, multi-medium sensors) or techniques may be used to help determine, measure or gage the nature, height, location or volume of the contents of the cargo compartment 60.

Still referring to FIG. 52, in yet another independent aspect of the present disclosure, as mentioned above, one or more debris pumps 380 may be used to create and/or maintain a vacuum on the collection chamber 60. In this embodiment, the debris pump 380 (e.g. rotary lobe pump) is useful to create a vacuum in the chamber 60 and a separate vacuum pump 370 (e.g. diaphragm pump) is useful to maintain the vacuum if necessary. If desired, the air (and any water and/or debris) that may be drawn from the collection chamber 60 during the vacuum process may be directed to a desired location. For example, one or more return lines 381 may be provided between the debris pump 380 (and/or vacuum pump 370) and the inflow chamber 310 (or other location), such as to vent the air to atmosphere and, at the same time, recirculate any contaminated water and debris extracted with the air into the debris recovery system 58 (e.g. reducing the possibly of discharging the contaminated water and debris to the environment).

In this embodiment, the debris pump 380 (and/or other components) may include fittings for at least one return line 381 and at least one debris disposal hose 386, both fluidly coupled to one or more valves (not shown) to allow selection of the desired path. For example, when pulling the vacuum on the exemplary cargo compartment 60, the first sign of water (debris or other substances or materials) in, or exiting from, the return line 381 may provide verification that all air has been extracted from the compartment 60, a sealed liquid system has been established and debris separation operations may commence. The exemplary return line 381 may then be closed and the debris pump 380 used to remove debris from the collection chamber 60. However, any other configuration of components and techniques may be used to direct the output of the debris pump(s) 380 (or other components) during or after the creation or maintenance of a vacuum in the cargo compartment 60, help determine when a sealed liquid system has been established and/or debris separation operations may commence or for any other purpose, if such features are included.

Figure 53:
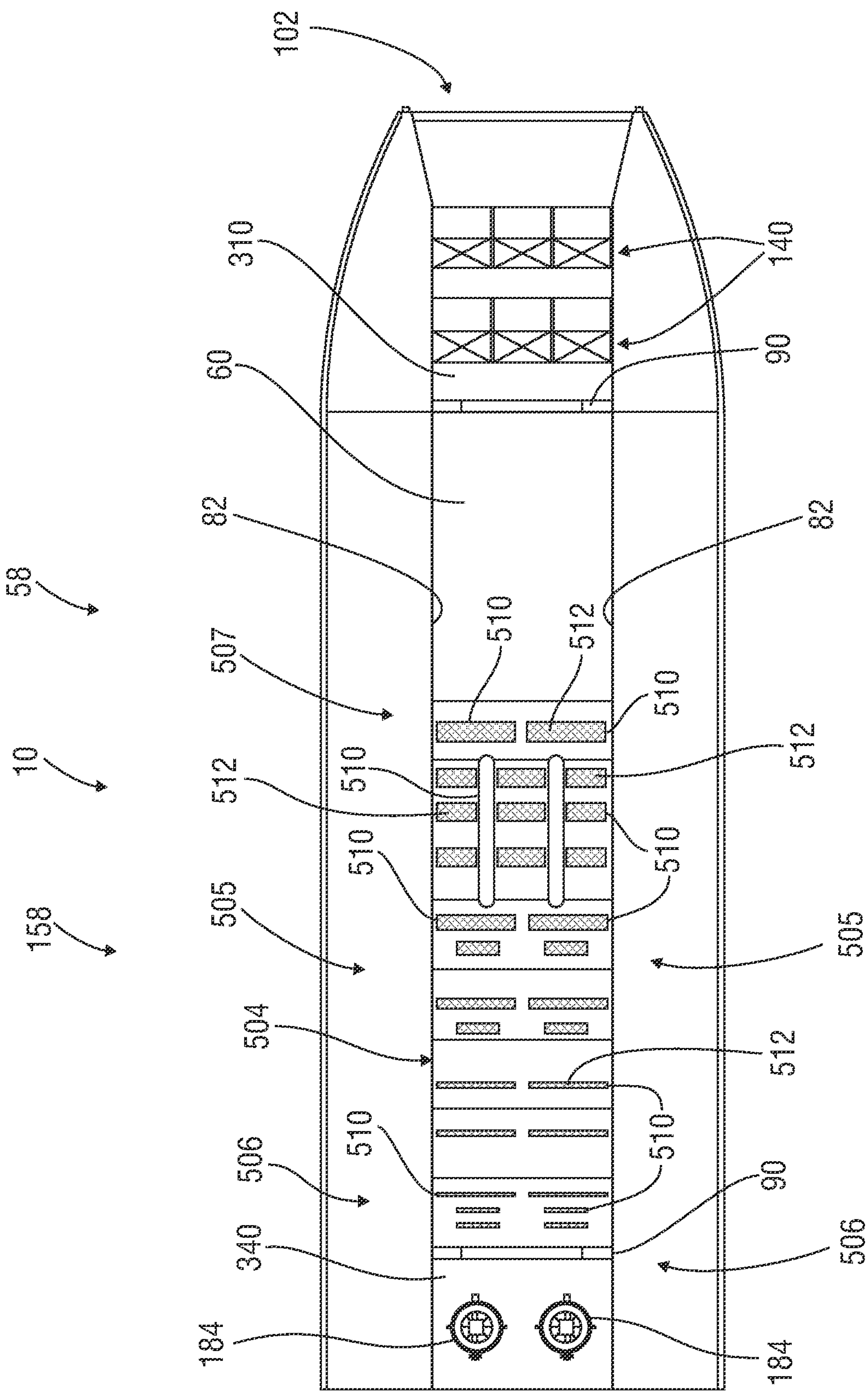
FIG. 53 is a top view of the vessel of FIG. 52 with the exemplary filter removed.

Referring now to FIGS. 52 & 53, in a further independent aspect of the present disclosure, in some embodiments, the velocity of liquid/debris moving within the collection chamber 60, turbulence therein and/or other variables could inadvertently allow or cause debris to be drawn into the discharge pump(s) 184 and/or suction chamber(s) 340. In some instances, this may occur when the vessel 10 is moving and/or the discharge pump(s) 184 are operating at high speed during debris collection, or at other times. For example, strong suction of the exemplary discharge pump(s) 184 could effectively cause a quasi-current of water and debris (e.g. arrows 364) to flow across the bottom 83 of the cargo compartment 60 (e.g. extending from the front passageway(s) 100 entering the chamber 60 at the inflow chamber 310 to the pump(s) 184). It may therefore be desirable to help prevent (e.g. any or more than minimal) debris from entering the discharge pump(s) 184 and/or suction chamber(s) 340 during debris collection, recovery or processing operations.

Any suitable components and techniques may be used to help prevent debris from entering the exemplary discharge pump(s) 184 and/or suction chamber(s) 340, such as by encouraging only water flow to the pump(s) 184, help slow or calm the velocity of liquid/debris moving through the chamber(s) toward the pump(s) 184, prevent formation of a current (e.g. arrows 364), reduce downward flow and encourage upward flow of debris in the chamber(s), help lessen turbulence and the potential for emulsification of debris and water therein or a combination thereof. For example, one or more barriers may be positioned or selectively positionable in that flow path 364, such as one or more intermediate walls (not shown) and/or enclosures or compartments containing the vessel engine or other equipment (not shown) extending up from the bottom 83 of the compartment 60 or otherwise into the flow path 364.

Still referring to FIGS. 52 & 53, for another example, one or more suction diffuser plates 504 (and/or other components) may be provided in one or more chambers (e.g. chambers 60, 120, 310, 340, 466 (e.g. FIG. 87)) forward of the discharge pumps 184. In this embodiment, a suction diffuser plate 504 is provided in the cargo compartment 60 proximate to and spaced upwardly from the bottom 83 thereof and forward of the suction chamber 340. For example, the suction diffuser plate 504 may be secured (e.g. via bolts, welding, etc.) on its sides 505 to the side walls 82 (or other components) of the chamber 60 and similarly secured at its rear end 506 to the rear vertical wall 90 (or other components). The illustrated suction diffuser plate 504 may engage, be coupled to or extend from the wall 90 at or near the lower end 91 of the wall 90, such as to ensure everything entering the suction chamber 340 and/or discharge pump(s) 184 must pass through the suction diffuser plate 504, position the plate 504 over the passageway 100 formed below the rear wall 90, allow maximum space above the plate 504 in the chamber 60 (for debris to fill), for any other purpose(s) or a combination thereof.

In some embodiments, the suction diffuser plate 504 may extend across a large area of the chamber 60 to assist in reducing the velocity and thus calming the flow water/debris moving through the chamber 60 (e.g. across flow path 364), equalizing water/debris flow across the desired length of the chamber 60, reducing emulsification, for any other purposes or a combination thereof. For example, the plate 504 may extend across approximately the entire width, and approximately ⅗ the entire length, of the chamber 30. In other embodiments, one or more plates 504 may extend across any other portion(s) of any chamber, such as across less than the entire width (e.g. ⅓, ¼, ½, ¾, ⅗, etc.), or across more or less than ⅗ the entire length (e.g. ¼, ⅓, ½, ⅔, ¾, ⅘, etc.), of the subject chamber(s) and be secured, positioned and arranged in the debris recovery system 58 in any other suitable manner. For example, multiple suction diffuser plates 504 may be piggybacked together, side-by-side or spaced-apart in the desired chamber(s).

Referring still to FIGS. 52 & 53, when included, the suction diffuser plate 504 may have any suitable form, configuration, construction, components and operation. In this embodiment, the suction diffuser plate 504 is constructed of aluminum and at least substantially flat, but could be constructed of any other material(s) and not be flat (e.g. curved, wavy, etc.). The illustrated suction diffuser plate 504 includes a series of fluid flow opening, or perforations, 510 formed therein to allow primarily or only water to flow therethrough. The perforations 510 may have any form, configuration, location, pattern, spacing and size. For example, some or all of the perforations 510 may be open or include texture 512 (e.g. mesh, fabric, grill) extending at least partially thereacross. The illustrated perforations 510 are shown each having a mesh-like texture 512 extending thereacross, such as to help prevent debris for passing therethrough and/or for any other purposes.

In some embodiments, the total combined open area of all the perforations 510 in the suction diffuser plate 504 may be greater than the space 101 below the lower end 91 of the rear vertical wall 90 by any desired multiple (e.g. 5-10×). This may, for example, cause the effect of dispersing out and increasing the size of the inlet(s) to the suction chamber 340 and/or discharge pump(s) 184, helping reduce turbulence and the velocity of flow into the suction chamber 340 and/or discharge pump(s) 184. If desired, the perforations 510 may be formed in the plate 504 in a specific pattern and/or configuration to help equalize, or balance, the flow of water through and below the suction diffuser plate 504 during operations and/or for any other purposes. In this embodiment, greater restriction on the flow of water through the plate 504 is provided (e.g. via smaller sized perforations 510 and/or wider spaces therebetween) closer to the discharge pumps 184 where the suction may be the strongest, while fluid flow restriction is continually reduced along the length of the plate 504 (as the perforations 510 increase in size and are spaced closer and closer together) from its rear end 506 to its front end 507, where suction pressure from the discharge pumps 184 should be weakest. However, the suction diffuser plate 504 may have any other arrangement of perforations 510 and/or other features.

Still referring to FIGS. 52 & 53, any gap(s) 504*a* between the suction diffuser plate(s) 504 and the bottom 83 of the chamber 60 (or other components) may be at least partially blocked, such as to block the path 364, help decrease the velocity of the water/debris drawn across the chamber 60 toward the discharge pump(s) 184, create a non-direct, or tortuous path of the incoming water/debris, force up any debris moving along the bottom 83 of the chamber 60, prevent inflowing debris from being sucked (e.g. directly across the bottom 83 of the chamber 60) into the discharge pump(s) 184, for any other purposes or a combination thereof. In this embodiment, the entire gap 504*a* is blocked by one or more face plates 508.

When included, the face plate 508 may have any suitable form, configuration and location. For example, the face plate 508 may be a non-perforated, downwardly extending part of the suction diffuser plate 504 or a separate component. In this embodiment, the face plate 508 extends between the suction diffuser plate 504 (e.g. at its front end 507) and the bottom 83 of the chamber 60. For example, the face plate 508 may be integral with the suction diffuser plate 504 or bottom 83 of the chamber 60 or be coupled thereto (e.g. with bolts, rivets, weld, epoxy, etc.). However, the face plate 508 may have a different configuration (e.g. partially perforated) and be associated with these or any other components in any manner. Moreover, the gap 504*a* may be fully, or only partially blocked, at any desired locations (e.g. at the rear end 506, or one or more mid-points, of the suction diffuser plate 504) and in any suitable manner. For example, at or proximate to its front end 507, the suction diffuser plate 504 may instead abut or be coupled to a partial vertical wall (see e.g. wall 90*a*, FIG. 88) provided in the inflow chamber 466 or elsewhere.

Figure 54:
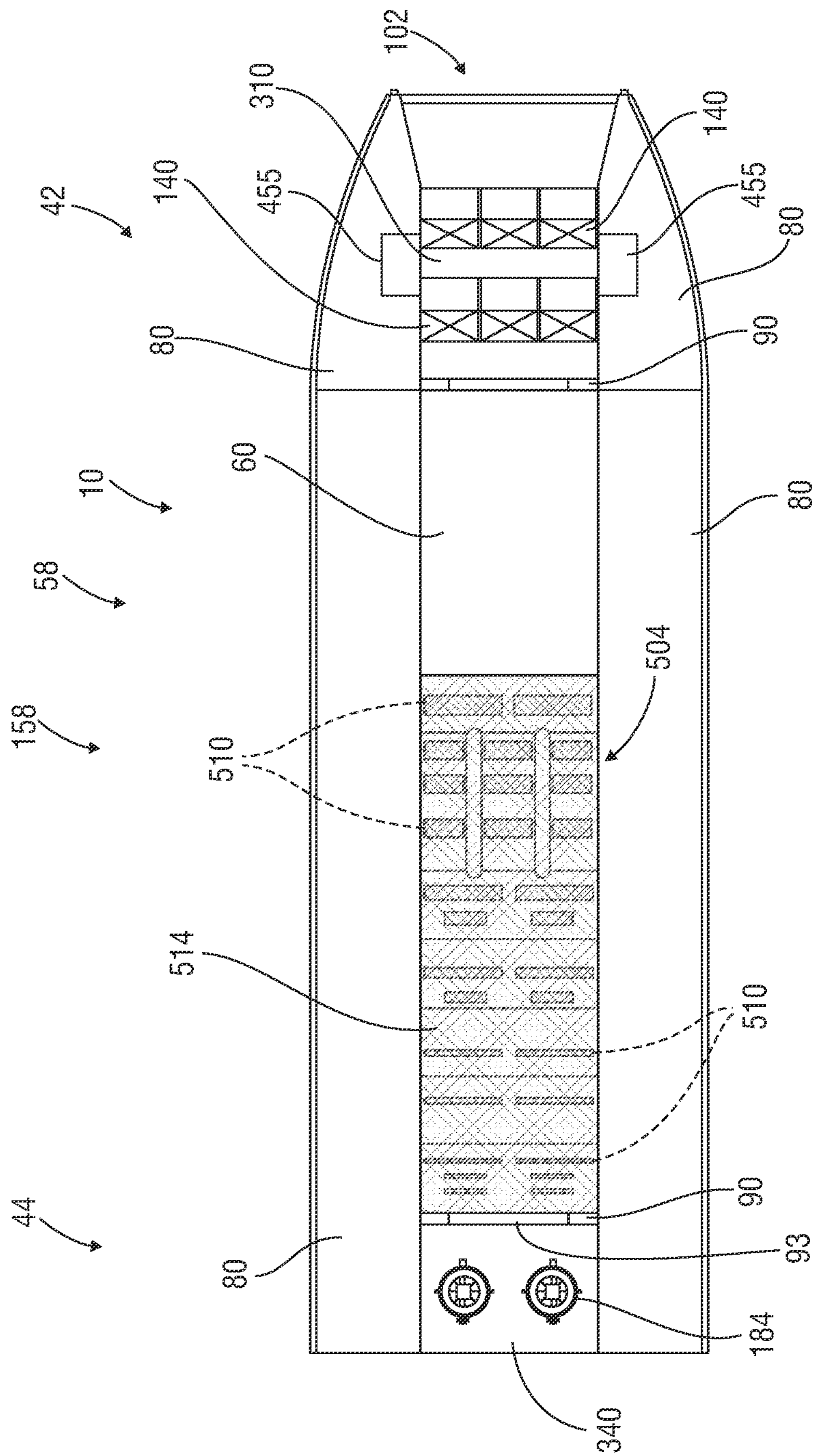
FIG. 54 is a top view of the vessel of FIG. 52.

Referring now to FIGS. 52 & 54, if desired, the debris recovery system 58 may include one or more filters 514 to help prevent any, or more than minimal, debris from entering the discharge pump(s) 184 and/or suction chamber(s) 340, for any other purposes or a combination thereof. When included, the filters 514 may have any suitable form, configuration, construction, location and operation. For example, one or more (e.g. removable) filters 514 may be piggybacked on top of the suction diffuser plate(s) 504, spaced apart therefrom or otherwise positioned above or below one or more perforations 510 therein. In the present embodiment, the filter 514 is an oil membrane filter (e.g. Oil Shark® Style SK400 Oleophilic Fabric Polyamide (Nylon 6,6) by Cerex Advanced Fabrics, Inc.) framed within, or attached to, one or more metal panels installed across the top of the suction diffuser plate 504. For another example, any suitable (e.g. cloth) filter may be stretched across the top of the suction diffuser plate(s) 504 and coupled thereto or to any other component(s) as desired.

In some embodiments, the filter(s) 514 may be (e.g. slightly) raised above the plate 504, such as to maximize flow of water through the filter 514, help prevent clogging of the perforations 510, for any other purposes or a combination thereof. In other embodiments, additional and/or different types of filters 514 may be strategically placed at any desired locations in the debris recovery system 58.

Figure 55:
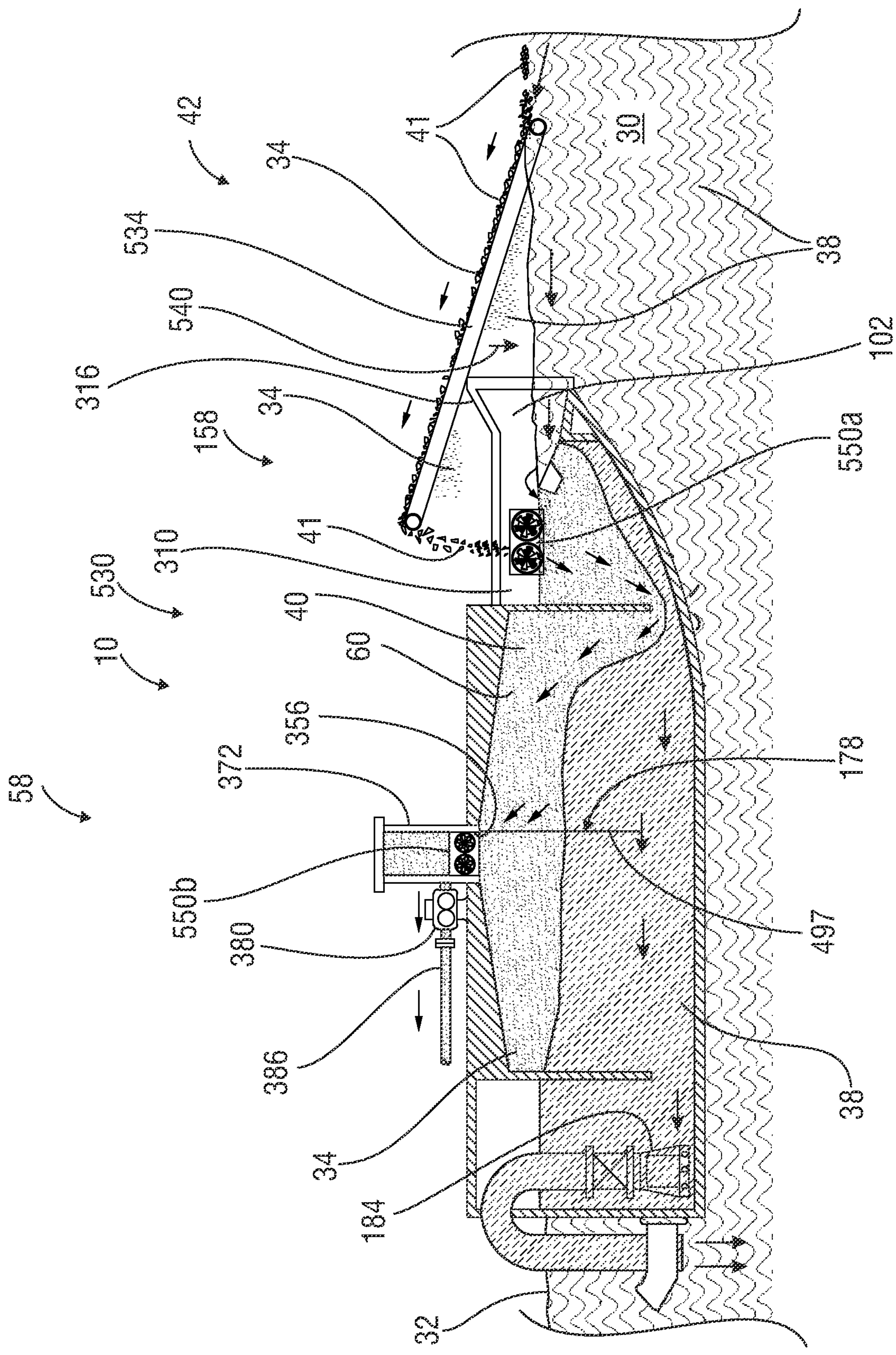
FIG. 55 is partial cross-sectional, side view of an exemplary waterborne vessel having an exemplary debris separation system in accordance with at least one embodiment of the present disclosure.
Figure 56:
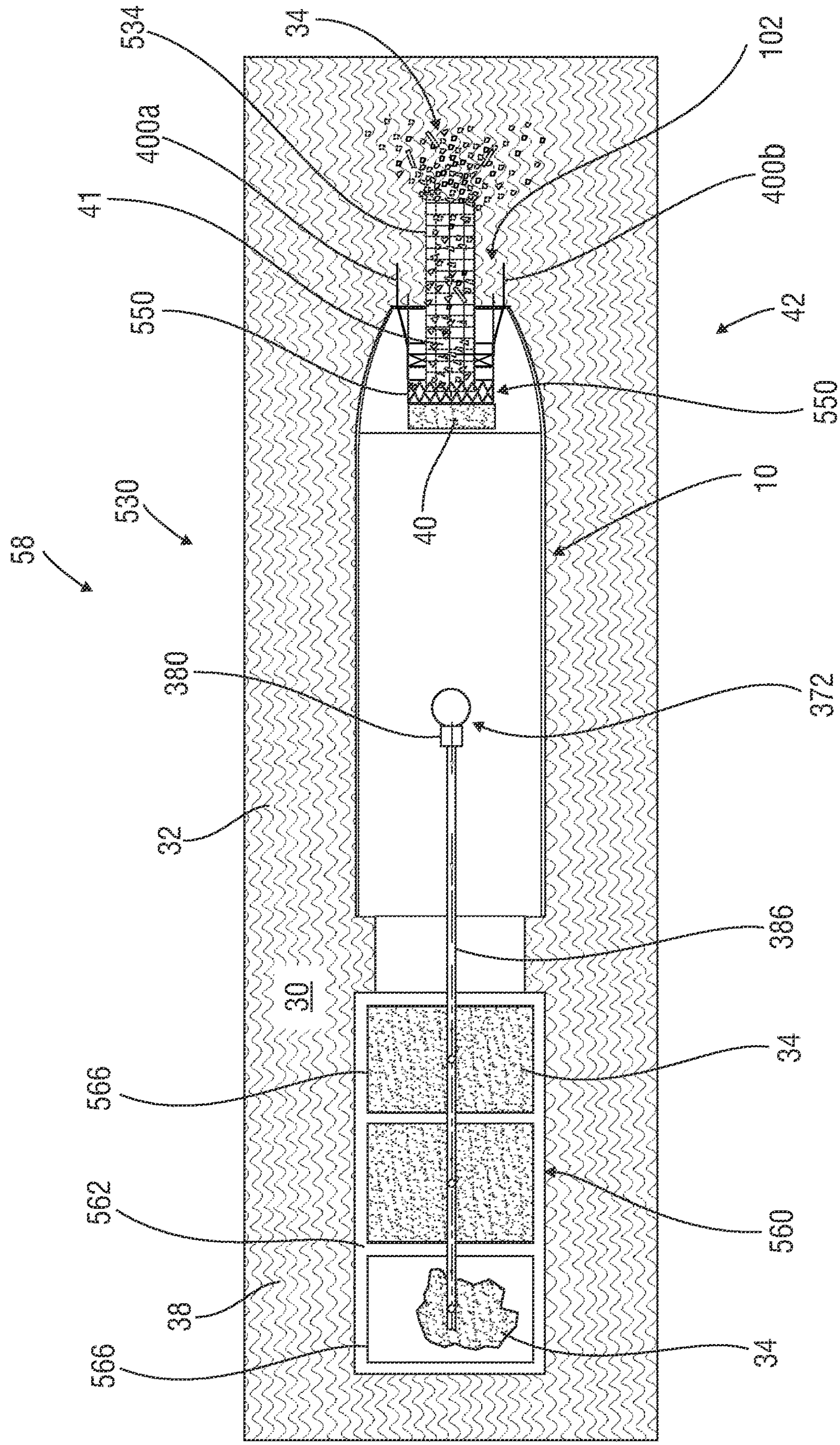
FIG. 56 is a top view of an exemplary waterborne vessel having an exemplary debris separation system and debris transport barge in accordance with at least one embodiment of the present disclosure.

Referring now to FIGS. 55 & 56, in another independent aspect of the present disclosure, the debris recovery system 58 may include one or more floating debris processing systems 530 useful to at least partially process debris 36 recovered during operations. In some embodiments, the floating debris processing system 530 may be configured to reduce the size of larger incoming floating debris 36 so that, when fragmented, it can flow through the debris recovery system 58. For example, one or more components of the system 58 may be limited by the size of debris it can process, such as the debris pump(s) 380 (e.g. limited to processing small-sized solid debris up to 1.00" or 1.50" sized particles or more or less). For another example, a heavy concentration, or a sludge or slurry mixture, of larger debris and some water, may accumulate in and potentially clog one or more spaces or components (e.g. vertical trunk 372) in the debris recovery system 58. Accordingly, the ability to handle larger-sized, floating debris (by reducing its size) and thus process a greater volume of debris can expand types of debris that can be handled and the scope and effectiveness of debris collection operations.

When included, the floating debris processing system 530 may be configured reduce the size of incoming debris in any manner and with any suitable components. For example, one or more debris conveyors 534 (e.g. conveyor belt) may extend (or be extendable) from, or over, the front 42 of the vessel 10 and into the body of water 30 forward, or in the path, of one or more intake openings 102. When included, the conveyor(s) 534 may have any suitable form, construction, configuration and operation. In this embodiment, the conveyor 534 can be positioned to dip below the surface 32 of the body of water 30 directly forward of the intake opening 102 and generally in the path of the water/floating debris being drawn into the vessel 10 (e.g. inflow chamber 310). Thus, at least some of the water 38 and floating debris 34 coming into the vessel 10 should encounter the exemplary conveyor 534 and, when the conveyor 534 is turned on, will be drawn up onto it and conveyed to one or more destinations (e.g. debris processor 550).

Still referring to FIGS. 55 & 56, the exemplary conveyor 534 may be coupled to the vessel 10 and operable in any suitable manner. For example, the conveyor 534 may be pinned to the inflow chamber cover 316, front deck and/or or other component or part of the vessel 10 to facilitate easy installation and removal and/or for any other purpose. In some embodiments, the conveyor 534 may be retractable or otherwise deployable, such as via electronic controller, remote control, artificial intelligence or manually. The illustrated conveyor 534 is hydraulically actuated, but could be powered in any other manner. If desired, the conveyor 534 may be at least partially porous and/or perforated to allow water and other liquids and, if desired, small debris 34 up to a particular particle size (e.g. small-sized debris 40), to drop down through the conveyor 534 (e.g. arrow 540) and into the incoming water/debris flow path or inflow chamber 310 because it's size should pass through the debris recovery system 58. For example, the conveyor 534 may be constructed at least partially of fabric, grating or mesh having selectively sized holes.

The exemplary conveyor 534 may deliver debris conveyed thereon (e.g. large-sized debris 41) to one or more destinations in any suitable manner. In this embodiment, the conveyor 534 is angled upwardly over at least part of the front 42 of the vessel 10 so that it will drop debris 34 carried thereon into a debris processor 550, which will process (e.g. fragment) the incoming debris 34 and discharge it onto the vessel 10. Thus, the size and type of debris that can be accepted on the exemplary conveyor 534 may be dictated by the capabilities of the debris processor 550.

Still referring to FIGS. 55 & 56, the exemplary debris processor 550 may be positioned at any desired location. In this embodiment, the debris processor 550 is positioned over, or within, the inflow chamber 310 (e.g. rearward of any IFRs 140 therein) so that its output will join the flow of debris 34 floating into the cargo compartment 60. However, the debris processor 550 could instead be located inside the cargo compartment 60 or at any other location.

If desired, multiple similar, or different types of, debris processors 550 can be provided at any desired locations, such as back-to-back, side-by-side or at different stages in the debris recovery system 58. In this embodiment, a stage-1, or first, debris processor 550*a* is positioned to receive debris 34 from the conveyor 534, such as described above, and a stage-2, or second, debris processor 550*b* is positioned proximate to the discharge port(s) 356 in the cargo compartment 60. The illustrated first debris processor 550*a* is configured for heavy-duty processing of large-sized debris 41 into smaller fragments, while the second debris processor 550*b* is configured for more fine fragmenting of debris 34, such as to help ensure the size of its output debris pieces are within the acceptable limits of the debris pump(s) 380 and/or other subsequent parts or components in the debris recovery system 58.

Still referring to FIGS. 55 & 56, when included, the debris processor(s) 550 may have any suitable form, construction, components, configuration and operation. In the present embodiment, the first debris processors 550*a* is an industrial shredder and the second debris processor 550*b* is an in-line grinder, but each could take any other form (e.g. shredder, macerator, combined grinder-macerator, etc.). For example, the first debris processor 550*a* may be a heavy duty, large-capacity industrial shredder capable of receiving and grinding a wide variety, types and sizes of items expected to be encountered (e.g. wood, metal, fabric) into smaller fragmented pieces. An example of a presently commercially available industrial shredder that can be used in some embodiments as the first debris processor 550*a* is one or more among the Monster Industrial® Shred Series industrial shredders by JWC Environmental® (See e.g. https://www.jwce.com/product-category/product-categories/industrial-grinders).

The illustrated second debris processor 550*b* may be the same or similar as the first debris processor 550*a* or a different unit capable of reducing debris to even smaller, or finely ground, particles acceptable by subsequent components in the debris recovery system 58 (e.g. less than 1" for processing by the debris pump(s) 380). Some examples of presently commercially available grinders that can be used in some embodiments as the first debris processor 550*a* are the EZstrip™ TR Munchers, Models CT201 or CT203/CT205 by NOV Process & Flow Technologies of the United Kingdom (See e.g. https://www.mono-pumps.com/mono+muncher), or the 30K & 40K In-line Muffin Monster sewage grinders by JWC Environmental® (See e.g. https://www.jwce.com/product/30k-40k-inline-muffin-monster/).

If desired, any on-board debris processors 550 (or debris pumps 380) could include a "clean-out" to collect debris items that are too big to be processed or otherwise rejected thereby. The exemplary debris processor(s) 550 may be coupled to the vessel 10 and operable in any suitable manner. For example, the debris processor(s) 550 may be pinned to vessel 10 to facilitate easy installation and removal and/or for any other purpose. The illustrated debris processors 550 are hydraulically actuated, but could be powered in any other manner and controlled via electronic controller, remote control (e.g. with AI, circuitry, software) or in any other suitable manner.

In some embodiments, one or more mechanical feeders (not shown) or other components (e.g. robotic handler) could be strategically positioned to help feed debris into one or more exemplary debris processor 550. In the present embodiment, a feeder (e.g. funnel) could be positioned over the first debris processor 550*a* to help align or orient and feed extra-large, or odd-shaped, debris (e.g. a log, chair, fence post, miscellaneous debris entangled in fishing net, rope) into the unit 550*a*. Also or instead, one or more operators could be on-site to help feed large or odd-shaped debris items or conglomerations into the debris processor 550*a* and/or remove anything too big or not suitable (e.g. marine life or other animals) for processing in the debris recovery system 58.

Referring now specifically to FIG. 56, in another independent aspect of the present disclosure, the vessel 10 may include, be rigidly or releasably coupled to or otherwise associated with one or more debris transport barges 560 for receiving debris collected on the vessel 10. For example, the vessel 10 may tow the debris transport barge(s) 560 or be coupled thereto, as desired, at the debris collection site or at any other time or location for debris offload. When the barge(s) 560 are used during debris collection, the exemplary debris recovery system 58 can effectively recover, process and offload debris without interruption until the barges 560 are filled to capacity, allowing for continuous collection of large volumes of debris 34.

When included, the debris transport barge(s) 560 may have any suitable construction, configuration, components and operation. In the illustrated embodiment, the debris transport barge 560 includes multiple transport containers 566 for holding debris offloaded from the vessel 10. For example, each transport container 566 may be a removable box positioned on the deck 562 of the barge 560 and fluidly coupled to one or more debris disposal hoses, or pipes, 386 extending from the debris pump(s) 380 (or other components) of the debris recovery system 58. In this embodiment, the debris disposal hose 386 extends over each transport container 566 and drops, or pours, the debris therein via a fully open top of the container 566 or one or more windowed cover or other passageway. One or more valves (not shown) may be used to selectively access each transport container 566, if desired.

Still referring to FIG. 56, in some embodiments, the transport containers 566 used for storing only solid debris 34 (without liquid contaminants, such as oil), at least part of the bottom of the transport container 566 may be perforated, such as to allow water to drain from the debris 34 placed therein. For example, the bottom of the transport container 566 may include (e.g. metallic) mesh or grating and/or fabric or other membrane-like material, allowing water to drain out onto the barge and/or back into the body of water 30. In some cases, the transport container(s) 566 may be raised off the barge deck 562 to allow or enhance water drainage. The debris 34 remaining in the transport container 566 may become compacted passively via gravity or, if desired, actively via tool, compactor or manually, to optimize space utilization.

Figure 57:
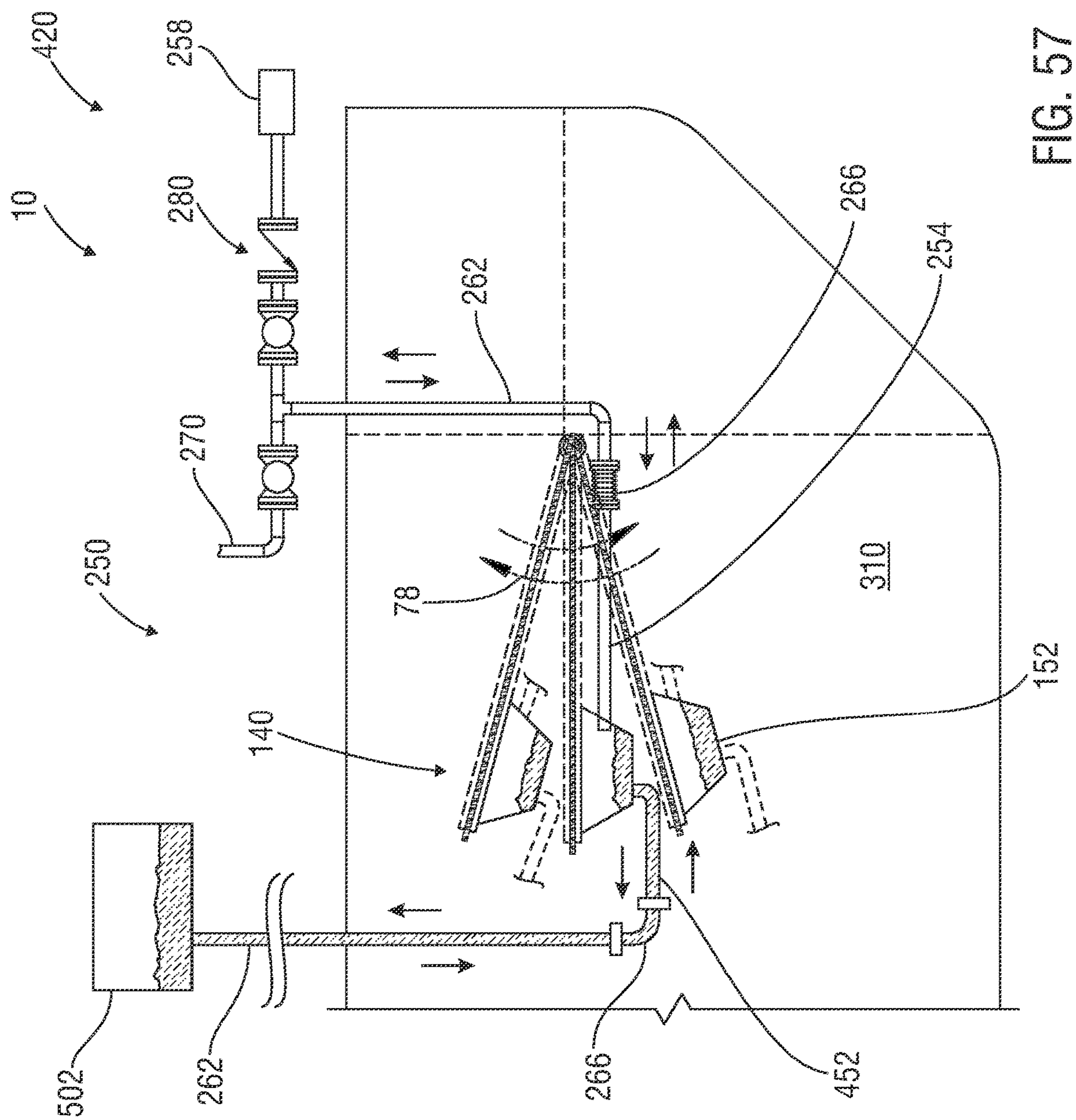
FIG. 57 is a side, cut-away view an exemplary closed-loop variable buoyancy system for use with one or more exemplary variable buoyancy IFRs in accordance with one or more embodiments of the present disclosure.

Referring now to FIG. 57, in another independent aspect of the present disclosure, when included, the variable buoyancy system 250 associated with one or more variable buoyancy IFRs 140 may have a closed-loop system to help prevent the buoyancy chamber 152 and/or other components from becoming clogged with, or damaged by, debris and/or for any other purposes. In such instances, the exemplary system 250 will be designed not to use the water from the cargo compartment(s) 60 or other location (e.g. in the remote debris recovery arrangement 420) that may contain debris.

Any suitable components and techniques may be used to provide a closed-loop variable buoyancy system 250. For example, the buoyancy chamber 152 may not utilize water exchange openings (e.g. openings 154, FIG. 30) that allow liquid from the inflow chamber 310, cargo compartment (not shown) or other chamber within which incoming debris will flow to enter the buoyancy chamber 152. Instead, one or more exemplary liquid exchange conduits 452 (e.g. flexible hose, steel pipe, etc.) or other component(s) may be fluidly coupled between the buoyancy chamber 152 and one or more liquid (preferably clean water) storage sources to change the buoyancy of the associated IFR 140. If desired, the exemplary liquid exchange conduit(s) 452 may enter the buoyancy chamber 152 at or near the bottom thereof, or lower than the entry point(s) of the air exchange conduit 254, to help encourage quick and easy flow of the liquid into and out of the chamber 152 to vary the buoyancy of the IFR 140 as desired and/or for any other purposes.

Still referring to FIG. 57, the liquid source may have any suitable form, construction, operation and location. For example, the liquid source may include one or more liquid (clean water) holding tanks 502 provided in or on the vessel 10 (or remote debris arrangement 420, FIG. 58) along with any necessary associated components (e.g. motor, fluid pump, valves, etc.). In this embodiment, the holding tanks 502 are reservoir chambers 455 (e.g. FIG. 54) built into or provided on the vessel 10 (or remote debris arrangement 420) near the chamber (e.g. inflow chamber 310) where the IFR 140 resides. The choice liquid can thus be cycled from the holding tank(s) 502 into and out of the exemplary buoyancy chamber(s) 152 as desired via the liquid exchange conduit(s) 452, such as through one or more risers 262 (e.g. steel pipe, flexible tubing, etc.) or other components.

In an exemplary operation, the buoyancy of the IFR 140 may be increased by selectively injecting compressed air into the buoyancy chamber 152 via one or more air compressors 258 (or other sources), similarly as described above with respect to other embodiments, but in this case to push water (or other liquid) out of the buoyancy chamber 152 and into the holding tank(s) 502 (or other destination). To decrease buoyancy of the exemplary IFR 140, for example, air (or other gas) can be selectively vented out of the chamber 152, allowing the desired volume of water or other liquid to passively drop (e.g. via gravity) or be driven (e.g. via pump, motor, etc.) into the buoyancy chamber 152. However, any other arrangement of components may be used to selectively provide liquid and gas into and out of the buoyancy chamber(s) 152 of one or more variable buoyance IFRs 140.

It should be noted that variations of the embodiments of FIGS. 52-57 may include more, fewer or different components, features and capabilities as those described or shown herein. Further, any of the details, features, components, variations and capabilities of other embodiments discussed or shown in this patent or as may be apparent from the description and drawings thereof, are applicable to the embodiments of FIGS. 52-57, except and only to the extent they may be incompatible with any features, details, components, variations or capabilities of the embodiments of FIGS. 52-57. Accordingly, other than with respect to any such exceptions, all of the details and description provided in this patent with respect to the other embodiments or as may be shown in the appended drawings relating thereto or which may be apparent therefrom, are hereby incorporated by reference herein in their entireties with respect to the embodiments of FIGS. 52-57.

One exemplary operational sequence for the direct use of the vessel 10 (e.g. FIGS. 1-57) at a typical debris (oil) spill response may be as follows. The illustrated vessel 10 may be launched and transit to the debris field, floating, for example, at a baseline height with a "DWL (Transit) Line" approximately 1'-3' from the bottom of the hull 55. The exemplary cargo compartment 60 may be passively flooded to a "Flood Line" level at a height that allows the passage of sea water 38 therein (or into the inflow chamber 310, when included). In some embodiments, one or more air evacuators 366 (e.g. vacuum pump(s) 370 and/or debris pump(s) 380) may be activated to evacuate air from the cargo compartment 60, adding liquid depth in the chamber 60 to facilitate separation of debris/water and increasing liquid capacity therein and/or helping create a sealed liquid system.

The exemplary discharge pump(s) 184 (e.g. two submersible process discharge pumps) may be activated, drawing water from the bottom of the cargo compartment 60 and typically causing debris 34 (e.g. oil) and typically some additional sea water 38 to be drawn into the intake opening 102 of the vessel 10 and into forward part of the cargo compartment 60 (or inflow chamber 310). The debris and water (with minimal emulsification or mixing, hopefully) will be drawn into the exemplary collection chamber 60, wherein the debris 34 will rise to the top while water is drawn out from the bottom.

In various embodiments, one or more sensors in the collection chamber 60 with read and communicate the level of debris or water in the chamber 60, which information can be used to vary operations. Whenever desired (e.g. when the debris has accumulated in the chamber 60 to a desired depth), debris can be drawn out of the cargo compartment 60 and directed to any desired destination. For example, one or more debris (e.g. crude oil) pumps 380 (e.g. fluidly coupled to one or more vertical trunks 372) at or proximate to the top of the cargo compartment 60 can be activated to remove debris 39 from the chamber 60 and direct it to the desired destination(s) (storage tank or cavity, barge, bladder bag, etc.). Likewise, whenever desired (e.g. when the lower level of debris in the chamber 60 is up at a desired height), the removal of debris can be slowed or stopped to allow more debris to accumulate and build up in the chamber 60, and so on. For example, one or more debris pumps 380 can be slowed or de-activated.

This exemplary process can be repeated until the debris field 36 has been acceptably mitigated. Depending upon the embodiment, to assist in debris recovery, throughout recovery operations the vessel 10 may be moved, sped-up, slowed and stopped, the discharge pumps 184 and or debris pumps 380 may be turned on, off and varied in speed, the buoyancy and position of any variable buoyancy IFRs 140 (if included) can be varied, as desired.

Figure 58:
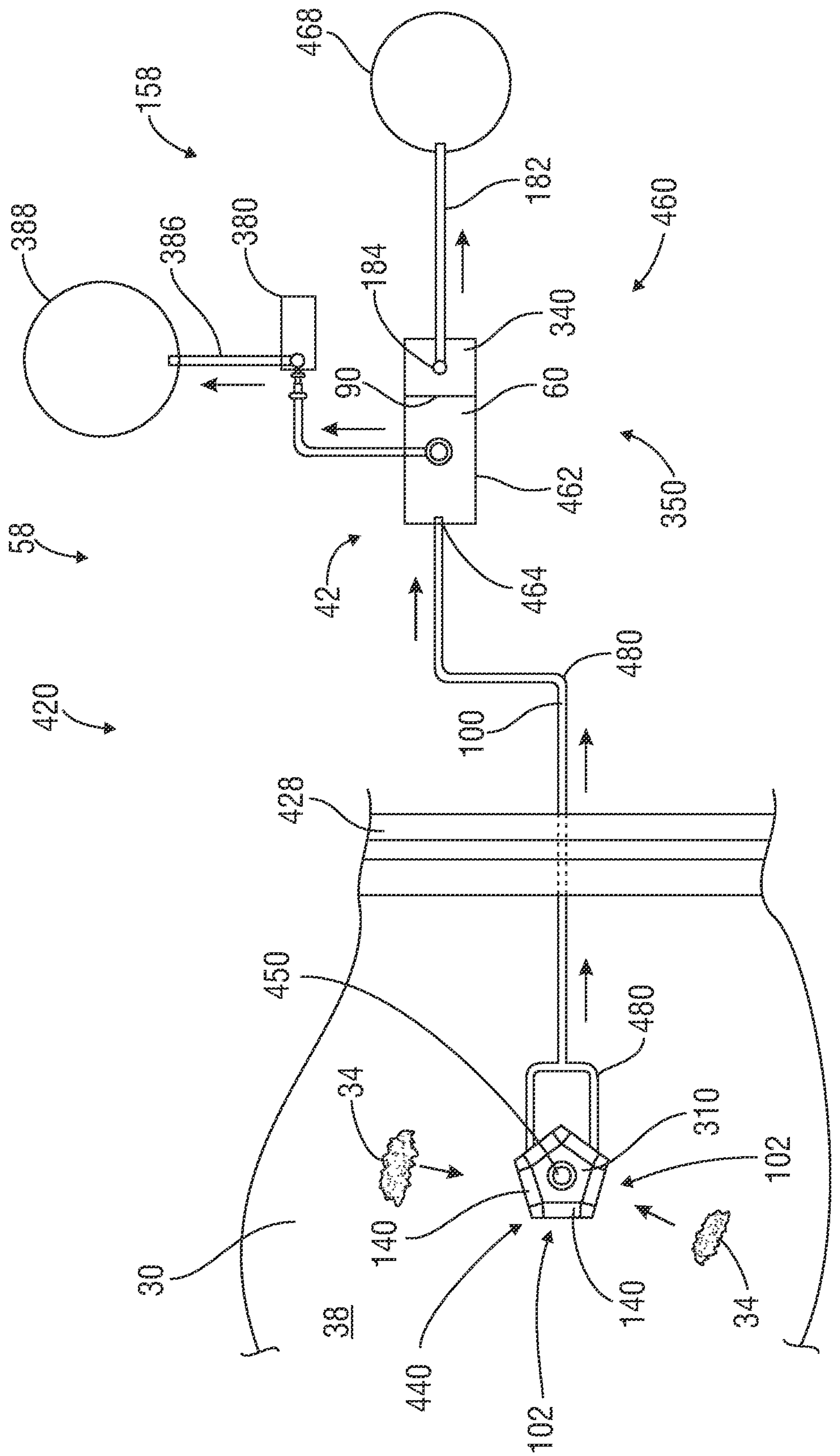
FIG. 58 is a top plan view of an exemplary remote debris recovery arrangement in accordance with one or more embodiments of the present disclosure.
Figure 59:
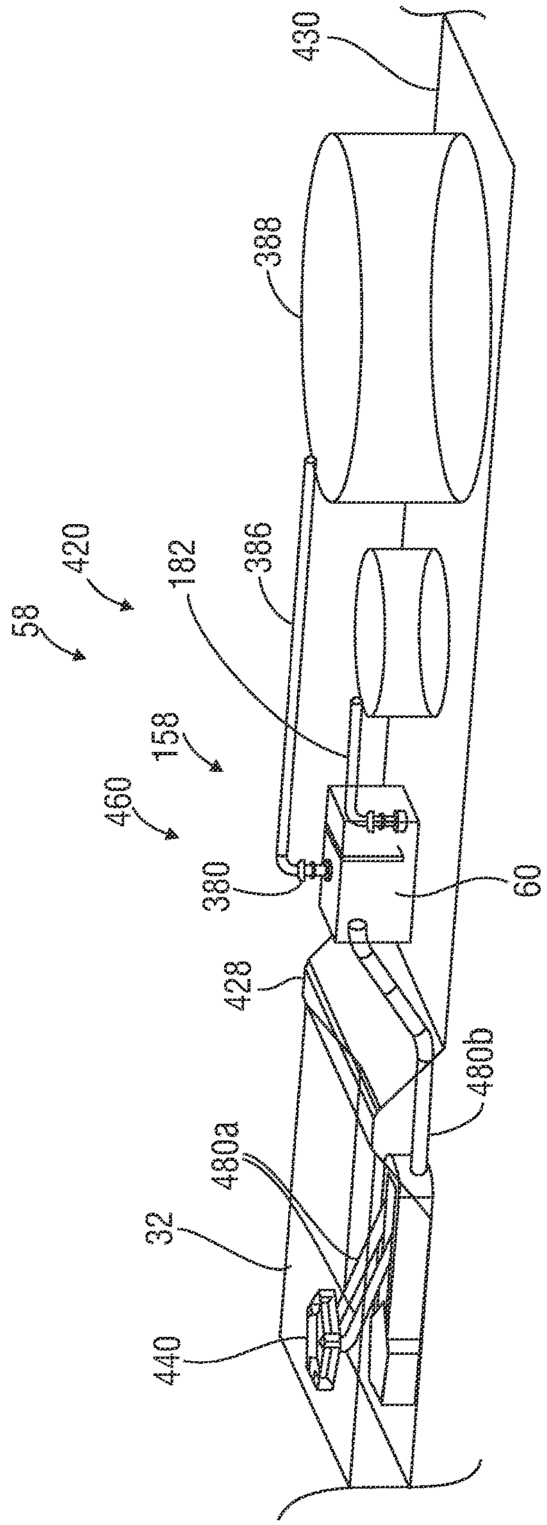
FIG. 59 is a perspective view of an exemplary remote debris recovery arrangement in accordance with one or more embodiments of the present disclosure.
Figure 60:
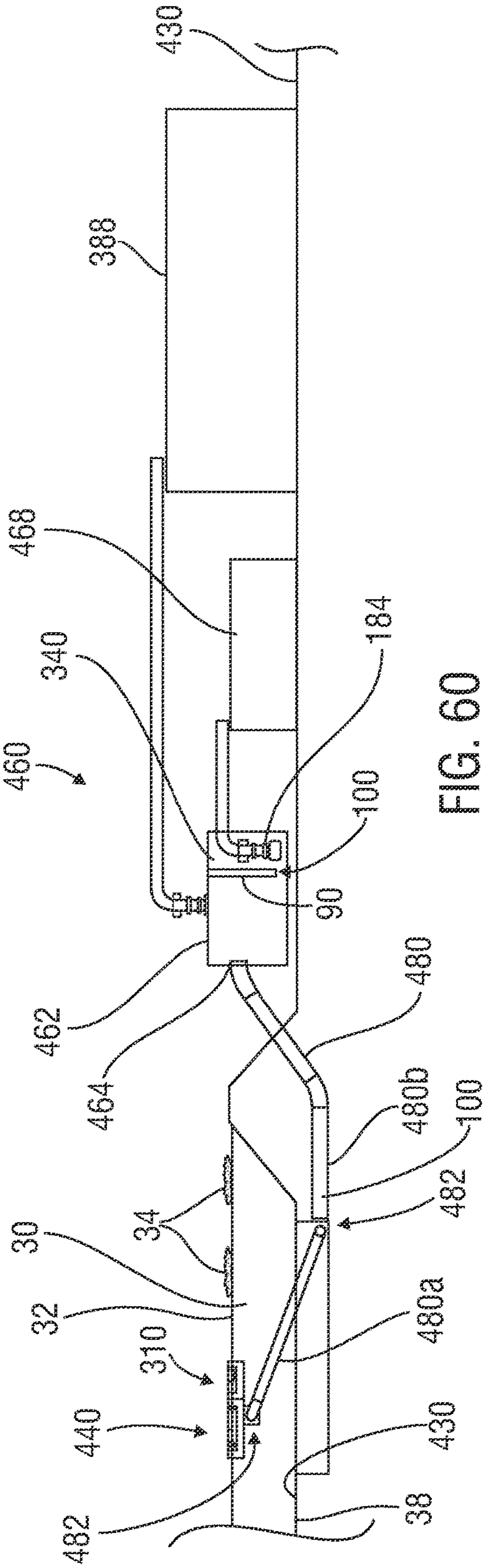
FIG. 60 is a side view of the exemplary remote debris recovery arrangement of FIG. 59.

Referring now to FIGS. 58-60, exemplary remote debris recovery arrangements 420 of the present disclosure will now be described. In a remote debris recovery arrangement 420, the intake opening(s) 102 and possibly other components, such as one or more IFRs 140 and inflow chambers 310, are remote from the cargo compartment 60 and other parts of the debris recovery system 58 (e.g. the fluid removal system(s) 158, debris separation system(s) 350). As used herein, the terms "remote" and variations thereof in this context means that the referenced feature(s) (e.g. intake openings) are provided in one or more components that are separate and distinct from the cargo compartment other components of the debris recovery system (e.g. the fluid removal and/or debris separation system(s)) and can be located separately therefrom. Often, the exemplary remote components, such as one or more intake openings 102, IFRs 140 and inflow chambers 310, are connectable to the other components of the debris recovery system 58 only by one or more tethers, lines, umbilical, hoses, pipes, other conduits or the like (e.g. the transmission conduit(s) 480).

In the illustrated embodiment, the remote debris recovery arrangement 420 includes at least one floating debris collection, or ingestion, head 440 carrying one or more intake openings 102, IFRs 140 and inflow chambers 310, and which is associated with and remote from at least one collection system 460. The exemplary ingestion head 440 is configured to be disposed in the body of water 30 to receive or ingest debris (and/or water, other liquid, substances, materials, etc.) therefrom and transmit it to the collection system 460. For the reader's convenience, whatever debris 34, water, other substances, chemicals, materials, solids, etc. that is ingested by the ingestion head 440 is sometimes simply referred to herein as the "intake" of the ingestion head 440.

Still referring to FIGS. 58-60, in some instances, the ingestion head 440 may have only the intake openings 102, IFR(s) 140 and inflow chamber(s) 310. In other embodiments, the ingestion head 440 may include less, additional or different features, such as one or more motors or engines, a propulsion system, one or more debris processors 550, suction pumps 185, debris pumps 380 or other pumps, electronics (e.g. for automated control of movement of the ingestion head 440, IFRs 140 and other components, etc.) or a combination thereof. For another example, some variations of the injection head 440 may not include any IFRs 140 or inflow chamber(s) 310.

The exemplary collection system 460 receives output from the ingestion head 440 and may store and/or separate ingested substances/materials, direct the debris, water and/or other substances or materials to one or more desired locations, perform other functions, or a combination thereof as desired. For example, the collection system 460 may be coupled to the ingestion head 440 only by one or more transmission conduits 480 and include one or more collection chambers 60, a fluid removal system 158 and a debris separation system 350. However, in other embodiments, the collection system 460 may include other or different components and be coupled to the ingestion head 440 or otherwise associated therewith in any other manner. For example, the collection system 460 may merely consist of one or more pits, tanks, cavities, containers, bladder bags or other suitable structures or areas for the storage, processing or other disposition of water, debris, other substances, etc. from the ingestion head 440.

It should be noted that those components and features of the remote debris recovery arrangement 420 described or shown herein with respect to FIGS. 58-82 which have like names, reference numerals, components, capabilities, purposes or appearances as any components and features described or shown in this patent with respect to the other embodiments herein (FIGS. 1-57) can include any or all of the same features, components, characteristics, variations, capabilities, operation, advantages, benefits and other details thereof, except and only to the extent they may be incompatible with any features, details, components, variations or capabilities of the embodiments of FIGS. 58-82. Accordingly, other than with respect to any such exceptions, all of the details and description provided herein and/or shown with respect to FIGS. 1-57 or as may otherwise be apparent from any part of this patent, are hereby incorporated by reference herein in their entireties with respect to the embodiments of FIGS. 58-82.

Figure 61:
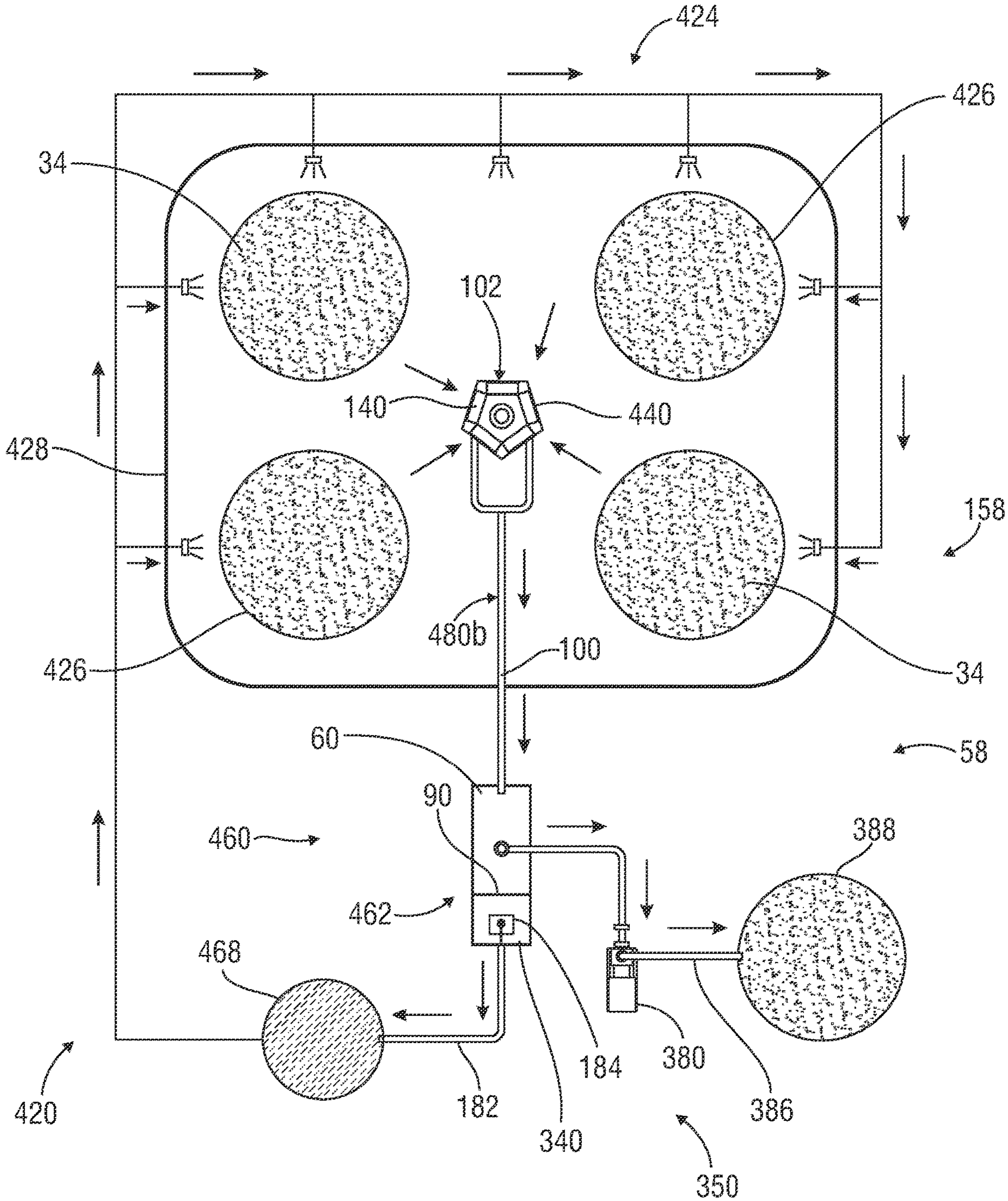
FIG. 61 is a top plan view of an exemplary remote debris recovery arrangement at an exemplary tank farm in accordance with one or more embodiments of the present disclosure.

In various embodiments, the remote debris recovery arrangement 420 may be used at onshore (e.g. FIGS. 58-61 and 83-86)), and/or offshore debris recovery locations (e.g. FIGS. 83-86). In FIG. 61, for example, the remote debris recovery arrangement 420 is shown used at an onshore location, such as to perform clean-up at a tank farm 424 after a tank 426 failure or leak, for other purpose(s) or a combination thereof. As used herein, the terms "tank" and variations thereof when used in connection with a tank farm refer to and include one or more storage tanks, silos, any other type of container or confining structure. The terms "tank farm" and variations thereof mean one or more areas that include one or more tanks. The tanks 426 in a tank farm 424 typically contain oil, chemicals, by-product(s), slurries, solids, etc. that could be contaminating if not properly contained, handled, transported, stored, used, etc.

Still referring to FIG. 61, for the purposes the present disclosure and appended claims, the contents of the tanks 426 in the tank farm 424 are sometimes referred to herein as the "product" and are treated herein as contaminants (debris) 34. The tank(s) 426 in the typical tank farm 424 are often surrounded by one or more peripheral berms 428 designed to encircle and contain spillage or leakage of debris 34 from the tanks 426 to prevent it from spreading elsewhere. As used herein, the terms "berm" and variations thereof mean one or more berms, walls, levees, shoulders, hills, ridges, embankments, other structures or a combination thereof designed to contain spillage or leakage of debris 34 (e.g. product) from one or more tanks 426 in a tank farm 424 or other source. In this example, the body of water 30 is the area(s) formed or surrounded by the berm 428 in the tank farm 424 (or other location) and the sea water 38 may be any combination of product (e.g. that escaped from one or more tanks 426), water and/or other substances and materials (e.g. other debris, fire suppressant foam, fire preventive chemicals, pellets, beads, etc.). Thus, in various debris recovery operations, the "body of water" may take on any variety of different forms and the "sea water" can be any substance(s) therein. Accordingly, the present disclosure is not limited by the type, nature, location, configuration or other details of what is referred to herein as the "body of water" and the "sea water" or "water".

The illustrated debris recovery site shows an exemplary remote debris recovery arrangement 420 used in connection with a tank farm 424 having multiple product storage tanks 426 surrounded by the berm 428. However, multiple remote debris recovery arrangements 420 can be used at the same location and the tank farm 424 could have different or other components. Thus, the present disclosure and appended claims are in no way limited by the characteristics, contents or any other details of the tank farm 424 or the type or the nature, type and characteristics of the debris (e.g. product) 34, water 38 and intake of the ingestion head 440, unless and only to the extent as may be expressly provided in a particular claim and only for that claim and claims depending therefrom. Moreover, the remote debris recovery arrangement 420 is not limited to use at tank farms 424, but may be used at any other onshore or offshore location. Accordingly, the location of the remote debris recovery arrangement 420 is not limiting upon the present patent and its claims or claims of any patents related hereto, unless and only to the extent as may be expressly provided in a particular claim and only for that claim and claims depending therefrom.

Figure 62:
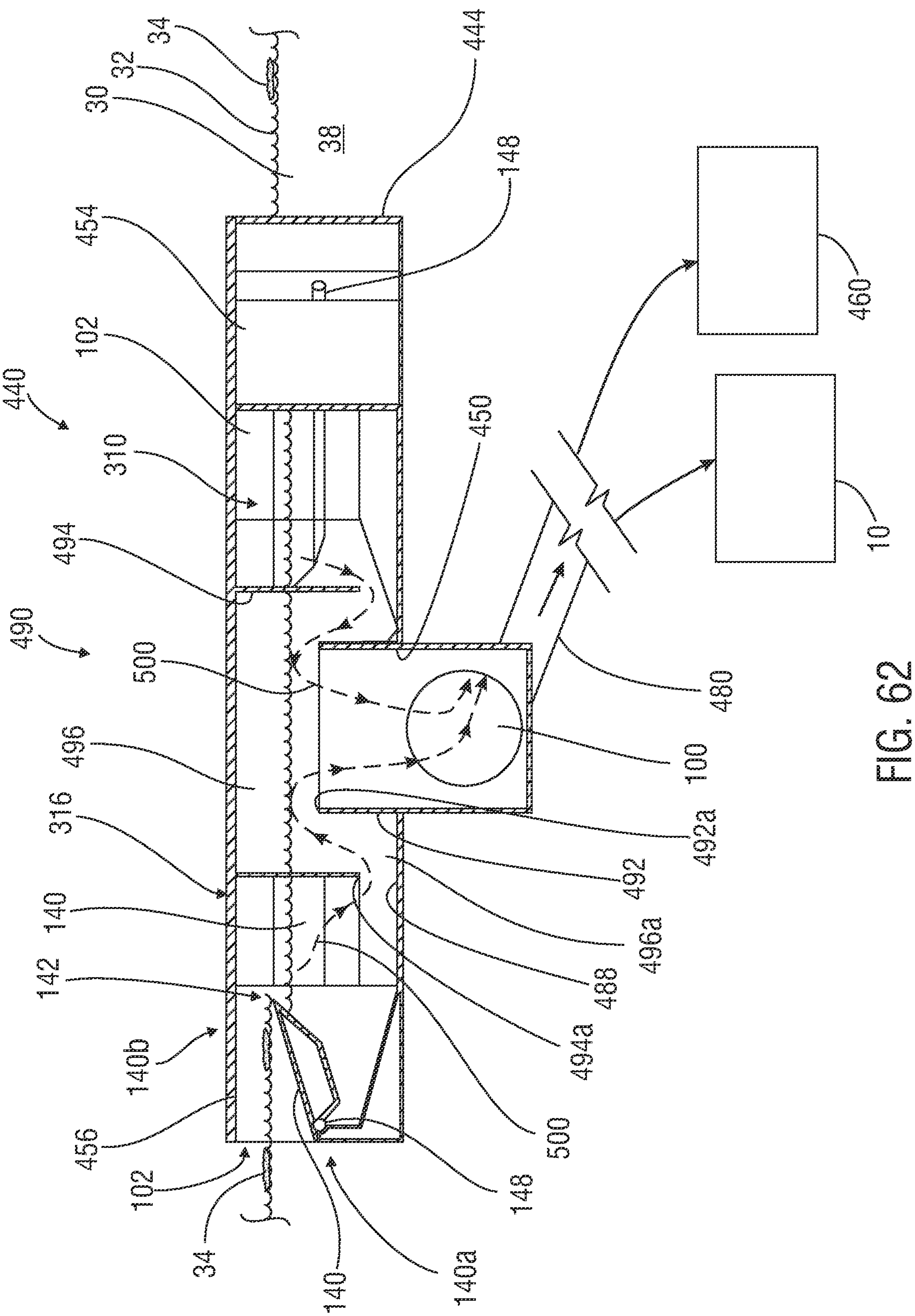
FIG. 62 is a partial cross-sectional, side view of an exemplary injection head that can direct recovered debris to an exemplary vessel or other form of exemplary collection system in accordance with one or more embodiments of the present disclosure.
Figure 63:
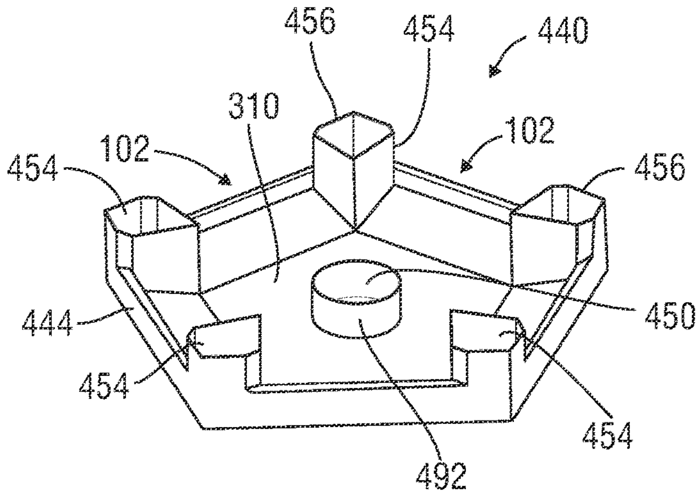
FIG. 63 is a top perspective view of part of the exemplary injection head shown in FIG. 62.
Figure 64:
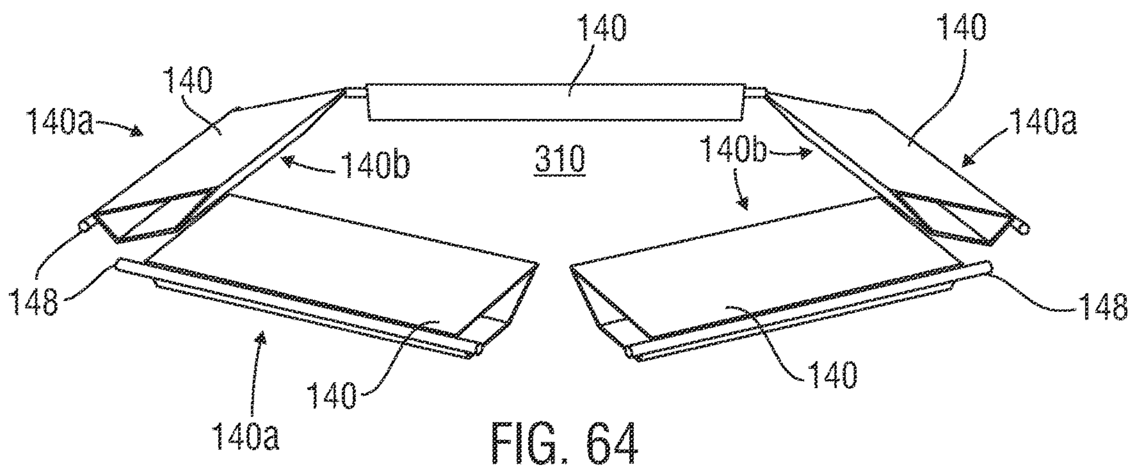
FIG. 64 is a side perspective view of the exemplary IFR cluster of the exemplary injection head shown in FIG. 62.

Referring now to FIGS. 62-64, when included, the ingestion head 440 may have any desired form, configuration, components, construction and operation and be associated with the collection system 460 in any suitable manner. For example, the ingestion head 440 may include at least one peripheral outer wall 444 that surround one or more inflow chambers 310 and may help form, or provide, one or more intake openings 102 thereto. The outer wall(s) 444 may have any suitable configuration and operation. For example, the outer wall 444 may be integrally formed of a single component, or constructed of multiple segments or components associated together (e.g. by weld, adhesive, mechanical connectors, joints, etc.). The illustrated outer wall 444 is formed in a pentagonal (5-sided) configuration and provides five intake openings 102, but could instead have a circular, square, rectangular, hexagonal, heptagonal, octagonal or any other configuration and provide any other number of intake openings 102 (e.g. 1, 2, 3, 4, 6 and so on).

At least one IFR 140 is shown provided in the exemplary ingestion head 440 proximate to each intake opening 102 and pointing inwardly toward the inflow chamber 310 to help control the inflow of debris 34, water, other liquids, substances and/or materials through the associated intake opening(s) 102 and into the inflow chamber 310, for any other purpose(s) or a combination thereof. Any desired number (e.g. 1, 2, 3, 4, 5, 6 and so on) of any combination of pivoting-type, sliding-type, fixed-buoyancy or variable buoyancy IFRs 140 (e.g. having any of the features and capabilities described above), and/or any other form of IFR 140, may be included in the ingestion head 440. All features, variations, components, capabilities, purposes and other details associated with the IFRs (a/k/a wave dampeners) 140 provided in other parts of this patent are applicable with respect to the IFRs 140 of FIGS. 58-90 and hereby incorporated by reference herein in their entireties. An arrangement having multiple IFRs 140 in the ingestion head 440 is sometimes referred to herein as a cluster of IFRs 140.

Referring again to FIGS. 62-64, when included in the exemplary ingestion head 440, the IFRs 140 may be arranged in any desired cluster or configuration (e.g. side by side, front-to-rear). For example, each IFR 140 may be a pivoting-type IFR pivotably coupled (e.g. with one or more pivot or hinge pins 148) at or near its rear end 140*a* to the outer wall 444 (or other part) of the ingestion head 440 so that its front end 140*b* will float at or near the surface 32 of the body of water 30 and/or the surface of liquid in the inflow chamber 310. During typical operations, the exemplary ingestion head 440 may be positioned in the body of water 30 so that the rear end 140*a* of each pivoting-type IFR 140 is generally below the surface 32 of the body of water 30 and debris 34 must pass over the front edge 142 of the IFR 140 to enter the inflow chamber 310. In many instances, it may be desirable to maintain the IFRs 140 in, or near, an upper-most buoyant position. However, the type, configuration, size, location and operation of the IFR(s) 140 are not limited or limiting upon the present disclosure or its claims, or any claims of any patents related hereto, unless and only to the extent as may be expressly provided in a particular claim and only for that claim and claims depending therefrom.

The exemplary ingestion head 440 may include multiple intake openings 102 and/or IFRs 140 to allow debris to be collected from select or multiple sides of the ingestion head 440 (e.g. without moving the ingestion head 440) to assist in rapid ingestion of debris 34, allow debris collection to be selectively focused in the debris field or body of water 30, for any other purpose(s) or a combination thereof. In this embodiment, five intake openings 102 and associated IFRs 140 are provided around the entire perimeter of the ingestion head 440, allowing concurrent collection from any direction up to 360 degrees around the perimeter of the ingestion head 440.

Referring still to FIGS. 62-64, in some applications, inflow optimization can be provided or enhanced with the combined length, or surface area, of the intake opening(s) 102 and/or front edges 142 of the IFRs 140 in the ingestion head. For a simplified example, assume that all intake into the ingestion head 440 must pass over the edge of one of the IFRs 140. If the total approximate suction into the intake openings 102 over the IFRs 140 (e.g. caused by one or more suction pumps 184) of an ingestion head is 1,000 gallons/minute and the total surface area of the front edges 142 of all the IFRs 140 is one foot (1'), approximately 1,000 gallons of liquid will be drawn over a one-foot length of IFR edge 142 every minute. In contrast, if the total surface area of the front edges 142 of all the IFRs 140 is expanded to ten feet (10'), for example, then approximately 1,000 gallons of liquid will be drawn across a ten feet length of IFR edges 142 each minute. Generally, because the water/debris can flow over a larger surface area in the latter case, the average velocity of flow over any IFR 140 should generally be less than in the former case (where the inflow is concentrated over a smaller area and therefore will be drawn in at greater velocity). In the latter example, less intake (floating debris/water) will be drawn over each IFR 140, which typically translates to a shallower thickness of the surface 32 of the body of water 30 being drawn in and, thus, less water.

Referring to FIGS. 62 & 63, the illustrated ingestion head 440 also includes one or more exit ports 450 fluidly coupled between the inflow chamber 310 and at least one collection system 460, such as via one or more fluid passageways 100 extending through one or more transmission conduits 480 (or other component). The exit port 450 may have any suitable form, configuration, shape and location. In this embodiment, a single exit port 450 has a substantially circular shape. For another example, the exit port 450 shown in FIGS. 80-82 has an oblong or elongated circular, or oval shape.

Referring again to FIGS. 62 & 63, the ingestion head 440 may be positionable in one or more desired operating positions (e.g. so that the front end 140*b* of one or more IFRs 140 will float at or near the surface 32 of the body of water 30 and/or surface of liquid in the inflow chamber 310). This may be accomplished in any suitable manner. For example, the ingestion head 440 may float in the body of water 30 in the desired operating position(s). In this embodiment, the ingestion head 440 includes one or more ballast cavities 454 that can assist in providing the desired flotation of the ingestion head 440. An exemplary ballast cavity 454 is shown placed between each adjacent pair of intake openings 102.

When included, the ballast cavities 454 may have any suitable form, configuration, location and operation. For example, one or more ballast cavities 454 may include foam or other floating material, air or a combination thereof. If desired, one or more of the ballast cavities 454 may be selectively controllable (e.g. by insertion and/or removal of water, air, other fluids, etc.) to ensure the desired ballasting of the ingestion head 440 during operations, for any other purpose(s) or a combination thereof. In some embodiments, for example, it may be necessary or desirable to adjust the buoyancy of the ingestion head 440 during operations, such as when the contents of the transmission conduit(s) 480 changes.

Additional or different ballasting components (e.g. floats, air jets, etc.) may be included in the ingestion head 440 or associated therewith (e.g. by tether) at any desired location. For example, one or more ballast cavities 454 may instead or also be provided on the underside of the ingestion head 440. Accordingly, additional, different or no ballast cavities 454 may be provided, and when the ingestion head 440 is configured to float, any suitable form, configuration and operation of components may be used. Thus, the present disclosure is not limited by the nature, type, configuration, components, location, operation or inclusion of ballast cavities 454 or other ballasting components associated with the ingestion head 440, unless and only to the extent as may be expressly provided in a particular claim and only for that claim and claims depending therefrom.

Figures 65, 66, 67:
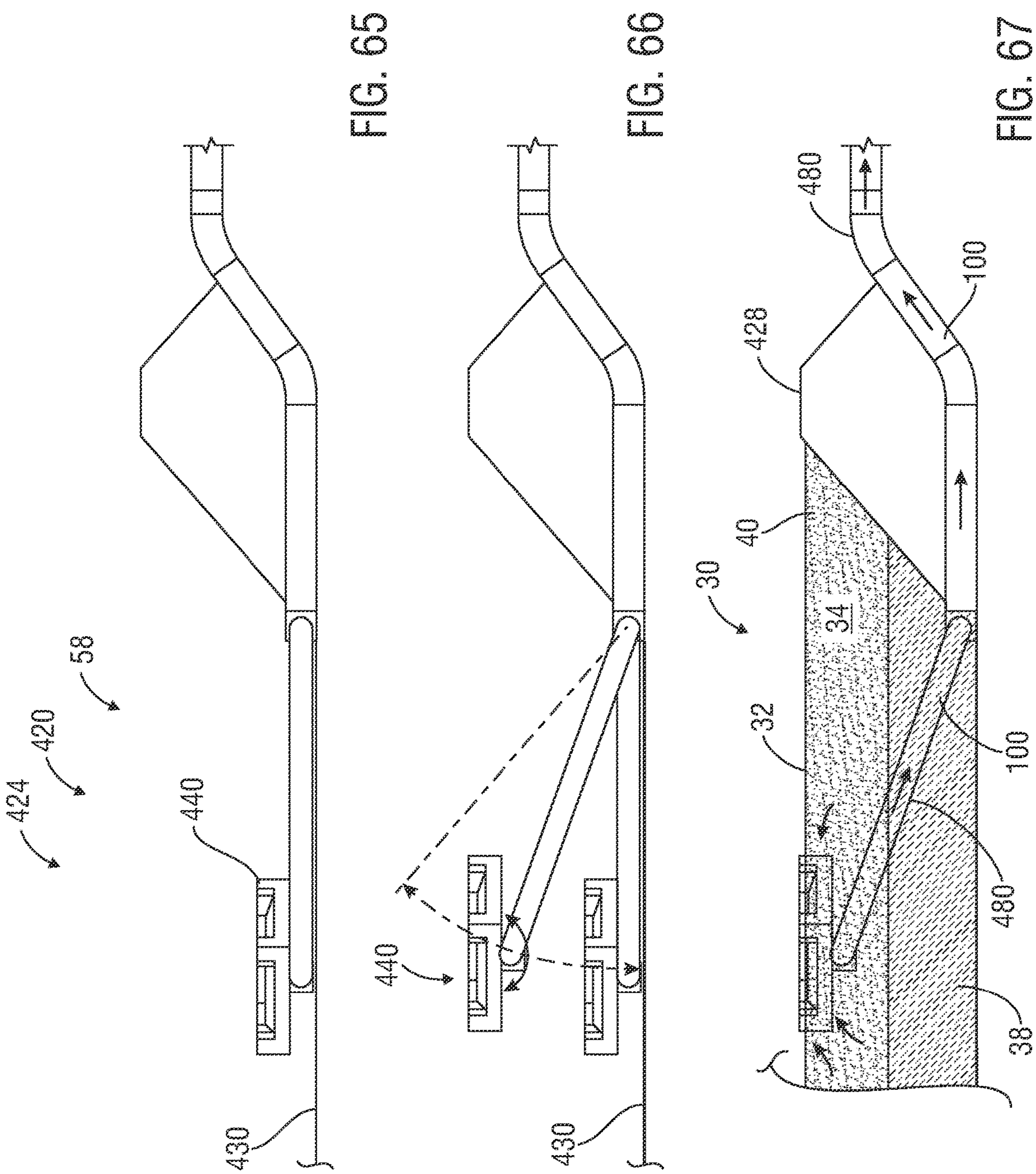
FIG. 65 is a side view of an exemplary injection head shown in an exemplary stowed position in accordance with one or more embodiments of the present disclosure.
FIG. 66 is a side view of the exemplary injection head shown in FIG. 65 moving between at least one exemplary stowed and at least one exemplary operating positions.
FIG. 67 is a side view of the exemplary injection head shown in FIG. 65 in an exemplary operating position.
Figure 68:
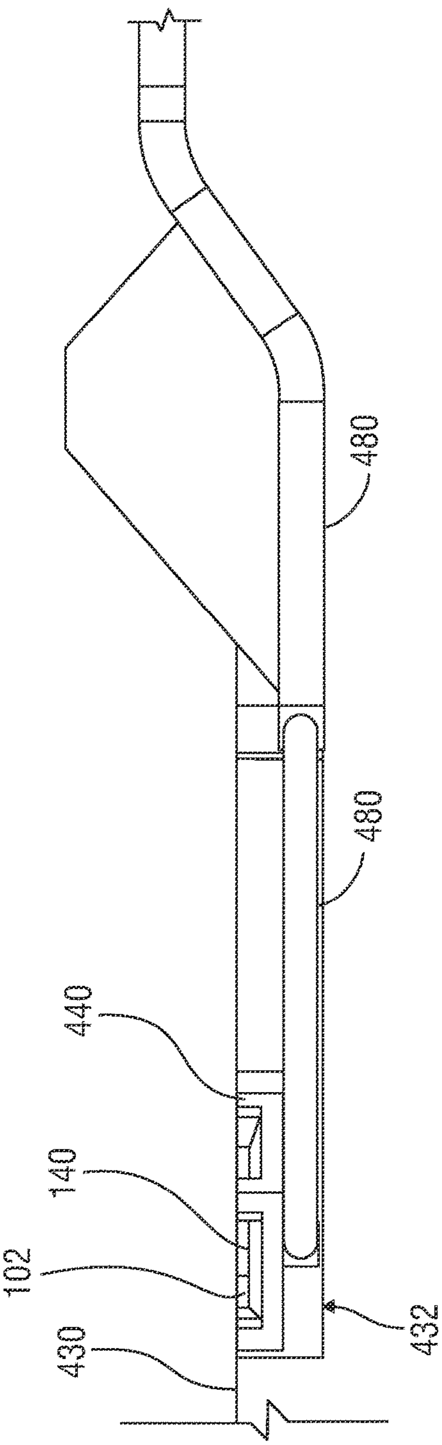
FIG. 68 is a side view of an exemplary injection head shown in an exemplary underground stowed position in accordance with one or more embodiments of the present disclosure.
Figure 69:
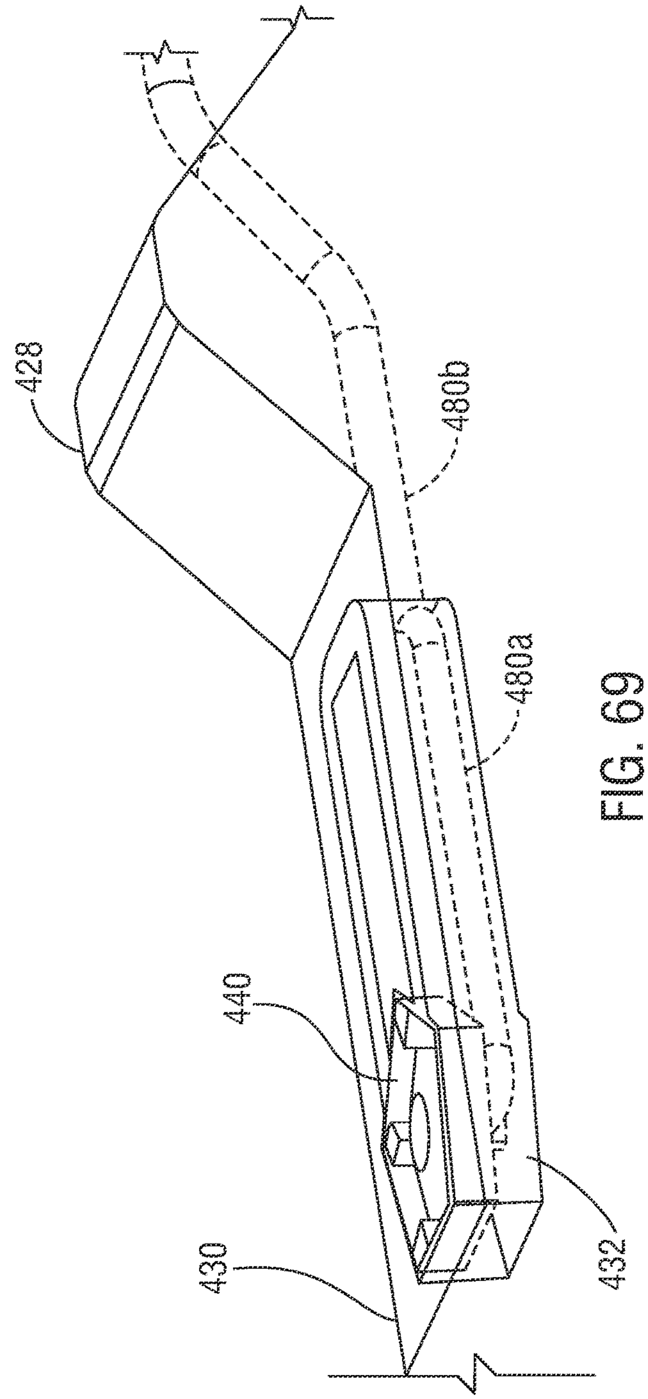
FIG. 69 is a perspective view of the exemplary injection head shown in FIG. 68.
Figure 70:
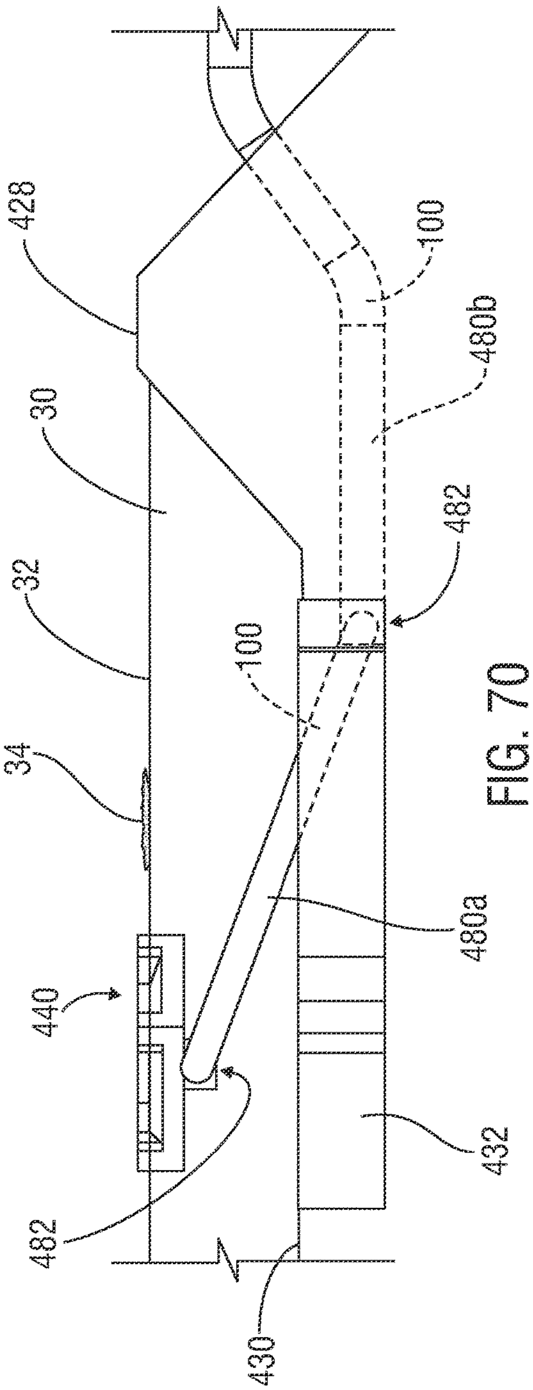
FIG. 70 is a side view of the exemplary injection head of FIG. 68 shown in an exemplary operating position in a body of water.
Figure 71:
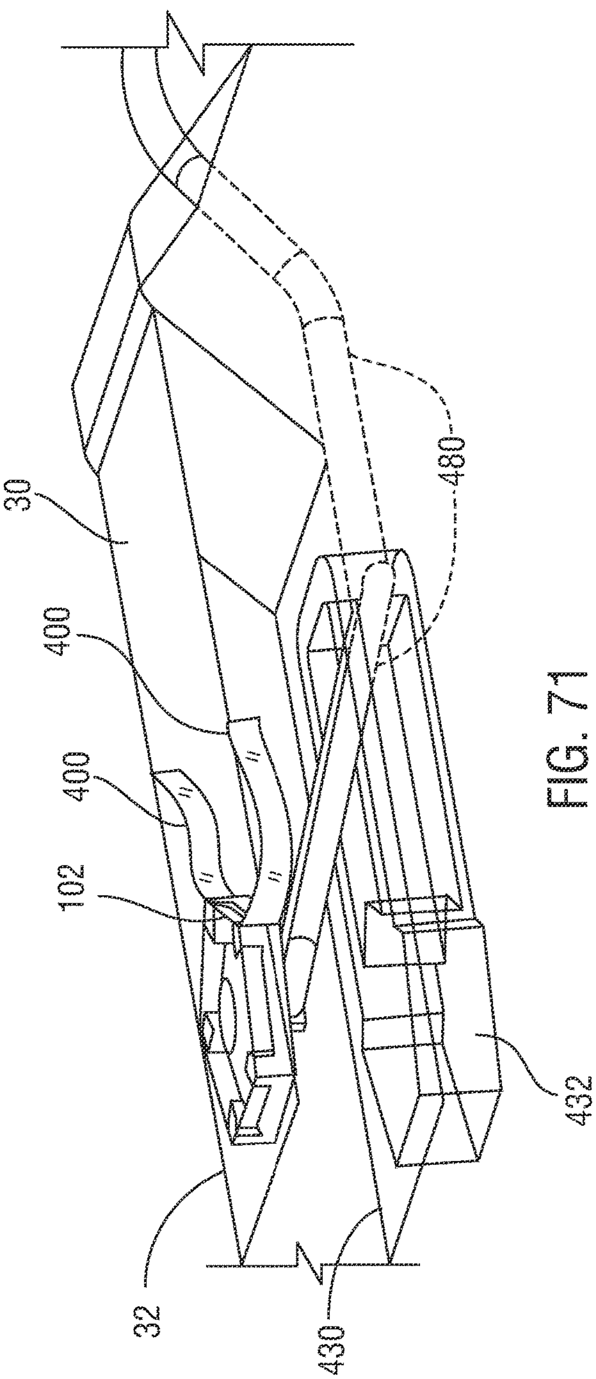
FIG. 71 is a perspective view of the exemplary injection head of FIG. 70 shown including a pair of exemplary containment booms.
Figure 72:
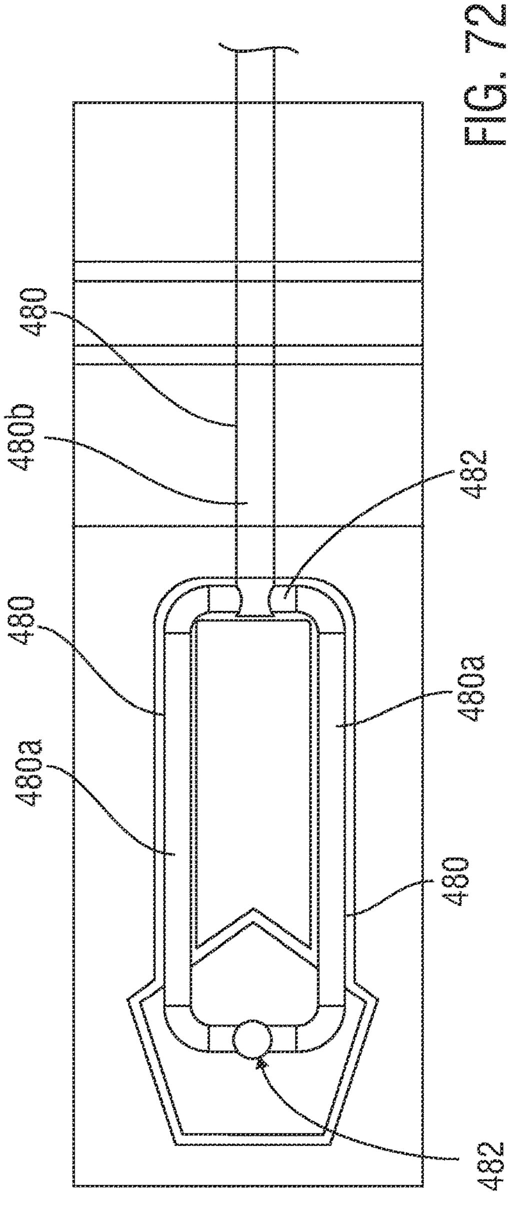
FIG. 72 is a bottom view of the exemplary injection head shown in FIG. 68.
Figure 73:
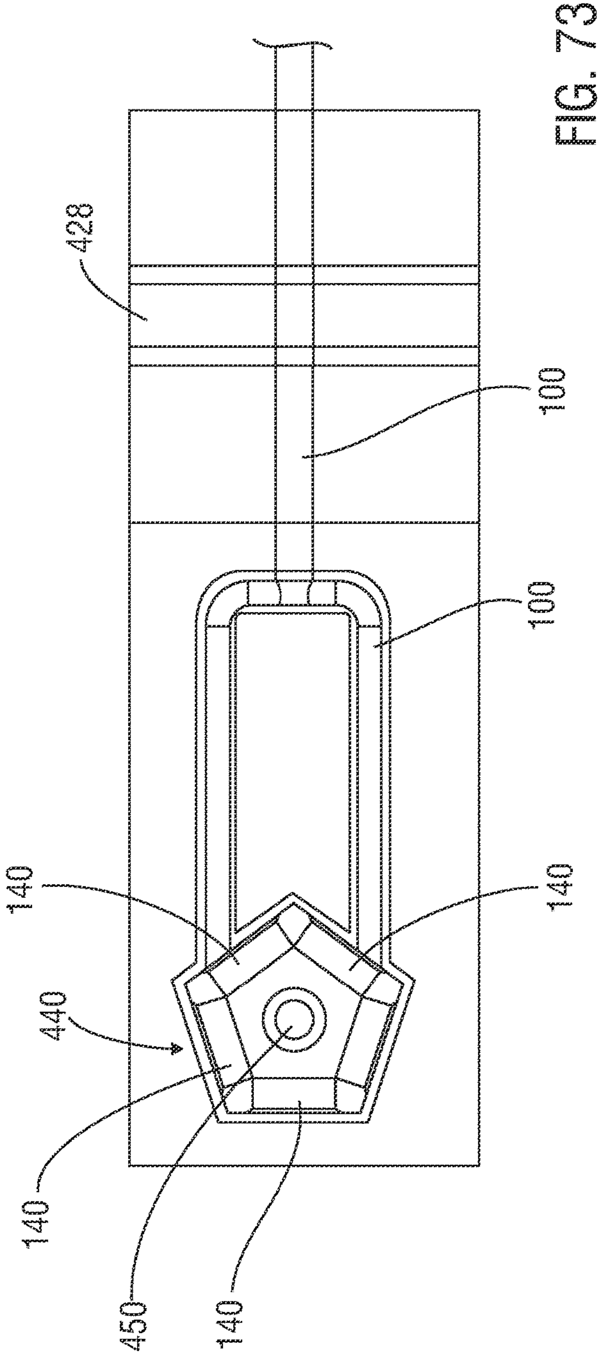
FIG. 73 is a top view of the exemplary injection head shown in FIG. 68.

Referring now to FIGS. 65-67, instead of or in addition to floating, the ingestion head 440 may be supported in its desired operating position(s) in any suitable manner. For example, the transmission conduit(s) 480 (and/or other components coupled to the ingestion head 440) may hold, or support, the ingestion head 440 in one or more desired operating positions (e.g. FIG. 67). However, any other components and techniques may be used to position the ingestion head 440 in its operating position(s).

If desired, the ingestion head 440 may be selectively moveable (e.g. via gravity, electric motor, hydraulic or pneumatic control systems, etc.) between multiple positions. For example, the ingestion head 440 may be moveable generally up and down between at least one stowed position (e.g. FIG. 65) and at least one operating position (e.g. FIG. 67). In one or more stowed positions, the illustrated ingestion head 440 may be at any desired location, such as at, or above, ground level 430 (e.g. FIG. 65) or below ground level 430 (e.g. FIGS. 68 & 69). In the embodiments of FIGS. 68-71, the ingestion head 440 in a stowed position rests in in a cavity or docking station 432 (e.g. concrete or steel form) or other space(s) or structure(s) formed or provided at the desired location. For other examples, the ingestion head 440 may be stored, stowed or mounted in stowed position on a vessel 10 or other carrier or structure.

Referring still to FIGS. 68-71, the ingestion head 440 may be retained in, or moveable to and from, multiple positions by gravity, manually or electronically via one or more latches, doors or other retainers, power-driven actuators (e.g. hydraulic, pneumatic, electric) and/or electronic controllers, remote control, robotics, AI in any other suitable manner or a combination thereof. In this embodiment, the ingestion head 440 is released, or moved, from a stowed position automatically upon the presence, or particular volume, of water or debris in the body of water 30. The illustrated ingestion head 440 should simply float out of a stowed position into an operating position as the body of water 30 fills with product, other debris, water and/or other substance (s), then drop back to a stowed position down via gravity as the surface 32 of the body of water 30 recedes. However, any other techniques and components may be used to move the ingestion head 440 between stowed and operating positions if this feature is included.

In some embodiments, one or more transmission conduits 480 and/or other components (e.g. arms, guides, etc.) may be configured to allow, cause or assist in the desired movement of the ingestion head 440 between positions. For example, the ingestion head 440 may be pivotably coupled to one or more stationary distal transmission conduits 480*b* (or other components) to allow the ingestion head 440 to move between positions. In this embodiment, the ingestion head 440 is pivotable relative to a single exemplary distal transmission conduit 480*b* shown anchored in position, such as by being buried in or otherwise secured to the earth.

Still referring to FIGS. 68-71, the ingestion head 440 may be pivotably coupled to one or more distal transmission conduits 480*b* in any suitable manner. For example, one or more proximal transmission conduits 480*a* extending from the ingestion head 440 may be pivotably coupled to the distal transmission conduit(s) 480*b*. In this embodiment, two parallel, spaced-apart proximal transmission conduits 480*a* are provided (e.g. to assist in maintaining the stability and position of the ingestion head 440 and/or for any other desired purposes). The exemplary proximal transmission conduit(s) 480*a* (or other components) may be pivotably coupled to distal transmission conduit(s) 480*b* (or other components) in any suitable manner, such as with one or more swivel pipe joints 482 (e.g. FIGS. 72-73), flexing members or the like. The illustrated ingestion head 440 and proximal transmission conduits 480*a* can thus pivot relative to the distal transmission conduit 480*b*, allowing the proximal transmission conduits 480*a* to follow the ingestion head 440 as it moves up and down, such as described above. If desired, the ingestion head 440 may also or instead be pivotably coupled to the proximal transmission conduit(s) 480*a*, such as with one or more swivel pipe joints 482, flexing members or the like, to help provide or maintain a desired (e.g. horizontal) position of the ingestion head 440 (e.g. relative to the surface 32 of the body of water 30).

To cause, allow or accommodate the desired movement of the ingestion head 440, the exemplary transmission conduit(s) 480 may, for example, include rigid, flexible, spooled, telescoping or otherwise expandable/contractable tubing or hose. However, other embodiments may include any other desired number, type and configuration of transmission conduits 480 or other components configured to allow, cause or assist in the desired movement of the ingestion head 440 in any suitable manner. Thus, the inclusion, type, configuration and operation of components useful to assist in moving the ingestion head 440 are not limiting upon the present patent or its claims or the claims of any patents related hereto, unless and only to the extent as may be expressly provided in a particular claim and only for that claim and claims depending therefrom.

Figure 74:
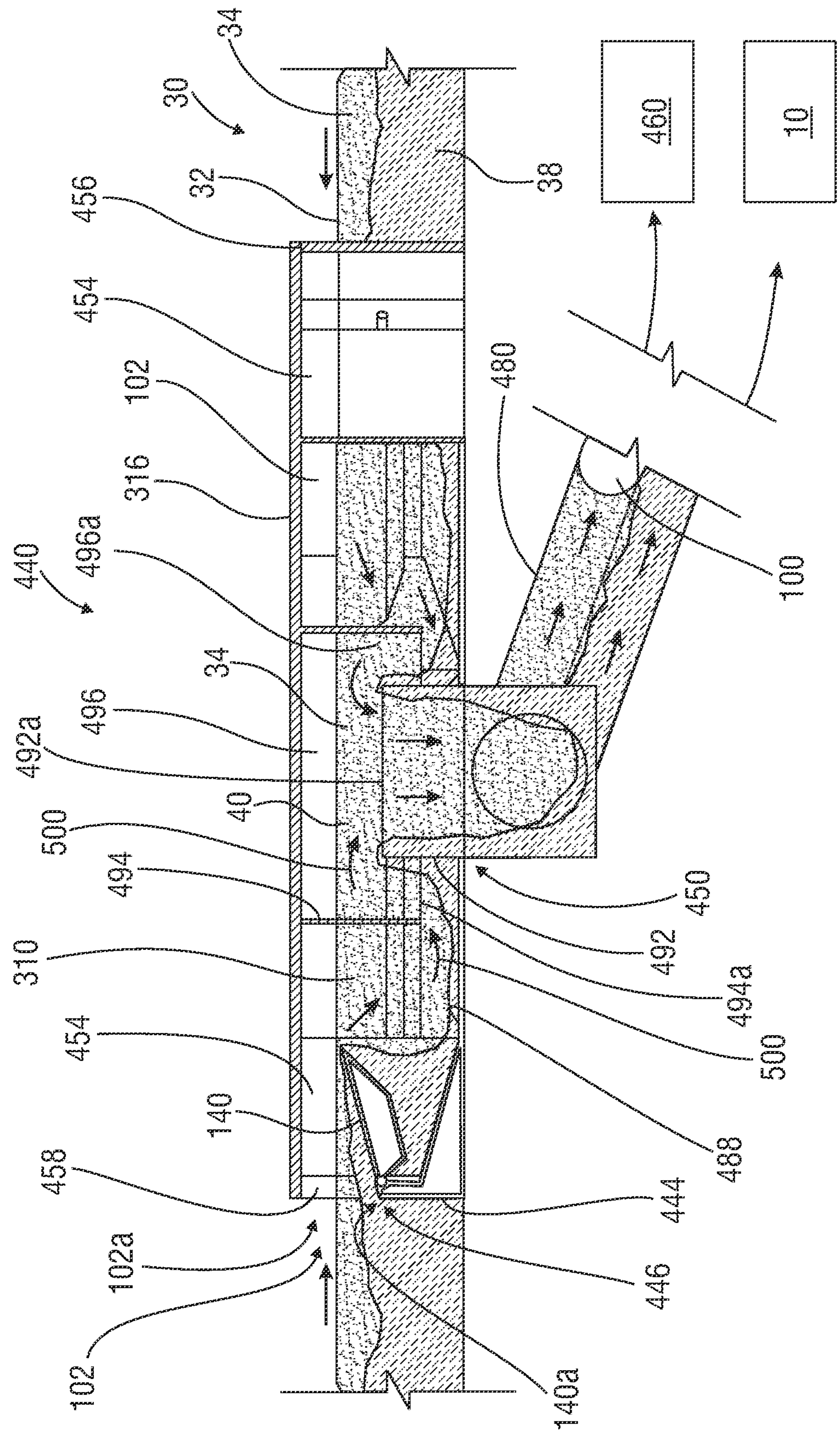
FIG. 74 is a partial cross-sectional, side view of an exemplary injection head shown ingesting water and debris from a body of water and which can direct recovered debris and water to an exemplary vessel or other form of exemplary collection system in accordance with one or more embodiments of the present disclosure.
Figure 77:
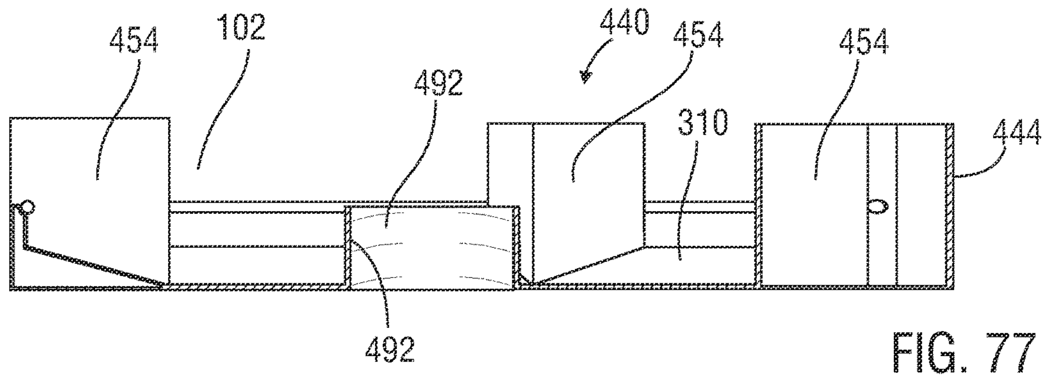
FIG. 77 is a partial cross-sectional, side view of part of the exemplary injection head shown in FIG. 74 without any exemplary IFRs or an inflow chamber cover.

Referring to FIG. 74, if desired, the ingestion head 440 may be moveable in any desired combination of directions (up, down, sideways, forward, rearward, etc.) across the body of water 30. For example, the ingestion head 440 may be self-propelled or towed, moved by another vessel, crane or other mechanism, pulled or pushed in any other manner (e.g. with wires, ropes or other mechanisms, manually or automated), or a combination thereof. In some instances, the ingestion head 440 may be selectively moved or steered (e.g. to the debris field in the body of water 30) by an operator, robotics or electronical controller (e.g. via AI or software, remote control or other automated) and/or one or more intake openings 102 may be selectively closed (e.g. by closing the associated IFR(s) 140) to optimize debris collection efforts, focus collection efforts at one or more particular side(s) of the ingestion head 440, increasing the velocity of intake into the open intake opening(s) 102, for any other purposes or a combination thereof.

If desired, the ingestion head 440 may be configured to maintain the exit ports 450 therein submerged in liquid during debris collection operations, such as to assist in providing a sealed liquid system and/or for any other purposes. The exit port(s) 450 may be retained submerged in liquid during operations in any suitable manner. For example, the ingestion head 440 may include at least one at least substantially sealed, substantially liquid-filled, vacuum cavity 496 extending around the exit port(s) 450 and which can maintain the exit port 450 submersed in liquid during operations. In this embodiment, the vacuum cavity 496 is formed between one or more inflow chamber covers 316 and the exit port 450, at least one inner (e.g. ring-shaped) wall 492 surrounding the exit port 450 and extending upwardly from the bottom surface 488 of the inflow chamber 310 to a desired height therein below the inflow chamber cover 316 and at least one outer (e.g. ring-shaped) wall 494 extending downwardly from the inflow chamber cover 316 radially outward of the inner wall 492 to a desired height below the upper edge 492*a* of the inner wall 492 and above the bottom surface 488 of the inflow chamber 310. However, the vacuum cavity 496 may be formed in any other manner. (See also FIG. 62).

Still referring to FIG. 74, as long as the liquid level in the exemplary vacuum cavity 496 remains above the upper edge 492*a* of the inner wall 492 during operations, the exit port 450 will remain submerged in liquid (even if the entire vacuum cavity 496 is not void of gas). This can be achieved, for example, by back-filling the exemplary transmission conduit(s) 480 with liquid (water) until water extends beyond the outer wall 494 in the inflow chamber 310 and placing the ingestion head 440 in an operating position in the body of water 30 with its intake openings 102 open. Retaining the exemplary ingestion head 440 at the surface 32 of the body of water 30 so that liquid and debris can flow into the inflow chamber 310 will retain the exit port 450 submerged in liquid. However, any other components and techniques may be used to retain the exit port 450 submerged in liquid during operations.

The exemplary vacuum cavity 496 could also or instead serve as a fire snuffer 490 that will submerge virtually all debris 34 flowing into the exit port 450 in liquid and may extinguish burning debris 34 (or have any other purposes). In the illustrated embodiment, the only passageway into the illustrated vacuum cavity 496 is the space 496*a* extending below the lower edge 494*a* of the outer wall 494. Thus, the incoming debris 34 must pass through that space 496*a* (e.g.

void of air or other gas) along its intake flow path 500 to the exit port(s) 450. As long as the liquid level in the exemplary vacuum cavity 496 remains above the upper edge 492*a* of the inner wall 492 during operations, such as described above, the lower edge 494*a* of the outer wall 494 and (liquid-only) space 496*a* will remain submerged in liquid, forcing the incoming debris 34 to be submerged and (hopefully) extinguishing any incoming burning debris 34 (even if the entire vacuum cavity 496 is not void of gas). (See also FIG. 62).

Still referring to FIG. 74, when one or more exemplary inner walls 492 is included, the incoming debris 34 will be forced through a tortuous path 500 and be submerged longer, assisting in extinguishing any burning intake and/or for any other desired purposes. Thus, after the intake passes under the lower edge 494*a* of the exemplary outer wall 494 on its way to the exit port(s) 450, it must then then travel up and around the upper edge 492*a* of the inner wall 492 and then back down to the exit port 450. So long as the liquid level in the illustrated vacuum cavity 496 remains above the upper edge 492*a* of the inner wall 492, such as described above, the entire tortuous path of the incoming debris 34 around the inner snuffer wall 492 will be submerged in liquid.

Figure 78:
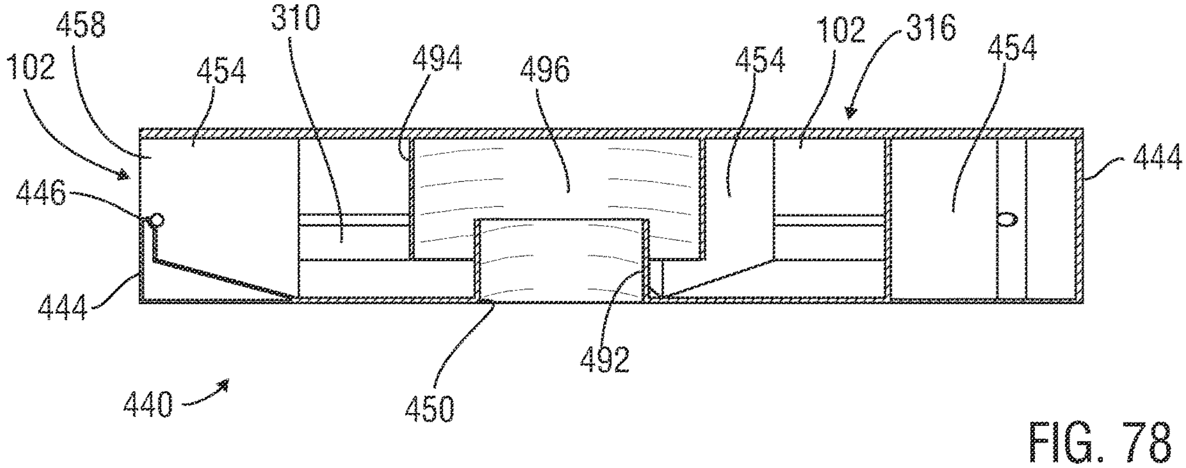
FIG. 78 is a partial cross-sectional, side view of part of the exemplary injection head shown in FIG. 74 without any exemplary IFRs but with an exemplary inflow chamber cover.
Figure 79:
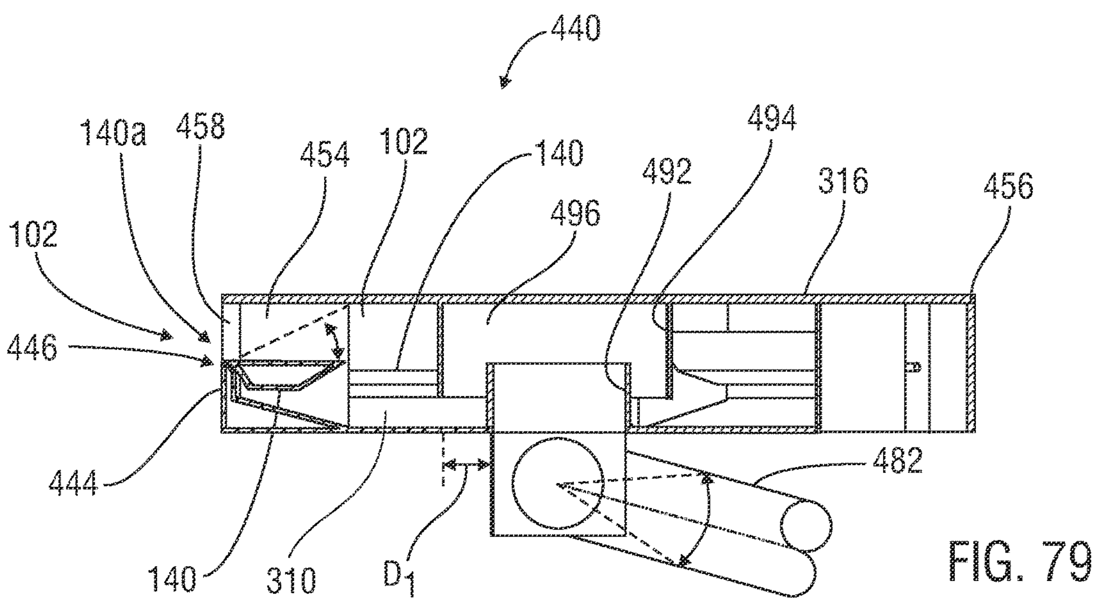
FIG. 79 is a partial cross-sectional, side view of part of the exemplary injection head shown in FIG. 74.

Referring now to FIGS. 78-79, in some instances, the greater the distance D1 between the inner and outer walls 492, 494, the longer the burning intake may be submerged and more likely it will be extinguished. However, the fire snuffer 490 can have any other form, configuration and operation and debris 34 may be fully submerged and/or burning debris extinguished in any other manner. When the exemplary ingestion head 440 is configured to ingest and assist in extinguishing burning debris 34, any desired components that may be exposed to high temperatures may, if desired, be formed of sufficiently heat-resistant material, such as Wnr.1.4762 (H-14)/AISI 446 (e.g. heat-resistant up to 1,200° C.) or AISI 446/1.4762 by METALCOR (heat-resistant ferritic chromium stainless steel with aluminum (e.g. heat-resistant up to 1,150° C.), any other material with similar properties or coated with sufficiently heat-resistant material.

Figure 81:
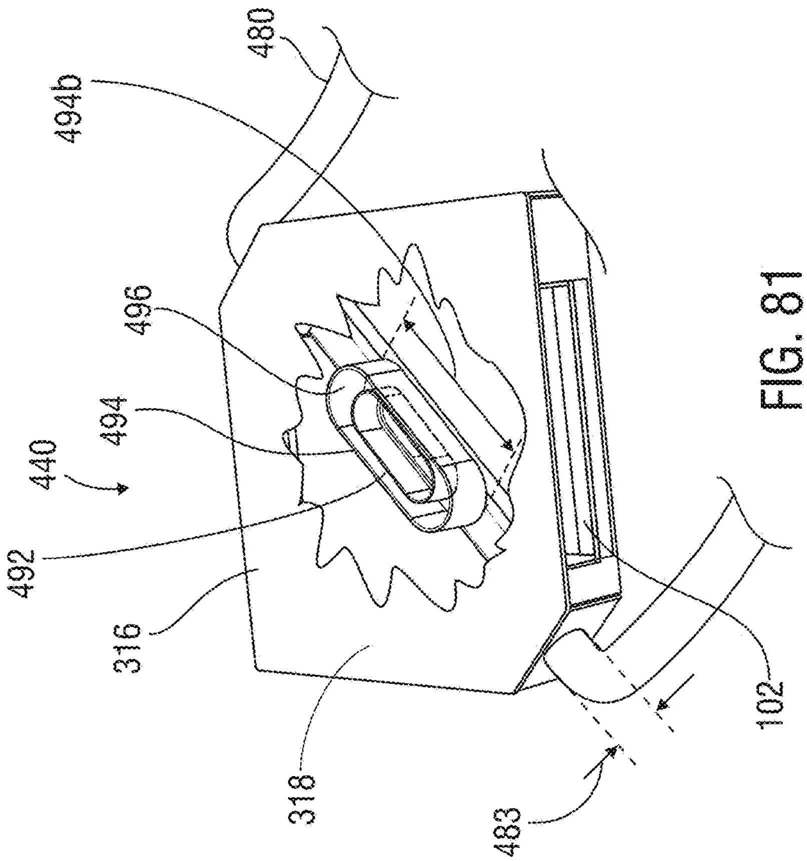
FIG. 81 is a perspective view of the injection head shown in FIG. 80 with an exemplary inflow chamber cover partially cut-away.
Figure 80:
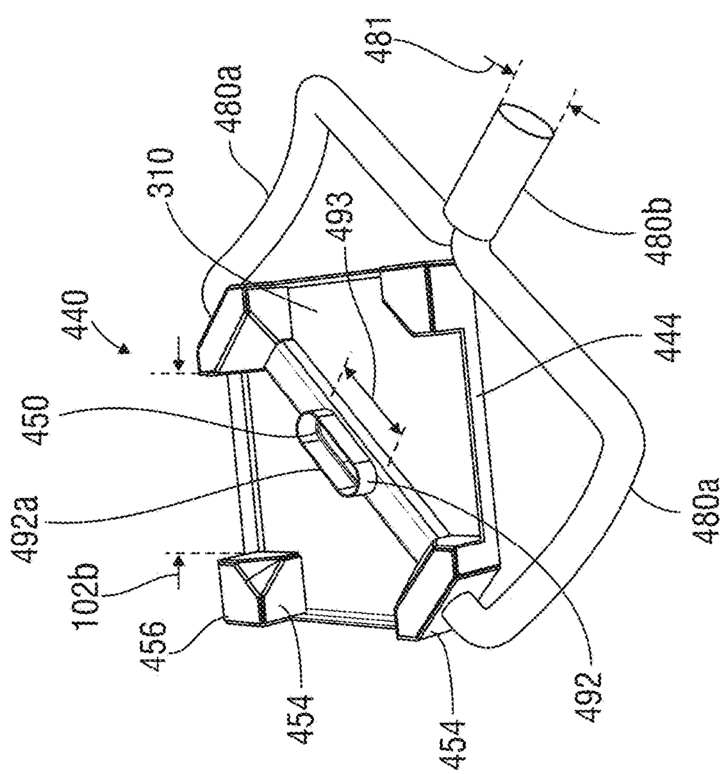
FIG. 80 is a perspective view of part of another exemplary injection head in accordance with one or more embodiments of the present disclosure.
Figure 82:
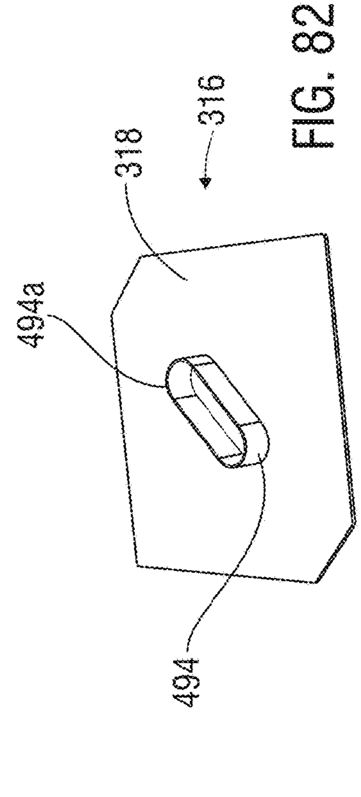
FIG. 82 is a perspective view of the exemplary inflow chamber cover shown in FIG. 81.

An example of inflow optimization can be shown with respect to FIGS. 80-82. In this embodiment, the suction pressure in the distal transmission conduit 480*b* is distributed to the outlets of the two proximal transmission conduits 480*a*. Since the combined diameters, or widths, 483 of the two illustrated proximal transmission conduits 480*a* is greater than the diameter or width 481 of the distal transmission conduit 480*b*, the suction pressure may be dissipated thereabout. For another example, the suction pressure at the outlets of the exemplary proximal transmission conduits 480*a* is distributed to the exit port 450. If the width, or diameter, 493 of the exemplary exit port 450 is greater than the combined diameters, or widths, 483 of the illustrated proximal transmission conduits 480*a*, the suction pressure may be dissipated thereabout. For yet a further example, the suction pressure at the illustrated exit port 450 is distributed over the upper edge 492*a* of the inner wall 492 and the lower edge 494*a* of the outer wall 494. In each of those instances, if the width or diameter of the inner wall 492 is greater than the width or diameter 493 of the exit port 450 and/or the diameter, or width, 494*b* of the outer wall 494 is greater than that of the inner wall 492, the suction pressure may be dissipated thereabout. Finally, the suction pressure is distributed and may be dissipated over the combined diameter, or length, 102*b* of each of the intake openings 102.

Referring now to FIGS. 75-79, when included with the ingestion head 440, the inflow chamber cover(s) 316 may have any suitable form, size, configuration, construction, orientation, operation and purpose. For example, the inflow chamber cover 316 may be at least partially transparent, or see-through, to provide visibility into the inflow chamber 310 by one or more operators, cameras and/or for any other purposes. In the illustrated embodiment, the inflow chamber cover 316 includes a non-perforated plate 318 configured to abut or extend across the uppermost edge 456 of the ingestion head 440 around the inflow chamber 310. In this instance, the uppermost edge 456 of the ingestion head 440 is at the top of the ballast cavities 454, but could be formed on other, or additional, parts or areas of the ingestion head 440. The exemplary inflow chamber cover 316 thus covers the entire inflow chamber 310 and forms the upper boundary of each intake openings 102 (e.g. FIGS. 62, 74).

The exemplary inflow chamber cover 316 may be integral to the ingestion head 440, or temporarily or permanently coupled thereto (e.g. by weld, adhesive, mechanical connectors, any other technique or a combination thereof). If desired, the inflow chamber cover(s) 316 may be removable or openable, such as to provide access into the inflow chamber 310, allow repair and/or replacement, for any other purposes or a combination thereof. However, the inflow chamber cover(s) 316 could have any other form, shape, configuration (e.g. be perforated) and operation. Thus, the present patent and its claims, or the claims of any patents related hereto, are not limited to the inclusion of, or form, configuration, construction, orientation and operation of the inflow chamber cover 316, unless and only to the extent as may be expressly provided in a particular claim and only for that claim and claims depending therefrom.

Referring back to FIG. 71, if desired, one or more containment booms 400 may be associated with, or part of, the ingestion head 440 and useful during debris collection operations to encourage debris/liquid flow into one or more intake openings 102 from the body of water 30, increase the efficiency, speed and/or effectiveness of debris recovery operations, for any other purpose(s) or a combination thereof. The containment boom 400 may, for example, include any of the features, characteristics or uses of the elongated booms 190 and/or containment booms 400 described above and/or shown in other figures appended hereto to the extent they are not incompatible with this embodiment. However, the form, quantity, size, configuration, construction, precise location, orientation and operation of containment booms 400 is not limited or limiting upon the present disclosure or it claims, or any claims of any patents related hereto, unless and only to the extent as may be expressly provided in a particular claim and only for that claim and claims depending therefrom. Moreover, various embodiments may not include any containment booms 400.

Figure 75:
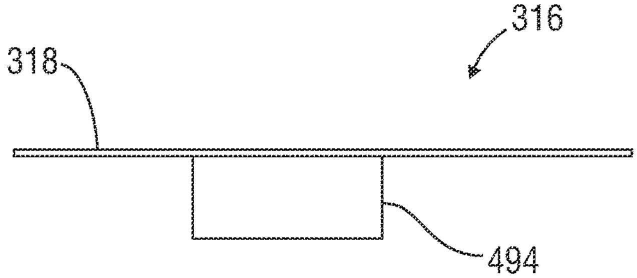
FIG. 75 is a side view of the exemplary inflow chamber cover shown in FIG. 74.
Figure 76:
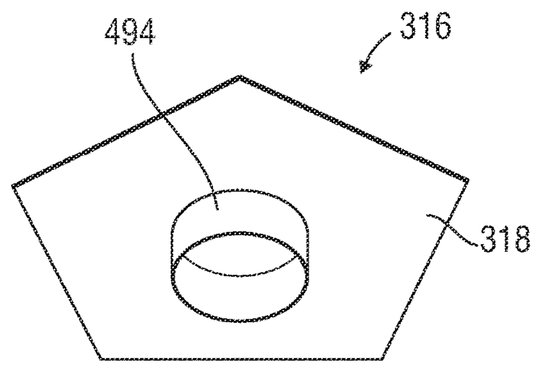
FIG. 76 is a perspective view of the exemplary inflow chamber cover shown in FIG. 74.

Now referring briefly back to FIGS. 74-76, the intake openings 102 may have any desired form, configuration, location and operation. For example, each intake opening 102 may be the entire space 102*a* extending between (i) the exemplary inflow chamber cover 316 (forming its upper boundary), (ii) the side edges 458 of the adjacent ballast cavities 454 (forming its side boundaries) and (iii) the upper edge 446 of the outer wall 444 of the ingestion head 440 and/or the rear end 140*a* or other part of the corresponding IFR 140 (forming its lower boundary). In other embodiments, one or more intake openings 102 may, for example, comprise only part of the space 102*a*. For another example, the intake opening 102 may have no upper and/or side boundaries. Thus, the form, quantity, size, configuration, construction, precise location, orientation and operation of the intake opening(s) 102 is not limited or limiting upon the present patent or its claims, or claims of any patents related hereto, unless and only to the extent as may be expressly provided in a particular claim and only for that claim and claims depending therefrom.

Referring back to FIGS. 58-60, the exemplary ingestion head 440 may be fluidly coupled with the collection system 460 in any suitable manner. In the present embodiment, the intake passes through a single exit port 450 in the ingestion head 440 and into respective passageways 100 extending through the first and second proximal transmission conduits 480*a* before merging in a single passageway 100 extending through the distal transmission conduit 480*b* to one or more collection chambers 60 of the collection system 460. The transmission conduits 480 may be rigid, flexible, take any other form or a combination thereof. In other embodiments, the ingestion head 440 may have multiple exit ports 450 and a different type, arrangement and quantity of transmission conduits 480 and passageways 100. Moreover, additional or different components and techniques may be used. Thus, the inclusion, form, quantity, size, configuration, construction, precise location, orientation and operation of the transmission conduit(s) 480 and passageway(s) 100 is neither limited nor limiting upon the present patent and its claims or the claims of any patents related hereto, unless and only to the extent as may be expressly provided in a particular claim and only for that claim and claims depending therefrom.

Figure 83:
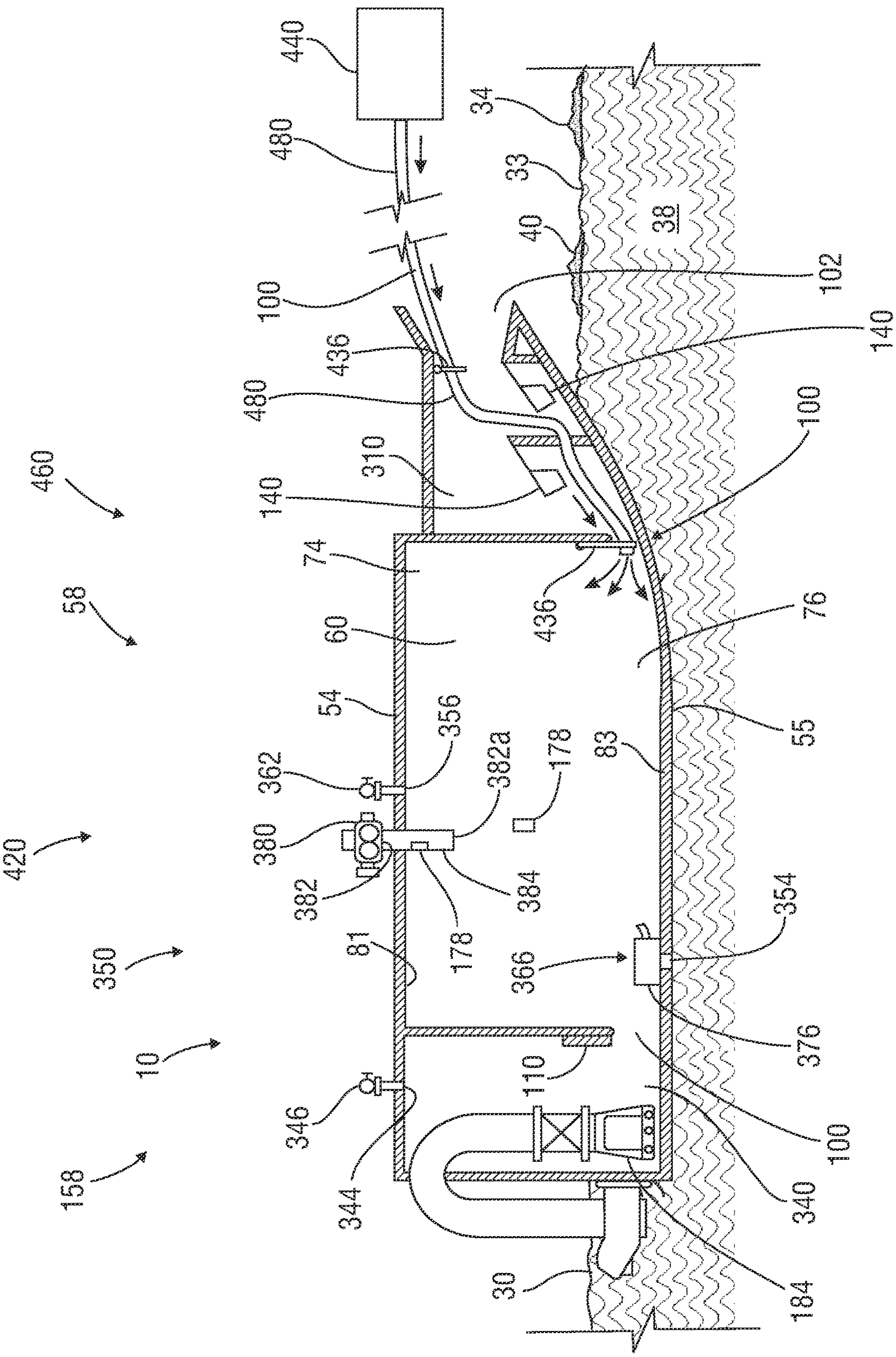
FIG. 83 is a partial cross-sectional, side view of an exemplary waterborne vessel shown fluidly coupled to one or more exemplary ingestion heads in an exemplary remote debris recovery arrangement in accordance with one or more embodiments of the present disclosure.

Referring now to FIG. 83, in another independent aspect of the present disclosure, the exemplary collection system 460 of the remote debris recovery arrangement 420 may have any suitable form, configuration and components and include any suitable components for collecting, separating and/or processing debris from one or more ingestion heads 440 or performing any other desired functions. For example, as mentioned above, the vessel 10 may be useful as the collection system 460 of a remote debris recovery arrangement 420 at any desired onshore (e.g. inland waterway, tank farm) or offshore (e.g. ocean, bay) location. In these sorts of remote debris recovery arrangements 420, the collection system 460 may thus include any one or more of the features, components, capabilities, variations, operations, purposes and details of the exemplary debris recovery systems 58 described and shown elsewhere in this patent for use on vessels 10. Accordingly, the entire description of the debris recovery systems 58 of embodiments involving vessels 10 are hereby incorporated by reference herein in their entireties.

Still referring to FIG. 83, such an arrangement may be useful, for example, when the vessel 10 cannot directly access the debris and, for example, may be parked, dry-docked, positioned nearby, etc. For another example, the vessel 10 may be used with one or more ingestion heads 440 is a remote debris recovery arrangement 420 to expand the vessel's zone of collection (e.g. into multiple debris fields) beyond the immediate vicinity of the vessel 10 in conjunction with, to supplement or in place of debris collection by the vessel 10. In the illustrated embodiment, one or more ingestion heads 440 is shown deployed remote (or spaced-apart) from, and fluidly coupled to the vessel 10 to recover and transfer over debris at a desired onshore (e.g. swamps, wetlands, craters, earthen cavities, tank farms, shallow inland waterways) or offshore location.

The illustrated vessel 10, such as any of the embodiments described above, is equipped with one or more IFR's 140 for direct debris collection and is easily adaptable to (e.g. even concurrently) receive intake from the ingestion heads 440. The vessel 10 may receive intake from the ingestion head(s) 440 in any suitable manner. For example, the vessel 10 may be fluidly coupled to the ingestion heads 440 with one or more transmission conduits 480 or other components. In this embodiment, one or more couplings 436 is provided to secure at least one transmission conduit 480 extending from the ingestion head(s) 440 to the vessel 10. The illustrated couplings 436 are retractable flanges that releasably secure the transmission conduit(s) 480 (e.g. hose) to the vessel 10 so that intake from the ingestion head 440 can flow through one or more fluid passageways 100 in the conduit(s) 480 onto the vessel 10. However, the couplings 436 and/or other components for assisting in coupling one or more ingestion heads 440 with a vessel 10 could take any other form.

Figure 84:
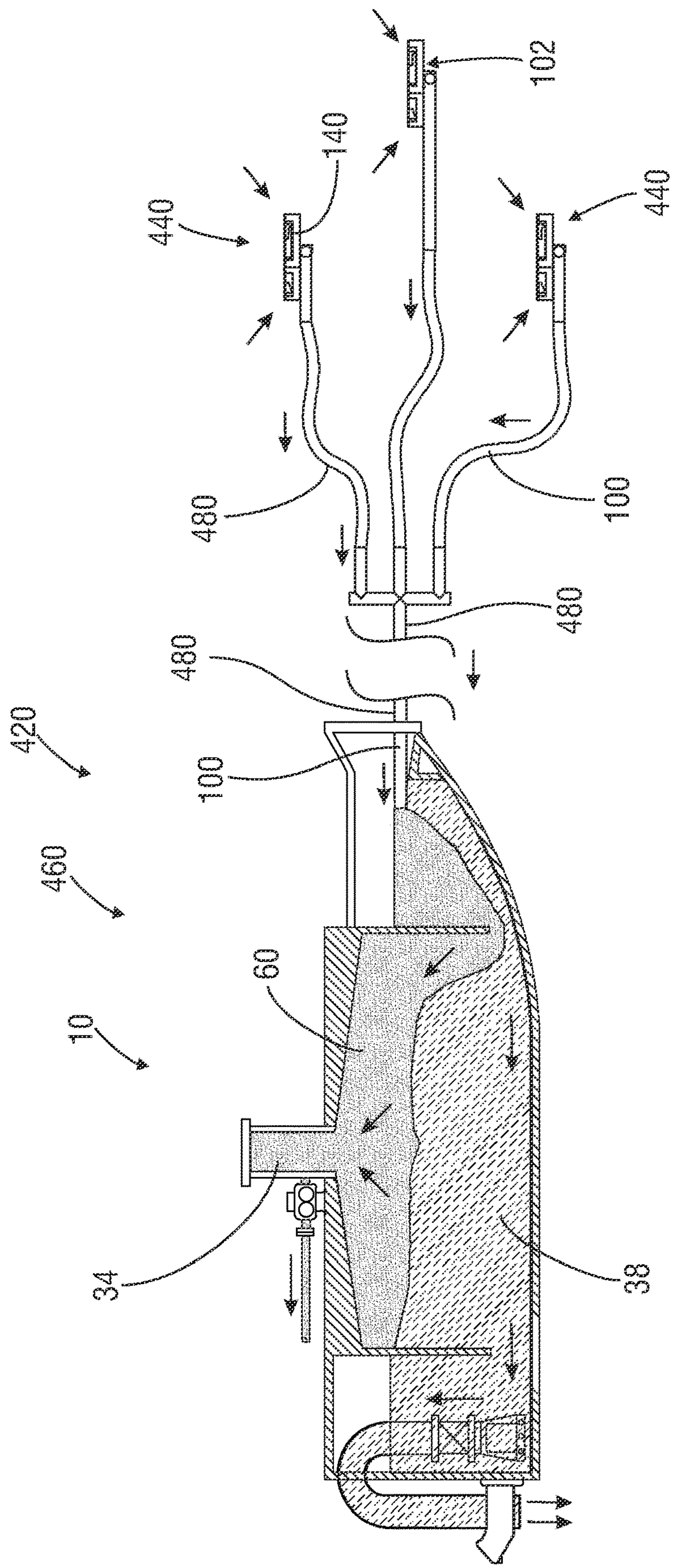
FIG. 84 is a partial cross-sectional, side view of another exemplary waterborne vessel shown fluidly coupled to one or more exemplary ingestion heads in an exemplary remote debris recovery arrangement in accordance with one or more embodiments of the present disclosure.

Still referring to FIG. 83, intake from the exemplary ingestion heads 440 may be directed to any desired location(s) on the vessel 10. In this embodiment, the transmission conduit 480 extends directly into the cargo compartment 60, bypassing the inflow chamber 310. Such an arrangement may be suitable, for example, when the ingestion heads 440 include one or more IFR's 140 that provide sufficient IFR action. In the embodiment of FIG. 84, intake from the illustrated ingestion heads 440 is instead directed into the inflow chamber 310 of the vessel 10, which, in this instance, does not have any IFRs 140. In some instances, IFR's 140 on vessel 10 may be removed when receiving intake from the ingestion head(s) 440.

Figure 85:
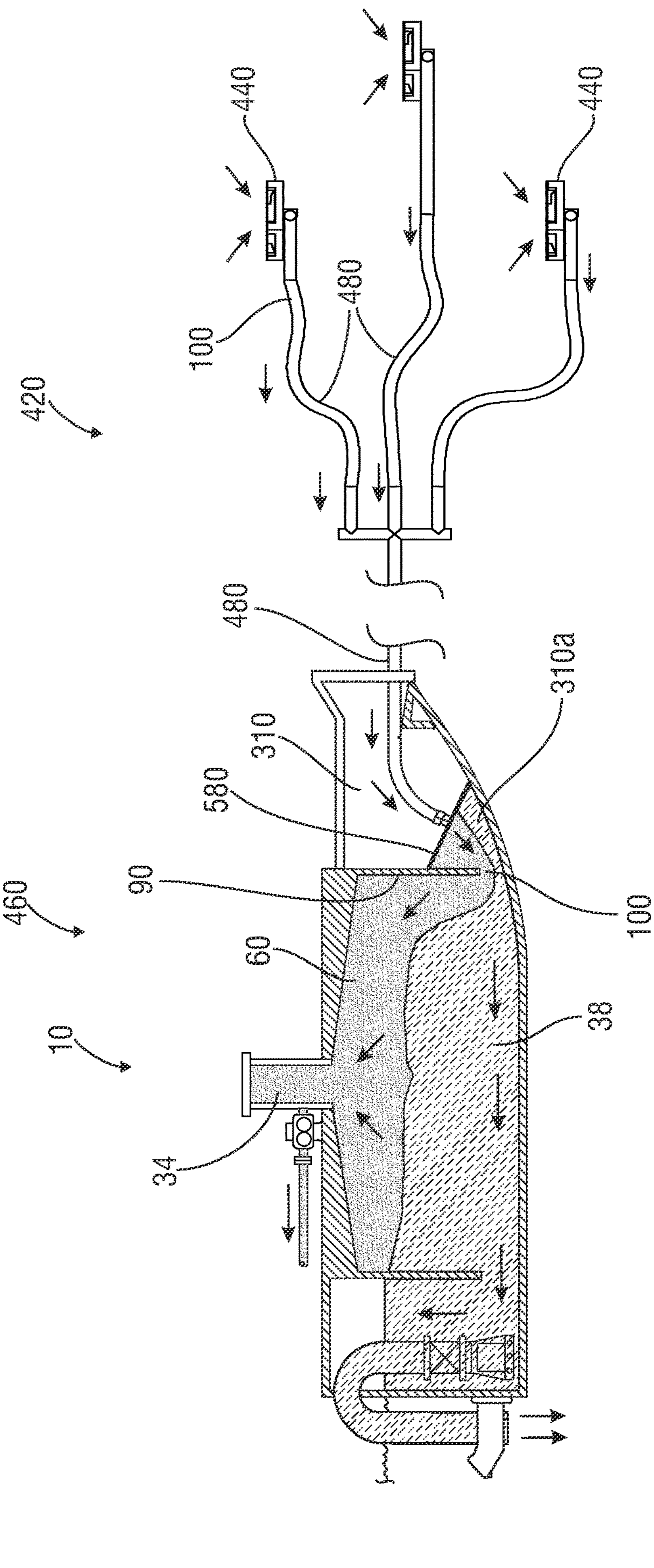
FIG. 85 is a partial cross-sectional, side view of yet another exemplary waterborne vessel shown fluidly coupled to one or more exemplary ingestion heads in an exemplary remote debris recovery arrangement in accordance with one or more embodiments of the present disclosure.
Figure 86:
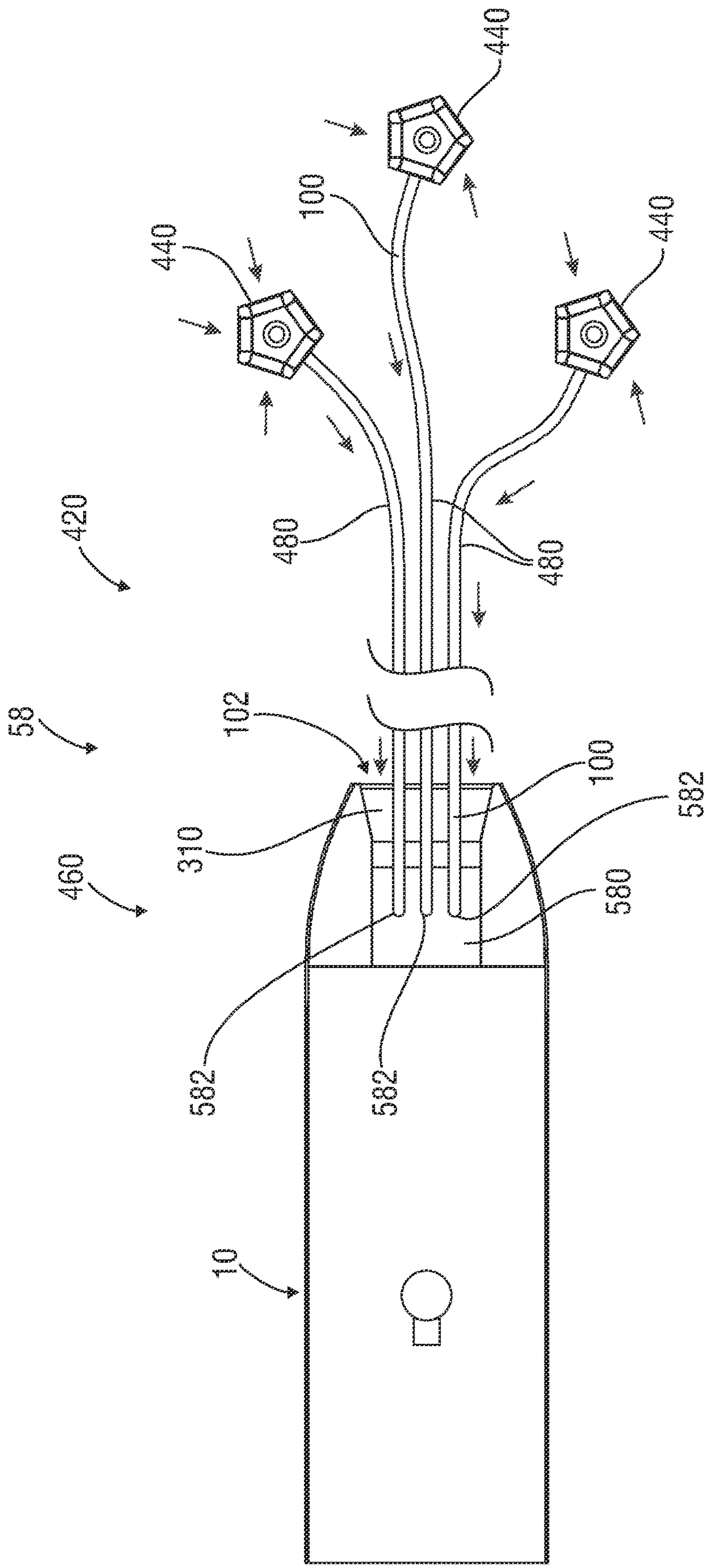
FIG. 86 is a top view of the exemplary remote debris recovery arrangement shown in FIG. 85.

Now referring to FIGS. 85-86, if desired, the intake from the ingestion head(s) 440 may be directed through one or more vacuum manifolds 580 provided in the inflow chamber 310. For example, one or more transmission conduits 480 may be releasably coupled to one or more ports 582 (e.g. camlock fitting) provided in the vacuum manifold 580 and which can be capped when not in use. When included, the vacuum manifold 580 may have any suitable form, configuration and operation. For example, the vacuum manifold 580 may provide one or more fluid-sealed portions 310*a* of the inflow chamber 310, such as to support a sealed liquid system and/or for any other purposes. In this embodiment, the vacuum manifold 580 includes one or more (e.g. solid) plates configured to extend horizontally or angularly over the rear-most part of the inflow chamber 310 to cover the adjacent passageway 100 into the cargo compartment 60 and provide a substantially fluid-tight seal over the fluid-sealed portion(s) 310*a*.

In some instances, the exemplary vacuum manifold 580 may be releasably coupled (e.g. with fastener(s)) to one or more surfaces forming the inflow chamber 310 to secure its position during use and seal the portion(s) 310*a* and be removable for stowage during non-use. In other embodiments, the vacuum manifold 580 may be movable between one or more operating and stowed positions, permanently mounted in an operating position or integral with the vessel 10. If desired, the vacuum manifold 580 may be at least partially transparent, or see-through, to allow the use of cameras or visibility to operators on the vessel 10 to observe one or more conditions in the fluid-sealed portion(s) 310*a* or for any other purposes. The exemplary manifold 580 may have any other compatible features of the inflow chamber cover 316 described and shown elsewhere.

Referring now to FIGS. 58-61, in another independent aspect of the present disclosure, the collection system 460 of the remote debris recovery arrangement 420 could be land-based (e.g. at a temporary or permanent stationary facility or at least partially skid, truck or trailer-mounted or movable across land in any other manner). In these types of remote debris recovery arrangements 420, the collection system 460 could include any one or more of the features, components, capabilities, variations, operations, purposes and details of the exemplary vessel-mounted debris recovery systems 58 shown and described herein with respect to FIGS. 1-57, except and only to the extent they may be incompatible with a land-based collection system 460 as described and shown herein. Accordingly, other than with respect to any such exceptions, the entire descriptions with respect to FIGS. 1-57 hereby incorporated by reference herein in their entireties.

Still referring to FIGS. 58-61, the illustrated collection system 460 includes a single collection tank 462 having a single collection chamber 60 therein. The collection tank 462 may have any suitable form, configuration, location and operation. For example, the collection tank 462 may be a commercially available or custom-manufactured tank or other container. However, the collection system 460 may instead include multiple collection tanks 462 and/or collection chambers 60 (and other components) of any other form.

Figure 87:
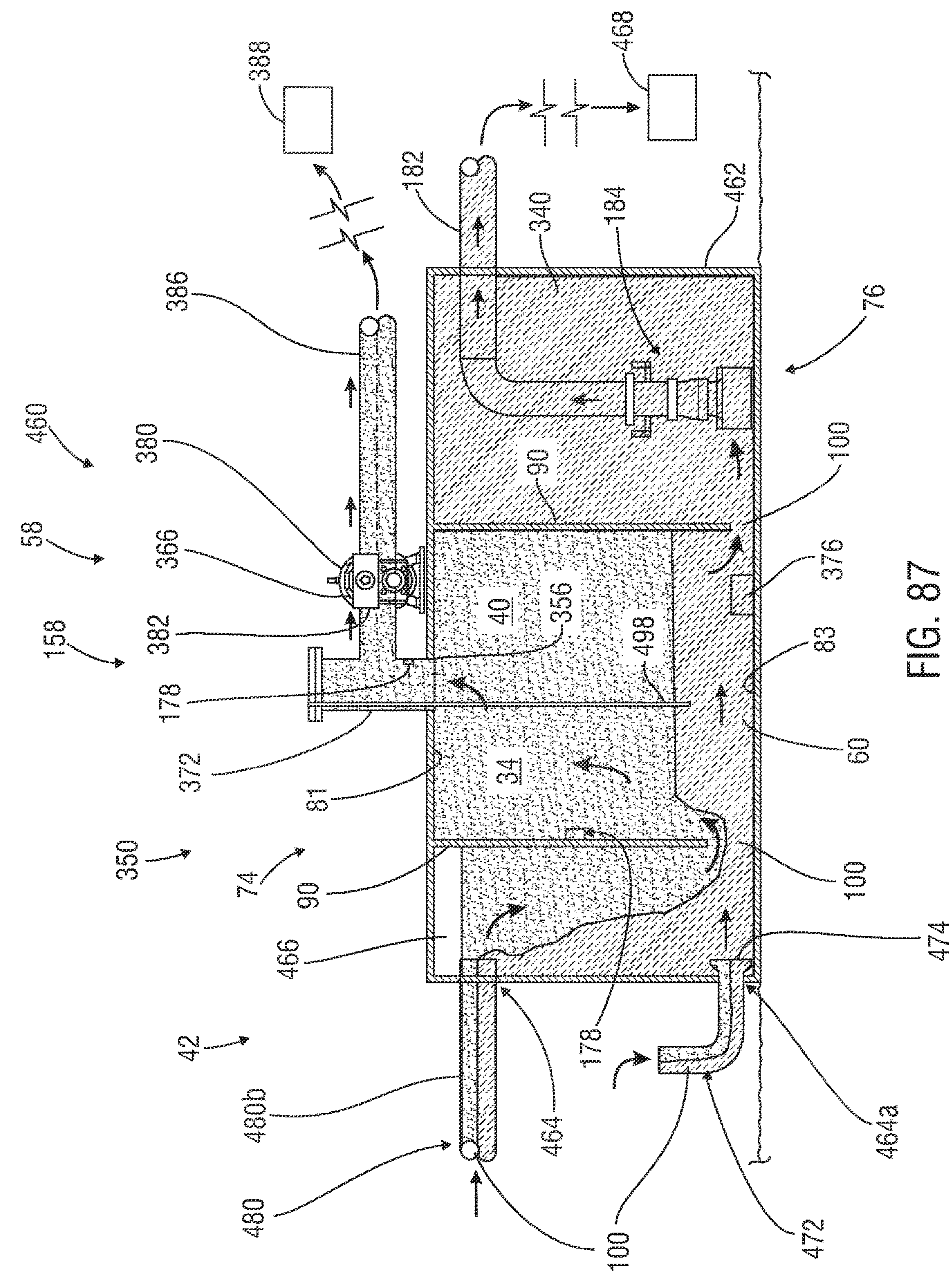
FIG. 87 is a partial cross-sectional, side view of an exemplary collection tank and other parts of an exemplary debris recovery system for use in a remote debris recovery arrangement in accordance with one or more embodiments of the present disclosure.

Referring now to FIG. 87, the exemplary connection tank 462 may be fluidly coupled to the ingestion head(s) 440 via one or more fluid passageways 100 extending through one or more transmission conduits 480. For example, a single distal transmission conduit 480*b* (from one or more ingestion heads 440) is shown fluidly coupled to the collection tank 462 at the front end 42 thereof at one or more inlet ports 464 proximate to the upper end of the collection tank 462. In many embodiments, it may be preferable to instead position the inlet port 464 closer to the bottom 83 of the collection chamber 60 (e.g. inlet port 464*a*). In some embodiments, multiple inlet ports 464 may be provided at different locations on the connection tank 462 to provide optional inlet locations, connect multiple transmission conduits 480 to the collection tank 462 (e.g. from one or multiple ingestion heads 440) for any other purposes or a combination thereof. Accordingly, the collection tank 462 may include any number of inlet ports 464 at any desired locations and coming from any desired sources. Moreover, the collection chamber(s) 60 of the collection system 460 could be fluidly coupled to one or more ingestion heads 440 in any other manner.

The collection tank 462 may, for example, simply store the inflow from the ingestion head(s) 440 in the collection chamber(s) 60, such as for later disposal or to route the inflow to one or more desired locations. In the present embodiment, the collection tank 462, at its front end 42, includes at least one inflow chamber 466 that receives the intake arriving from the ingestion head 440. The inflow chamber 466 may have any suitable form, configuration, components, operation and purpose (e.g. such as those of the inflow chamber 310). For example, the inflow chamber 466 may be provided to help decrease the velocity of the incoming inflow, allow the settling and separation process of water/debris to begin before entering the cargo compartment 60, allow, discourage reduce, or prevent emulsification of water and debris as it enters the collection tank 462, for any other purposes or a combination thereof. If desired, one or more other surfaces or components, such as vertical walls 90 (e.g. that directs the inflow upward, downward or in any other tortuous path) may form, or be provided in, the inflow chamber 466 for any such purpose(s).

Still referring to FIG. 87, in this embodiment, the inflow chamber 466 is at least partially separated from the cargo compartment 60 by at least one vertical wall 90 and fluidly coupled to the cargo compartment 60 by at least one fluid passageway, or opening, 100 (e.g. located proximate to the bottom 83 of the chamber 60) that allows fluid flow past the vertical wall 90. This exemplary vertical wall 90 and associated passageway(s) 100 between the inflow chamber 466 and cargo compartment 60 may have the same or similar features, configuration, operation, uses and benefits as the vertical wall 90 and passageway 100 described above with respect to the inflow chamber 310 and cargo compartment(s) 60 of previously described embodiments, which descriptions are hereby incorporated by reference herein in their entireties.

If desired, the fluid passageway(s) 100 between the inflow chamber 466 and cargo compartment(s) 60 may be typically fully submerged in liquid during operations (e.g. to allow a sealed liquid system), for one or more other purposes or a combination thereof). However, in other embodiments, any desired number, form, configuration and location of, or no, inflow chambers 466 and associated vertical walls 90 and passageways 100 may be included.

Figure 90:
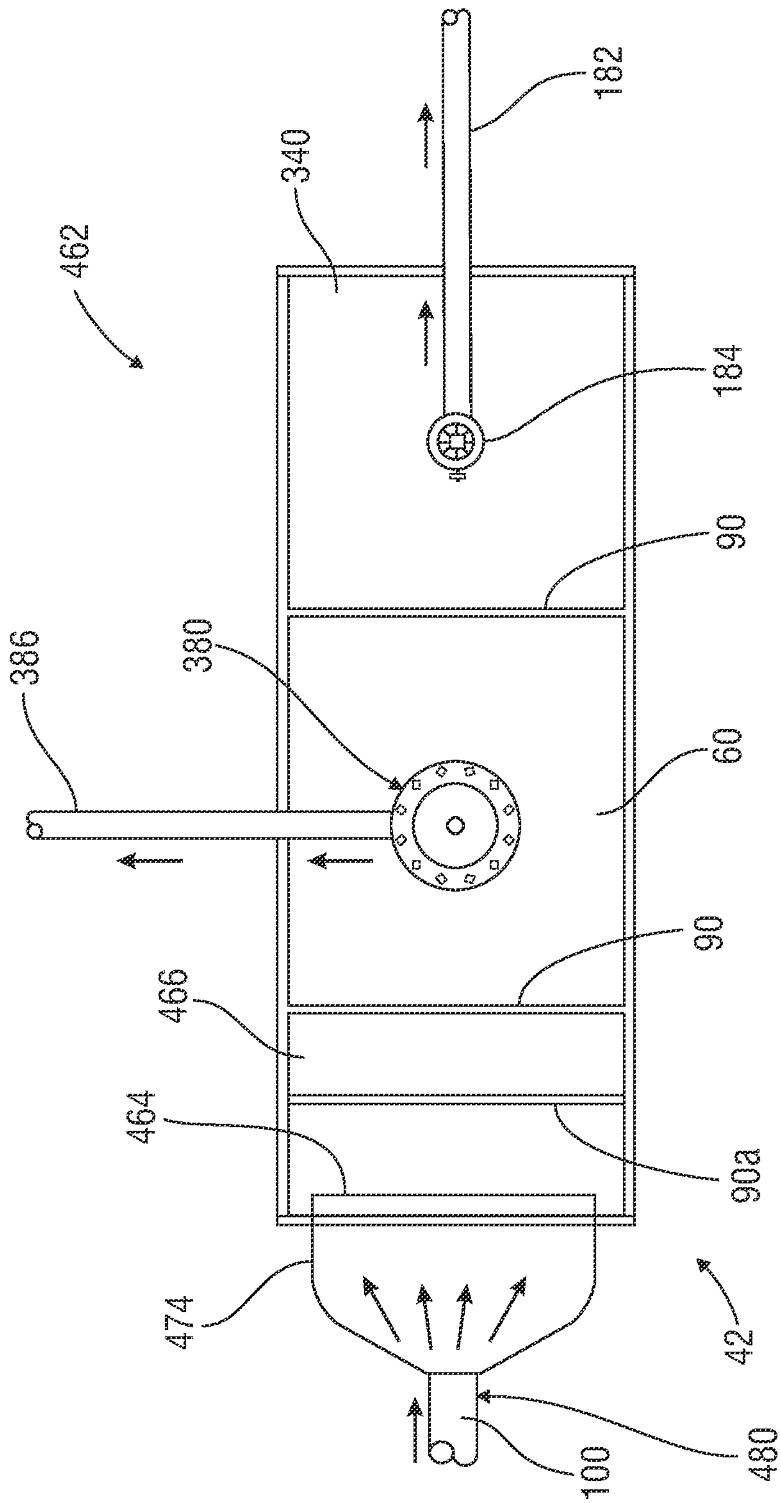
FIG. 90 is a top view of still another exemplary collection tank and other parts of an exemplary debris recovery system for use in a remote debris recovery arrangement in accordance with one or more embodiments of the present disclosure.

Referring now to FIGS. 87-90, in many embodiments, one or more additional or different features may be provided to help decrease the velocity of the water/debris entering the collection tank 462 (or other components), allow the settling and separation of water/debris to begin before entering the cargo compartment 60, allow, discourage reduce, or prevent emulsification of water and debris as it enters the collection tank 462, provide a tortuous path of the incoming water/debris, prevent the inflowing debris to be sucked (e.g. directly across the bottom 83 of the tank 462) into any associated discharge pump(s) 184, for any other purposes or a combination thereof. One or more such features may be particularly useful when an exemplary inlet ports 464 is closer to the bottom 83 of the collection tank 462. For example, in FIG. 88, at least one (e.g. upwardly extending, partial) vertical wall 90*a*, and in FIG. 89, an upwardly angled conduit section 472 (e.g. 90 degree elbow joint) coupled to the inlet port 464*a*, are provided in the inflow chamber 466 to serve one or more such purposes. For another example, such as shown in FIG. 90 one or more (e.g. custom-fabricated) wide-mouth transitions 474 may be provided at the inlet port 464 to help decrease the velocity of the intake entering the collection tank 462, reduce emulsification, for any other purposes or a combination thereof. If desired, any part of the collection tank 462 (e.g. the cargo compartment 60) may include one or more suction diffuser plates 504, such as described above. However, these components may take any other form or may not be included.

Referring back to FIG. 87, the illustrated fluid removal system 158 (of the collection system 460) may include one or more discharge pumps 184 situated in one or more cargo compartments 60 of the collection tank 462, one or more associated suction chambers 340 or elsewhere. In this embodiment, two submersible, variable speed discharge pumps 184 are disposed in a single suction chamber 340 rearward of the cargo compartment 60. Other embodiments may instead include only one or more than two (e.g. 3, 4, 5, etc.) discharge pumps 184, one or more banks of discharge pumps 184, one or more non-variable speed and/or non-submersible discharge pumps 184, more than one or no suction chamber 340, other features or a combination thereof.

The exemplary suction chamber 340 is shown separated from the cargo compartment 60 of the collection tank 462 by at least one vertical wall 90 and fluidly coupled to the cargo compartment 60 by at least one fluid passageway 100 that allows fluid flow past the vertical wall(s) 90. During debris recovery operations, the exemplary discharge pump(s) 184 are configured to create suction in the suction chamber 340, cargo compartment 60, inflow chamber 466 (if included) and the transmission conduit(s) 480 to (ideally concurrently) (i) draw debris (and typically some water) from the body of water 30, through the intake opening 102, over the IFR(s)

140 (if included) and into the inflow chamber(s) 310 of the ingestion head 440 (e.g. FIGS. 62, 74) and into the cargo compartment(s) 60 of the collection tank 462 and (ii) draw at least substantially water from the cargo compartment 60 and pump it out of the collection tank 462 to any desired destination(s). In other embodiments, (i) and (ii) may not be concurrent or may be intermittent and/or additional pumps may be used for performing (i) and/or (ii). Moreover, any other components may be used to perform the debris collection process.

Referring still to FIG. 87, the vertical wall(s) 90 and passageway(s) 100 between the suction chamber 344 and cargo compartment 60 in the collection tank 462 may have the same or similar features, configuration, operation, uses and benefits as the vertical wall 90 and passageway 100 described above with respect to the suction chamber 344 and cargo compartment 60 of previously described embodiments. For example, in this embodiment, a single passageway 100 is shown extending between the exemplary suction chamber 340 and cargo compartment(s) 60, situated proximate to the lower end 76 of the illustrated cargo compartment 60 and configured to typically be fully submersed in liquid during operations allow a vacuum to be created/maintained in the cargo compartment 60 during operations, help support a sealed liquid system, draw at least substantially only water out of the cargo compartment 60, for one or more other purposes or a combination thereof. For another example, the lower end 91 of the vertical wall 90 may not extend down to bottom 83 of the cargo compartment 60 and/or suction chamber 340.

While the exemplary passageway(s) 100 between the inflow chamber 466 and/or suction chamber 340 (if included) and cargo compartment(s) 60 of this embodiment effectively serve at least one common or similar purpose as the "suction conduit(s) 160" described above and shown in various appended figures (e.g. FIGS. 1-2, 13-20), one or more actual suction conduits 160 could, in this embodiment, be coupled to one or more of the exemplary discharge pumps 184, if desired. Accordingly, the compatible features of the suction conduit 160 as described and shown elsewhere in this patent are hereby incorporated herein by reference for these embodiments.

In some embodiments, one or more IFRs (e.g. IFRs 140, FIG. 34, 41) may be provided in any the inflow chamber 466 and/or cargo compartment 60 (or other location) of the collection system 460 to help separate debris and water therein, for any other purposes or a combination thereof. If desired, one or more selectively moveable gates (e.g. gates 110, FIGS. 3-18, 47) may be associated with one or more of the passageways 100 in the collection tank 462 to selectively seal off or fluidly isolate the inflow chamber 466 from the cargo compartment(s) 60 as desired, serve as a "sliding"-type IFR (e.g. IFR 140, FIGS. 35-39), for any other purposes or a combination thereof.

Referring again to FIG. 87, the exemplary remote debris recovery arrangement 420 may include a debris separation system 350 configured to assist in removing recovered debris from the cargo compartment 60 and/or collection tank 462. The debris separation system 350 may have any suitable form, configuration, components, operation, variation and purposes, such as those described above and shown herein with respect to other embodiments. For example, the debris separation system 350 of these embodiments may include at least one discharge port 356 and related components, such as to allow air in the cargo compartment(s) 60 to be selectively evacuated therefrom, debris floating in the cargo compartment 60 to reach up to the upper end 74 of the cargo compartment 60 for subsequent removal therefrom, help ensure only (or primarily) water is drawn by the discharge pump(s) 184 out of the cargo compartment(s) 60 during debris separation operations or any other purposes.

At least one exemplary suction chamber vent and related components (not shown) may be included to allow the suction chamber 340 to be selectively at least partially vented of air to allow flooding and/or liquid-sealing of the exemplary cargo compartment 60, transmission conduits 480 and ingestion head 440, formation of a sealed liquid system and/or for any other purposes. At least one flooding port and related components (not shown) may be included to allow the cargo compartment 60 to be selectively filled with liquid and/or for any other purposes. If desired, a vacuum may be formed in the compartment 60 so that all or a desired lesser amount of air therein may be removed therefrom and the entire cargo compartment 60 (or a desired lesser amount) filled with water, debris, other substances or a combination thereof. For example, at least one air evacuator 366 (or other components) configured to encourage flooding, filling and/or air evacuation of the cargo compartment 60 may be included. One or more debris pumps 380 configured to remove small-sized debris 40 from the cargo compartment 60 (e.g. during or after debris recovery operations) may be included.

Still referring to FIG. 87, when included, the exemplary debris pump 380 may, if desired, be configured to off-load or deliver the recovered debris to any desired location during debris recovery operations (e.g. without at least significant, or any, interruption in debris recovery) so that there is effectively no limit in the volume of debris that can be (e.g. rapidly) recovered. For example, one or more debris disposal hoses, or pipes, 386 may be coupled between the debris pump 380 and one or more tanks, bags or other debris storage containers 388 (e.g. FIGS. 58-61), any other destination or a combination thereof. Thus, the exemplary debris recovery system 58 may be configured to effectively remove a virtually unlimited volume of collected debris 40 during operations, not need necessarily to store the recovered debris within itself and be used continuously to recover debris, separate debris from water/other liquid and separately off-load collected debris and water without interruption and unlimited by volume.

In some embodiments, one or more vertical trunks 372 may be associated with (e.g. provided over) the discharge port(s) 356 in any desired manner. For example, the vertical trunk 372 may extend upwardly from (e.g. and above the upper wall 81 of) the cargo compartment 60 and/or may start inside the chamber 60, extend at least partially sideways or have any other configuration. If desired, the inlet(s) 382 to the exemplary debris pump(s) 380 may be fluidly coupled to the vertical trunk 372 upwardly of the top (e.g. upper wall 81) of the cargo compartment 60. With this exemplary arrangement, the air evacuator 366 (or other components) could be configured to evacuate air from the cargo compartment 60 sufficient to allow water/debris in the cargo compartment 60 to then fill the compartment 60 and extend up into the vertical trunk 372. In such instances, floating debris (e.g. small-sized debris 40) may be able to rise all the way to the top of the exemplary cargo compartment 60 and into the vertical trunk 372 (e.g. providing for a maximum volume of debris collected in the compartment 60 and removed therefrom). However, the vertical trunk(s) 372, when included, may have any other configuration and operation.

Still referring to FIG. 87, the exemplary debris separation system 350 may include one or more sensors 178, such as to indicate that water or debris in the cargo compartment 60 is at a desired height, depth and/or volume to turn on or off the debris pump(s) 380, any other desired purpose or a combination thereof. Alternative or additional arrangements for detecting debris/water levels in the cargo compartment 60 may include visual inspection (via camera, naked eye, etc.) by operators (e.g. through windows, periscopes, etc.), mechanical debris level indicators (e.g. configured to float on the surface of water in the cargo compartment 60 and/or vertical trunk 372 but not in debris (e.g. oil)) visible to operators or otherwise.

Referring back to FIGS. 58 & 62, if desired, the inflow chamber 310, transmission conduit(s) 480, collection chamber 60 or a combination thereof may be selectively pre-flooded or maintained with liquid (e.g. water) to a desired level at all times, or as desired. For example, it may be desirable to maintain liquid in the inflow chamber 310 above the upper edge 492*a* of the inner wall 492 and/or the lower edge 494*a* of the outer wall 494 of the vacuum cavity 496 to help support a sealed liquid system and/or for any other purposes. The inflow chamber 310, transmission conduit(s) 480, collection chamber 60 or a combination thereof may be selectively pre-flooded or maintained with liquid in any suitable manner. For example, the ingestion head 440 and/or one or more transmission conduits 480 may be coupled to a liquid (water) source for selective filling or flooding of any combination of the inflow chamber 310, transmission conduit(s) 480 and collection chamber 60. In some instances, a hose, pipe or tubing from a liquid source may be inserted into ingestion head 440. For another example, in some embodiments, the components may be back-flooded with liquid from the collection system 460.

Figure 88:
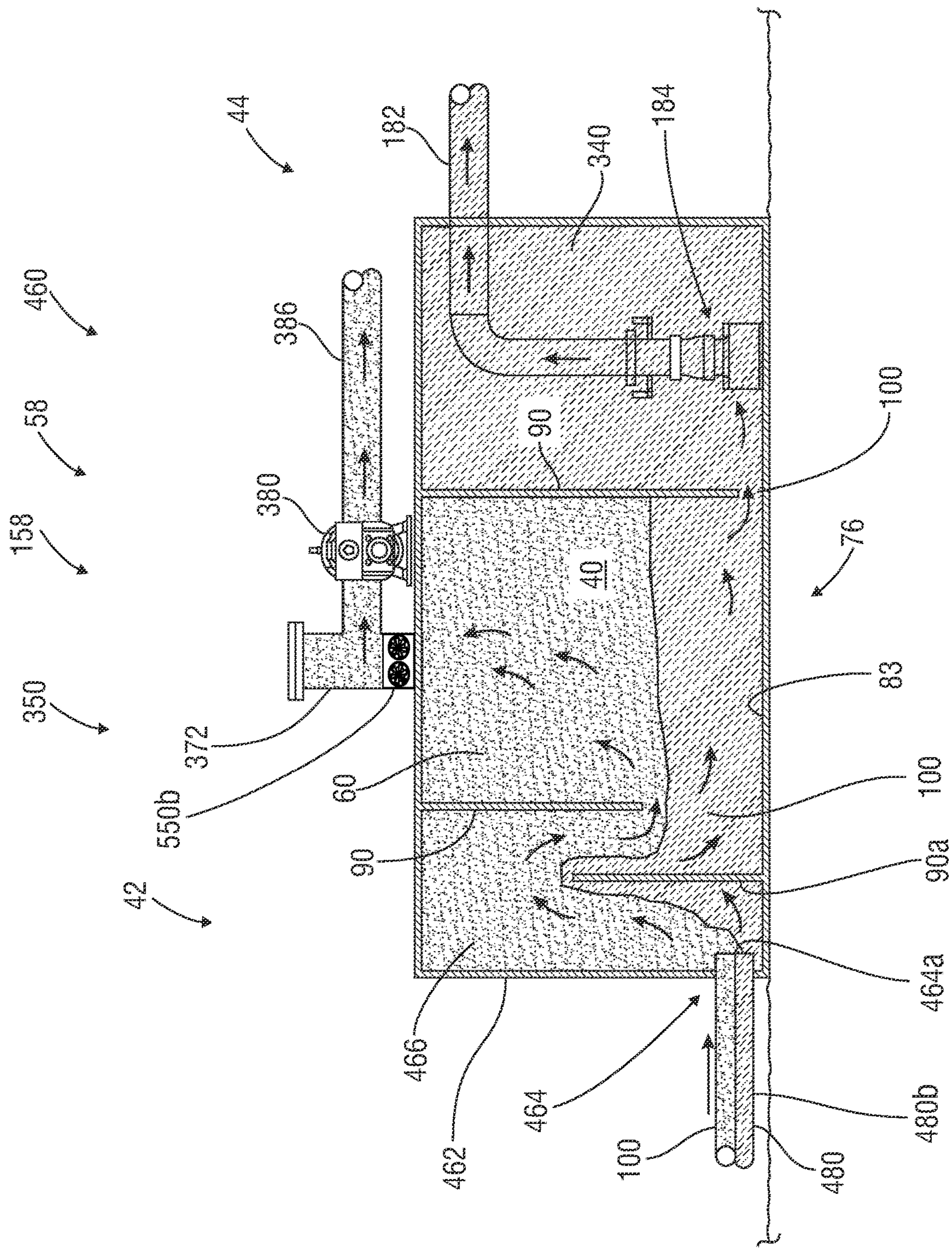
FIG. 88 is a partial cross-sectional, side view of another exemplary collection tank and other parts of an exemplary debris recovery system for use in a remote debris recovery arrangement in accordance with one or more embodiments of the present disclosure.
Figure 89:
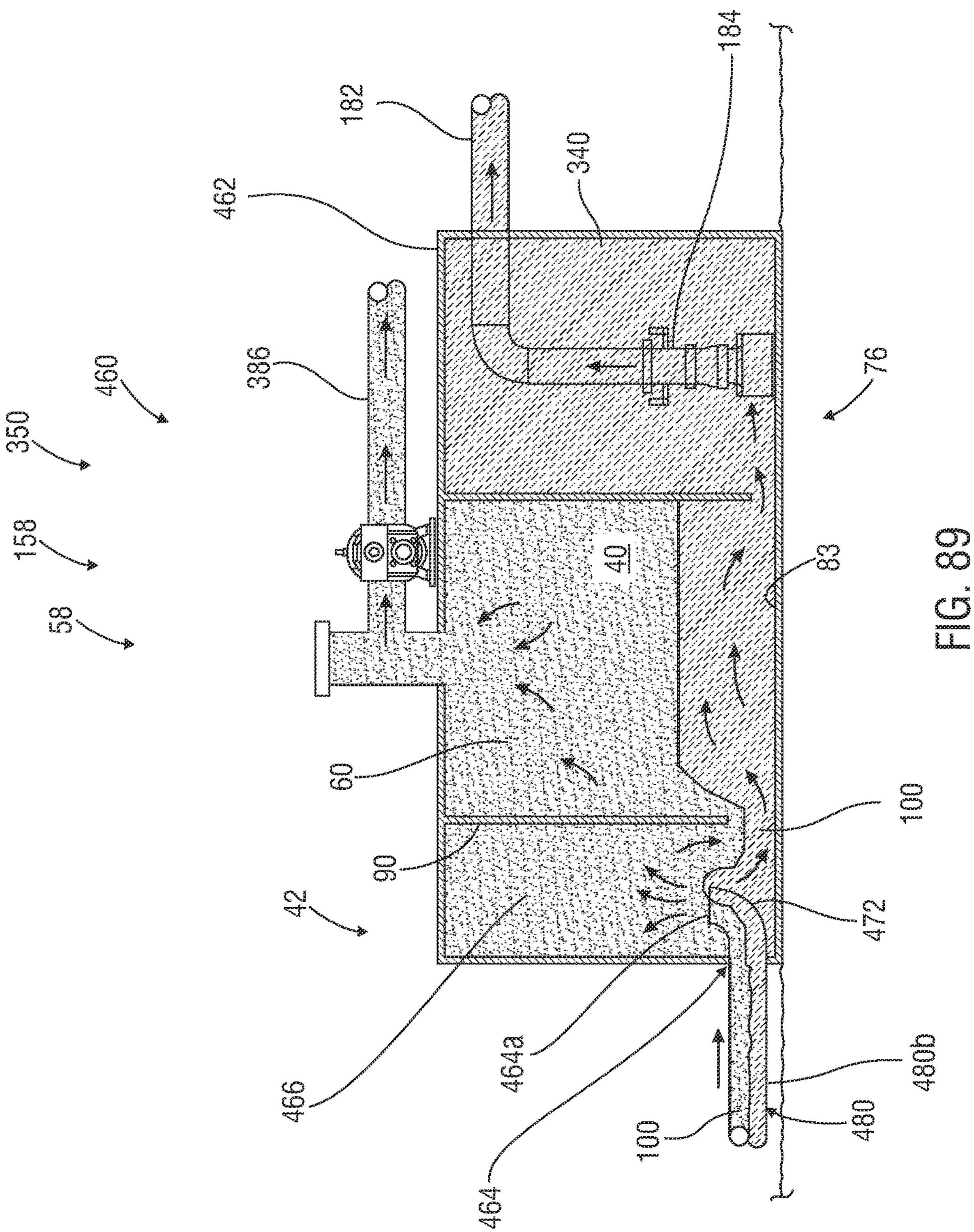
FIG. 89 is a partial cross-sectional, side view of yet another exemplary collection tank and other parts of an exemplary debris recovery system for use in a remote debris recovery arrangement in accordance with one or more embodiments of the present disclosure.

Referring briefly to FIGS. 88, the collection system 460 of the land-based embodiments may include a debris processing system 530 (e.g., FIG. 55), such as described above and shown with respect to other embodiments (the description of which is hereby incorporated by reference herein in its entirety). For example, one or more debris processors (e.g. processor 550*b*), such as a debris grinder, may be provided at any desired location in the debris recovery system 58.

Referring again to FIGS. 58-61, the liquid discharge from the exemplary discharge pump(s) 184 may be delivered to any desired destination, such as a separate water storage tank 468 and/or for recirculation (e.g. to the tank farm 424 or body of water 30). For example, the fluid removal system 158 may include one or more discharge pipe (or hose) sections 182 extending from the discharge pump(s) 184 to the water storage tank 468, body of water 30 or other location. However, any other components and techniques may be used for moving or transporting water or other liquid removed from the cargo compartment(s) 60 by the discharge pump(s) 184.

Referring now to FIGS. 62, 74 & 85, the position (and movement) of each IFR 140 in the remote debris recovery arrangement 420 and its intake resistance, the rate of inflow/volume of debris (and some water) and debris/water ratio entering the inflow chamber 310 may be regulated and varied as desired by selectively controlling one or more "controllable" variables, similarly as described above with respect to other embodiments. Some potential examples of controllable variables are the direction and speed of movement (if any) of the ingestion head 440, buoyancy of the exemplary IFR 140, the use of one or more IFR variable buoyancy mechanisms (such as described above), activity of, such as the amount of suction created by, the discharge pump(s) 184 (e.g. FIG. 87), manipulating one or more of valves in the fluid removal system 158, removal of debris from the collection system 460 (e.g. through one or more debris pumps 380) or a combination thereof. Depending upon the particular embodiment of the debris recovery system 58 and conditions of use, any one or more of the controllable variables may be evaluated and/or varied as desired (e.g. in real-time, on an ongoing basis). One or more "non-controllable" variables can also influence the position (and movement) of each IFR 140 in the inflow chamber 310, and its intake resistance, the rate of inflow/volume of debris (and some water) and debris/water ratio entering the inflow chamber 310 and can be factored in (e.g. in real-time, on an ongoing basis when deciding on the manipulation or use of one or more controllable variables). Some potential examples of non-controllable variables include environmental factors (e.g. wind, rain, wave action in the body of water 30, etc.), the type or nature (e.g. density, viscosity, thickness, composition and depth) of liquid and debris in the body of water 30 and inflow chamber 310, such as described above.

Still referring to FIGS. 62, 74 & 85, in many embodiments, the debris recovery system 58 of the of the collection system 460 will not at least substantially mix or emulsify the incoming debris and water (e.g. due to the intake resistance and/or wave dampening effect caused by the IFR 140, use of a sealed liquid system, one or more controllable variables and/or inflow optimization features), allowing the debris to rise above the water in the cargo compartment 60. These capabilities of various embodiments of the present disclosure will make separation of debris and water easy, achievable and not overly onerous or time-consuming, allow sufficiently clean water (e.g. with hydrocarbon concentration of less than 3.6 PPM (parts-per-million units of water) or less than some other desired amount, such as 10 PPM, 5 PPM, 4 PPM etc.) to be discharged from the cargo compartment 60 to the environment and thus free up more space for debris in the collection system 460, allow the collection of a higher ratio of debris to water, provide other benefits, or a combination thereof.

It should be noted that variations of the embodiments of FIGS. 58-90 may include more, fewer or different components, features and capabilities as those described or shown herein. Further, any of the details, features, components, variations and capabilities of other embodiments discussed or shown in this patent or as may be apparent from the description and drawings thereof, are applicable to the embodiments of FIGS. 58-90, except and only to the extent they may be incompatible with any features, details, components, variations or capabilities of the embodiments of FIGS. 58-90 Accordingly, other than with respect to any such exceptions, all of the details and description provided in this patent with respect to the other embodiments or as may be shown in the appended drawings relating thereto or which may be apparent therefrom, are hereby incorporated by reference herein in their entireties with respect to the embodiments of FIGS. 58-90.

Different exemplary remote debris recovery arrangements 420 may be purpose-designed or equipped for recovering primarily or only liquid or solid (e.g. plastic) debris, for on-shore or waterborne operations, for use in small or large bodies of water 30 or any combination thereof. Likewise, different exemplary vessels 10 may be designed for only direct waterborne debris recovery operations or for use with ingestion heads 440 as part of a remote debris recovery arrangement 420, for recovering only liquid (e.g. oil) debris or solid (e.g. trash) debris, for use in small (e.g. inland) or large bodies of water 30 or any combination thereof. For example, an exemplary small-version vessel 10 may be configured for direct recovery of liquid (e.g. oil) debris in small bodies of water and easily, quickly configurable to also or instead accommodate solid debris and used in a remote debris recovery arrangement 420 to receive debris intake from one or more ingestion heads 440. For another example, the vessel 10 or other collection system 460 may be a combination model for handling both liquid and solid debris. Yet another example may be a vessel 10 or other collection system designed specifically for continuous solid trash collection.

In accordance with various embodiments of the present disclosure, the debris recovery system 58 in able to recover, or ingest, and store (or dispose of) large amounts of debris (e.g. oil) on the vessel 10 or other collection system 460 without causing any or significant additional mixing, or emulsification, of the debris with water on the vessel 10 or other collection system 460. By so avoiding further emulsification, the need to separate the debris and water on the vessel 10 or in the collection system 460 is minimized or reduced, reducing the need for extensive separation equipment, allowing for the discharge of a high volume of water or high ratio of water to debris, allowing for the collection of debris accompanied with minimal contaminated water, reducing the time and cost of operations and storage and transport of the recovered debris before final disposal or recycling, producing a water output that is sufficiently contaminant free to be exhausted to the environment, for any other purpose(s) or a combination thereof. In many embodiments, a sealed liquid system and/or inflow optimization features may be provided to enhance performance during debris collection operations.

In typical oil recovery operations, an oleophilic collection process is often used followed by the use of dispersants. After the dispersants are used, however, the typical oleophilic collection processes cannot be restarted for further debris collection. Thus, it is often difficult to know when to switch over (guess at the extent of the debris field) to dispersants. The oleophilic collection process may be terminated prematurely to the detriment of thorough and effective debris recovery operations. Since the exemplary debris recovery systems 58 and methods of use thereof do not rely upon or use any oleophilic collection process, the debris recovery systems 58 can be used before and after the use of dispersants, providing great flexibility in determining when to utilize dispersants and likely improved effectiveness in debris recovery operations.

The present disclosure includes many different independent facets, such as the debris recovery system 58, fluid removal system 158, debris separation system 350, vessel 10, remote debris recovery arrangement 420, collection system 460, collection tank 462 and injection head 440, each of which can include any one or more of the components, features, details and uses described or shown herein with respect to any embodiments herein, and each of which is not limited to or by the particular form, configuration, construction, components, location, operation and other details relating thereto as described above and shown in the appended figures. Thus, the details of the debris recovery system 58, fluid removal system 158, debris separation system 350, vessel 10, remote debris recovery arrangement 420, collection system 460, collection tank 462 and injection head 440 as provided and shown herein are not limiting upon the present patent and its claims or claims of any patents related hereto, unless and only to the extent as may be expressly provided in a particular claim and only for that claim and claims depending therefrom. Further, each such facet and its components and uses can be a stand-alone product or service and thus a unique invention in its own right, separate and distinct from other facets, components and uses.

It should be noted that the form, quantity, size, configuration, construction, precise location, orientation and operation of the components mentioned above are not limited or limiting upon the present disclosure or any claims of any patents related hereto, unless and only to the extent as may be expressly provided in a particular claim and only for that claim and claims depending therefrom.

Any of the components described above or shown in the appended figures may be automated or electronically or remotely controlled, such as with a computer-based controller, artificial intelligence, computer software and circuits, robotics and otherwise as is and becomes further know, to the extent that electronic control is desired and compatible for use with such component(s).

Each embodiment described herein or shown in the appended figures and any other embodiments of the debris recovery system 58 may have any one or more of the features described herein, shown in the appended figures or apparent therefrom. Thus, the exemplary embodiments, for example, do not require all of the features presented herein or shown in the appended figures for such embodiments or other embodiments. Accordingly, all of the above components are not required for every or any particular embodiment of the debris recovery system 58 and/or any other components may be used. In fact, it should be clearly understood that the debris recovery system 58 may consist of merely one or more tanks, containers, bladder bags, or any other suitable structure or area for the storage, processing or other disposition water, debris, other substances and materials, or a combination thereof.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Accordingly, different embodiments of the present disclosure may have any one or more of the features described or shown in, or which may be apparent from, this patent. Moreover, the present invention includes additional features, capabilities, functions, methods, uses and applications that have not been specifically addressed herein but are, or will become, apparent from the description herein, the appended drawings and/or claims.

The methods described above or claimed herein and any other methods which may fall within the scope of the appended claims can be performed in any desired or suitable order and are not necessarily limited to any sequence described herein or as may be listed in the appended claims. Further, the methods of various embodiments of the present disclosure may include additional acts beyond those mentioned herein and do not necessarily require use of the particular components shown and described herein, but are equally applicable with any other suitable structure, form and configuration of components.

While exemplary embodiments have been shown and described, many variations, modifications and/or changes of the system, apparatus and methods of the present disclosure, such as in the components, details of construction and operation, arrangement of parts and/or methods of use, are possible, contemplated by the patent applicant(s) hereof, within the scope of any appended claims, and may be made and used by one of ordinary skill in the art without departing from the spirit, teachings and scope of this disclosure and any appended claims. Thus, all matter herein set forth or shown in the accompanying drawings should be interpreted as illustrative, and the scope of the disclosure and any appended claims should not be limited to the embodiments described or shown herein.

The invention claimed is:

1. A system for processing floating solid debris recovered from a body of water on a vessel, the vessel having at least one chamber, at least one intake opening fluidly coupled to the at least one chamber and through which water enters the at least one chamber from the body of water and at least one discharge port fluidly coupled to the at least one chamber and through which at least some processed solid debris exits the at least one chamber, each item of floating solid debris having an original respective size, the system comprising:

a first debris processor disposed on the vessel between the at least one intake opening and the at least one discharge port and configured to fragment floating solid debris from the body of water into fragments, each solid debris fragment having a fragmented size that is smaller than the original size of the solid debris from which it was fragmented; and a second debris processor disposed on the vessel between the first debris processor and the at least one discharge port and configured to receive solid debris fragments fragmented by the first debris processor and re-fragment at least some of the received fragments into a size that is smaller than the fragmented size thereof and allow at least some of the re-fragmented solid debris to enter the at least one discharge port, wherein the at least one chamber of the vessel includes at least first and second chambers, the first chamber being an inflow chamber positioned proximate to the at least one intake opening and the second chamber being a main cargo compartment fluidly coupled between the inflow chamber and at least one discharge port, and wherein the first debris processor is configured to fragment solid debris before it enters the main cargo compartment and the second debris processor is configured to re-fragment at least some of the solid debris fragments received thereby from the main cargo compartment and before the solid debris fragments enter the at least one discharge port.

2. The system of claim 1 wherein the first debris processor is configured to discharge at least some of the solid debris fragments fragmented thereby into the inflow chamber and the second debris processor is configured to receive at least some of the solid debris fragments fragmented by the first debris processor.

3. The system of claim 1 wherein the first debris processor is configured to be positioned above the inflow chamber.

4. The system of claim 1 wherein the first debris processor is configured to receive and fragment floating solid debris constructed at least partially of any among plastic, metal, glass, fabric, other man-made materials, wood or a combination thereof, and the second debris processor is configured to reduce at least some of the solid debris fragments received thereby into finely ground particles.

5. The system of claim 4 wherein the first debris processor includes an industrial shredder capable of receiving and grinding wood and metal into smaller fragmented pieces and the second debris processor includes a grinder.

6. The system of claim 1 further including a debris pump having at least one inlet fluidly coupled to at least one discharge port, wherein the second debris processor is configured to allow at least some of the solid debris fragments re-fragmented thereby to enter at least one inlet of the debris pump.

7. The system of claim 6 wherein the second debris processor is arranged so that all of the solid debris fragments re-fragmented thereby enter at least one inlet of the debris pump.

8. The system of claim 1 wherein the main cargo compartment has upper and lower ends and the second debris processor is positioned closer to the upper end than the lower end of the main cargo compartment.

9. The system of claim 1 further including a conveyor configured to extend from the vessel to the body of water and receive floating solid debris from the body of water and deliver it to the first debris processor.

10. The system of claim 9 wherein the body of water has a surface and the conveyor is elongated, has first and second ends and is positioned during floating solid debris collection operations so that the first end thereof extends at least partially over the inflow chamber and the second end thereof is positioned proximate to the surface of the body of water.

11. The system of claim 10 wherein the first debris processor is positioned closer to the first end than the second end of the conveyor.

12. The system of claim 11 wherein the first debris processor is positioned at least partially below the conveyor, wherein at least some of the collected floating solid debris drops from the conveyor into the first debris processor.

13. The system of claim 10 wherein the conveyor is positioned during floating solid debris collection operations so that the second end thereof is positioned below the surface of the body of water.

14. The system of claim 10 wherein the conveyor is positioned during floating solid debris collection operations so that the second end thereof is positioned at the surface of the body of water.

15. The system of claim 9 wherein the conveyor is at least partially porous and configured to allow floating solid debris having an outer dimension of up to one and one-half inches to filter therethrough and into at least one chamber of the vessel.

16. The system of claim 9 wherein the first debris processor is configured to be positioned within the inflow chamber.

17. The system of claim 9 wherein the conveyor is at least partially porous and configured to allow floating solid debris having no dimension greater than one inch to filter therethrough.

18. The system of claim 1 wherein the vessel and main cargo compartment each have respective upper and lower ends, further including at least one wall extending at least partially between the upper and lower ends of the vessel and at least partially separating the main cargo compartment and inflow chamber, at least one passageway fluidly coupling the inflow chamber and main cargo compartment, wherein the at least one discharge port is fluidly coupled to the main cargo compartment at a height higher than the height of the at least one passageway, and an inflow regulator (IFR) configured to at least partially float in the inflow chamber at a height higher than the height of the at least one passageway, wherein the inflow chamber and main cargo compartment are configured so that buoyant debris and water can move from the body of water onto the vessel through at least one intake opening thereof and into the inflow chamber, pass over the IFR and then move downwards to and through at least one passageway and into the main cargo compartment, then upwardly therein to at least one debris removal outlet.

19. The system of claim 1 wherein the first debris processor includes a shredder and the second debris processor includes a grinder.

20. The system of claim 1 wherein the first and second debris processors each include an in-line grinder, respectively.

21. The system of claim 1 wherein the second debris processor includes a shredder.

22. The system of claim 1 wherein at least one among the first and second debris processors includes a macerator.

23. The system of claim 1 wherein at least one among the first and second debris processors includes a clean-out configured to collect debris items that are too big to be processed or are otherwise rejected thereby.

24. The system of claim 1 further including at least one feeder configured to help feed at least some of the solid debris into the first debris processor.

25. The system of claim 24 wherein the at least one feeder includes at least one funnel.

26. The system of claim 1 further including at least one robotic handler configured to help feed at least some of the solid debris into the first debris processor.

* * * * *